(12) United States Patent
Kitamura et al.

(10) Patent No.: US 9,189,843 B2
(45) Date of Patent: Nov. 17, 2015

(54) PATTERN INSPECTION APPARATUS AND METHOD

(75) Inventors: Tadashi Kitamura, Yokohama (JP);
Toshiaki Hasebe, Tokyo (JP);
Masotoshi Tsuneoka, Tokyo (JP)

(73) Assignee: NGR Inc., Tokyo (JP)

( * ) Notice: Subject to any disclaimer, the term of this patent is extended or adjusted under 35 U.S.C. 154(b) by 412 days.

(21) Appl. No.: 13/604,456

(22) Filed: Sep. 5, 2012

(65) Prior Publication Data
US 2012/0328181 A1  Dec. 27, 2012

Related U.S. Application Data

(62) Division of application No. 13/152,227, filed on Jun. 2, 2011, now Pat. No. 8,285,031, which is a division of application No. 11/987,766, filed on Dec. 4, 2007, now Pat. No. 7,983,471.

(30) Foreign Application Priority Data

Dec. 5, 2006  (JP) .................................. 2006-328802

(51) Int. Cl.
*G06K 9/00* (2006.01)
*G06T 7/00* (2006.01)

(52) U.S. Cl.
CPC . *G06T 7/001* (2013.01); *G06K 9/00* (2013.01); *G06K 2209/19* (2013.01); *G06T 2207/30148* (2013.01)

(58) Field of Classification Search
None
See application file for complete search history.

(56) References Cited

U.S. PATENT DOCUMENTS

| 4,589,139 A | 5/1986 | Hada et al. |
| 4,805,123 A | 2/1989 | Specht et al. |
| 4,958,374 A | 9/1990 | Tokita et al. |
| 5,046,109 A | 9/1991 | Fujimori et al. |

(Continued)

FOREIGN PATENT DOCUMENTS

| DE | 198 03 021 | 7/1998 |
| EP | 0 930 499 | 7/1999 |

(Continued)

OTHER PUBLICATIONS

"Automated Failure Part Tracing Method for a Logic LSI Using an Electron Beam Tester", NEC Technical Report, vol. 50, No. 6, 1997, pp. 20-31 (partial English translation).

(Continued)

*Primary Examiner* — Aaron W Carter
(74) *Attorney, Agent, or Firm* — Lathrop & Gage LLP

(57) ABSTRACT

A pattern inspection apparatus is used for inspecting a fine pattern, such as a semiconductor integrated circuit (LSI), a liquid crystal panel, and a photomask (reticle) for the semiconductor or the liquid crystal panel, which are fabricated based on data for fabricating the fine pattern such as design data. The pattern inspection apparatus includes a reference pattern generation device configured to generate a reference pattern represented by one or more lines, comprising one of a line segment and a curve, from the data, an image generation device configured to generate the image of the pattern to-be-inspected, a detecting device configured to detect an edge of the image of the pattern to-be-inspected, and an inspection device configured to inspect the pattern to-be-inspected by comparing the edge of the image of the pattern to-be-inspected with the one or more lines of the reference pattern.

2 Claims, 92 Drawing Sheets

(56) References Cited

U.S. PATENT DOCUMENTS

| | | | |
|---|---|---|---|
| 5,129,009 | A | 7/1992 | LeBeau |
| 5,137,362 | A | 8/1992 | LeBeau |
| 5,379,350 | A | 1/1995 | Shimazu et al. |
| 5,398,292 | A | 3/1995 | Aoyama |
| 5,407,763 | A | 4/1995 | Pai |
| 5,479,537 | A | 12/1995 | Hamashima et al. |
| 5,563,702 | A | 10/1996 | Emery et al. |
| 5,600,734 | A | 2/1997 | Okubo et al. |
| 5,801,965 | A | 9/1998 | Takagi et al. |
| 5,807,649 | A | 9/1998 | Liebmann et al. |
| 5,978,501 | A | 11/1999 | Badger et al. |
| 6,023,530 | A | 2/2000 | Wilson |
| 6,040,911 | A | 3/2000 | Nozaki et al. |
| 6,047,083 | A | 4/2000 | Mizuno |
| 6,072,897 | A | 6/2000 | Greenberg et al. |
| 6,868,175 | B1 | 3/2005 | Yamamoto et al. |
| 7,181,059 | B2 | 2/2007 | Duvdevani et al. |
| 7,206,443 | B1 | 4/2007 | Duvdevani et al. |
| 7,234,128 | B2 | 6/2007 | Gau et al. |
| 7,388,978 | B2 | 6/2008 | Duvdevani et al. |
| 7,454,051 | B2 | 11/2008 | Hirano et al. |
| 7,526,119 | B2 | 4/2009 | Isomura et al. |
| 7,796,801 | B2 | 9/2010 | Kitamura et al. |
| 7,817,844 | B2 | 10/2010 | Kitamura et al. |
| 8,010,307 | B2 | 8/2011 | Fang et al. |
| 8,119,310 | B1 | 2/2012 | Lu et al. |
| 2004/0081350 | A1 | 4/2004 | Kitamura et al. |
| 2004/0120571 | A1 | 6/2004 | Duvdevani et al. |
| 2004/0126005 | A1 | 7/2004 | Duvdevani et al. |
| 2005/0146714 | A1 | 7/2005 | Kitamura et al. |
| 2005/0226494 | A1 | 10/2005 | Yamamoto et al. |
| 2006/0039597 | A1 | 2/2006 | Kontani et al. |
| 2006/0245636 | A1 | 11/2006 | Kitamura et al. |
| 2009/0110262 | A1 | 4/2009 | Noguchi et al. |
| 2010/0278416 | A1 | 11/2010 | Xiao et al. |
| 2010/0328655 | A1 | 12/2010 | Den Boef |

FOREIGN PATENT DOCUMENTS

| | | |
|---|---|---|
| JP | 63-88682 | 4/1988 |
| JP | 4-194702 | 11/1993 |
| JP | 8-76359 | 3/1996 |
| JP | 8-110305 | 4/1996 |
| JP | 2747105 | 5/1998 |
| JP | 10-307917 | 11/1998 |
| JP | 10-312461 | 11/1998 |
| JP | 11-231507 | 8/1999 |
| JP | 2001-338304 | 12/2001 |
| JP | 2003-100825 | 4/2003 |

OTHER PUBLICATIONS

Haralick R. M. et al., "Digital Step Edges from Zero Crossing of Second Directional Derivatives", IEEE Transactions on Pattern Analysis and Machine Intelligence, vol. PAMI-6, No. 1 Jan. 1984, pp. 58-68.

Steger, C. et al., "An Unbiased Detector of Cuvilineau Structures", IEEE Transactions on Pattern Analysis and Machine Intelligence, vol. 20, No. 2, Feb. 1998, pp. 113-125.

Pavlidis, T. et al., "Segmentation of Plane Curves", IEEE Transactions on Computers, vol. C-23, No. 8, Aug. 1974, pp. 860-870.

Hashimoto, M. et al., "High Speed Template Matching Algorithm Using Information of Contour Points," Systems and Computers in Japan vol. 23, No. 9, pp. 78-87, 1992.

Official Notice of Rejection, Japanese Patent Office, dated Feb. 21, 2003 for Patent Application No. 2000-258234, with English Translation.

U.S. Appl. No. 11/434,797 Notice of Allowance mailed May 10, 2010, 7 pages.

U.S. Appl. No. 11/058,616 Notice of Allowance mailed Jun. 14, 2010, 6 pages.

U.S. Appl. No. 11/058,616 Response to Office Action filed Apr. 26, 2010, 26 pages.

U.S. Appl. No. 11/044,159, Notice of Allowance dated Sep. 25, 2009, 9 pages.

U.S. Appl. No. 11/044,159, Terminal Disclaimer dated Aug. 11, 2009, 3 pages.

U.S. Appl. No. 11/044,159, Response to Office Action dated Jul. 31, 2009, 13 pages.

U.S. Appl. No. 11/044,159, Office Action dated Jun. 12, 2009, 22 pages.

U.S. Appl. No. 11/044,159, Response to Office Action dated Mar. 25, 2009, 16 pages.

U.S. Appl. No. 11/044,159, Office Action dated Dec. 11, 2008, 20 pages.

U.S. Appl. No. 11/044,159, Response to Office Action dated Aug. 29, 2008, 16 pages.

U.S. Appl. No. 11/044,159, Office Action dated Apr. 30, 2008, 11 pages.

U.S. Appl. No. 09/648,372, Notice of Allowance dated Oct. 28, 2004, 7 pages.

U.S. Appl. No. 09/648,372, Response and Amendment dated Sep. 3, 2004, 14 pages.

U.S. Appl. No. 09/648,372, Office Action dated Jun. 3, 2004, 7 pages.

U.S. Appl. No. 09/648,372, Preliminary Amendment and Response to Restriction Requirement dated Mar. 18, 2004, 15 pages.

U.S. Appl. No. 09/648,372, Restriction Requirement dated Feb. 19, 2004, 5 pages.

U.S. Appl. No. 09/648,372, Response to Office Action dated Dec. 12, 2003, 31 pages.

U.S. Appl. No. 09/648,372, Office Action dated Aug. 13, 2003, 7 pages.

U.S. Appl. No. 11/058,616, Office Action mailed Aug. 14, 2009, 22 pages.

U.S. Appl. No. 11/058,616, Response to Office Action filed Nov. 9, 2009, 28 pages.

U.S. Appl. No. 11/058,616, Office Action mailed Jan. 13, 2010, 7 pages.

U.S. Appl. No. 11/434,797 Office Action mailed Jan. 15, 2010, 7 pages.

U.S. Appl. No. 11/434,797 Response to Office Action filed Apr. 14, 2010, 16 pages.

U.S. Appl. No. 12/852,314, Response to Office Action filed Dec. 16, 2010, 20 pages.

U.S. Appl. No. 12/852,314, Office Action mailed Nov. 19, 2010, 17 pages.

U.S. Appl. No. 12/852,314, Notice of Allowance and Interview Summary mailed Jul. 14, 2011, 9 pages.

U.S. Appl. No. 12/852,314, Office Action mailed Apr. 20, 2011, 10 pages.

U.S. Appl. No. 12/852,314, Response to Office Action filed Jun. 17, 2011, 12 pages.

Yang, et al., "Systematic and Random Defect Control with Design Based Metrology", Proc. of SPIE vol. 7638, pp. 76380I-8, 2010.

Hashimoto, K, et al. "Tolerance-Based Wafer Verification Methodologies with a Die-to-Database Inspection System", Jpn. J. Appl Phys. 48 (2009), pp. 076502-1-502-7.

Hagio, Y, et al. "Novel Mask-Qualification Methodology with Die-to-Database Wafer Inspection System", Proc. of SPIE 7379 (2009), pp. 73790V-1-90V-9.

Hagio, Y, et al. "Hotspot Management for Spacer Patterning Technology with Die-to-Database Wafer Inspection System", Proc. of SPIE 7275 (2009), pp. 72750V-1-50V-10.

Yang, H, et al. "Systematic Defect Filtering and Data Analysis Methodology for Design Based Metrology", Proc. of SPIE (2009), 8 pages.

Kim, J, et al. "The APC (Advanced Process Control) Procedure for Process Window and CDU improvement using DBMs", Proc. of SPIE 7140 (2008), pp. 71403G-1-03G-11.

Park, D, et al. "Novel process proximity correction by the pattern to pattern matching method with DBM", Proc. of SPIE 7140 (2008), pp. 71403K-1-03K-8.

Hashimoto, K, et al. "Hot Spot Management with Die-to-Database Wafer Inspection System", Proc of SPIE 6925 (2008), pp. 692517-1-517-8.

(56) References Cited

OTHER PUBLICATIONS

Park, J, et al. "Systematic Defect Inspection and Verification for Distributions of Critical Dimension in OPC Models Utilizing Design Based Metrology Tool", Proc. of SPIE 6922 (2008), pp. 69222C-1-22C-9.

Yang, H, et al. "Wide Applications of Design Based Metrology with Tool Integration", Proc. of SPIE 6922 (2008), pp. 692239-1-239-7.

Kitamura, T, et al. "A New Robust Process Window Qualification (PWQ) Technique to Perform Systematic Defect Characterization to Enlarge the Lithographic Process Window, using a Die-to-Database Verification Tool (NGR2100)", Proc. of SPIE 6925 (2008), pp. 692519-1-519-5.

Yamaguchi, S, et al. "Accuracy of Mask Pattern Contour Extraction with Fine-pixel SEM Images", Proc. of SPIE 6730 (2007), pp. 673036-1-036-12.

Lau, M, et al. "A SEM-based System for Photomask Placement Metrology", Proc. of SPIE, 6607 (2007), pp. 660727-1-727-11.

Melliar-Smith, M, "Lithography Beyond 32nm—A Role for Imprint?", Proc. of SPIE (2007), 14 pages.

Kitamura et al., "Die-to-Database Verification Tool for Detecting CD Errors, which are caused by OPC Features, by using Mass Gate Measurement and Layout Information", Proc. of SPIE, vol. 6518 (2007), pp. 651834-1-651834-9.

Yang, H, et al. "Advanced Process Control with Design Based Metrology", Proc. of SPIE 6518 (2007), pp. 651821-1-821-8.

Kim, J, et al. "OPC and Design Verification for DFM using Die-to-Database Inspection", Proc. of SPIE 6521 (2007), pp. 652117-1-117-10.

Kim, C, et al. "DFM flow by using combination between design based metrology system and model based verification at sub-50nm memory device", Proc. of SPIE 6521 (2007), pp. 65210T-1-10T-4.

Yune, H, et al. "CD uniformity improvement of sub 60nm contact hole using model based OPC", Proc. of SPIE 7140 (2008), pp. 71403E-1-03E-8.

Suneoka, M, et al. "Direct Die to Database Electron Beam Inspection of Fused Silica Imprint Templates", Proc. of SPIE 6349 (2006), pp. 63492D-1-92D-8.

Hoffman, M, et al. "Introduction of a Die-to-Database Verification Tool for Mask Geometry NGR4000", Proc. of SPIE 6349 (2006), pp. 634940-1-940-6.

Yang, H, et al. "New OPC Verification Method using Die-to-Database Inspection", Proc. of SPIE 6152 (2006), pp. 615232-1-232-9.

Myron et al., "Defect Inspection for Imprint Lithography Using a Die to Database Electron Beam Verification System", Proc. of SPIE vol. 6151 (2006), pp. 61510M-1-61510M-10.

Kitamura, T, et al. "Introduction of a Die-to-Database Verification Tool for the Entire Printed Geometry of a Die—Geometry Verification System NGR2100 for DFM", Proc. of SPIE 5853 (2005), pp. 988-999.

Kitamura, T., Hasebe, T. et al. "Die-to-database verification tool using mass gate measurement and Layout Information for detecting critical dimension errors" Proc. of SPIE vol. 6518 (2007) pp. 651834-1-651834-9.

Melliar Smith, M. et al. "Step and Flash Imprint for Silicon Integrated Circuit Applications" NGL 2006, Jul. 6-7, 2006, Tokyo, Japan, 4 pages.

Resnick, D. et al., "A template infrastructure for step-and-flash imprint lithography", Microlithography World, Feb. 2006, Accessed on the Internet Mar. 9, 2006.

Resnick, D. et al., "Template Advances in Step and Flash Imprint Lithography", undated, 5 pages.

U.S. Appl. No. 12/725,141 Notice of Allowance mailed Nov. 28, 2001, 9 page.

U.S. Appl. No. 12/725,141 Response to Office Action filed Sep. 27, 2001, 13 pages.

U.S. Appl. No. 12/725,141, Office Action mailed Jul. 22, 2001, 10 pages.

Select File History from related U.S. Appl. No. 13/152,227, dated Nov. 21, 2011 through Jun. 6, 2012, 46 pages.

F I G. 1 0
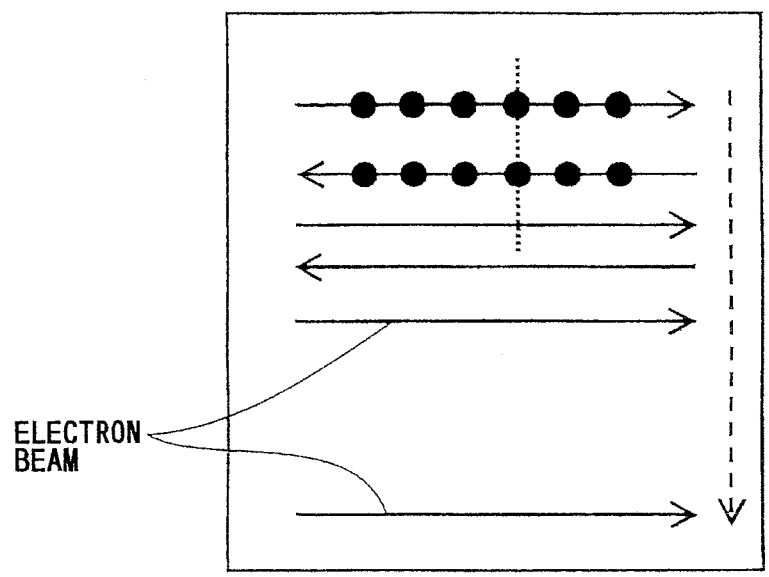

F I G. 14
ARCTANGENT(2)
INCLINATION
SCANNING METHOD
ARCTANGENT(2)
ROTATED IMAGE
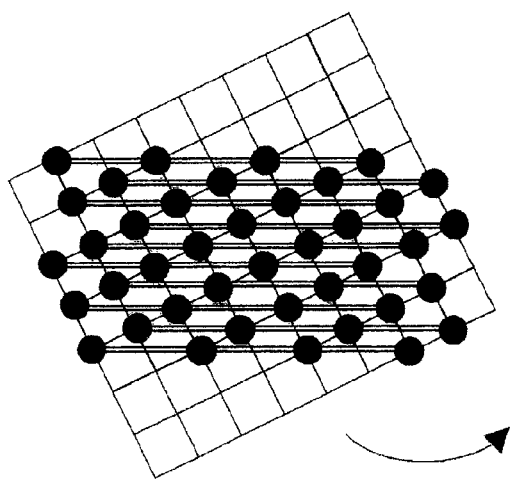
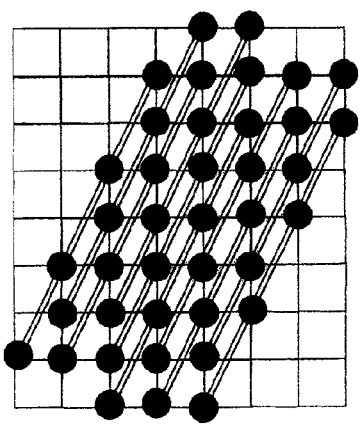

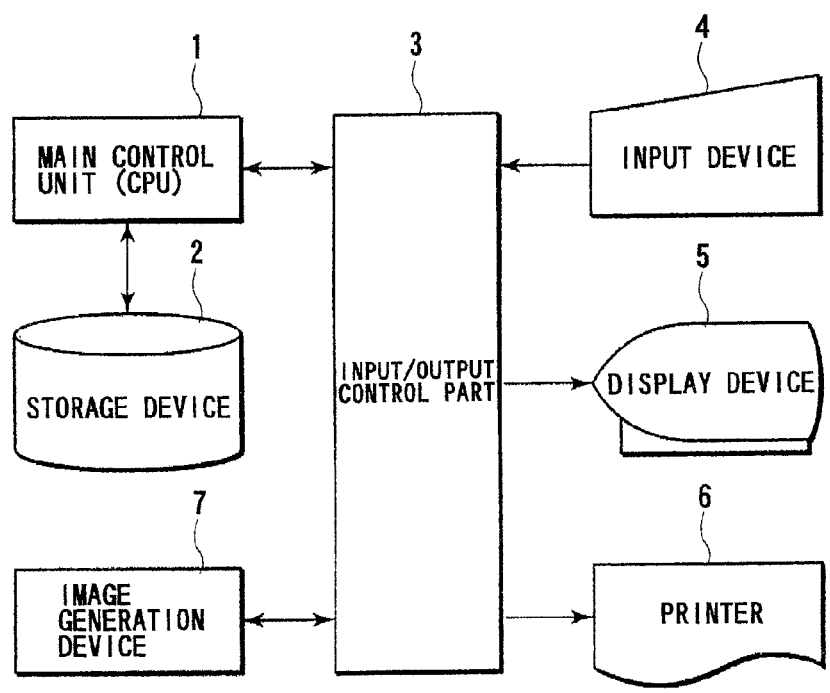
F I G. 1 5

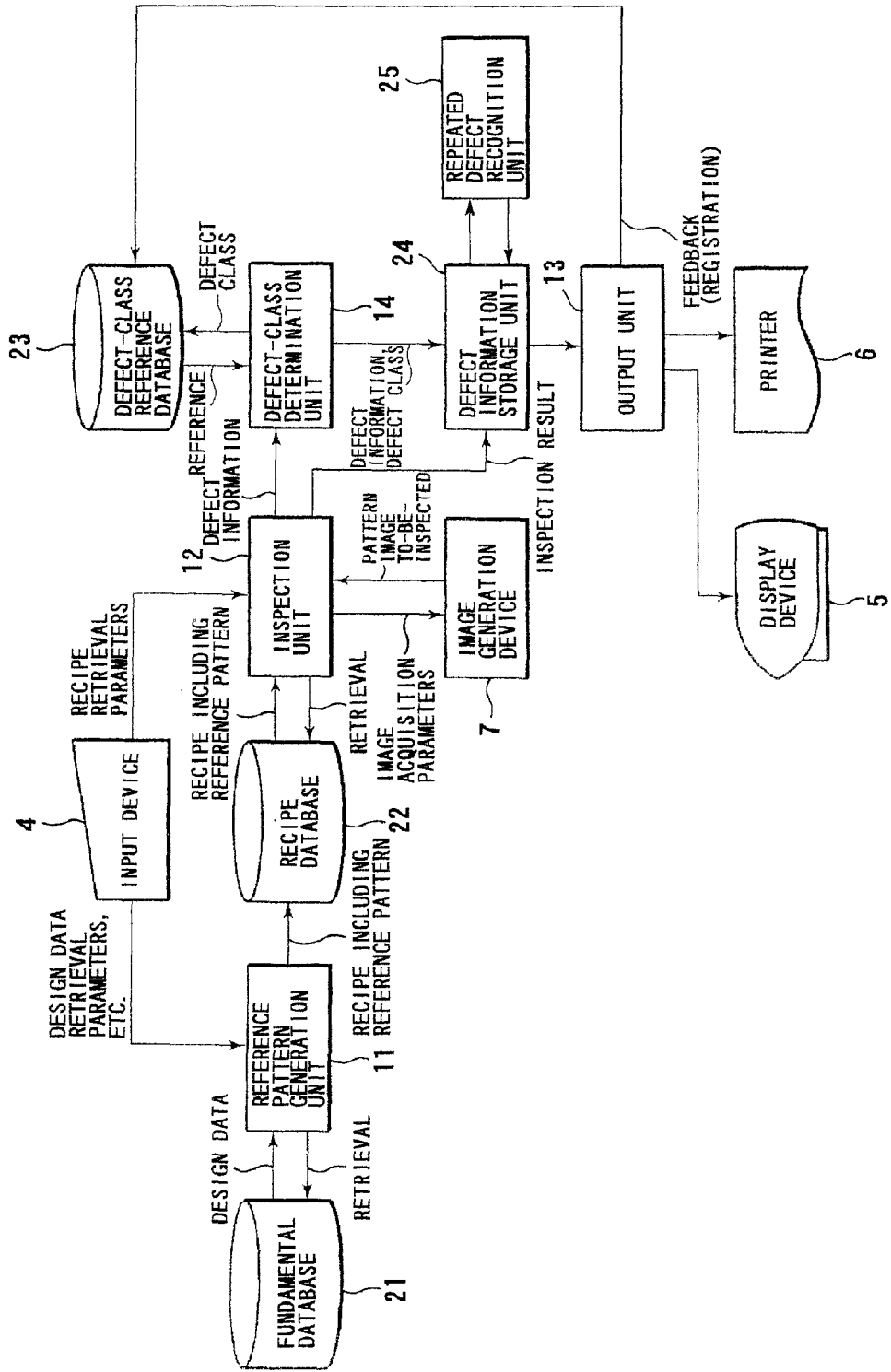

F I G. 1 8
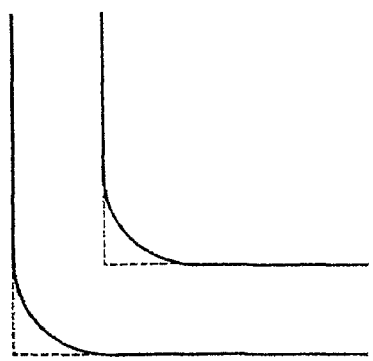

F/G.19
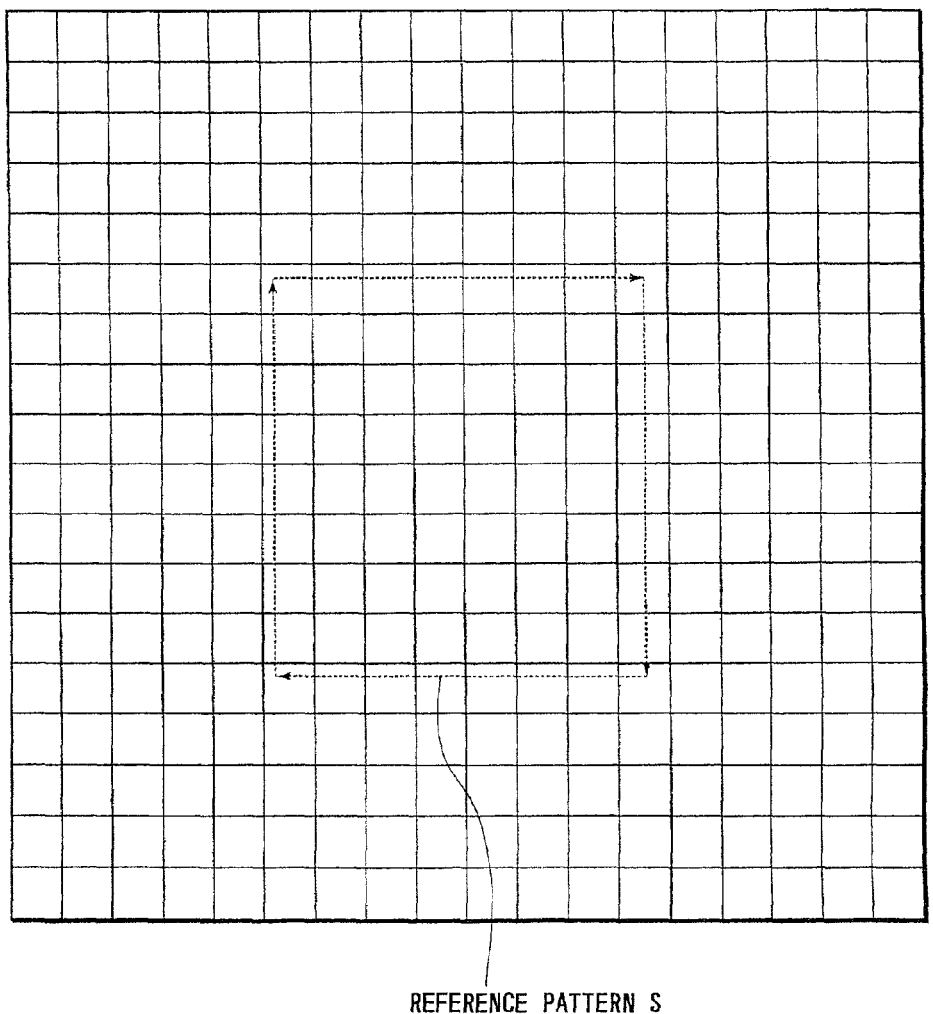
REFERENCE PATTERN S

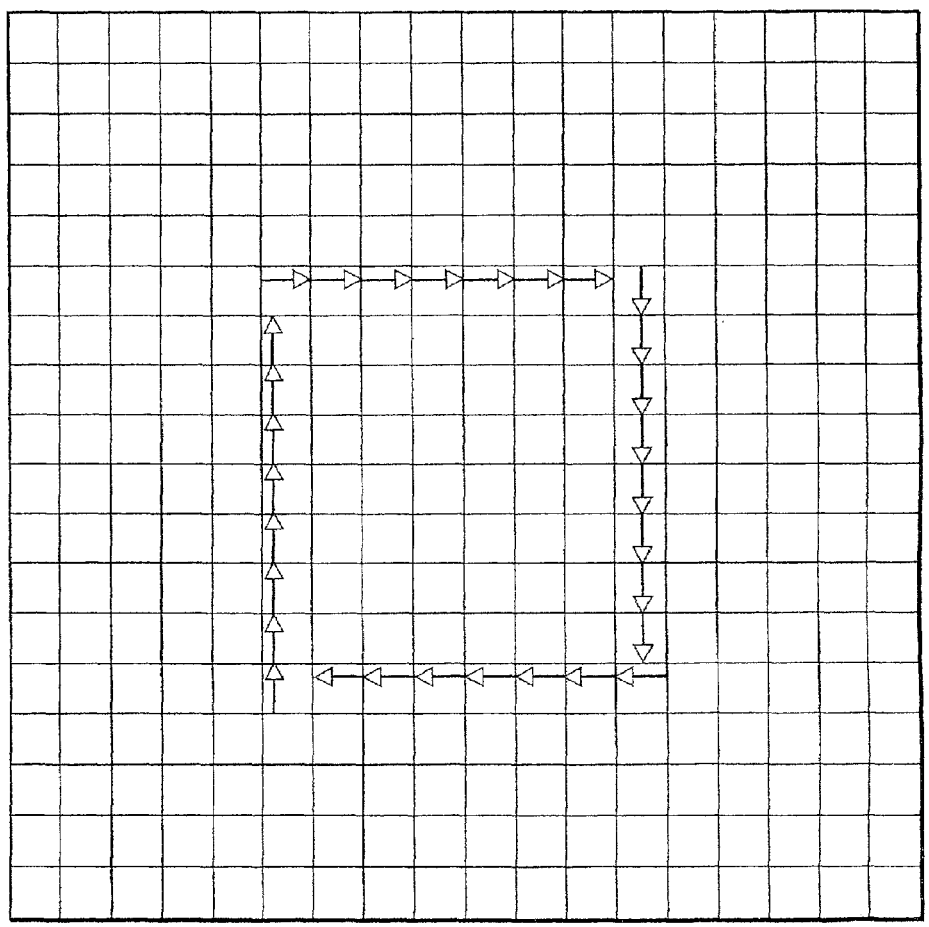
F I G. 2 0

F I G. 2 3
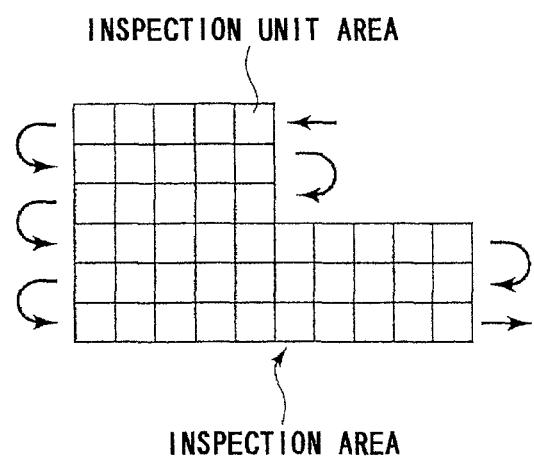
F I G. 2 4
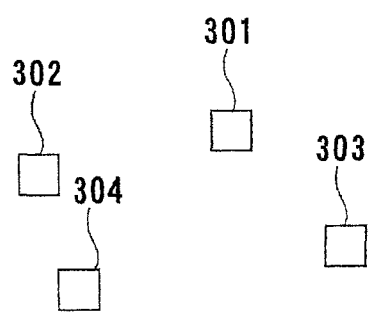

FIG. 28

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 80 | 60 | 40 | 20 | 0 | 0 | 0 | 0 |
| 100 | 100 | 100 | 80 | 60 | 40 | 20 | 0 |
| 100 | 100 | 100 | 100 | 100 | 100 | 80 | 60 |
| 100 | 100 | 100 | 100 | 100 | 100 | 100 | 100 |
| 100 | 100 | 100 | 100 | 100 | 100 | 100 | 100 |

F I G. 3 0

| 0 | 0 | 0 | 0 | 0 | 0 | 0 | 0 |
|---|---|---|---|---|---|---|---|
| 15 | 0 | 0 | 0 | 0 | 0 | 0 | 0 |
| 85 | 55 | 45 | 15 | 0 | 0 | 0 | 0 |
| 85 | 100 | 100 | 85 | 55 | 40 | 20 | 0 |
| 15 | 45 | 55 | 85 | 100 | 100 | 60 | 50 |
| 0 | 0 | 0 | 15 | 45 | 60 | 90 | 100 |
| 0 | 0 | 0 | 0 | 0 | 0 | 30 | 50 |
| 0 | 0 | 0 | 0 | 0 | 0 | 0 | 0 |

F I G. 3 1
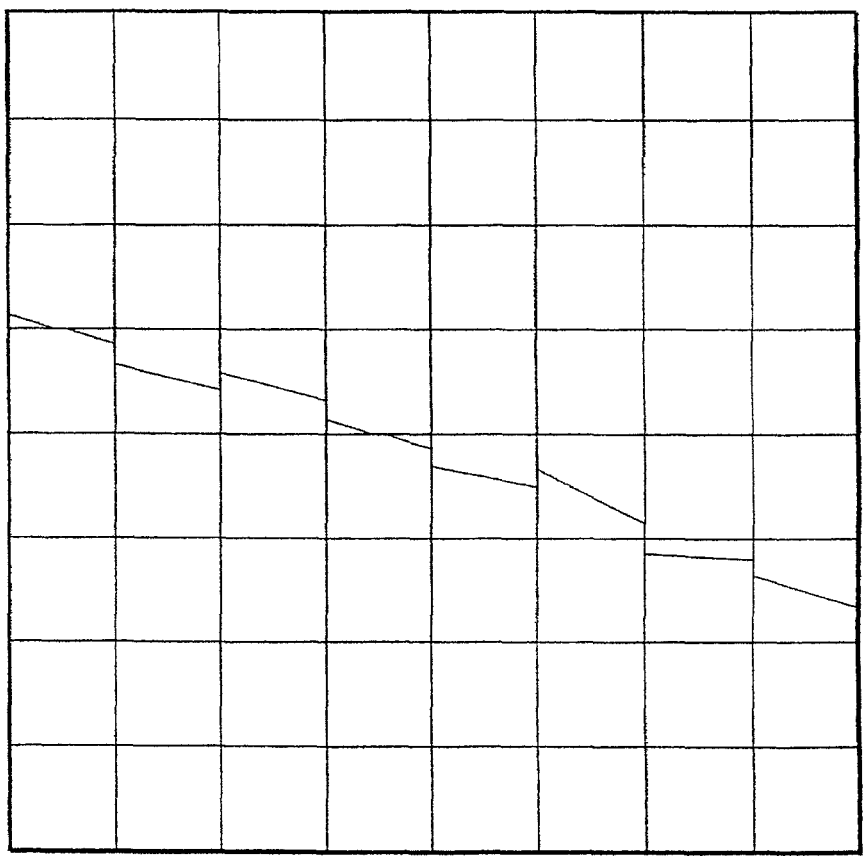

*FIG. 32*

| 0 | 0 | 0 | 20 | 0 | 0 | 0 | 0 | 0 | 0 | 20 | 0 | 0 | 0 | 0 |
|---|---|---|----|---|---|---|---|---|---|----|---|---|---|---|

*FIG. 33*

| 0 | 20 | 20 | 20 | 20 | 20 | 0 | 0 | 20 | 20 | 20 | 20 | 20 | 0 | 0 |
|---|----|----|----|----|----|---|---|----|----|----|----|----|---|---|

*FIG. 34*

| 0 | 0 | 0 | 1 | 0 | 0 | 0 | 0 | 0 | 0 | 1 | 0 | 0 | 0 | 0 |
|---|---|---|---|---|---|---|---|---|---|---|---|---|---|---|

F I G. 35

| 0 | 10 | 15 | 20 | 15 | 10 | 0 | 0 | 10 | 15 | 20 | 15 | 10 | 0 | 0 |

F I G. 36

| 0 | 0 | 1 | 0 | 0 | 0 | 0 | 0 | 0 | 0 | 0 | 1 | 0 | 0 | 0 |

F I G. 37

| 0 | 10 | 18 | 20 | 18 | 10 | 0 | 0 | 10 | 18 | 20 | 18 | 10 | 0 | 0 |

F I G. 38

| 0.5 | 0.9 | 1.0 | 0.9 | 0.5 |

F I G. 40

| 0 | 20 | 20 | 20 | 20 | 20 | 0 |
|---|----|----|----|----|----|---|
| 0 | 20 | 20 | 20 | 20 | 20 | 20 |
| 0 | 20 | 20 | 20 | 20 | 20 | 20 |
| 0 | 20 | 20 | 20 | 20 | 20 | 20 |
| 0 | 20 | 20 | 20 | 20 | 20 | 20 |
| 0 | 0  | 20 | 20 | 20 | 20 | 20 |
| 0 | 0  | 0  | 0  | 0  | 0  | 0  |

| (0,0) | (10,0) | (18,0) | (20,0) | (18,0) | (10,0) | (0,0) |
|---|---|---|---|---|---|---|
| (0,0) | (9,0) | (17,1) | (19,3) | (18,6) | (10,8) | (1,10) |
| (0,0) | (6,0) | (13,2) | (16,5) | (15,10) | (9,14) | (2,17) |
| (0,0) | (4,0) | (9,2) | (11,6) | (10,11) | (7,16) | (2,19) |
| (0,0) | (1,0) | (4,2) | (6,5) | (6,10) | (4,14) | (2,17) |
| (0,0) | (0,0) | (1,1) | (2,3) | (2,6) | (2,8) | (1,10) |
| (0,0) | (0,0) | (0,0) | (0,0) | (0,0) | (0,0) | (0,0) |

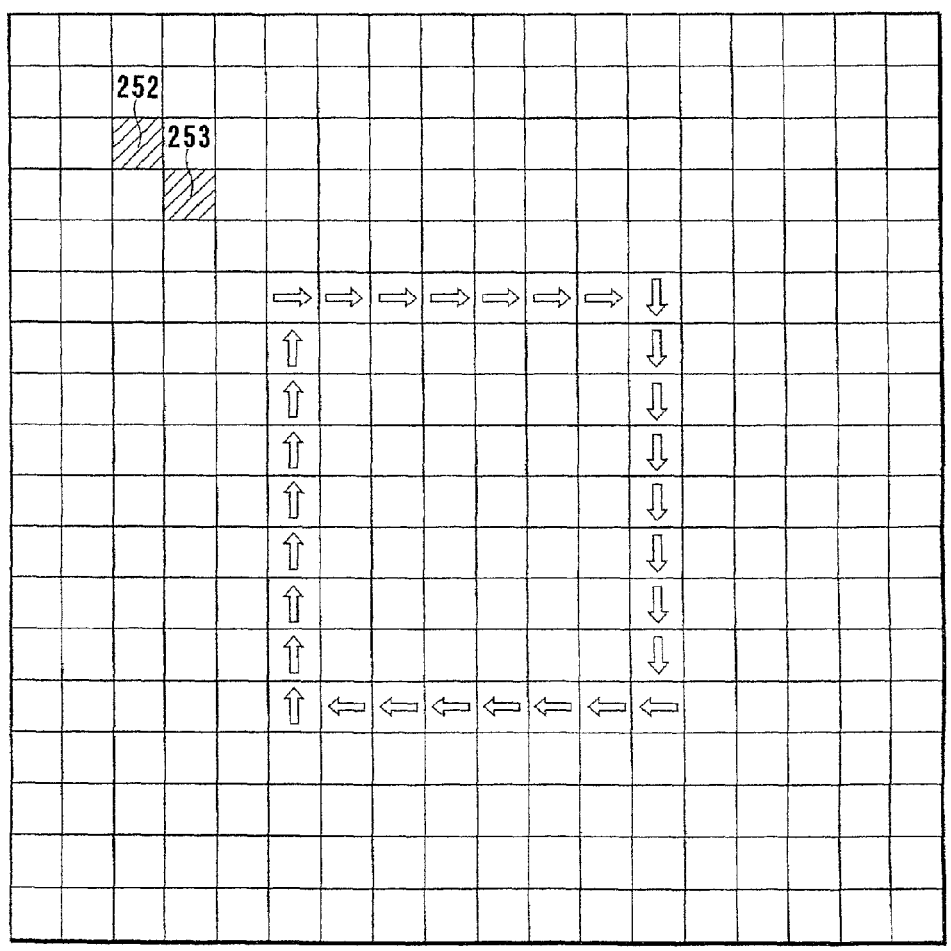
F I G. 45

F I G. 46
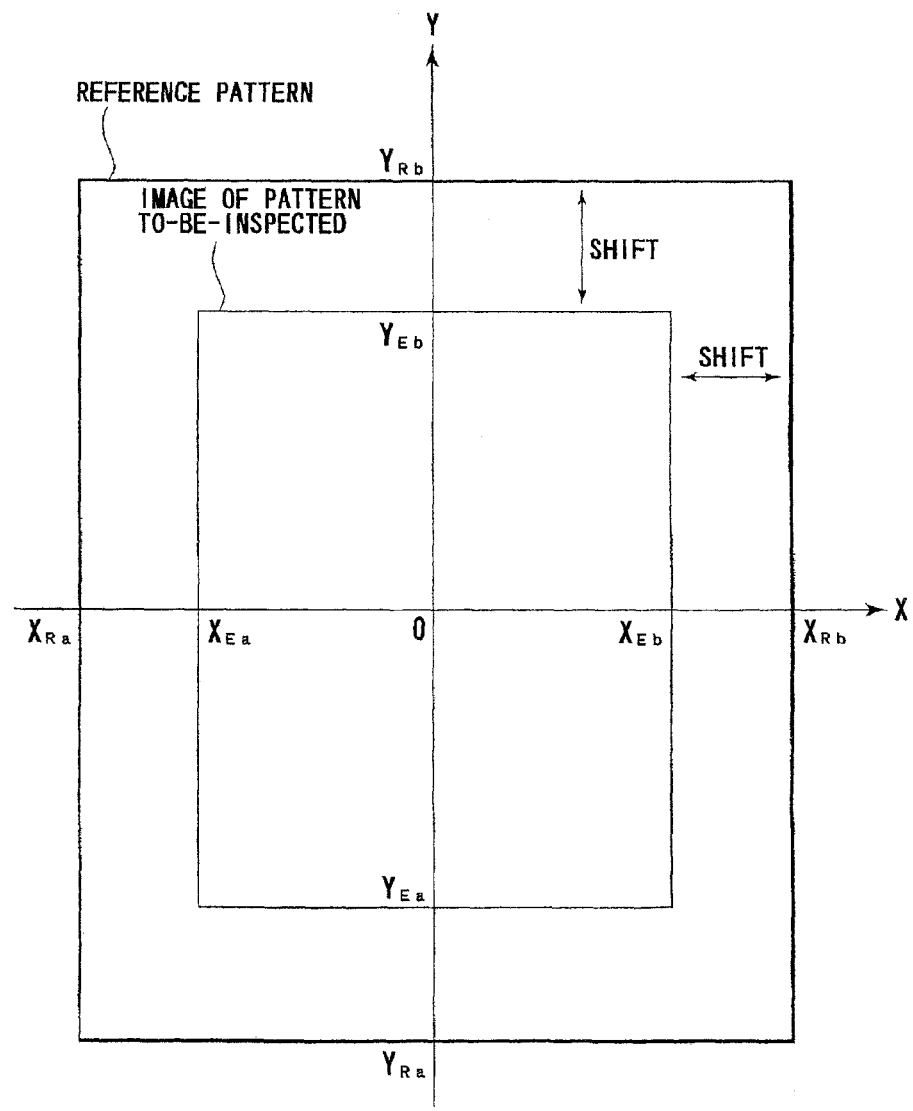

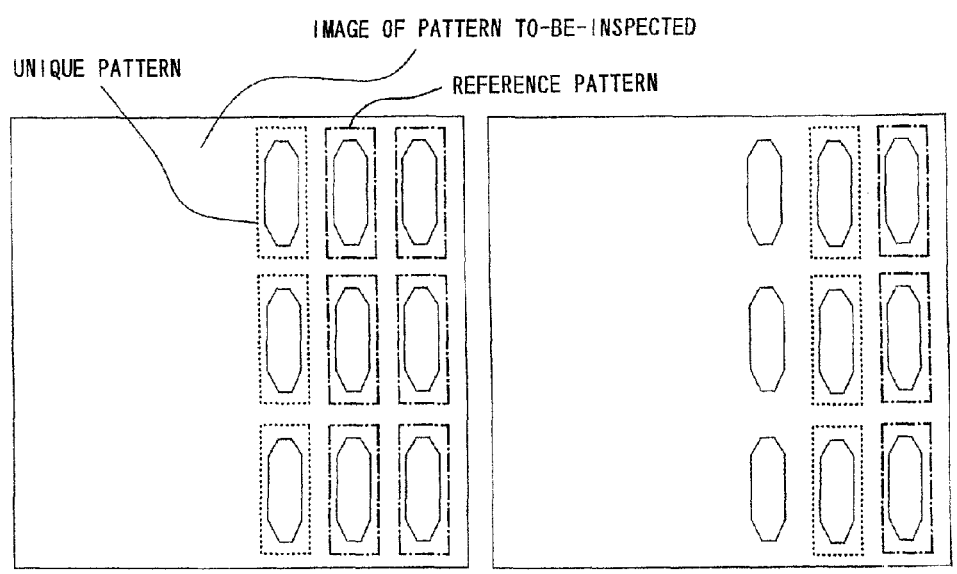

F I G. 5 3 A
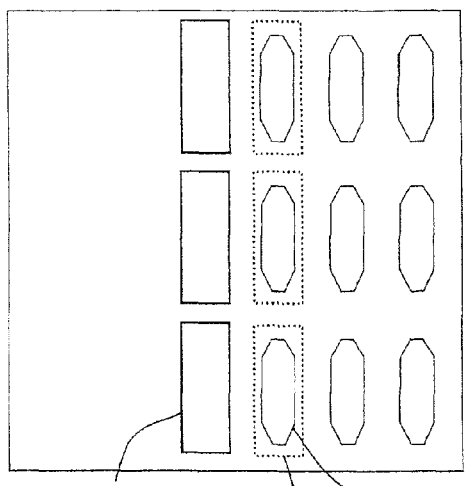
NEGATIVE PATTERN
UNIQUE PATTERN
IMAGE OF PATTERN TO-BE-INSPECTED
F I G. 5 3 B
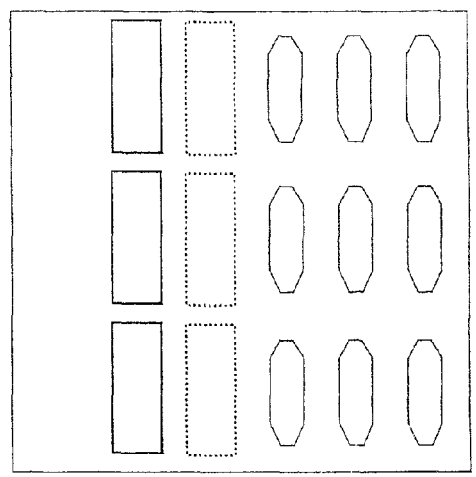
F I G. 5 3 C
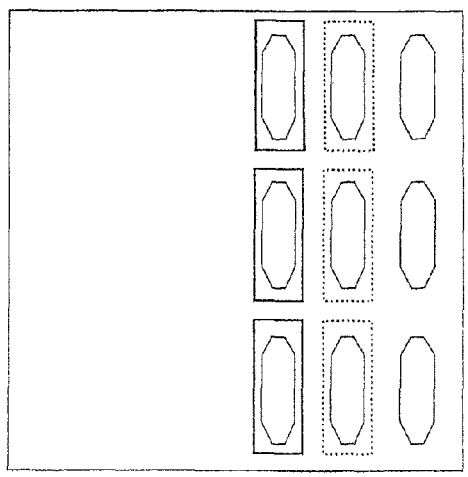

PROJECTION DATA OF UPWARD LINE SEGMENTS ONTO THE VERTICAL AXIS

PROJECTION DATA OF UPWARD LINE SEGMENTS ONTO THE HORIZONTAL AXIS

PROJECTION DATA OF UPWARD EDGE VECTORS ONTO THE VERTICAL AXIS

PROJECTION DATA OF UPWARD EDGE VECTORS ONTO THE HORIZONTAL AXIS

F I G. 5 5
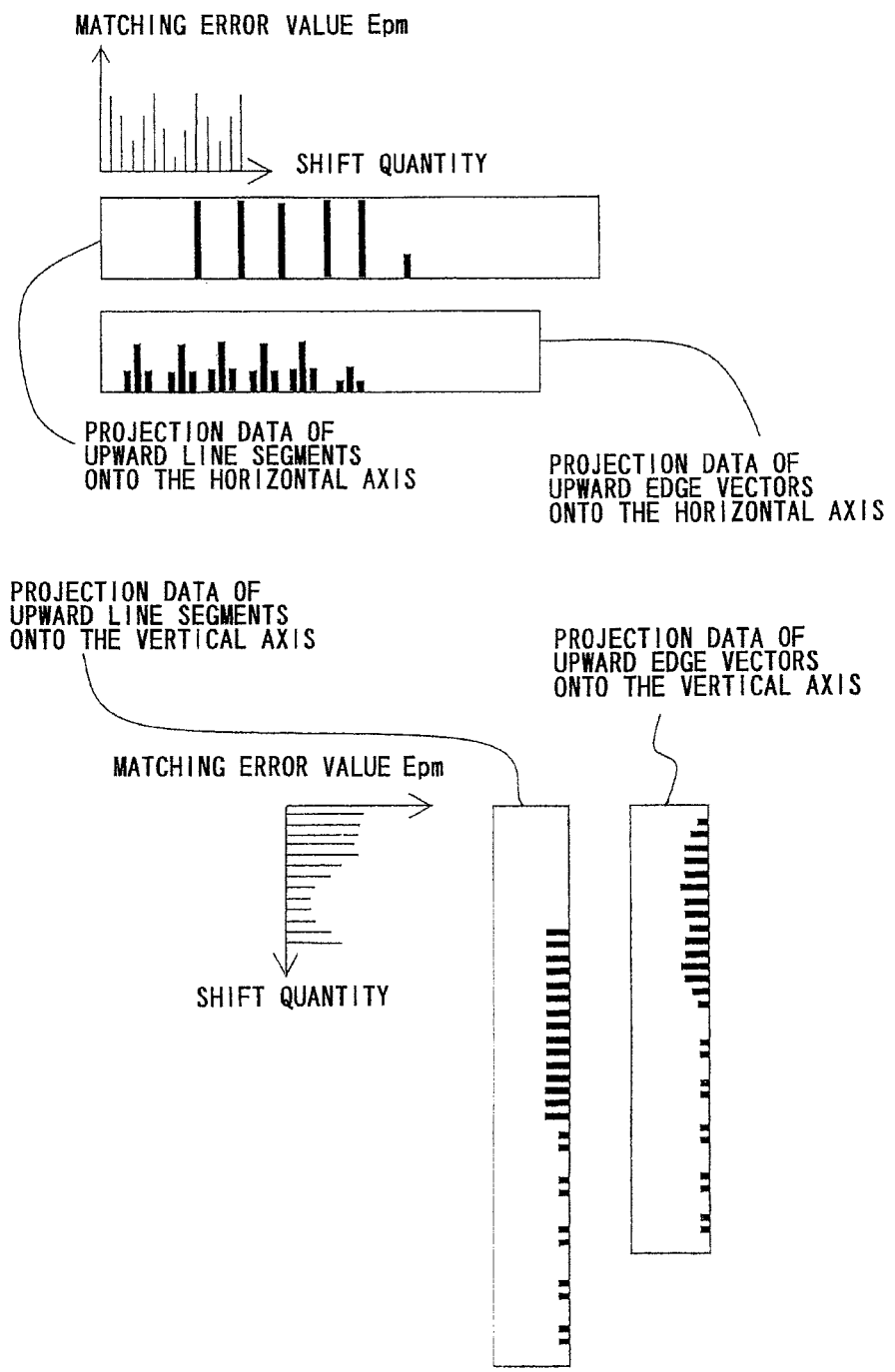

F I G. 5 7 A
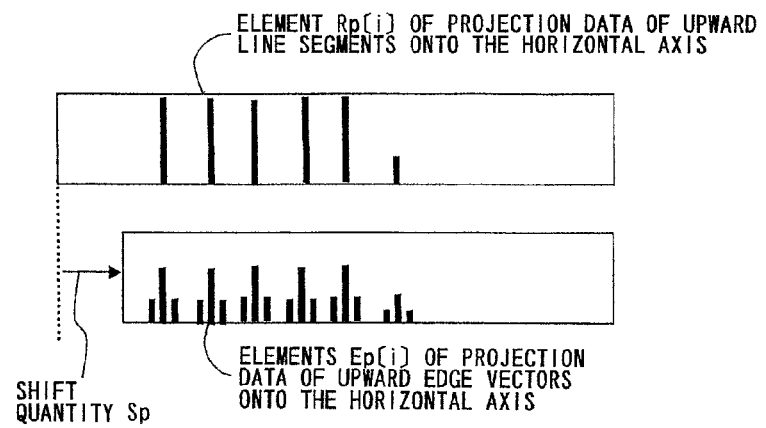
F I G. 5 7 B
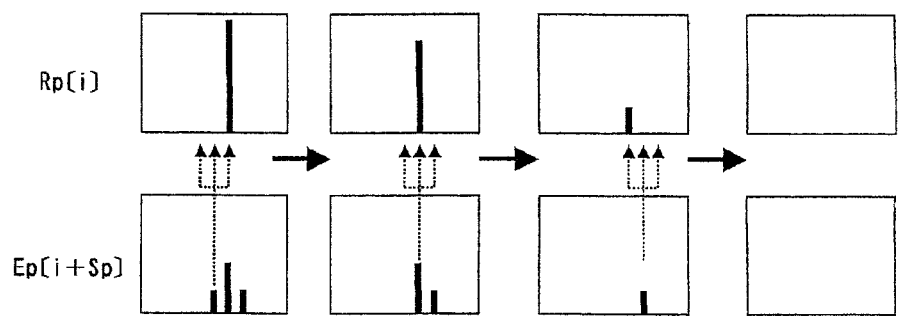
F I G. 5 7 C
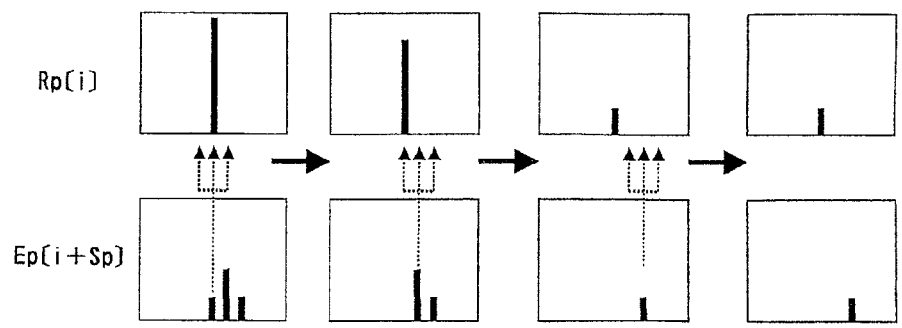

IMAGE OF PATTERN TO-BE-INSPECTED

THE MAXIMUM SIZE OF HOLE PATTERN X Khmax

COMPARE

COMPARE

THE MINIMUM SIZE OF HOLE PATTERN X Khmin

REFERENCE PATTERN

EVALUATION VALUE

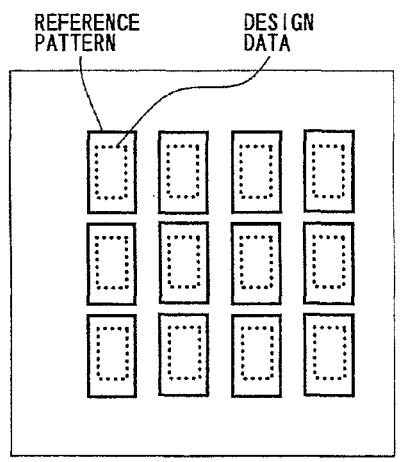
F I G. 59A
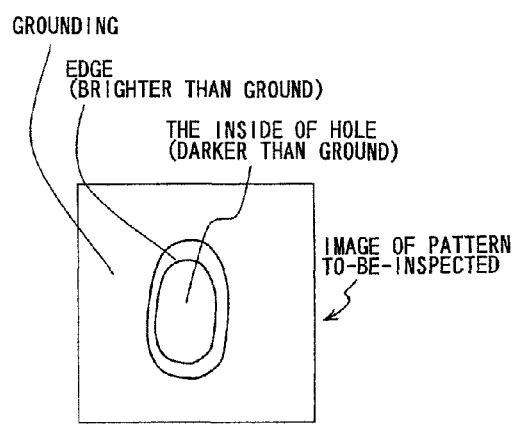
F I G. 59B
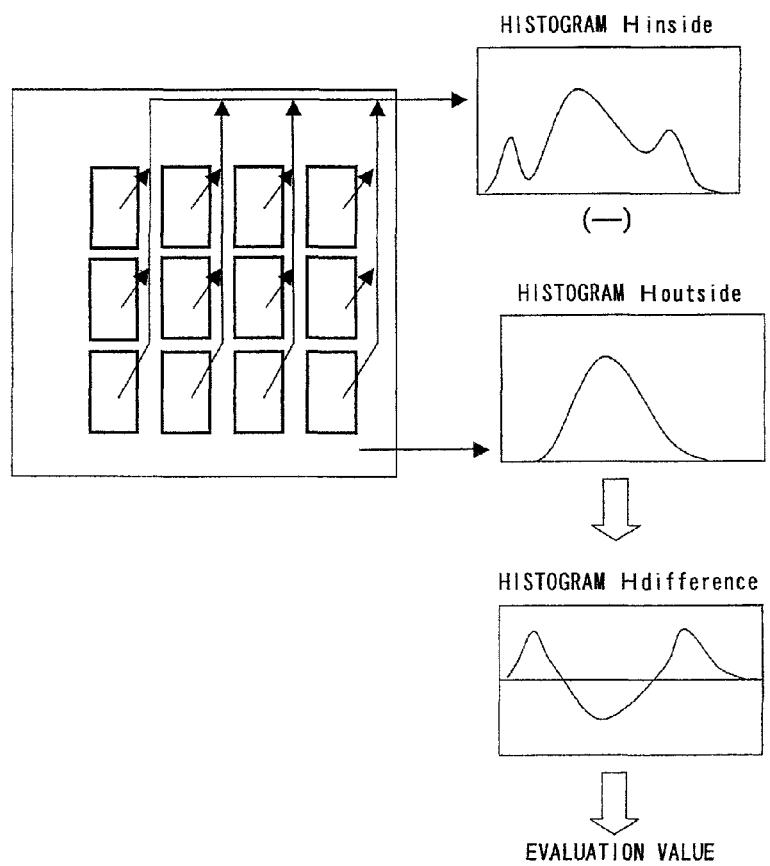
F I G. 59C

F I G. 63A
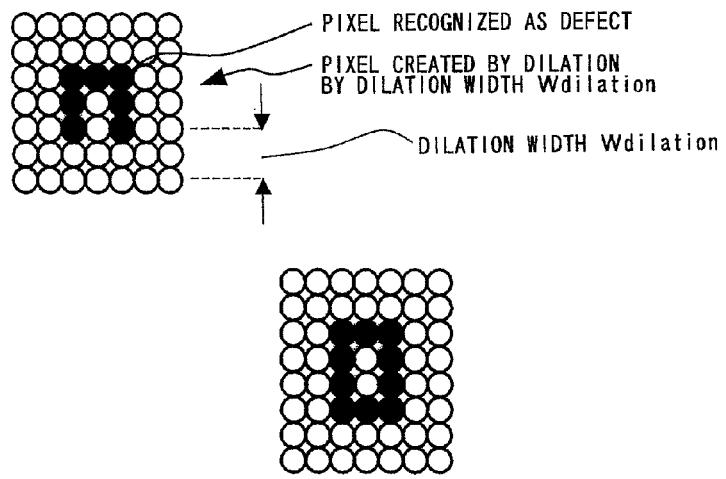
F I G. 63B
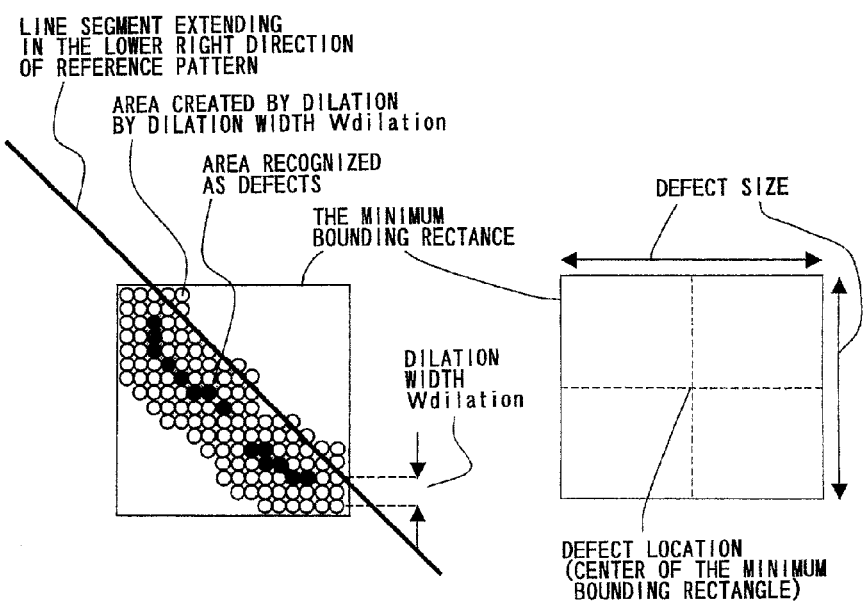

F I G. 67A
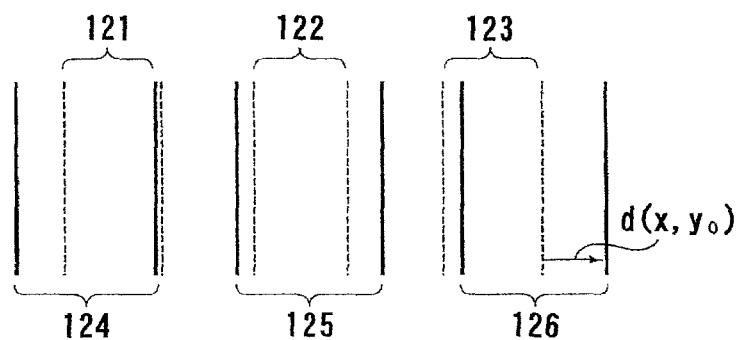
F I G. 67B
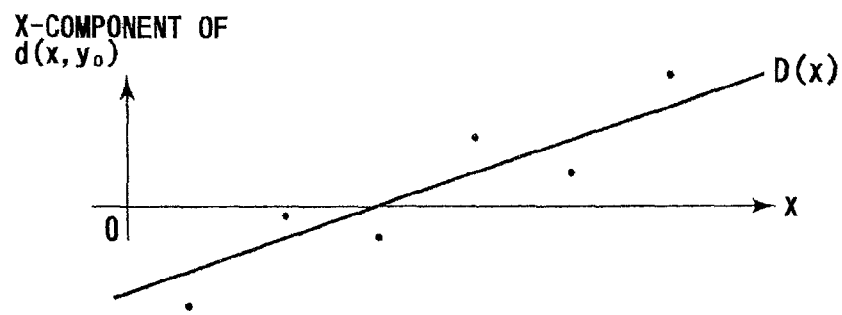

F I G. 71A
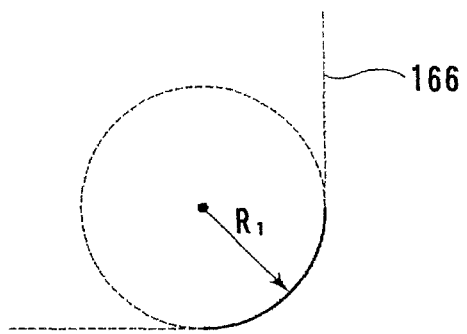
F I G. 71B
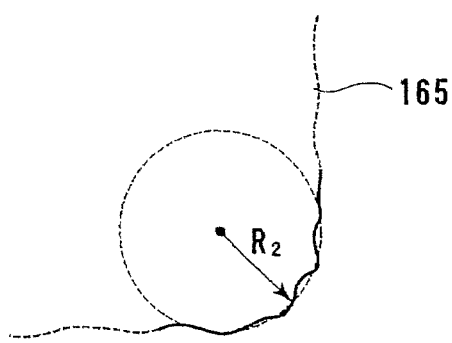

F I G. 8 2
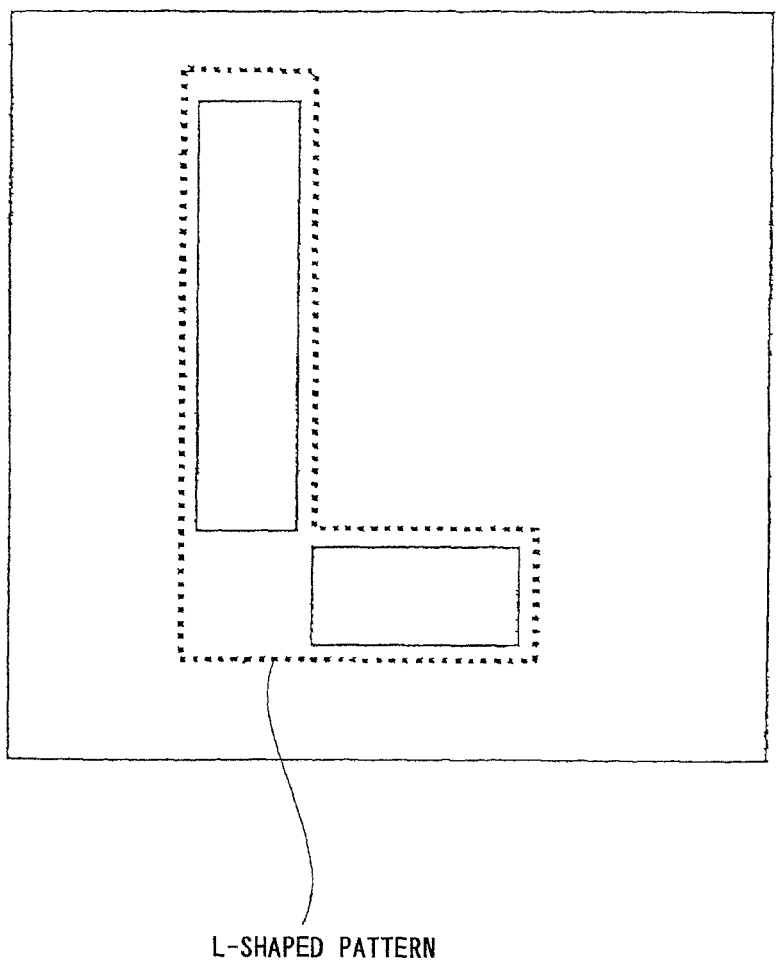
L-SHAPED PATTERN

F I G. 84
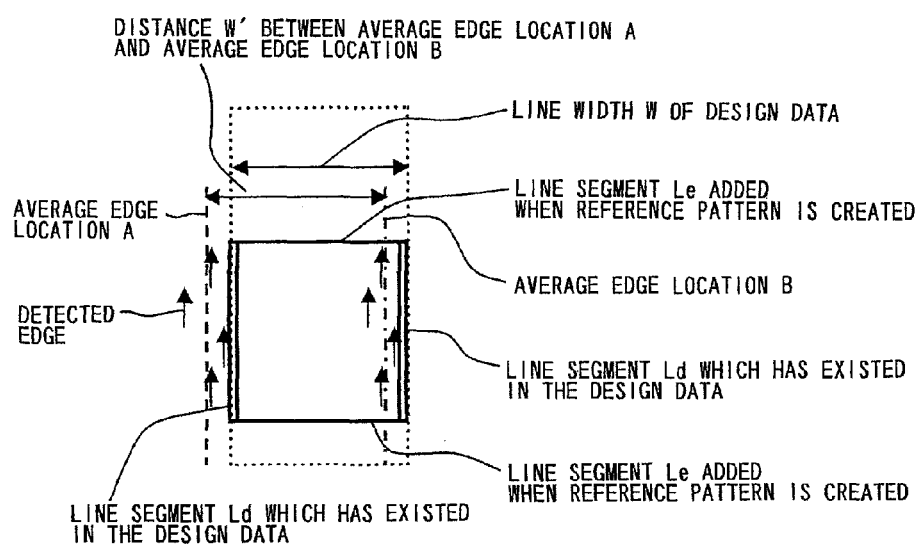

F I G. 88
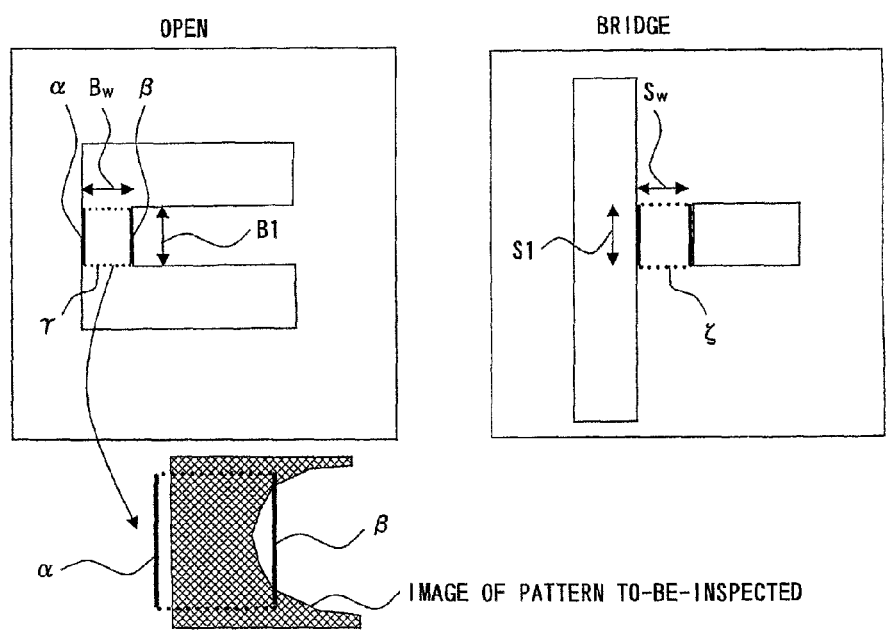
IMAGE OF PATTERN TO-BE-INSPECTED

MASK 1

MASK 2

DESIGN DATA OF THE MASK 1
DESIGN DATA OF THE MASK 2

REFERENCE PATTERN CREATED
FROM DESIGN DATA OF MASK 1

REFERENCE PATTERN CREATED
FROM DESIGN DATA OF MASK 2

LINES AND CIRCLES
CREATED FROM DESIGN
DATA OF MASK 1

LINES AND CIRCLES
CREATED FROM DESIGN
DATA OF MASK 2

$S_{mask1}$ $S_{mask2}$

REFERENCE
PATTERN

F I G. 98
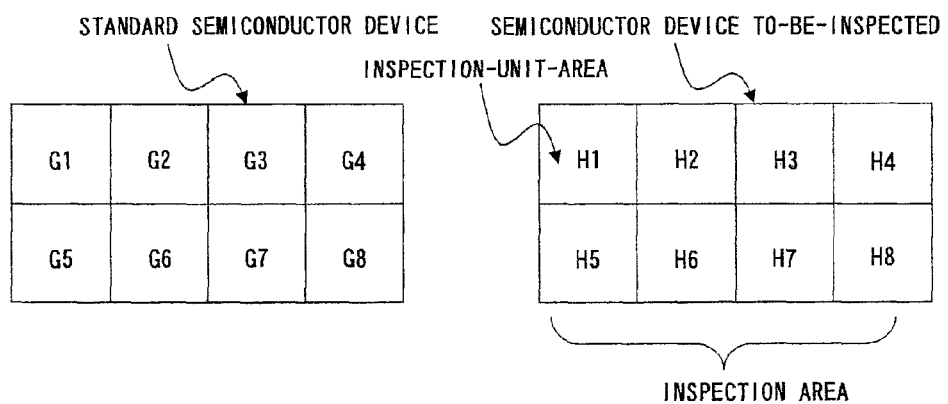
F I G. 99
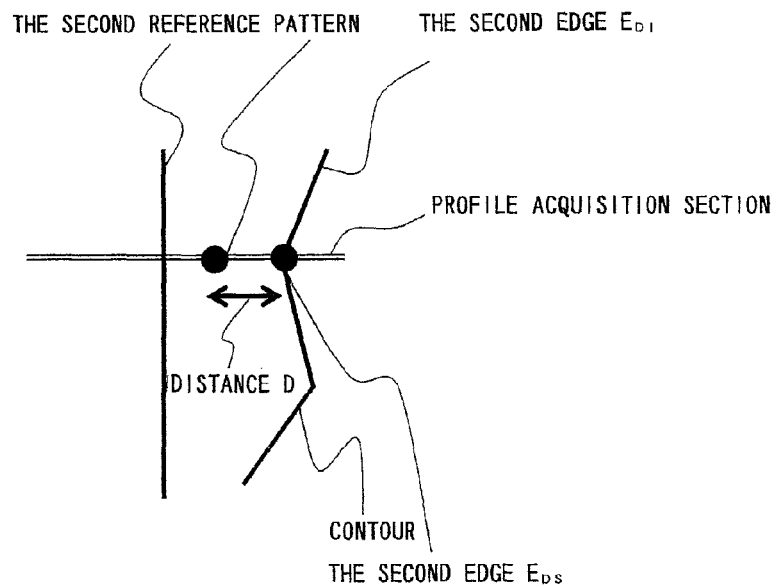

F I G. 1 0 1
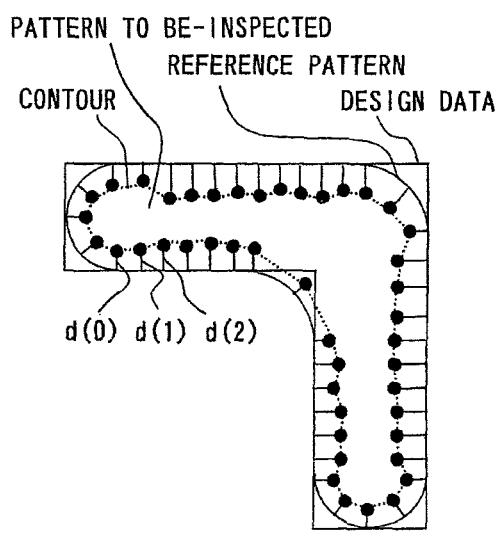
F I G. 1 0 2
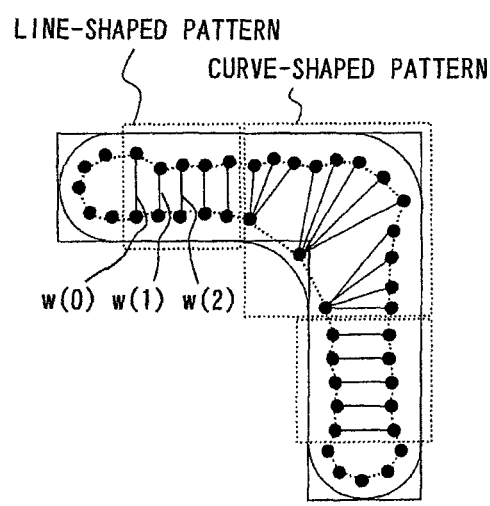

F I G. 1 0 3
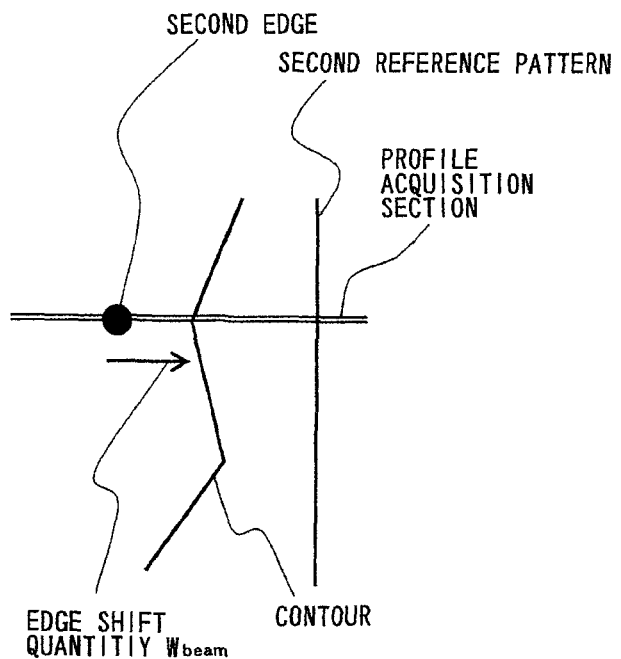
F I G. 1 0 4
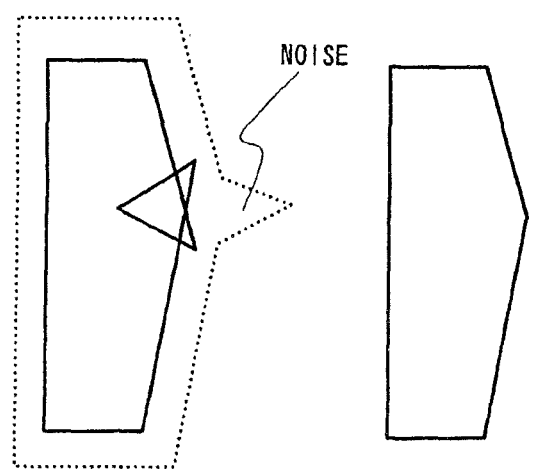

F I G. 1 0 5
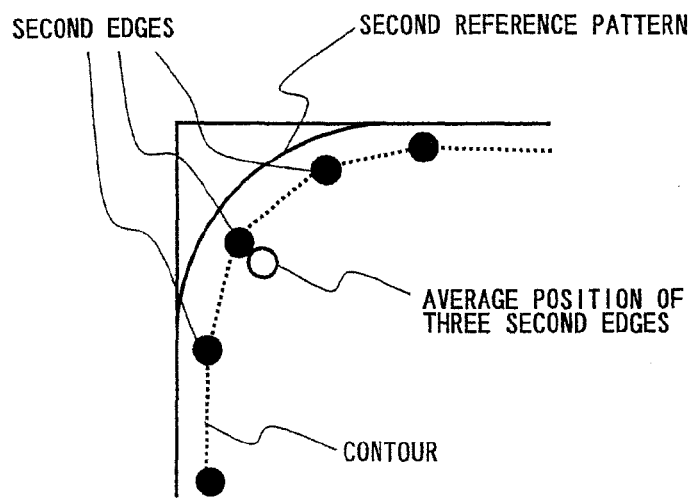
F I G. 1 0 6
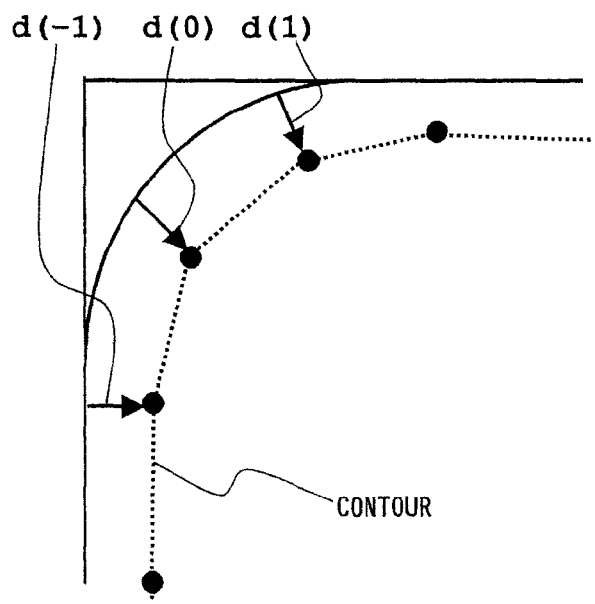

FIG. 107A    FIG. 107B
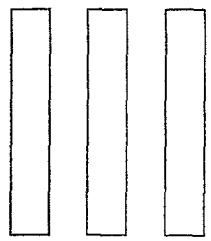    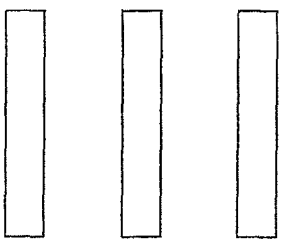
FIG. 108
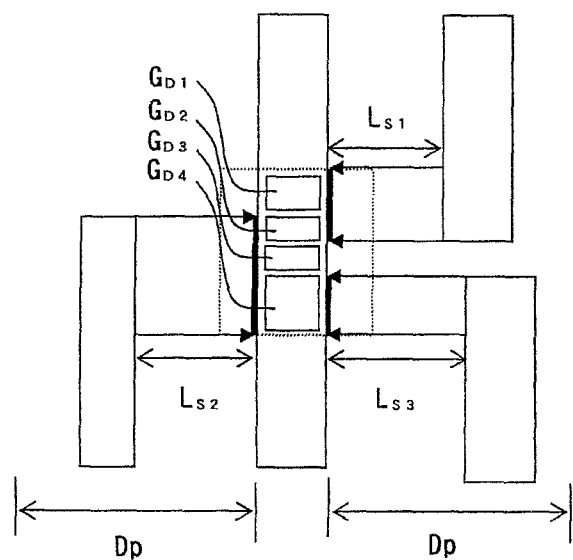

F I G. 1 0 9
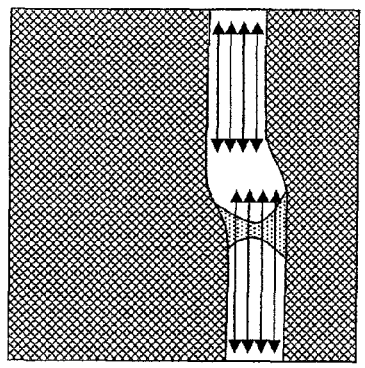
F I G. 1 1 0
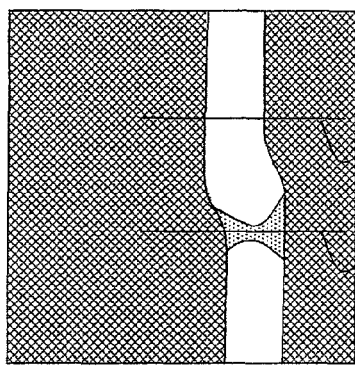
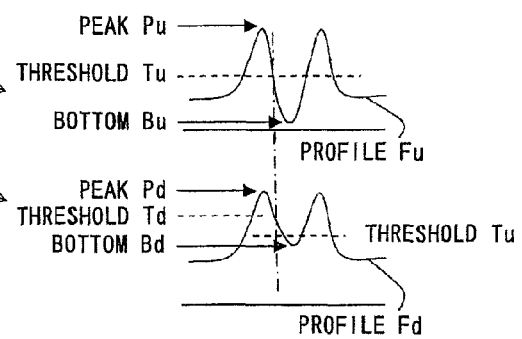
F I G. 1 1 1
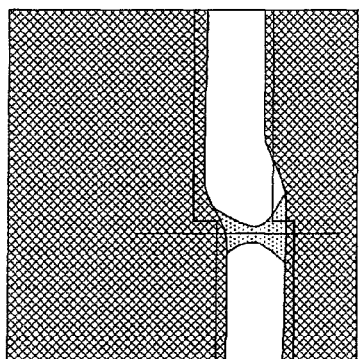
REFERENCE PATTERN

F/G. 114

FIG. 117A
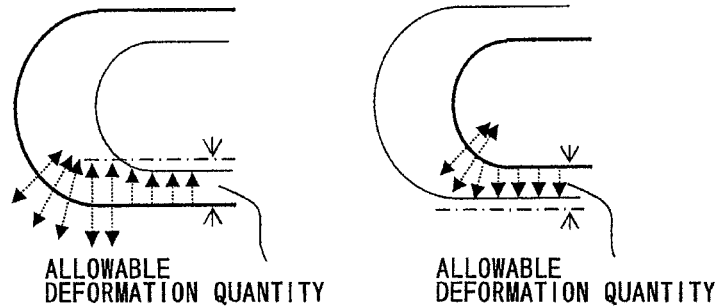
FIG. 117B
FIG. 117C
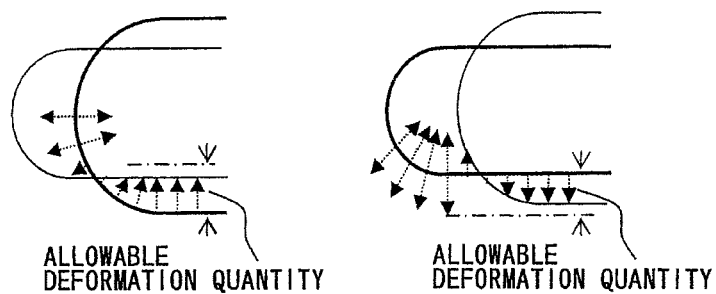
FIG. 117D
FIG. 118
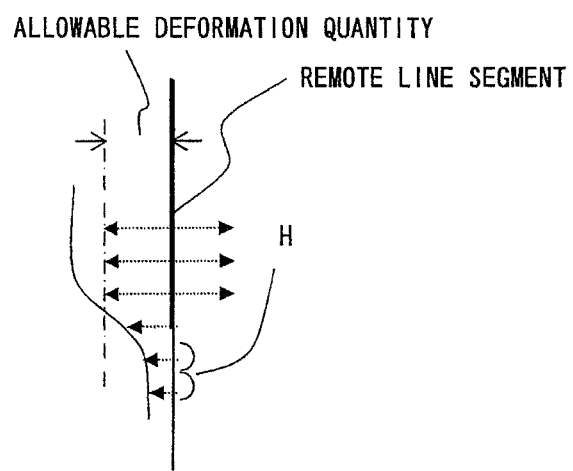

PATTERN INSPECTION APPARATUS AND METHOD

BACKGROUND OF THE INVENTION

1. Field of the Invention

The present invention relates to a pattern inspection apparatus and method, and more particularly to an apparatus and a method for inspecting a fine pattern, such as a semiconductor integrated circuit (LSI), a liquid crystal panel, and a photomask (reticle) for the semiconductor or the liquid crystal panel, which are fabricated based on data for fabricating the fine pattern such as design data.

2. Description of the Related Art

For the pattern inspection of a wafer in a fabricating process of semiconductor integrated circuit or the pattern inspection of a photomask for pattern formation of a wafer, an optical pattern inspection apparatus that uses the die-to-die comparison method has been used. In the die-to-die comparison method, a defect is detected by comparing an image obtained from a die to-be-inspected and an image obtained from the equivalent position of a die adjacent to the die to-be-inspected. In this case, the die means a semiconductor device.

On the other hand, for the inspection of a photomask (reticle) having no adjacent die, the die-to-database comparison method has been used. In the die-to-database comparison method, mask data is converted into an image. Then the image is used for a substitution of the image of the adjacent die used in the die-to-die comparison method, and inspection is performed in the same manner as the above. Here, the mask data is data obtained by applying photomask correction to design data. The technology concerned is disclosed, for example, in U.S. Pat. No. 5,563,702, "Automated photomask inspection apparatus and method."

However, by using the die-to-database comparison method for wafer inspection, corner roundness of a pattern formed on a wafer is likely to be detected as a defect. In the inspection of a photomask, a pretreatment, which adds corner roundness to the image converted from the mask data by applying a smoothing filter, prevents the corner roundness of the pattern from being detected as the defect. However, in the inspection of a wafer, because the corner roundness added by the pretreatment may be different from corner roundness of each pattern actually formed on the wafer, the pretreatment may not perfectly prevent the corner roundness of the pattern from being detected as the defect. Therefore, an allowable pattern deformation quantity should be set in order to ignore the above difference. As a result, a problem in which a fine defect existing in a place except a corner cannot be detected has happened.

The above problem is not severe for the die-to-database comparison photomask inspection, because the photomask should correspond to the mask data as much as possible. Therefore, currently, the die-to-database comparison photomask inspection has been put into practical use. However, the above problem is severe for the die-to-database comparison wafer inspection, because a pattern formed on the wafer is allowed to be deformed as long as an electrical property is guaranteed. This allowable pattern deformation quantity is considerably large. Actually, pattern deformation occurs due to a difference in stepper exposure conditions, or the like. Therefore, the die-to-database comparison wafer inspection has not been put into practical use.

From a viewpoint of problems in semiconductor integrated circuit fabrication, repeated defects (systematic defects) are more important issues than a random defect caused by a particle or the like. The repeated defects are defined as defects that occur repeatedly over all dies on a wafer caused by photomask failure, or the like. Because the repeated defects occur in a die to-be-inspected and in adjacent dies that are to be compared with the die to-be-inspected, the die-to-die comparison wafer inspection cannot detect the repeated defects. Therefore, the die-to-database comparison wafer inspection has been demanded.

Although the die-to-die comparison wafer inspection has not been put into practical use because of calculation cost or the like, there have been proposed inspection methods in which design data and a wafer image are used. These inspection methods are disclosed in, for example, a literature: "Automatic failure part tracing method of a logic LSI using an electron beam tester," NEC Technical Report, vol. 50, No. 6, 1997. In this literature, the following methods are disclosed: a method in which projections of wiring edges on the X- and Y-axes are used; a method in which wiring corners are focused on; and a method in which a genetic algorithm is applied. Moreover, as a method used in this literature, a matching method in which after edges are approximated by straight lines, closed areas are extracted, and the closed areas are used for matching is described. However, these methods fail to realize an inspection speed that is usable in high-speed inspection, and fail to perform matching while detecting a pattern deformation quantity.

Further, currently, the automatic defect classification (ADC) method in which an image of a die having a defect is used has been used. However, the method cannot classify whether the defect is a killer defect or not, because the method cannot recognize which part of a circuit the defect destroys.

Moreover, a position of a defect detected by the die-to-die comparison inspection has an error caused by precision of a stage and an image generation device of an inspection apparatus, and such error is approximately ten or more times larger than a line width of a pattern to-be-inspected. Due to the error, even if a defect position is related with design data, relationship between the defect position and the design data cannot be recognized.

Currently, a line width of semiconductor integrated circuits is far shorter than wavelength used in a lithography process. In the lithography process, a method of adding an OPC (Optical Proximity Correction) pattern has been used. In the method, by using a photomask fabricated by mask data that is generated by adding an OPC pattern to design data, a pattern formed on a wafer fabricated by the photomask can be consistent with the design data as much as possible. Adding an OPC pattern is one of the most important techniques for photomask correction.

If the OPC pattern does not effectively correct a pattern formed on a wafer, repeated defects occur. However, the die-to-die comparison wafer inspection cannot detect the repeated defects. In order to solve this problem, it is necessary to provide a method in which a pattern formed on the wafer is inspected based on design data in consideration of an allowable pattern deformation quantity.

In addition, in a multi-product/small-volume fabricating process, e.g. a system-on-a-chip (SoC) fabricating process, a short delivery time is required. In the fabricating process, when repeated defects are detected in electric inspection as a final inspection, a short delivery time cannot be achieved. In order to solve this problem, it is necessary to provide an inspection method that inspects a difference between a pattern formed on a wafer and design data for each lithography process. In the inspection method, it is necessary for an allowable pattern deformation quantity that does not affect an electrical property to be set, and a deformation quantity that exceeds the allowable pattern deformation quantity should be detected.

Further, a lithography simulator inspects a simulation pattern, which is obtained from mask data to which an OPC pattern is added, by comparing the simulation pattern with design data in order to evaluate the OPC pattern. Although the entire device can be verified by the lithography simulator, the simulation pattern cannot be necessarily the same as an actual pattern. Moreover, a defect except for a defect caused by the OPC pattern cannot be detected by the lithography simulator. A random defect existing on a photomask, a stepper aberration, or the like is an example of such defect.

Moreover, for verifying the simulation, it is necessary to provide a method in which a simulation pattern outputted from the lithography simulator is verified with an image of a pattern actually formed on a wafer. Moreover, it becomes increasingly important to improve the technology for circuit design by setting an allowable pattern deformation quantity to design data precisely and in detail.

A CD-SEM (Critical Dimension Scanning Electron Microscope) has been used for controlling a line width in a fabricating process of semiconductor integrated circuits. The CD-SEM automatically measures a line width of a line-shaped pattern in a specified position using a profile (line profile). Several positions in several shots on several pieces of wafers for each lot are measured in order to control stepper exposure condition by using the CD-SEM.

As control items in a fabricating process of semiconductor integrated circuits, end shrinkage of a wiring, a position of an isolated pattern, and the like are also important besides the line width, but the automatic measuring function of the CD-SEM allows only one-dimensional measurement. Specifically, the CD-SEM can measure only a length such as a line width. Therefore, those two-dimensional shapes are inspected by an operator manually using an image acquired from the CD-SEM or other microscopes.

The isolated pattern includes a hole pattern or an island pattern. The island pattern may be a negative pattern of the hole pattern. The hole pattern includes a contact hole/via hole or a test pattern.

Generally, an OPC pattern plays an important role not only to guarantee a gate line width, but also to form shapes of a corner and an isolated pattern. Furthermore, because of improvement of a processor frequency, control of a shape of an end of a gate pattern, which is called an end-cap, or a base of a gate pattern, which is called a field extension, also becomes important in addition to the gate line width.

The above inspections of two-dimensional patterns are essential both in sampling inspection in a fabricating process, and in an R&D fabricating process. Especially, in the R&D fabricating process, it is necessary to inspect all patterns formed on a wafer. However, currently, the control of the two-dimensional shape is performed by human work, and is not perfectly performed. In order to solve this problem, automated die-to-database comparison wafer inspection is required.

As concrete subjects for automatization, the following subjects are enumerated:

1. The method, in which the inspection is performed for every profile acquisition section, is used. However, by using such local inspection method, deformation for every pattern to-be-inspected cannot be inspected.

2. It is necessary to detect bridge state of a pattern to-be-inspected, which is a negative pattern in a wiring layer, in higher speed. Further, it is necessary to reduce an effect of an electron beam spot size.

3. In the case where a pattern to-be-inspected, which is a negative pattern in a wiring layer and has a larger line width than an electron beam spot size does not exist, it is necessary to prevent deterioration of defect detection accuracy of a pattern to-be-inspected, which is a negative pattern in a wiring layer and has the smaller line width than the electron beam spot size.

4. Conventionally, an overlay error caused in process of the double exposure method is controlled by measuring limited areas in a semiconductor device. Therefore, the overlay error caused locally by a stepper aberration or the like cannot be controlled.

5. In the case of long-term inspection, it may be necessary to adjust a setting value of an image generation device. In such case, it is necessary that the most suitable setting value of the image generation device is estimated and the setting value of the image generation device is adjusted by using the estimated setting value.

6. A method of controlling OPC patterns of gates by using a line width and space widths on both sides of gates has been used. Because space widths on both sides of a gate having different space widths on one side cannot be determined uniquely, OPC patterns of the gate cannot be controlled.

7. A part of a pattern to-be-inspected fabricated by a stepper under a focus condition and an exposure dose condition, which are different from the optimal conditions, may be deformed more than an allowable deformation quantity. In such case, pattern deformation quantities cannot be obtained from the above-mentioned part.

SUMMARY OF THE INVENTION

In view of the above, it is therefore to provide a pattern inspection apparatus and method for inspecting a pattern to-be-inspected by using an image of the pattern to-be-inspected and data for fabricating the pattern to-be-inspected such as design data.

To achieve the above object, according to a first aspect of the present invention, there is provided a pattern inspection apparatus for inspecting a pattern to-be-inspected by using an image of the pattern to-be-inspected and data for fabricating the pattern to-be-inspected, the pattern inspection apparatus comprising: a reference pattern generation device configured to generate a reference pattern represented by one or more lines from the data, each of the one or more lines comprising one of a line segment and a curve; an image generation device configured to generate the image of the pattern to-be-inspected; a detecting device configured to detect an edge of the image of the pattern to-be-inspected; and an inspection device configured to inspect the pattern to-be-inspected by comparing the edge of the image of the pattern to-be-inspected with the one or more lines of the reference pattern.

In a preferred aspect of the present invention, the inspection device inspects the pattern to-be-inspected by using deformation quantities for every pattern-to-be-inspected.

In a preferred aspect of the present invention, the inspection device uses at least one of an average value of edge placement errors of the pattern to-be-inspected, a standard deviation of edge placement errors, a power spectrum of edge placement errors, an autocorrelation of edge placement errors, and a standard deviation of line widths for every pattern to-be-inspected.

In a preferred aspect of the present invention, the inspection device obtains repeatability of statistics of the deformation quantities by counterbalancing a variation in the measurement values caused by measurement.

In a preferred aspect of the present invention, the detecting device detects the edge of the image of the pattern to-be-inspected by using the threshold method, in which a luminance value of a part of the image of a pattern to-be-inspected other than a part of the profile is used as a bottom of the profile.

In a preferred aspect of the present invention, the detecting device uses a luminance value of a part of the image of the pattern to-be-inspected, with a pattern, which has a larger line width than an electron beam spot size, existing in the part.

In a preferred aspect of the present invention, the detecting device detects the edge of the image of the pattern to-be-inspected after correcting a profile by an inverse filter in order to correct beam spot size.

In a preferred aspect of the present invention, the reference pattern generation device divides the reference pattern in order to determine a line width and a space width uniquely, and the inspection device inspects the pattern to-be-inspected using the divided reference patterns, and a plurality of the edges.

In a preferred aspect of the present invention, the reference pattern generation device deforms the reference pattern by using results obtained by comparing the edges of the image of the pattern to-be-inspected with the one or more lines of the reference pattern, and the inspection device inspects the pattern to-be-inspected by comparing the edge of the image of the pattern to-be-inspected with the one or more lines of the deformed reference pattern again.

In a preferred aspect of the present invention, the part that is deformed by the reference pattern generation device includes one of an end, a line part, a part that is liable to cause open, and a part that is liable to cause bridge.

According to a second aspect of the present invention, there is provided a pattern inspection apparatus for inspecting a pattern to-be-inspected by using an image of the pattern to-be-inspected and data for fabricating the pattern to-be-inspected, the pattern inspection apparatus comprising: a reference pattern generation device configured to generate reference patterns represented by one or more lines from the data, each of the one or more lines comprising one of a line segment and a curve; an image generation device configured to generate the image of the pattern to-be-inspected; a detecting device configured to detect an edge of the image of the pattern to-be-inspected; and an inspection device configured to inspect the pattern to-be-inspected by comparing the edge of the image of the pattern to-be-inspected with the one or more lines of the reference patterns.

In a preferred aspect of the present invention, the reference pattern generation device generates the reference pattern with regard to a first exposure process, generates the reference pattern with regard to a second exposure process, obtains a result of the Boolean operation on the generated reference patterns, and applies different corner round to vertices obtained by the Boolean operation and vertices except for the vertices obtained by the Boolean operation.

In a preferred aspect of the present invention, the reference pattern generation device generates the reference pattern, which is applied to corner round, with regard to a first exposure process, generates the reference pattern, which is applied to corner round, with regard to a second exposure process, and obtains a result of the Boolean operation on the generated reference patterns.

In a preferred aspect of the present invention, the image generation device obtains a feature quantity from the image of the pattern to-be-inspected, estimates image generation condition of the image generation device from the obtained feature quantity, and generates the image of the pattern to-be-inspected by using the image generation condition.

In a preferred aspect of the present invention, the inspection device inspects relationship between a location of a pattern formed by a first exposure process and a pattern formed by a second exposure process by performing matching between the image of the pattern to-be-inspected and the reference pattern with regard to the first exposure process, and by performing matching between the image of the pattern to-be-inspected and the reference pattern with regard to the second exposure process.

According to a third aspect of the present invention, there is provided a method of inspecting a pattern to-be-inspected by using an image of the pattern to-be-inspected and data for fabricating the pattern to-be-inspected, the method comprising: generating a reference pattern represented by one or more lines from the data, each of the one or more lines comprising one of a line segment and a curve; generating the image of the pattern to-be-inspected; detecting an edge of the image of the pattern to-be-inspected; and inspecting the pattern to-be-inspected by comparing the edge of the image of the pattern to-be-inspected with the one or more lines of the reference pattern.

In a preferred aspect of the present invention, the pattern to-be-inspected is inspected by using deformation quantities for every pattern-to-be-inspected.

In a preferred aspect of the present invention, the reference pattern is divided in order to determine a line width and a space width uniquely, and the divided reference patterns and a plurality of the edges are used in the inspecting.

According to a fourth aspect of the present invention, there is provided a method of inspecting a pattern to-be-inspected by using an image of the pattern to-be-inspected and data for fabricating the pattern to-be-inspected, the method comprising: generating reference patterns represented by one or more lines from the data, each of the one or more lines comprising one of a line segment and a curve; generating the image of the pattern to-be-inspected; detecting an edge of the image of the pattern to-be-inspected; and inspecting the pattern to-be-inspected by comparing the edge of the image of the pattern to-be-inspected with the one or more lines of the reference patterns.

In a preferred aspect of the present invention, the reference patterns are generated by generating the reference pattern with regard to a first exposure process, generating the reference pattern with regard to a second exposure process, obtaining a result of the Boolean operation on the generated reference patterns, and applying different corner round to vertices obtained by the Boolean operation and vertices except for the vertices obtained by the Boolean operation.

In a preferred aspect of the present invention, the reference pattern is generated by generating the reference pattern, which is applied to corner round, with regard to a first exposure process, generating the reference pattern, which is applied to corner round, with regard to a second exposure process, and obtaining a result of the Boolean operation on the generated reference patterns.

In a preferred aspect of the present invention, relationship between a location of a pattern formed by a first exposure process and a pattern formed by a second exposure process is inspected by performing matching between the image of the pattern to-be-inspected and the reference pattern with regard to the first exposure process, and performing matching between the image of the pattern to-be-inspected and the reference pattern with regard to the second exposure process.

BRIEF DESCRIPTION OF THE DRAWINGS

FIG. 10 is a schematic view showing a method in which a pattern is scanned bidirectionally;

FIG. 14 is a schematic view showing an alternative method in which a rotated image of a pattern to-be-inspected is obtained by replacing positions of pixels;

FIG. 15 is a schematic view showing an example of basic arrangement of the pattern inspection apparatus according to the embodiment of the present invention;

FIG. 17 is a functional block diagram of the pattern inspection apparatus according to another embodiment of the present invention;

FIG. 18 is a schematic view showing an example of correction of a reference pattern;

FIG. 19 is a schematic view showing an example of a reference pattern;

FIG. 20 is a schematic view showing an example in which the reference pattern in FIG. 19 is converted into edges for respective pixels;

FIG. 23 is a schematic view showing a sequential inspection;

FIG. 24 is a schematic view showing a random inspection;

FIG. 28 is a schematic view showing an example of an image of a pattern to-be-inspected having a contrast between the inside of the pattern-to-be-inspected and the ground;

FIG. 30 is a schematic view showing an example of an image of a pattern to-be-inspected having bright edges and having no contrast between the inside of the pattern-to-be-inspected and the ground;

FIG. 31 is a schematic view showing edges detected from the image of FIG. 30;

FIG. 32 is a schematic view showing an example of magnitudes of edges of a one-dimensional image of a pattern to-be-inspected;

FIG. 33 is a schematic view showing an example in which the edges of FIG. 32 are dilated;

FIG. 34 is a schematic view showing an example of edges of a one-dimensional reference pattern;

FIG. 35 is a schematic view showing another example in which the edges of FIG. 32 are dilated;

FIG. 36 is a schematic view showing another example of edges of the one-dimensional reference pattern;

FIG. 37 is a schematic view showing another example in which the edges of FIG. 32 are dilated;

FIG. 38 is a schematic view showing an example of a smoothing filter;

FIG. 40 is a schematic view showing an example in which the edges of FIG. 39 are dilated;

FIG. 45 is another schematic view of FIG. 20 in which the reference pattern in FIG. 19 is expressed with the edge vectors for respective pixels;

FIG. 46 is a schematic view showing a matching;

FIGS. 52A and 52B are schematic views showing a method of calculating a matching evaluation value of an array of rectangular patterns;

FIGS. 53A, 53B and 53C are schematic views showing a method of calculating a matching evaluation value in which negative patterns paired with unique patterns are used;

FIG. 55 is a schematic view showing calculated matching error values $E_{pm}$;

FIGS. 57A, 57B and 57C are schematic views showing a method of calculating the matching error values $E_{pm}$;

FIGS. 59A, 59B and 59C are schematic views of the second matching method of a hole pattern;

FIGS. 63A and 63B are schematic views showing a method of recognizing a defect having abnormal pattern deformation quantity;

FIG. 67A is a schematic view showing another example of the edges of the reference pattern and the edges of the image of the pattern to-be-inspected;

FIG. 67B is a schematic view showing an example in which the X-components of the vectors $d(x,y_0)$ at $y=y_0$ between the two edges shown in FIG. 67A are approximated by the regression line $D(x)$;

FIG. 71A is a schematic view showing an example of edges of a corner of a reference pattern;

FIG. 71B is a schematic view showing an example of edges of a corner of an image of a pattern to-be-inspected;

FIG. 82 is a schematic view showing a method of dividing a line-shaped pattern having a corner into two rectangles at a corner portion;

FIG. 84 is a schematic view showing an inspection method which uses a reference pattern suitable for line width inspection and a reference pattern suitable for space width inspection;

FIG. 88 is a schematic view showing a method of extracting a part that is liable to cause open or bridge;

FIG. 98 is a schematic view showing a die-to-die comparison method in which contours are used;

FIG. 99 is a schematic view showing a method of comparing a contour with the second edge;

FIG. 101 is a schematic view showing edge placement errors of a pattern to-be-inspected;

FIG. 102 is a schematic view showing line widths of a pattern to-be-inspected;

FIG. 103 is a schematic view showing a method of correcting a contour;

FIG. 104 is a schematic view showing a method of reducing a noise on a contour;

FIG. 105 is a schematic view showing a method of reducing noise on a contour by using an average position of the second edge, the preceding edge to the second edge, and the subsequent edge to the second edge;

FIG. 106 is a schematic view showing a method of reducing noise on a contour by using an average of distances between edges of the second reference pattern and the corresponding second edges of an image of a pattern to-be-inspected;

FIGS. 107A and 107B are schematic views showing examples of gates having different OPC patterns;

FIG. 108 is a schematic view showing an example of a gate having different space widths on one side.

FIG. 109 is a schematic view showing bridge state of a pattern to-be-inspected, which is a negative pattern in a wiring layer;

FIG. 110 is a schematic view showing the threshold method, in which a luminance value of a part of an image of a pattern to-be-inspected other than a part of the profile is used as a bottom of the profile;

FIG. 111 is a schematic view showing a method, in which a luminance value of a part of an image of a pattern to-be-inspected other than a part of the profile is used as a bottom of the profile;

FIG. 113 is a schematic view showing a method of obtaining a region suitable for automatic contrast brightness adjustment and automatic focus adjustment;

FIG. 114 is a schematic view showing examples of a region suitable for automatic astigmatism adjustment;

FIG. 115 is a schematic view showing a method of obtaining a region suitable for automatic astigmatism adjustment;

FIG. 116 is a schematic view showing an example of the case in which intensity of the secondary electrons from inspection-unit-areas has gradually decreased according to a sequential inspection;

Figure 1:
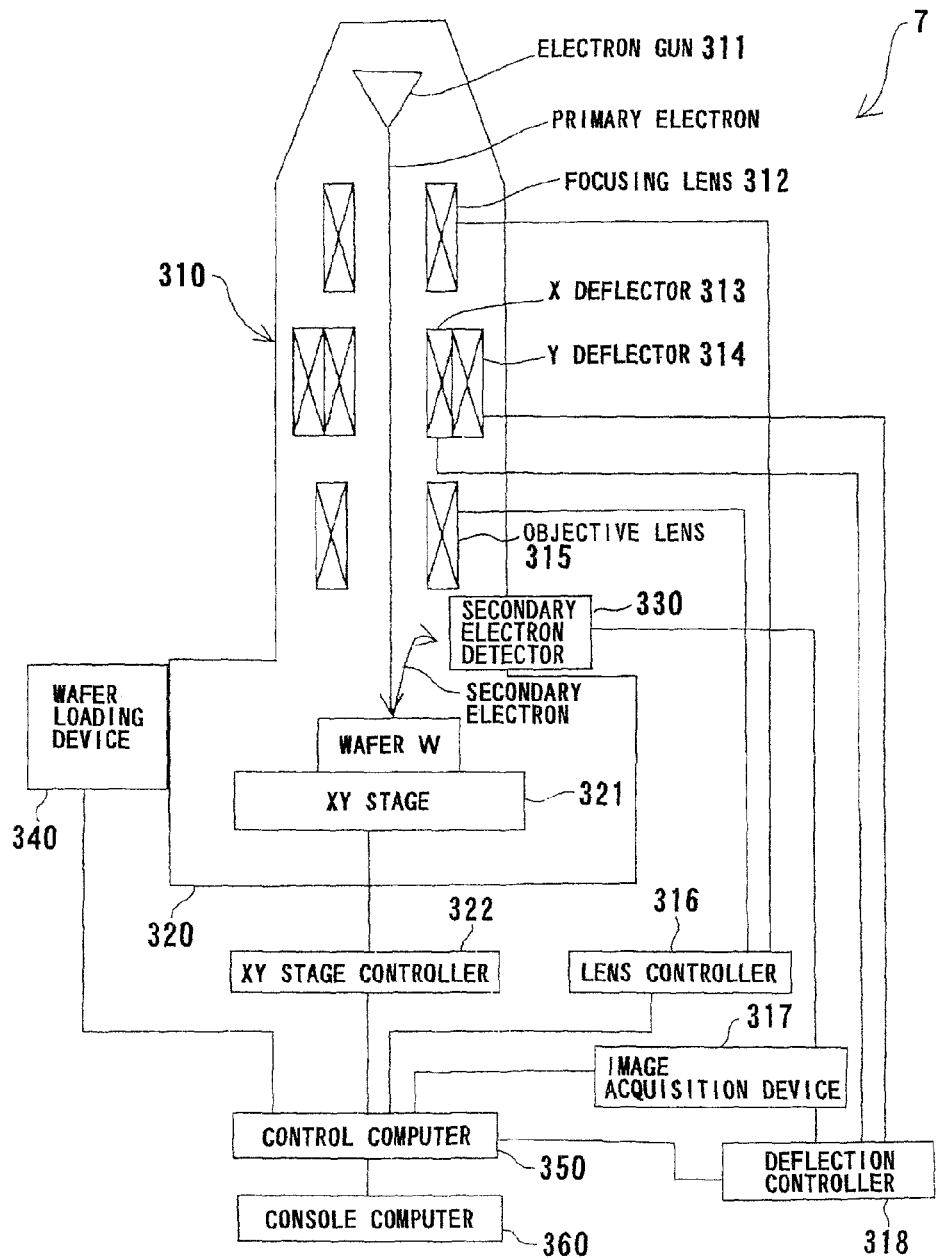
FIG. 1 is a schematic view, partly in block form, showing a basic arrangement of an image generation device in a pattern inspection apparatus according to an embodiment of the present invention.

FIGS. 117A, 117B, 117C, and 117D are schematic views showing a method of deforming an end of a reference pattern;

FIG. 118 is a schematic view showing a method of deforming a line part of a reference pattern; and FIGS. 119A, 119B, 119C, and 119D are schematic views showing a method of deforming a part of a reference pattern that is liable to cause open, and a part that is liable to cause bridge.

DETAILED DESCRIPTION OF THE PREFERRED EMBODIMENTS

Contents

1. Overview
2. Hardware configuration
2.1 Basic arrangement of image generation device
2.2 Scan methods of image generation device
2.3 Basic arrangement of pattern inspection apparatus
2.4 Functional block diagram
3. Explanations of terms
3.1 Edge
3.2 Reference pattern
3.3 Recipe data
3.4 Inspection-unit-area
3.5 Inspection results
4. Basic Inspection processing
4.1 The first edge detection
4.1.1 The first edge detection method 1
4.1.2 The first edge detection method 2
4.2 Line-shaped pattern matching method
4.2.1 Matching method in which unique pattern is used
4.2.2 Matching method in which negative pattern is used
4.2.3 Matching method in which projection data obtained by projecting edge on the horizontal and vertical axes are used
4.3 Matching method in which geometrical information for isolated pattern is used
4.4 Matching method in which statistics for isolated pattern are used
4.5 Post-matching processing
4.6 The first inspection
4.6.1 Method of recognizing defect having abnormal pattern deformation quantity
4.6.2 Method of recognizing defect using luminance distribution of pixels
4.7 Method of determining defect-classes based on feature quantity obtained from image of pattern to-be-inspected
4.8 Pattern deformation quantities obtained from the whole inspection-unit-area
4.9 Extraction rules for attributes of reference pattern
4.10 Method of detecting defect using attributes of reference pattern
4.10.1 Defect of end having edge placement error
4.10.2 Defects of line part and corner having edge placement error
4.10.3 Defects of isolated pattern having placement error
4.10.4 Other defects of isolated pattern
4.10.5 Defect of corner having abnormal curvature
4.11 The second edge detection
4.12 The second inspection
5. Application inspection processing
5.1 Method of recognizing repeated defects
5.2 Region inspection method
5.2.1 Methods of inspecting line width, average line width, space width, and average space width of line-shaped pattern 5.2.2 Methods of inspecting line width, average line width, space width, and average space width of curvilinear-shaped pattern
5.2.3 Method of inspecting part that is liable to cause open or bridge defect
5.3 Method of inspecting patterns requiring signal intensity correction
5.4 Method of inspecting overlay error
5.4.1 Method of inspecting overlay error between location of pattern to-be-inspected and location of pattern of preceding process
5.4.2 Method of inspecting overlay error of pattern to-be-inspected fabricated by double exposure method
5.5 Inspection method in which contours are used
5.5.1 Die-to-die comparison method in which contours are used
5.5.2 Inspection method in which deformation quantities for every pattern to-be-inspected are used
5.5.3 Method of correcting contour and Methods of reducing noise on contour
5.6 Method of grouping gates based on space widths of reference patterns
5.7 Threshold method, in which luminance value of part of image of pattern to-be-inspected other than part of the profile is used as bottom of the profile
5.8 Method of correcting profile by using inverse filter
5.9 Method of extracting region suitable for automatic image adjustments
5.10 Method of adjusting time-dependence variation in setting value of image generation device
5.11 Method of deforming reference pattern by using pattern deformation quantities obtained from pattern to-be-inspected 1. Overview A pattern inspection apparatus according to an embodiment of the present invention performs inspection by comparing an image of a pattern to-be-inspected obtained from an image generation device 7 shown in FIG. 1 with a reference pattern.

Figure 2:
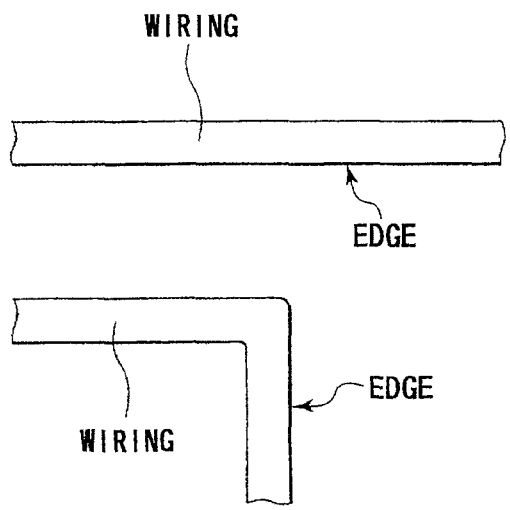
FIG. 2 is a schematic view showing an example of reference patterns obtained from design data.
Figure 3:
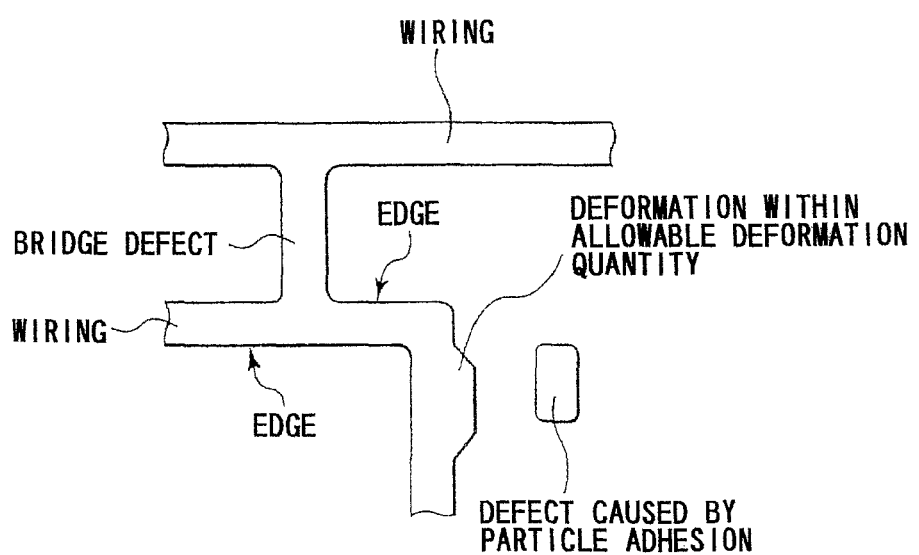
FIG. 3 is a schematic view showing an example of an image of a pattern to-be-inspected fabricated based on the design data.

FIG. 2 is a schematic view showing an example of reference patterns obtained from design data, and FIG. 3 is a schematic view showing an example of an image of a pattern to-be-inspected fabricated based on the design data. As shown in FIG. 3, the image of the pattern to-be-inspected may have a bridge defect, a defect caused by particle adhesion, and a deformation within an allowable pattern deformation quantity. Especially, corners have big corner roundness. Therefore, the image of the pattern to-be-inspected is rather different from the reference patterns.

Figure 4:
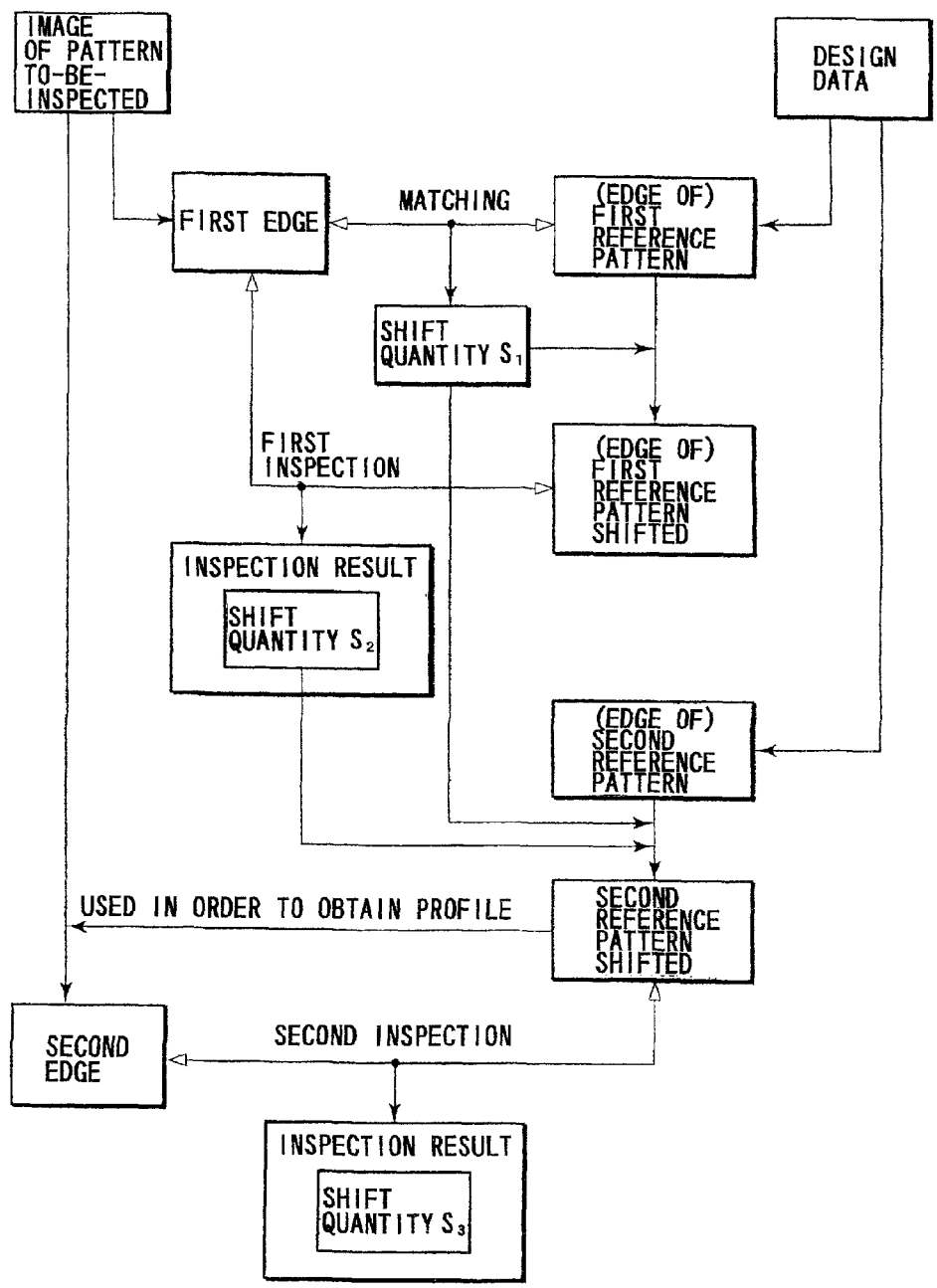
FIG. 4 is a schematic view showing an outline of inspection processing that the pattern inspection apparatus according to the embodiment of the present performs.

FIG. 4 is a schematic view showing an outline of inspection processing that the pattern inspection apparatus according to the embodiment of the present invention performs. In the first inspection processing, the first edges are detected from the image of the pattern to-be-inspected. Then, by comparing the detected first edges with edges of the first reference pattern, matching between the image of the pattern to-be-inspected and the reference pattern is performed. As a result of the matching, a shift quantity $S_1$ is obtained, and the first reference pattern is shifted by the shift quantity $S_1$. Next, by comparing the detected first edges with the edges of the first reference pattern shifted, the pattern to-be-inspected is inspected. In the first inspection, pattern deformation quantities are obtained by comparing the detected first edges with the edges of the first reference pattern, and then a defect is detected from the pattern deformation quantities. A shift quantity $S_2$ is obtained as one of the pattern deformation quantities.

Then, in order to detect the second edges from the image of the pattern to-be-inspected, the second reference pattern is shifted by the shift quantity $S_1+S_2$. Using the second reference pattern shifted, profiles are obtained from the image of the pattern to-be-inspected and the second edges are detected. Then, by comparing the detected second edges with the edges of the second reference pattern shifted, the pattern to-be-inspected is inspected. Also in the second inspection, pattern deformation quantities are obtained by comparing the detected second edges with the edges of the second reference pattern, and then a defect is detected from the pattern deformation quantities. A shift quantity $S_3$ is obtained as one of the pattern deformation quantities.

By using the above method, the bridge defect, the defect caused by particle adhesion, and the pattern deformation quantities can be detected from the image of the pattern to-be-inspected, and the defects or the pattern deformation quantities can be classified from attributes that the design data has.

2. Hardware Configuration 2.1 Basic Arrangement of Image Generation Device

FIG. 1 is a schematic view showing, partly in block form, a basic arrangement of the image generation device 7 in the pattern inspection apparatus according to the embodiment of the present invention. As shown in FIG. 1, the image generation device 7 generally comprises an irradiation system 310, a specimen chamber 320, and a secondary electron detector 330.

The irradiation system 310 comprises an electron gun 311, a focusing lens 312 for focusing primary electrons emitted from the electron gun 311, an X deflector 313 and a Y deflector 314 for deflecting an electron beam (charged particle beam) in the X and Y directions, respectively, and an objective lens 315. The specimen chamber 320 has an XY stage 321 movable in the X and Y directions. A wafer W as a specimen can be loaded into and unloaded from the specimen chamber 320 by a wafer-loading device 340.

In the irradiation system 310, primary electrons emitted from the electron gun 311 are focused by the focusing lens 312, deflected by the X deflector 313 and the Y deflector 314, and focused and applied by the objective lens 315 to a surface of the wafer W.

When the primary electrons are applied to the wafer W, the wafer W emits secondary electrons, and the secondary electrons are detected by the secondary electron detector 330. The focusing lens 312 and the objective lens 315 are connected to a lens controller 316 that is connected to a control computer 350. The secondary electron detector 330 is connected to an image acquisition device 317 that is also connected to the control computer 350. Intensity of the secondary electrons detected by the secondary electron detector 330 is converted into an image of a pattern to-be-inspected by the image acquisition device 317. A field of view is defined as the largest region where the primary electrons are applied and an image without distortion can be acquired.

The X deflector 313 and the Y deflector 314 are connected to a deflection controller 318 that is also connected to the control computer 350. The XY stage 321 is connected to an XY stage controller 322 that is also connected to the control computer 350. The wafer-loading device 340 is also connected to the control computer 350. The control computer 350 is connected to a console computer 360.

2.2 Scan Methods of Image Generation Device

Figure 5:
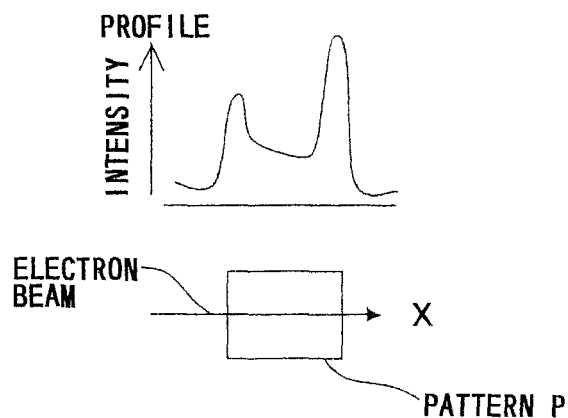
FIG. 5 is a schematic view showing intensity of secondary electrons detected by the secondary electron detector in the image generation device shown in FIG. 1.

FIG. 5 is a schematic view showing intensity of secondary electrons detected by the secondary electron detector in the image generation device shown in FIG. 1. FIG. 5 shows the intensity of the secondary electrons that are detected by the secondary electron detector 330 when a pattern P to-be-inspected is scanned by the one electron beam in the X direction. As shown in FIG. 5, due to the edge effect, the intensity of the secondary electrons generated from edges of the pattern P to-be-inspected is stronger than the intensity of the secondary electrons generated from a central area of the pattern P to-be-inspected. The intensity of the secondary electrons generated from the left-hand side of the pattern to-be-inspected and the intensity of the secondary electrons generated from the right-hand side of the pattern to-be-inspected are not symmetrical. For example, the intensity of the secondary electrons generated from a left edge in FIG. 5, where the electron beam starts scanning the pattern P to-be-inspected, is weaker than the intensity of the secondary electrons generated from a right edge in FIG. 5 (the opposite edge), where the electron beam leaves the pattern P to-be-inspected.

Figure 6:
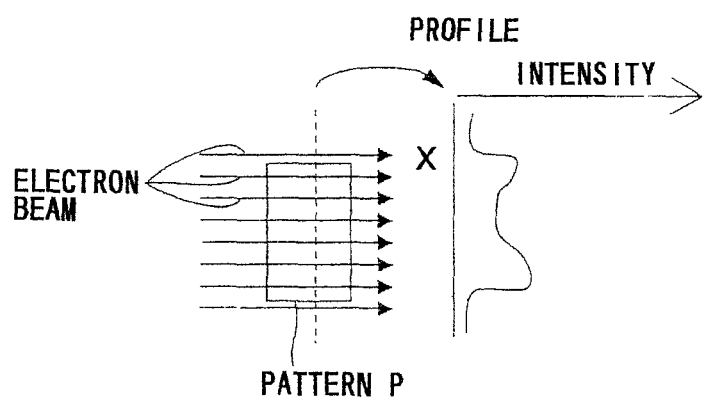
FIG. 6 is a schematic view showing intensity of the secondary electrons in the case where the pattern P shown in FIG. 5 is turned 90 degrees and profiles of the pattern P are obtained.

FIG. 6 is a schematic view showing intensity of the secondary electrons in the case where the pattern P to-be-inspected shown in FIG. 5 is turned 90 degrees and profiles of the pattern P to-be-inspected are obtained. Specifically, FIG. 6 shows the intensity of the secondary electrons that are detected by the secondary electron detector 330 when the pattern P to-be-inspected is scanned by a plurality of electron beams in the X direction. As shown in FIG. 6, the edge effect at edges of the pattern P to-be-inspected whose direction is similar to the scanning direction is difficult to obtain more clearly than in the case shown in FIG. 5.

Figure 7:
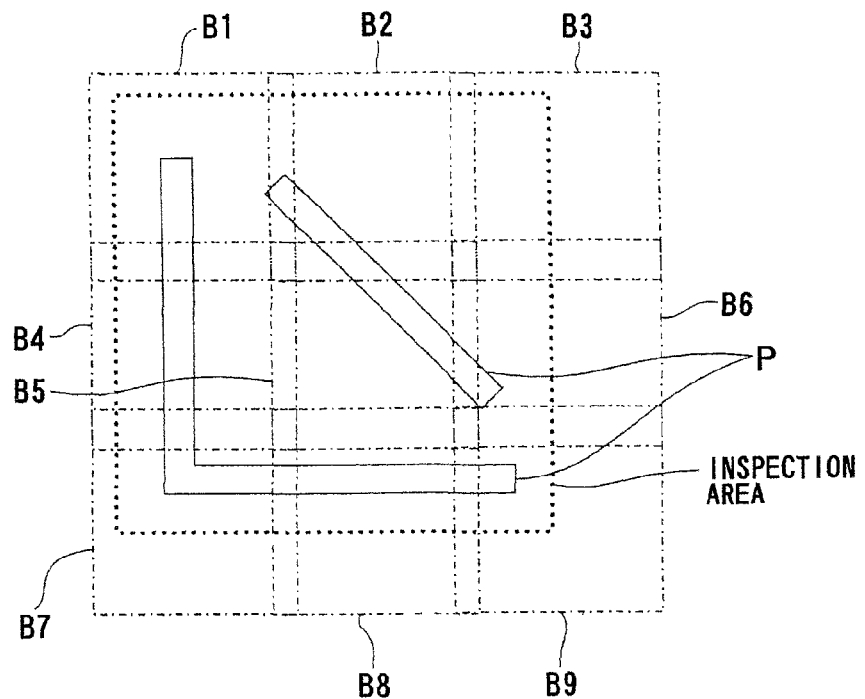
FIG. 7 is a schematic view showing a scanning area used when patterns to-be-inspected are inspected by the pattern inspection apparatus according to the embodiment of the present invention.

FIG. 7 is a schematic view showing a scanning area used when patterns to-be-inspected are inspected by the pattern inspection apparatus according to the embodiment of the present invention. In FIG. 7, a rectangle shown by dotted lines is an inspection area, which will be described later in 3.4 Inspection-unit-area. Patterns P to-be-inspected shown by solid lines exist in the inspection area. Inspection is performed for each inspection-unit-area that is obtained by dividing the inspection area by a field of view. The scanning area means an area that is scanned by a single scanning process. The maximum size of the scanning area is the field of view. A scanning area, which exists in the interior of a boundary of the inspection area, is the same as the inspection-unit-area. In the case of a scanning area that includes a boundary of the inspection area, an area that exists in the scanning area and also exists in the inspection area is the inspection-unit-area. Nine blocks B1 through B9 arranged in a matrix of three vertical columns and three horizontal rows shown by chain lines are the scanning areas.

Figure 8:
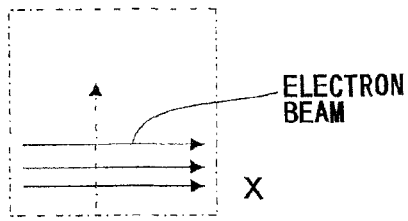
FIG. 8 is a schematic view illustrative of edge detection accuracy that is obtained when a pattern to-be-inspected is scanned horizontally.

The larger difference between a peak and a bottom of a profile obtained from an edge and its neighborhood of an image of a pattern to-be-inspected is, the higher edge detection accuracy is. FIG. 8 is a schematic view illustrative of edge detection accuracy that is obtained when a pattern to-be-inspected is scanned horizontally (in the X direction). As shown in FIG. 8, when the pattern to-be-inspected is scanned horizontally, edge detection accuracy with regard to edges in the vertical direction is as high as edge detection accuracy shown in FIG. 5. However, edge detection accuracy with regard to edges in the horizontal direction is low.

Figure 9:
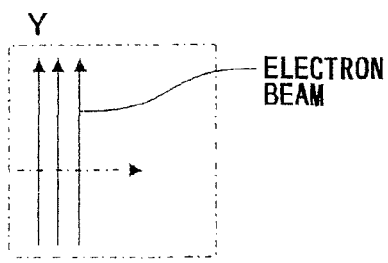
FIG. 9 is a schematic view illustrative of edge detection accuracy that is obtained when a pattern to-be-inspected is scanned vertically in an upward direction.

FIG. 9 is a schematic view illustrative of edge detection accuracy that is obtained when a pattern to-be-inspected is scanned vertically in the upward direction (in the Y direction). As shown in FIG. 9, when the pattern to-be-inspected is scanned vertically, edge detection accuracy is high with regard to edges in the horizontal direction, but is low with regard to edges in the vertical direction.

In a lower left block B7 of FIG. 7 where there are edges in the horizontal direction and edges in the vertical direction, if edge detection accuracies with regard to the edges in the horizontal direction and the edges in the vertical direction need to be high, two scans including the horizontal scan shown in FIG. 8 and the vertical scan shown in FIG. 9 are required. In the case of a block B8, which is to the right of the block B7, where there are only edges in the horizontal direction, the vertical scan shown in FIG. 9 is required. In the case of a middle left block B4 where there is only edges in the vertical direction, the horizontal scan shown in FIG. 8 is required. In these examples, the scanning direction has been selected, so that the scanning direction becomes more perpendicular to all edges of the patterns to-be-inspected. Therefore, one of the horizontal scan, the vertical scan, and both the horizontal and vertical scans is selected by using distribution of directions of edges of the reference pattern.

Because most of patterns to-be-inspected on semiconductor integrated circuits (LSI) and liquid crystal panels comprise edges in the vertical direction and edges in the horizontal direction, those patterns to-be-inspected need to be scanned in both the horizontal and vertical scans for detecting the edges of the image of the patterns to-be-inspected composed of edges in the vertical direction and edges in the horizontal direction with high accuracy.

FIG. 10 is a schematic view showing a method in which a pattern to-be-inspected is scanned bidirectionally. As described by using FIG. 5, the intensity of the secondary electrons is observed with a lower level at the edge (left edge in FIG. 5) where the electron beam starts scanning the pattern P to-be-inspected than at the opposite edge (right edge in FIG. 5) where the electron beam leaves the pattern P to-be-inspected. In view of these observations, an image of a pattern to-be-inspected is acquired by scanning the pattern to-be-inspected in alternately opposite directions as shown in FIG. 10. Specifically, the image of the pattern to-be-inspected is acquired by scanning the pattern to-be-inspected alternately in leftward direction and rightward direction. Left edges of the pattern to-be-inspected are detected by using the image of the pattern to-be-inspected acquired by scanning in the leftward direction, and right edges of the pattern to-be-inspected are detected by using the image of the pattern to-be-inspected acquired by scanning in the rightward direction. As a result, high edge detection accuracy can be achieved at both the left edges and the right edges of the pattern to-be-inspected.

Figure 11A:
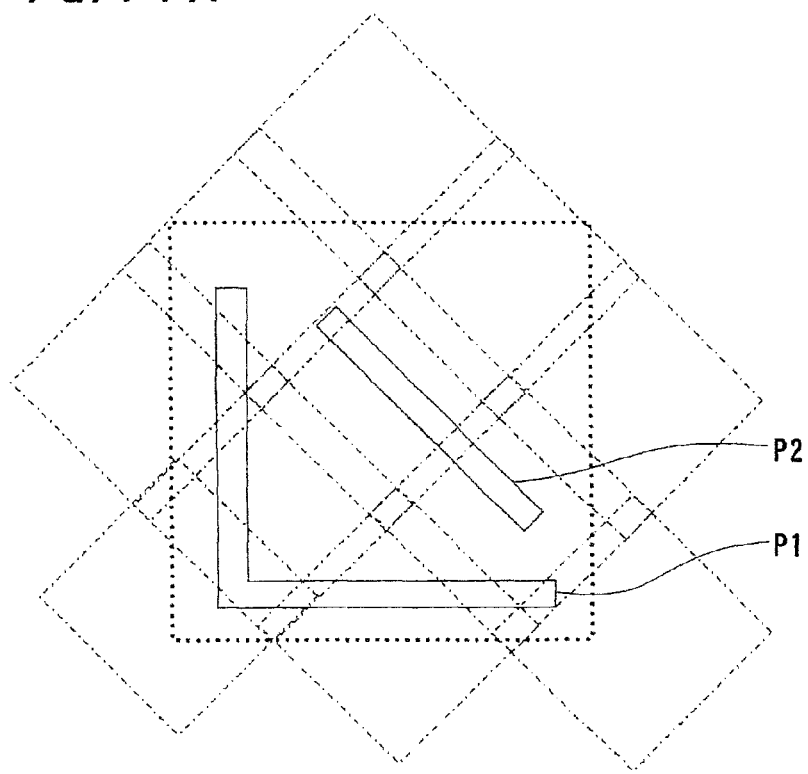
FIGS. 11A, 11B, and 11C are schematic views showing methods of scanning in the 45 degree direction or the minus 45 degree direction.
Figure 11B:
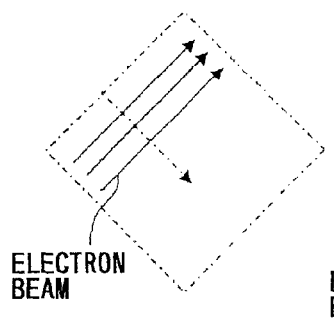
Figure 11C:
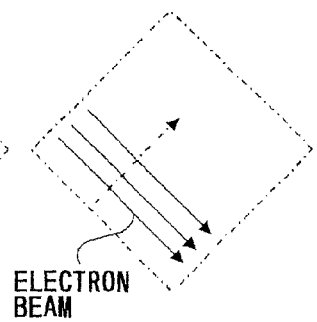

FIGS. 11A, 11B, and 11C are schematic views showing methods of scanning in the 45 degree direction or the minus 45 degree direction. A pattern P1 to-be-inspected composed of only edges in the horizontal direction and edges in the vertical direction as shown in FIG. 11A may be scanned once in the 45 degree direction as shown in FIG. 11B, or in the minus 45 degree direction as shown in FIG. 11C to achieve high edge detection accuracies with regard to the edges in the horizontal direction and the edges in the vertical direction.

If there is a pattern P2 to-be-inspected composed of edges in the 45 degree direction as shown in FIG. 11A, the pattern P2 to-be-inspected needs to be scanned twice in the 45 degree direction and in the minus 45 degree direction. However, it is expected that a frequency of requiring scan in two directions for the pattern P2 to-be-inspected is smaller than a frequency of requiring scan in one direction for the pattern P1 to-be-inspected composed of edges in the horizontal direction and edges in the vertical direction. Therefore, scanning in the 45 degree direction or in the minus 45 degree direction is efficient for achieving high edge detection accuracy in the case of one scanning.

Next, the case where scanning in the 45 degree direction and in the minus 45 degree direction is performed will be described. High edge detection accuracy with regard to edges in the lower right direction (minus 45 degrees) that constitute the pattern P2 to-be-inspected is achieved when the pattern P2 to-be-inspected is scanned in the direction of 45 degrees as shown in FIG. 11B. However, the high edge detection accuracy with regard to edges in the lower right direction (minus 45 degrees) cannot be achieved when the pattern P2 to-be-inspected is scanned in the minus 45 degree direction as shown in FIG. 11C, because the scanning direction and direction of edges are parallel. In the case where an inspection region is inspected by using scanning in the minus 45 degree direction, an inspection-unit-area including the pattern P2 to-be-inspected is inspected by using scanning in the 45 degree direction and the minus 45 degree direction. Generally, a frequency of requiring scanning in the 45 degree direction and in the minus 45 degree direction is smaller than a frequency of requiring scanning in the 0 degree direction and in the 90 degree direction.

As described in FIGS. 5 through 11, the image generation device 7 generates an image of a pattern to-be-inspected according to one of the following three scanning methods:

1. Scan Method 1

Unidirectional scan in the 0 degree direction, 90 degree direction, 45 degree direction, or minus 45 degree direction;

2. Scan Method 2

Alternate scan in the 0 degree direction and 180 degree direction; and

3. Scan Method 3

Bidirectional scan in the 0 degree direction and 90 degree direction or bidirectional scan in the 45 degree direction and minus 45 degree direction.

A coordinate system has the X-axis, whose direction is rightward, and the Y-axis, whose direction is upward, as the same manner as design data. A direction of the edge is defined as a direction in which the interior of the pattern to-be-inspected exists on the right-hand side. In the block B4 in FIG. 7, there are two edges in the vertical direction, a direction of the left side edge is determined as 90 degrees, and a direction of the right side edge is determined as 270 degrees.

As described later in 4.1 The first edge detection, the first edge is detected from a local image of a pattern to-be-inspected. A direction of the first edge is determined at the time of detection. A method in which the first edge is detected from an image of a pattern to-be-inspected acquired by the above-mentioned Scan method 1 through Scan method 3 will be described.

According to the unidirectional scan of the above-mentioned Scan method 1, and the alternate scan of the above-mentioned Scan method 2, edges are detected from a single image of a pattern to-be-inspected. According to the bidirectional scan of the above-mentioned Scan method 3, edges are detected from two images of a pattern to-be-inspected, and the detected edge information is merged. Specifically, according to the bidirectional scan in the 0 degree direction and the 90 degree direction, edges having an angle from 45 degrees to 135 degrees and an angle from 225 degrees to minus 45 degrees are detected from an image of a pattern to-be-inspected acquired by scanning in the 0 degree direction, and edges having an angle from 135 degrees to 225 degrees and an angle from minus 45 degrees to 45 degrees are detected from an image of a pattern to-be-inspected acquired by scanning in the 90 degree direction, and all detected edges are combined into total edges that are handled as edges detected from a single image of a pattern to-be-inspected.

According to the bidirectional scan in the 45 degree direction and the minus 45 degree direction, edges having an angle from 90 degrees to 180 degrees and an angle from 270 degrees to 360 degrees are extracted from an image of a pattern to-be-inspected acquired by scanning in the 45 degree direction, and edges having an angle from 0 to 90 degrees and an angle from 180 degrees to 270 degrees are extracted from an image of a pattern to-be-inspected acquired by scanning in the minus 45 degree direction, and all edges are combined into total edges that are handled as edges detected from a single image of a pattern to-be-inspected.

As described later in 4.11 The second edge detection, the second edge is detected from a profile (one-dimensional data). A direction of the second edge is determined at the time of setting the profile. A method in which the second edge is detected from the profile obtained by the above-mentioned Scan method 1 through Scan method 3 will be described.

According to the unidirectional scan of the above-mentioned Scan method 1, a profile is determined from one image of a pattern to-be-inspected.

According to the alternate scan in the 0 degree direction and 180 degree direction of the above-mentioned Scan method 2, a profile for detecting a right edge (edges at an angle from 180 degrees to 360 degrees) is obtained from an image of a pattern to-be-inspected acquired by scanning in the 0 degree direction, and a profile for detecting a left edge (edges at an angle from 0 degree to 180 degrees) is obtained from an image of a pattern to-be-inspected acquired by scanning at 180 degrees.

According to the bidirectional scan of the above-mentioned Scan method 3, a profile for detecting an edge having an angle from 45 degrees to 135 degrees or an angle from 225 degrees to minus 45 degrees is obtained from an image of a pattern to-be-inspected acquired by scanning in the 0 degree direction, and a profile for detecting an edge having an angle from 135 degrees to 225 degrees or an angle from minus 45 degrees to 45 degrees is obtained from an image of a pattern to-be-inspected acquired by scanning in the 90 degree direction.

Figure 12:
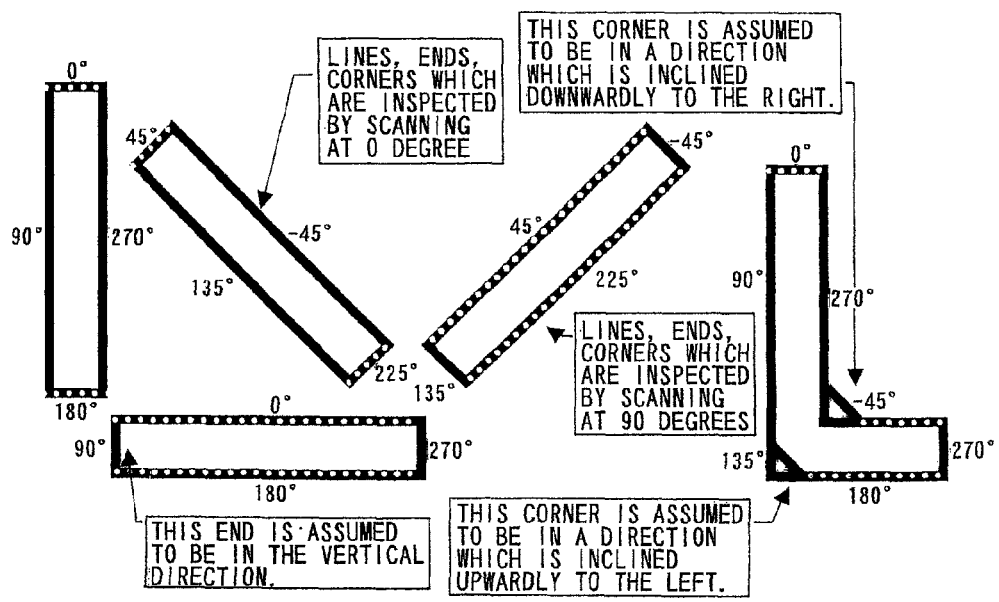
FIG. 12 is a schematic view showing examples of line segments, which should be inspected by using either the image scanned at 0 degree or the image scanned at 90 degrees.

FIG. 12 is a schematic view showing examples of line segments, which should be inspected by using either the image of the pattern to-be-inspected acquired by scanning in the 0 degree direction or the image of the pattern to-be-inspected acquired by scanning in the 90 degree direction. As shown in FIG. 12, line segments of line parts, ends, and corners, which have the vertical direction (90 degrees or 270 degrees), the upper left direction (135 degrees), and the lower right direction (minus 45 degrees), should be inspected by using an image of a pattern to-be-inspected acquired by scanning in the 0 degree direction. Further, line segments of line parts, ends, and corners, which have the horizontal direction (0 degree or 180 degrees), the upper right direction (45 degrees), and the lower left direction (225 degrees), should be inspected by using an image of a pattern to-be-inspected acquired by scanning in the 90 degree direction.

According to the bidirectional scan in the 45 degree direction and minus 45 degree direction, a profile for detecting an edge having an angle from 90 degrees to 180 degrees or an angle from 270 degrees to 360 degrees is obtained from an image of a pattern to-be-inspected acquired by scanning in the 45 degree direction, and a profile for detecting an edge having an angle from 0 degree to 90 degrees or an angle from 180 degrees to 270 degrees is obtained from an image of a pattern to-be-inspected acquired by scanning in the minus 45 degree direction.

Therefore, an edge of an image of the pattern to-be-inspected is detected from an image of the pattern to-be-inspected that has been generated in one of the plurality of the scanning directions. The selected scanning direction is more perpendicular to the edge of the reference pattern.

In the case where the image of the pattern to-be-inspected is acquired by scanning in the 45 degree direction or minus 45 degree direction, there is rotation between the acquired image of a pattern to-be-inspected and design data, and therefore it is necessary to compensate for such rotation. As a method for compensating for rotation, a method in which design data is rotated can be used. However, because design data is rotated, the inclined image becomes final output image, and therefore such image is difficult to see. Therefore, a method in which an image of a pattern to-be-inspected is rotated is used. However, in the case where scanning is made in order to perform sampling uniformly in the X and Y directions, if an acquired image of a pattern to-be-inspected is rotated, interpolated values between pixels must be used as values of the rotated image. In this case, the rotated image of the pattern to-be-inspected may be unsharp by interpolation, and therefore in this embodiment, the rotated image is acquired only by replacing positions of pixels without using interpolation. In the case of using this embodiment, it is necessary to use the following scanning method.

Figure 13:
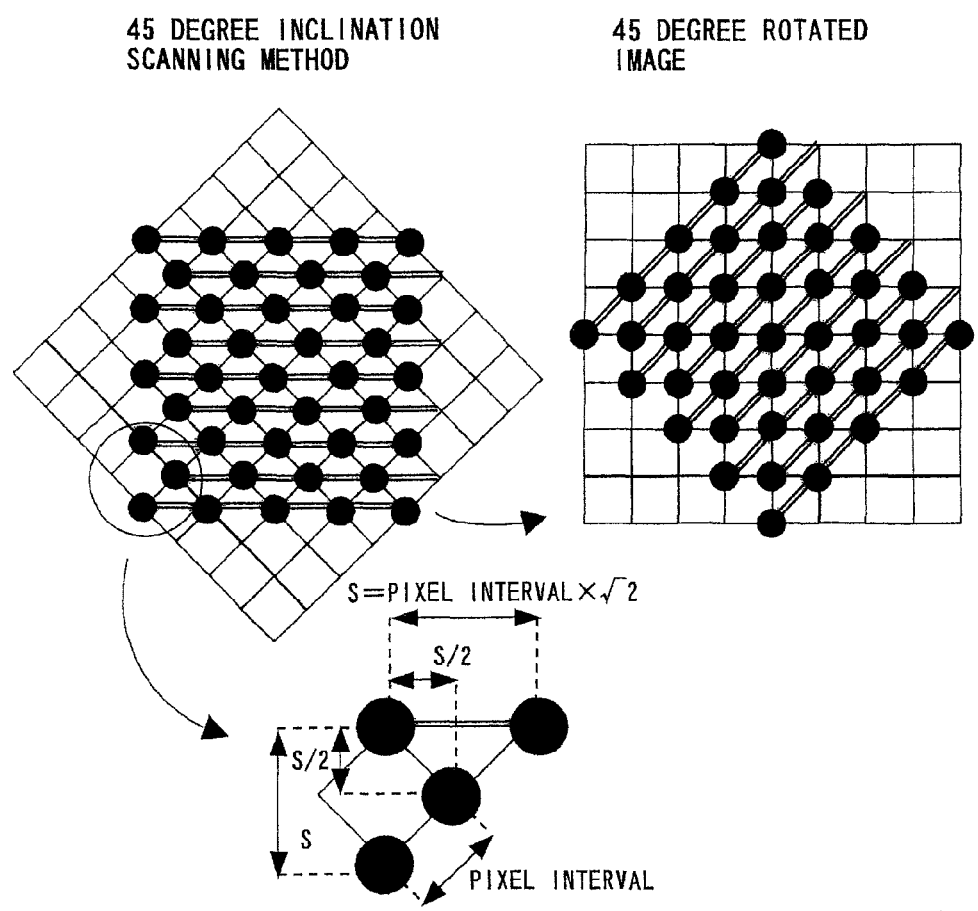
FIG. 13 is a schematic view showing a method in which a rotated image of a pattern to-be-inspected is obtained by replacing positions of pixels.

FIG. 13 is a schematic view showing a method in which a rotated image of a pattern to-be-inspected is obtained by replacing positions of pixels. An object in a 45 degree inclination scanning method as shown in the left side of FIG. 13 is the same as an object in a 45 degree rotated image as shown in the right side of FIG. 13, with the object in the 45 degree rotated image being rotated by 45 degrees. The final image to be rotated is the image on the right-hand side of FIG. 13. In FIG. 13, grid points show positions of images of a pattern to-be-inspected that is acquired by uniform sampling in the X and Y directions. Solid circles (●) correspond to positions of actual sampling. Positions where there is no solid circle are not sampled. In order to obtain the image of the pattern to-be-inspected on the right-hand side of FIG. 13, the scanning method on the left-hand side of FIG. 13 is performed.

In this case, sampling intervals S in the X direction are the same for each scanning line, but sampling intervals in the Y direction are half of the sampling interval S in the X direction. Between odd-numbered lines and even-numbered lines, the positions of sampling are shifted by half of the sampling interval S in the X direction. This sampling interval S is obtained by multiplying the pixel interval on the right-hand side of FIG. 13 by $\sqrt{2}$. In this manner, a desired image of a pattern to-be-inspected can be obtained only by rotating the left side view. In this case, it is necessary to store values in the order different from the actual sampling order.

Although FIG. 13 shows the case in which scanning is performed in the 45 degree direction, FIG. 14 shows the case in which scanning is performed in the arctangent (2) degree direction, and a rotated image of a pattern to-be-inspected.

According to this embodiment, the pattern to-be-inspected may be scanned with a minimum electron beam (charged particle beam), and therefore the image of the pattern to-be-inspected can be obtained in a minimum time. In addition, the rotated image of the pattern to-be-inspected can be obtained without lowering image quality due to interpolation, and therefore the edge detection accuracy can be prevented from being lowered.

2.3 Basic Arrangement of Pattern Inspection Apparatus

FIG. 15 is a schematic view showing an example of basic arrangement of the pattern inspection apparatus according to the embodiment of the present invention. The pattern inspection apparatus according to the embodiment of the present invention comprises a main control unit 1, a storage device 2, an input/output control unit 3, an input device 4, a display device 5, a printer 6, and the image generation device 7 shown in FIG. 1.

The main control unit 1 comprises a CPU (Central Processing Unit) or the like, and manages and controls the whole apparatus. The main control unit 1 is connected to the storage device 2. The storage device 2 can take a form of a hard disk drive, a flexible disk drive, an optical disc drive, and the like. Further, the input device 4 such as a keyboard or a mouse, the display device 5 such as a display for displaying the input data, calculation results, and the like, and the printer 6 for printing inspection results and the like are connected to the main control unit 1 through the input/output control unit 3.

The main control unit 1 has a control program such as an OS (Operating System), a program for the pattern inspection, and an internal memory (internal storage device) for storing necessary data and the like, and realizes the pattern inspection with these programs and the like. These programs can be initially stored in a flexible disk, an optical disc drive, and the like, read and stored in a memory, a hard disk, and the like before execution, and then executed.

2.4 Functional Block Diagram

Figure 16:
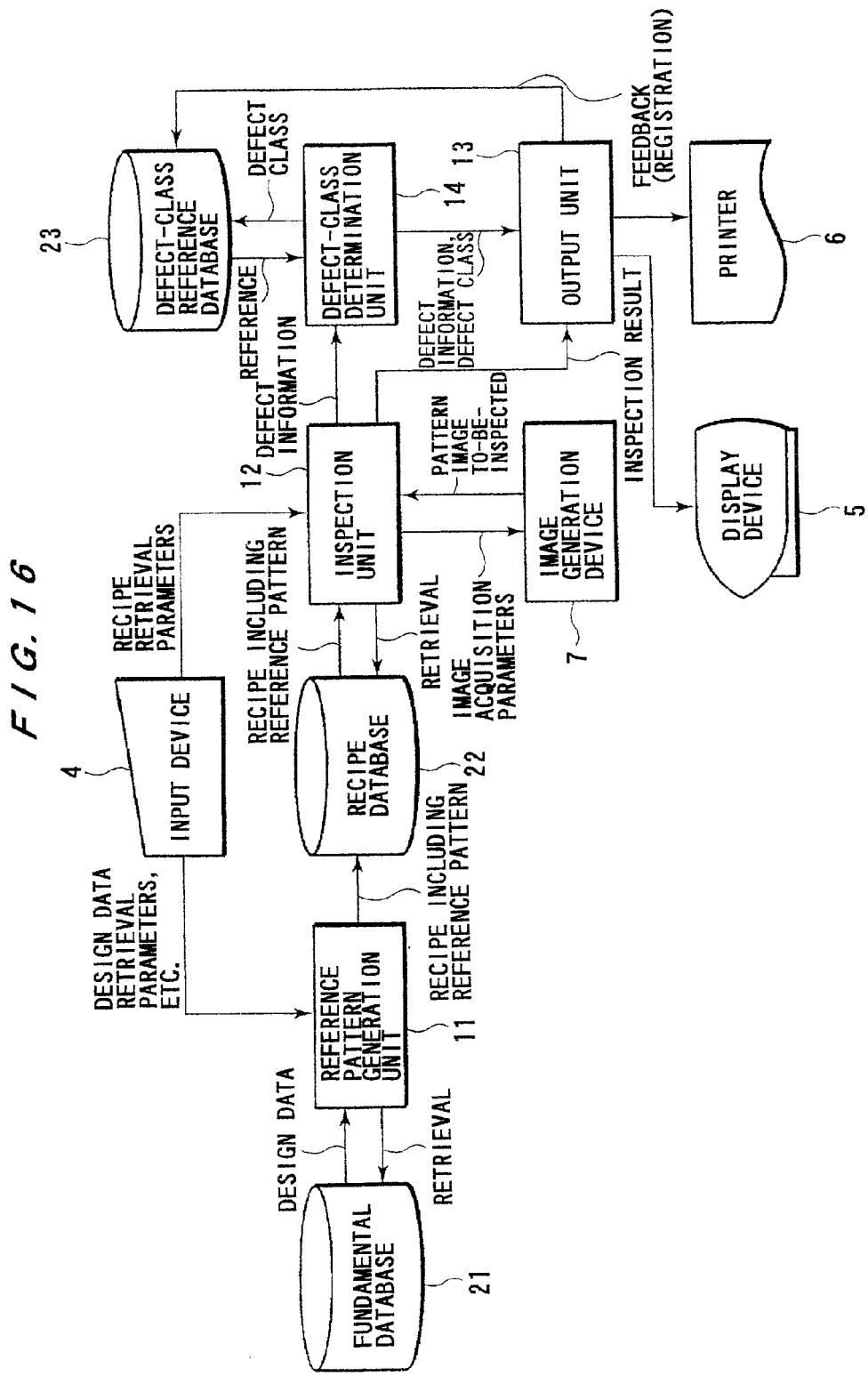
FIG. 16 is a functional block diagram of the pattern inspection apparatus according to the embodiment of the present invention.

FIG. 16 is a schematic view showing a functional block diagram of the pattern inspection apparatus in this embodiment. A reference pattern generation unit (reference pattern generation device) 11, an inspection unit (inspection device) 12, an output unit 13, and a defect-class determination unit (defect classification device) 14 are all realized by programs. A fundamental database 21, a recipe database 22, and a defect-class reference database 23 are provided in the storage device 2. The inspection unit (inspection device) 12 includes a detecting device for detecting the first edge and the second edge of an image of the pattern to-be-inspected.

Alternatively, the fundamental database 21 may be provided outside the storage device 2 and the pattern inspection apparatus may access the fundamental database 21 through the LAN (Local Area Network).

FIG. 17 is a schematic view showing the functional block diagram of the pattern inspection apparatus according to another embodiment of the present invention. FIG. 17 shows a structure having a function for recognizing repeated defects. In the example of FIG. 17, a defect information storage unit 24 and a repeated defect recognition unit (repeated defect recognition device) 25, which recognizes repeated defects, are added to the functional block of FIG. 16.

3. Explanations of Terms 3.1 Edge

An edge means a boundary between the inside of a pattern to-be-inspected and a ground. As the edge, an edge of an image of a pattern to-be-inspected and an edge of a reference pattern are used. The edge of the image of the pattern to-be-inspected is detected by edge detection methods, and the edge of the reference pattern is obtained by dividing the reference pattern represented by one or more lines pixel by pixel. As described by using FIG. 60 in 4.6 The first inspection later, inspection is performed by establishing correspondence between the edge of the image of the pattern to-be-inspected and the edge of the reference pattern.

The edge is represented by a vector that has information of a starting point (with sub pixel accuracy), a direction, and a magnitude for each pixel. In the case of the edge of the image of the pattern to-be-inspected, the magnitude is a length of vector multiplied by sharpness of the edge, where the sharpness is defined as a probability of being a real edge. In the case of the edge of the reference pattern, the magnitude is a length of vector multiplied by a degree of contribution to matching.

3.2 Reference Pattern

A reference pattern is represented by one or more lines. Each of the one or more lines comprises one of a line segment and a curve. The reference pattern is compared with an image of a pattern to-be-inspected. Design data can be used as the most suitable data for the reference pattern. As the design data, data obtained by modifying layout data that is represented by the GDSII (Graphic Design System II) data stream format by layer merging or fracturing can be used.

First, the design data is modified in order to be optimal for positions of edges detected from an image of a pattern to-be-inspected by performing shrink processing (processing in which magnification of the design data is altered), size-processing (processing in which a line width is altered), and the like. Furthermore, because position of an edge to-be-detected is generally different in the first edge detection and in the second edge detection, two kinds of reference patterns are prepared for the first edge detection and for the second edge detection.

Next, polygons obtained by the above processing are clipped by a rectangle whose one side is equal to the side of the field of view plus an error of the XY stage 321 and the maximum allowable pattern deformation quantity of a pattern to-be-inspected.

Next, corners of the obtained polygons are rounded off. As shown in FIG. 18, normally the design data consists of polygons having acute angles (dotted lines in FIG. 18). On the other hand, a pattern to-be-inspected formed on a wafer has corner roundness. In order to cancel this difference, the corners of the obtained polygons are corrected to be close to the pattern to-be-inspected by applying a circle, an ellipse, a straight line, or a curve described by other methods to the corner parts.

Finally, results obtained by the above are registered as a reference pattern into the recipe database 22 beforehand. If the error of the XY stage 321 can be neglected, the absolute coordinate values of the pattern deformation can be measured. In this embodiment, the reference pattern is set to be larger than the image of the pattern to-be-inspected in consideration of the error of the XY stage 321 and the maximum allowable pattern deformation quantity of a pattern to-be-inspected to perform inspection. As an alternative method, the image of the pattern to-be-inspected may be set to be larger than the reference pattern to perform inspection.

If the design data is used as a reference pattern, defect inspection in which a pattern to-be-inspected formed on a wafer is compared with the design data can be performed. In this case, an allowable quantity that does not affect an electrical property is set. This pattern deformation quantity may be set for each attribute of pattern, and furthermore may be altered for a portion where patterns-to-be-inspected are crowded and for a portion where patterns-to-be-inspected are not crowded.

If a curve (solid lines in FIG. 73) representing a contour of a simulation pattern obtained by a lithography simulator is used as a reference pattern, the simulation capability can be verified. The simulation pattern is obtained by a light intensity distribution obtained by optical simulation using mask data. The curves of the contour are obtained from the distribution. In this case, an allowable pattern deformation is set to an error quantity that is allowed in the simulation.

In this embodiment, a method in which the design data is used as the reference pattern will be described.

FIG. 19 is a schematic view showing an example of a reference pattern, and FIG. 20 is a schematic view showing an example in which the reference pattern S of FIG. 19 is converted into the edges for respective pixels. In FIG. 19, the reference pattern S (dotted lines) is shown with sub pixel accuracy. Normally, edge direction of the reference pattern is parallel to the horizontal direction (X-direction) or the vertical direction (Y-direction) of the pixel. The edge of the reference pattern, as with an edge of an image of a pattern to-be-inspected, has information of a starting point (with sub pixel accuracy), a direction, and the magnitude for each pixel. In this embodiment, the edge magnitude of the reference pattern is set to unity, i.e. 1 except for 4.2.1 Matching method in which unique pattern is used and 4.2.2 Matching method in which negative pattern is used described later.

Figure 21:
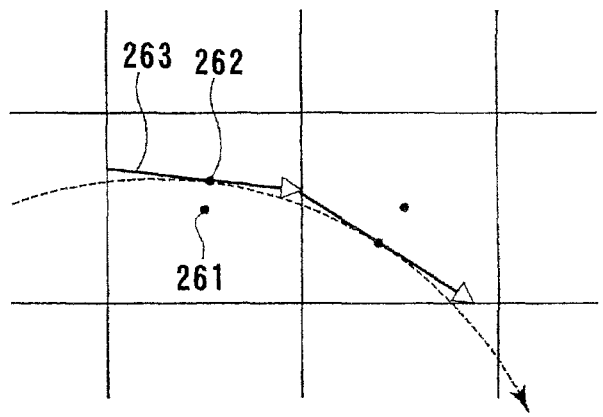
FIG. 21 is a schematic view showing an example in which the reference pattern including a curve is converted into edge vectors.

As shown in FIG. 21, the reference pattern includes a curve in a corner part. For converting a curvilinear part of the reference pattern into an edge of the reference pattern, a tangent line 263 at a point 262 that is on the reference pattern and is closest to the center 261 of the pixel is generated.

3.3 Recipe Data

Before the inspection, a set of inspection parameters called recipe data is set. As operator input parameters of the recipe data, design data retrieval parameters, image acquisition parameters, and edge detection/inspection parameters are set. As output data of the recipe data, the reference pattern generation unit 11 generates a reference pattern.

As the design data retrieval parameters, a device name and a process name with regard to a wafer (specimen) to-be-inspected are set. As the image acquisition parameters, a slot number for specifying a wafer, condition-setting parameters for the irradiation system 310, a pixel interval, the number of pixels and an inspection area are set.

The pixel interval means a distance on the wafer corresponding to an interval between the pixels of an image of a pattern to-be-inspected. For the number of pixels, 1024×1024, 8192×8192, or the like is set. The pixel interval is multiplied by the number of pixels, and the obtained product is a size of the image of the pattern to-be-inspected. A region having the size is the field of view, which is described in the above-mentioned 2.1 Basic arrangement of image generation device. For example, in the case where the pixel interval is 9 nm and the number of pixels is 8192×8192, the field of view is approximately 70 μm×7 μm.

As the edge detection/inspection parameters, the following parameters are set:

1. Pattern deformation quantities to be inspected
An edge placement error;
A deformation quantity of a line width;
The minimum line width;
A deformation quantity of a space width;
The minimum space width;
A contact-area inspection ratio;
A placement error of the centroid of a pattern-to-be-inspected, a deformation quantity of a diameter, and the like, in the case of an isolated pattern; and
A defect judgment coefficient of a correction pattern that should not be formed on a wafer.

2. Limit values of the negative side and the positive side of the allowable pattern deformation quantities, which correspond to the above pattern deformation quantities, and a limit of an allowable directional difference between edges used for matching.

These pattern deformation quantities are set for each attribute of a reference pattern.

3. Parameters for detecting the first edge, which are empirically determined from an image of pattern to-be-inspected.
The first edge detection method;
Coefficients of filter for edge dilation;
A threshold used in binarization of edges of an image of a pattern to-be-inspected; and
A p-tile coefficient used in binarization of edges of an image of a pattern to-be-inspected.

4. Parameters used in extraction rules for determining attributes of reference pattern (line part, corner, end, isolated pattern, and the like).

The attributes of the reference pattern are used for specifying part or the whole of the reference pattern. Typically, there are three kinds of attributes for specifying part of the reference pattern. One of the attributes is a line part (line part except for an end of the reference pattern), another of the attributes is a corner (portion having a vertex which does not contact the line part having the attribute of an end), and the other of the attributes is an end (line part corresponding to an end of the reference pattern). There is an isolated pattern (pattern isolated from the other) as an attribute for specifying the whole of the reference pattern.

5. Parameters used in extraction rules for a region suitable for a region inspection.

The maximum line width, the minimum line length, and a termination shortening length of a reference pattern suitable for line width inspection;

The maximum line width, the minimum line length, and a termination shortening length of a reference pattern suitable for space width inspection;

The maximum line width of a part that is liable to cause an open defect;

The maximum line length of a part that is liable to cause an open defect;

The maximum space width of a part that is liable to cause a bridge defect; and

The maximum space length of a part that is liable to cause a bridge defect.

6. Parameters for detecting the second edge, which are empirically determined from an image of pattern to-be-inspected.

A length of a profile acquisition section;

An interval between profile acquisition sections;

An interval between sampling points in a profile acquisition section;

A method of detecting an edge from a profile (the threshold method and the like); and A flag for indicating whether profile acquisition sections are set at the time of setting recipe data, or are set after detecting the first edges.

7. The minimum size and the maximum size of an isolated pattern, and safety factors.

8. The number of inspection-unit-areas in order to obtain a global pattern deformation quantity.

9. The number of maximum registrations of defect images.

10. The number of maximum registrations of defects to-be-reinspected.

11. A region suitable for automatic contrast brightness adjustment, automatic focus adjustment, and automatic astigmatism adjustment.

12. An interval of representative distortion vectors held by a distortion correction vector calculation circuit 414.

The recipe data is managed by using the device name, the process name, and an inspection mode, which are the design data retrieval parameters, as a key. The inspection mode is a generic term for the image acquisition parameters, and the edge detection/inspection parameters.

Figure 22:
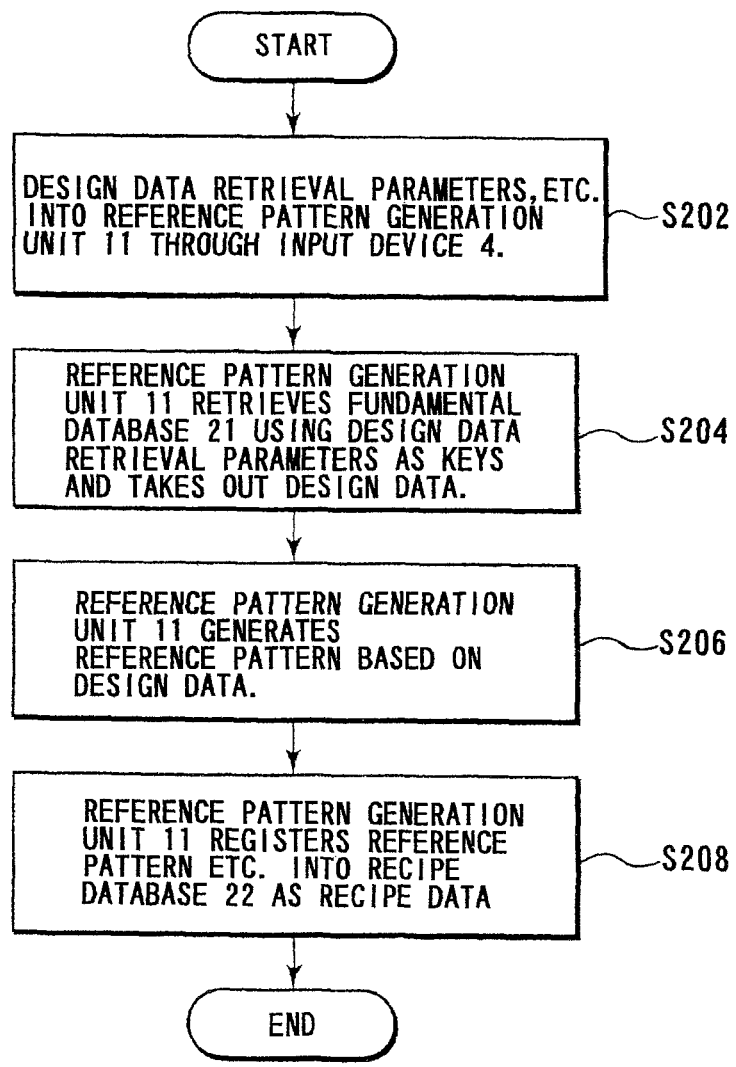
FIG. 22 is a flowchart showing an example of recipe registration processing according to the embodiment of the present invention.

FIG. 22 is a flowchart showing an example of recipe registration processing in this embodiment. First, the operator inputs the operator input parameters (the design data retrieval parameters, etc.) into the reference pattern generation unit 11 via the input device 4 (step S202).

The reference pattern generation unit 11 retrieves the fundamental database 21 using the design data retrieval parameters (a device name and a process name) as a key and takes out the design data (step S204). The fundamental database 21 serves as a database that stores the design data corresponding to a reference pattern. Next, the reference pattern generation unit 11 generates a reference pattern based on the design data (step S206).

Finally, the reference pattern generation unit 11 registers the reference pattern and the operator input parameters into the recipe database 22 as recipe data (step S208).

3.4 Inspection-Unit-Area

Because inspection is performed for each inspection-unit-area that is obtained by dividing the inputted inspection area by a field of view, a reference pattern is created corresponding to the inspection-unit-area. The inspection includes a sequential inspection or a random inspection.

FIG. 23 is a schematic view showing the sequential inspection. The inspection area is not set on the whole wafer, but is set on a plurality of areas that are specified by rectangles (the upper short rectangle, the lower long rectangle, and the like as shown in FIG. 23), and each inspection-unit-area is scanned sequentially in order to inspect the areas at high speed. The reference pattern is created for each inspection-unit-area.

FIG. 24 is a schematic view showing the random inspection. In the random inspection, a certain area is not inspected sequentially, but limited areas are inspected. In FIG. 24, only inspection-unit-areas 301 to 304 are inspected.

3.5 Inspection Results

Inspection results include the following basic information:

1. Information of a defect having an abnormal pattern deformation quantity

2. Information of a defect recognized by using luminance distribution of pixels

3. Pattern deformation quantities obtained from the whole inspection-unit-area

The inspection results include the following information, which is obtained by using pattern deformation quantities with regard to attributes of a reference pattern:

4. Information of a defect detected by using the attributes of a reference pattern The results of inspection include the following information, which is obtained by using edges facing each other:

5. Information of a defect detected by the region inspection

4. Basic Inspection Processing

Figure 25:
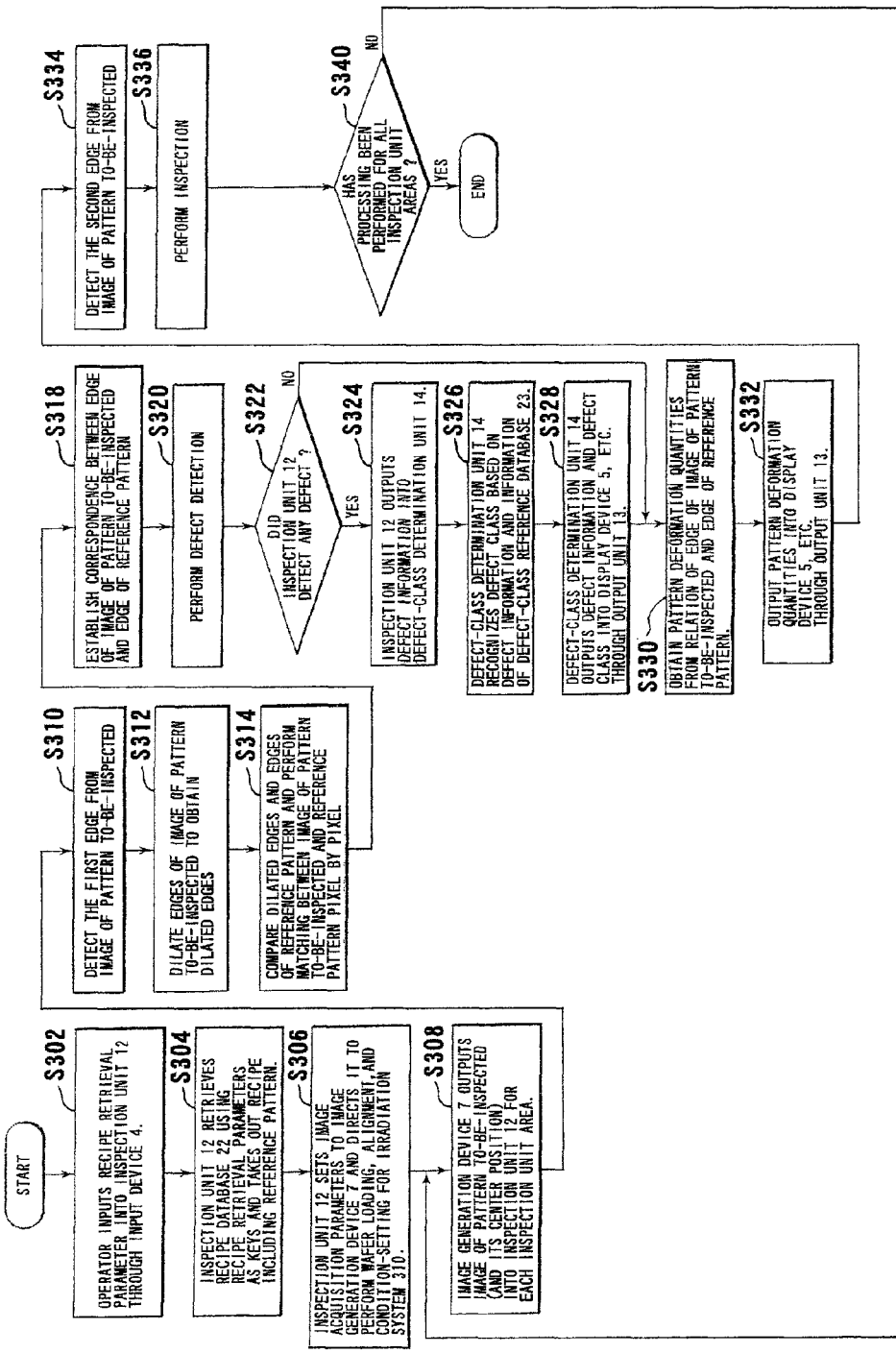
FIG. 25 is a flowchart showing an example of basic inspection processing according to the embodiment of the present invention.
Figure 26:
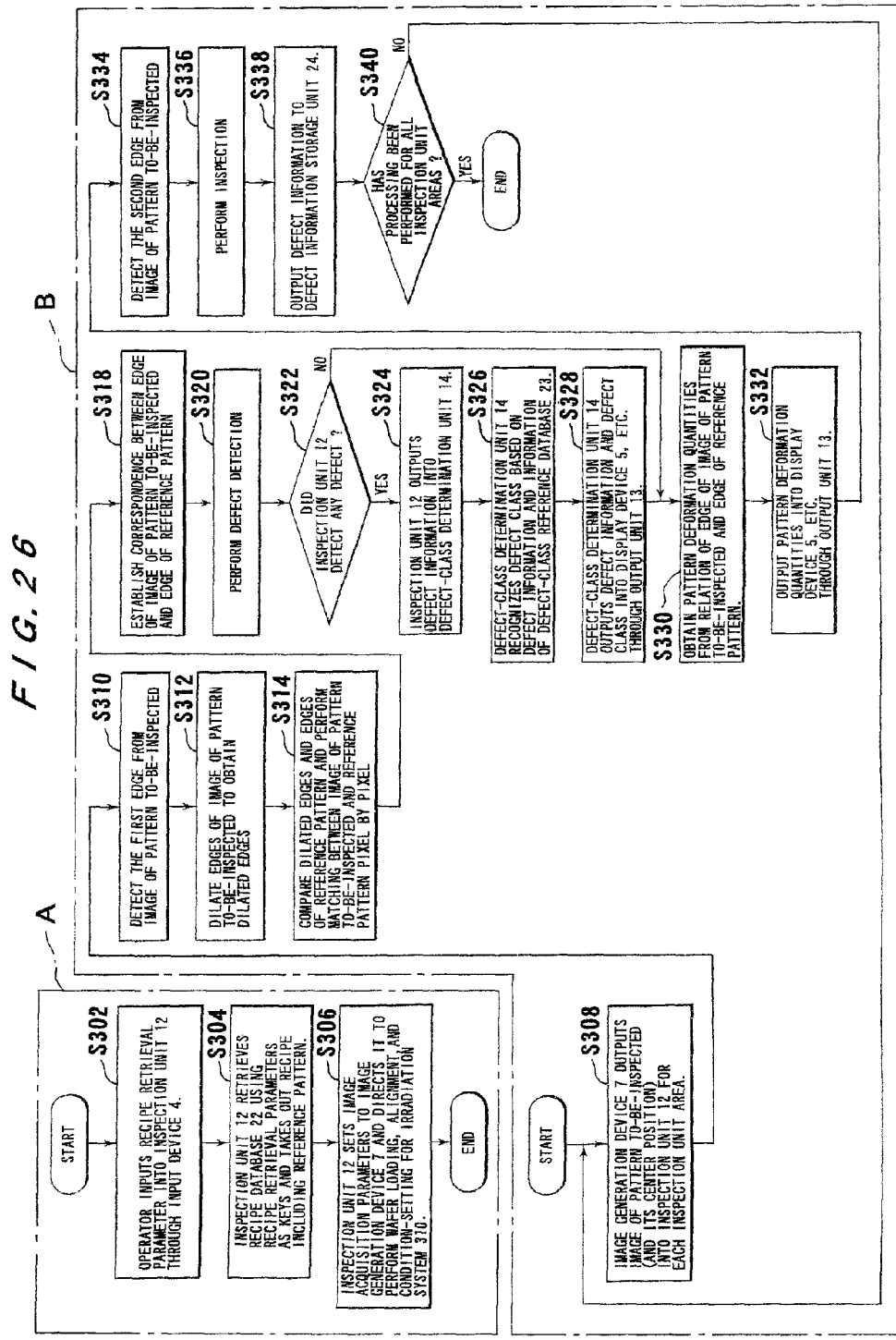
FIG. 26 is a sub-block of a flowchart showing an example of inspection processing for recognizing repeated defects.
Figure 27:
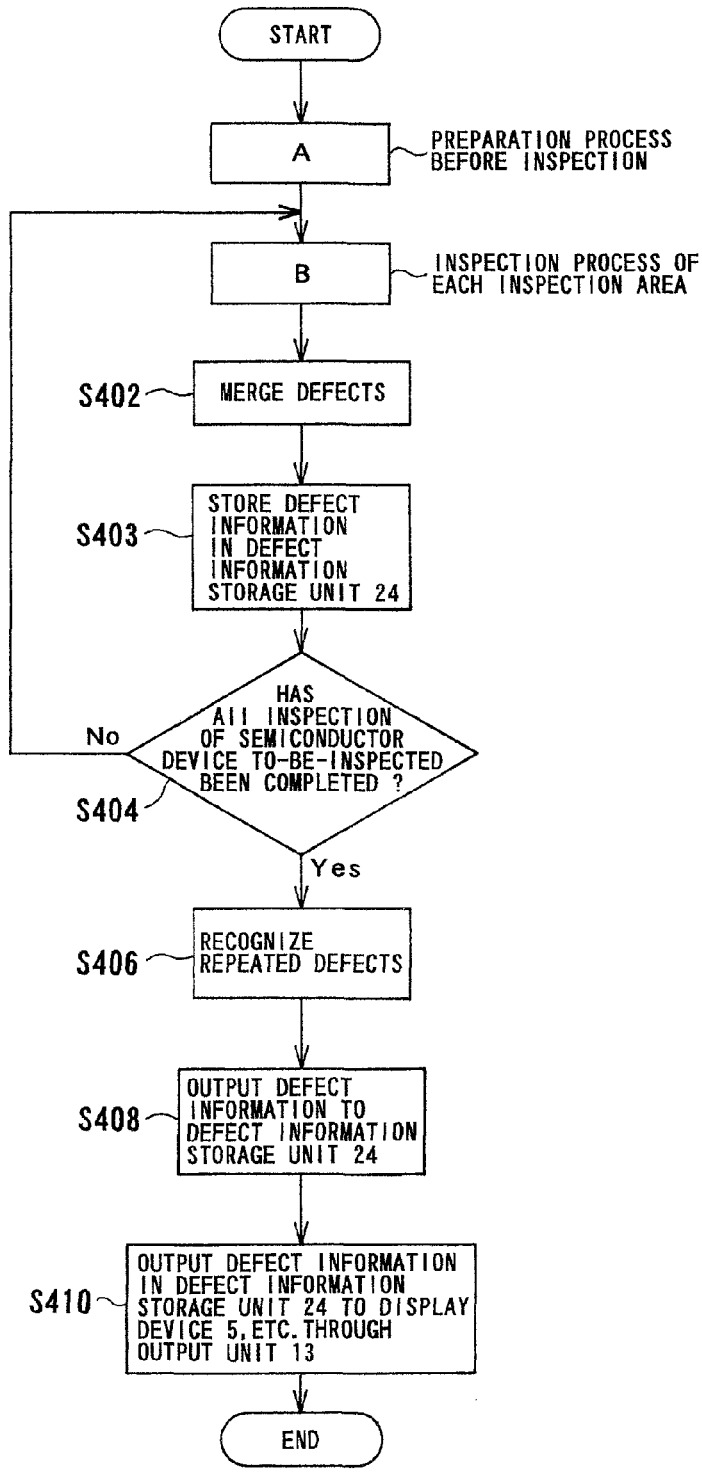
FIG. 27 is a main block of a flowchart showing an example of the inspection processing for recognizing repeated defects.

FIG. 25 is a flowchart showing an example of basic inspection processing according to the embodiment of the present invention. FIGS. 26 and 27 are flowcharts showing another example of the inspection processing in this embodiment, and show inspection processing for recognizing repeated defects. A block A of FIG. 27 is identical to the block A of FIG. 26, and is a preparation process before the inspection. A block B of FIG. 27 is identical to the block B of FIG. 26, and shows an inspection process of each inspection area.

In the basic inspection processing shown in the flowchart of FIG. 25, first, the operator inputs recipe retrieval parameters (a device name and a process name, and an inspection mode) into the inspection unit 12 through the input device 4 (step S302).

The inspection unit 12 retrieves the recipe database 22 using the recipe retrieval parameters as a key and takes out the recipe data including a reference pattern (step S304). Then, in order to acquire the image of the pattern to-be-inspected, the inspection unit 12 sets the image acquisition parameters to the image generation device 7 and directs the image generation device 7 to perform wafer loading, alignment, and condition-setting for the irradiation system 310 (step S306).

Here, the alignment means a method of obtaining transformation coefficients between a coordinate system that is used in design data and a coordinate system for controlling an observation position of the wafer (specimen). This method has been embodied by CAD (Computer Aided Design) navigation. The CAD navigation is a well-known method. In the method, after the alignment, the coordinate values of the position of CAD data that should be observed are transformed into the coordinate values of controlling the observation position of the wafer. Then a field of view of an image generation device is moved to that position, and an image at the position is acquired.

As the image generation device 7, a scanning electron microscope shown in FIG. 1 is most suitable. Various scanning microscopes such as a scanning focus ion-beam microscope, a scanning laser microscope, or a scanning probe microscope; or various microscopes may be used.

The image generation device 7 outputs an image of a pattern to-be-inspected and a center position of the image to the inspection unit 12 for each inspection-unit-area (step S308).

4.1 The First Edge Detection

Next, the inspection unit 12 detects the first edge from the image of the pattern to-be-inspected (step S310). For the first edge detection, the following two edge detection methods can be used. The first edge detection method is chosen according to the above-mentioned 3.3 Recipe data "3. The first edge detection method".

4.1.1 The First Edge Detection Method 1

One is a method suitable for an image having a contrast between the inside of a pattern-to-be-inspected and the ground. In many of such images, an edge can be detected through binarization processing. However, in the case where the contrast is relatively indistinct, the edges cannot be detected clearly. In this case, by applying a method disclosed in the literature [reference 1]: R. M. Haralick, "Digital step edges from ZERO crossing of second directional derivatives," IEEE Trans. Pattern Anal. Machine Intell., Vol. PAMI-6. No. 1, pp. 58-68, 1984 or other methods, the edges can be detected. By applying this method, a point of inflection on the edge part can be detected with sub pixel accuracy.

4.1.2 The First Edge Detection Method 2

The other is a method that can cope with an image having bright edges and having no contrast between the inside of a pattern-to-be-inspected and the ground. For example, a method disclosed in the literature [reference 2]: Carton Steger, "An unbiased detector of curvilinear structures," IEEE Trans. Pattern Anal. Machine Intell., Vol. 20, No. 2, February 1998, can be used. By using this method, a peak of the edge can be detected with sub pixel accuracy. However, in this method, the edge direction has only a value of 0 to 180 degrees because the inside of the pattern-to-be-inspected and the ground cannot be distinguished.

As an alternative method of the above-mentioned 4.1.1 The first edge detection method 1, the method of the above-mentioned [literature 2] can be used. In this case, an image having a contrast between the inside of the pattern-to-be-inspected and the ground is processed by a differential filter (for example, Sobel filter or a band-pass filter) in order to generate an edge magnitude image, and the edge is detected by using the edge magnitude image. In this case, the inside of the pattern-to-be-inspected and the ground can be distinguished.

Because these methods are processed by using a rather large window, sub pixel accuracy can be obtained, and the edge direction can be stable. Therefore, a method, in which the edges are connected and the connected edges are processed by the linear approximation in order to obtain higher edge detection accuracy, is not necessarily required.

At the first edge detection of step S310, the edge magnitude and the edge direction are obtained from the image of the pattern to-be-inspected for each pixel. As described in 3.1 Edge, the magnitude is a length of vector multiplied by sharpness of the edge. In the case of an image having a contrast between the inside of the pattern-to-be-inspected and the ground as described in 4.1.1 The first edge detection method 1, by using the method of the above-mentioned [literature 1], the absolute value of the first derivative of the image can be set as the sharpness of the edge, and the zero cross point of the second derivative of the image can be taken as the edge position.

On the other hand, in the case of an image having bright edges and having no contrast between the inside of a pattern-to-be-inspected and the ground as described in 4.1.2 The first edge detection method 2, by using the method of the above-mentioned [literature 2], a sign-inverted value (absolute value) of the second derivative of the image can be set as the sharpness of the edge, and the zero cross point of the first derivative of the image can be taken as the edge position. In either case, the edge can be obtained with sub pixel accuracy.

Figure 29:
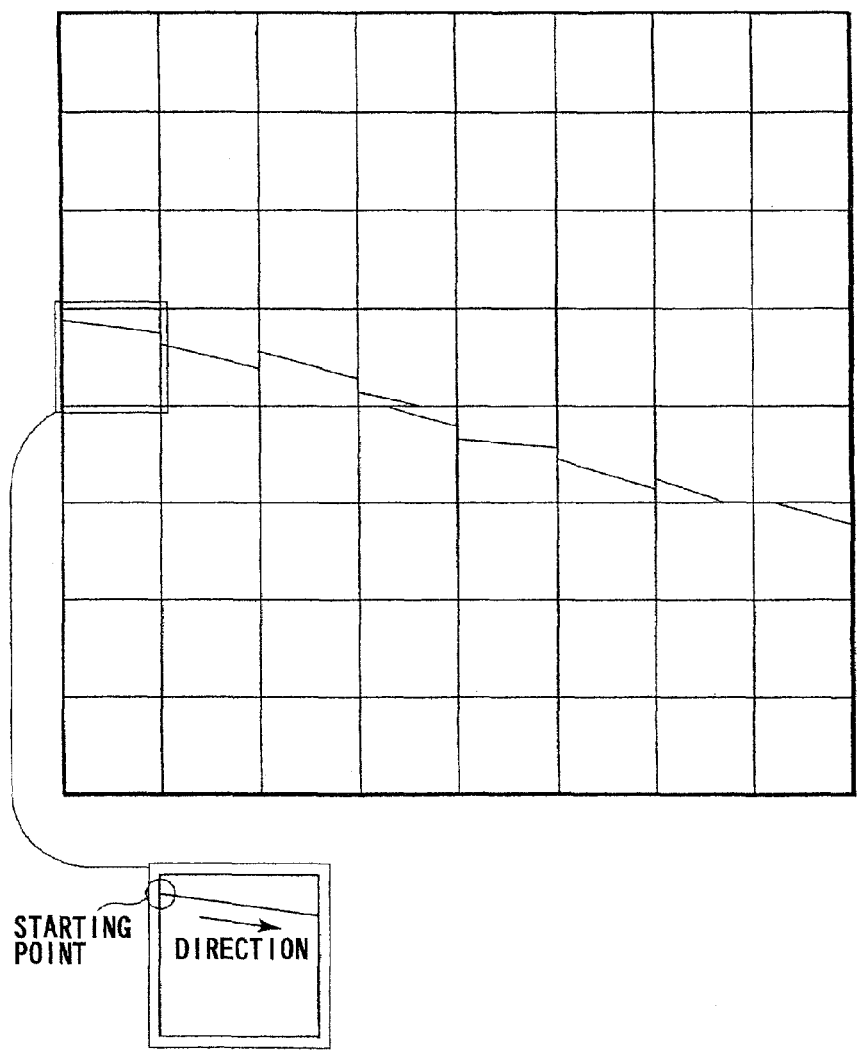
FIG. 29 is a schematic view showing edges detected from the image of FIG. 28.

FIG. 28 is a schematic view showing an example of an image of a pattern to-be-inspected having the contrast between the inside of the pattern-to-be-inspected and the ground as described in 4.1.1 The first edge detection method 1, and FIG. 29 is a schematic view showing the edges detected from the image of FIG. 28. In FIG. 28, a luminance value is shown for each pixel. The luminance value means a digitized value of intensity of secondary electrons. As shown in FIG. 29, an edge is detected for each pixel, and information of a starting point (with sub pixel accuracy), a direction (in 0 to 360 degrees), and a magnitude can be obtained for each pixel. As described above, the sharper the edge is, the larger the magnitude becomes.

FIG. 30 is a schematic view showing an example of an image of a pattern to-be-inspected having bright edges and having no contrast between the inside of the pattern-to-be-inspected and the ground described in the above-mentioned 4.1.2 The first edge detection method 2, and FIG. 31 is a schematic view showing the edges detected from the image of FIG. 30. In FIG. 30 also, the luminance value is shown for each pixel. Furthermore, as shown in FIG. 31, an edge is detected for each pixel, and information of a starting point (with sub pixel accuracy), a direction (in 0 to 180 degrees), and a magnitude can be obtained for each pixel.

4.2 Line-Shaped Pattern Matching Method

Next, the inspection unit 12 dilates the edges of the image of the pattern to-be-inspected. Hereafter, obtained results are called dilated edges (step S312). In this embodiment, the edges are dilated by the allowable pattern deformation quantity that does not affect an electrical property. In this stage, the allowable pattern deformation quantity is a positive integer. The quantity is the biggest value among values in the above-mentioned 3.3 Recipe data "2. The limit values of the negative side and the positive side of the allowable pattern deformation quantities". By dilating the edges by the allowable pattern deformation quantity, the matching can be performed with the pattern deformation that does not affect an electrical property being allowed.

Methods of obtaining the dilated edges will be described. FIG. 32 is a schematic view showing magnitudes of edges of a one-dimensional image of a pattern to-be-inspected and FIG. 33 is a schematic view showing an example in which the edges of FIG. 32 are dilated. The dilated edges are shown in FIG. 33. For simple explanation, one-dimensional data is used in FIG. 32 and FIG. 33. As methods of obtaining FIG. 33 from FIG. 32, the following methods can be used. In the methods, the magnitudes of the edges are processed as an image, and appropriate filters are considered.

In order to ignore the pattern deformation within the allowable pattern deformation quantity, the schematic view showing magnitudes of edges in FIG. 32 is processed by a maximum value filter having a window that is twice as large as the allowable pattern deformation quantity, so that the dilated edges shown in FIG. 33 are obtained. The maximum filter obtains the maximum value among intensity values, which neighboring pixels of a target pixel have, and sets the obtained maximum value to a value of the target pixel of a processed image. In FIG. 33, the edges of the image of the pattern to-be-inspected of FIG. 32 are dilated rightward and leftward by two pixels, respectively. This is an example for the case where the allowable pattern deformation quantity is two pixels.

The case where edges of a reference pattern are shown in FIG. 34 will be considered. First, figures are obtained by shifting FIG. 34. Each shift quantity used in the above is from two pixels in the leftward direction to two pixels in the rightward direction, respectively. Next, when the evaluation value of the matching is obtained from FIG. 33 and each shifted figure, each evaluation value has the same value. Therefore, the shift quantity is not determined uniquely. The evaluation value of the matching will be described later.

In order to solve this problem, the edges of FIG. 32 are dilated with weights giving to the neighboring pixels as shown in FIG. 35. In order to realize the dilation of FIG. 35, a smoothing filter consisting of 0.5, 0.75, 1.0, 0.75, and 0.5 coefficients may be used. In the case of the example shown in FIG. 35, when FIG. 34 (the edges of the reference pattern) is shifted by one pixel or more in the rightward direction or the leftward direction, the evaluation value will decrease.

Next, the case where the edges of the reference pattern are wider than the edges of the reference pattern shown in FIG. 34 by two pixels as shown in FIG. 36 will be considered. First, figures are obtained by shifting FIG. 36. Shift quantities used in the above are one pixel in the leftward direction and one pixel in the rightward direction. Next, when the evaluation value of the matching is obtained from FIG. 35 and each shifted figure, each evaluation value has the same value. Therefore, the shift quantity is not determined uniquely.

In order to solve this problem, the edges of FIG. 32 are dilated with weights giving to the neighboring pixels as shown in FIG. 37. In order to realize the dilation of FIG. 37, a smoothing filter consisting of 0.5, 0.9, 1.0, 0.9, and 0.5 coefficients (FIG. 38) may be used.

From the above consideration, the dilation as shown in FIG. 37 is most suitable. However, from a viewpoint of processing speed, crowdedness of the edges, and the like, the dilation as shown in FIG. 33 or FIG. 35 may be used.

After determining the coefficients of the smoothing filter, the coefficients are set into the above-mentioned 3.3 Recipe data "3. The coefficients of filter for edge dilation", and are used.

Figure 39:
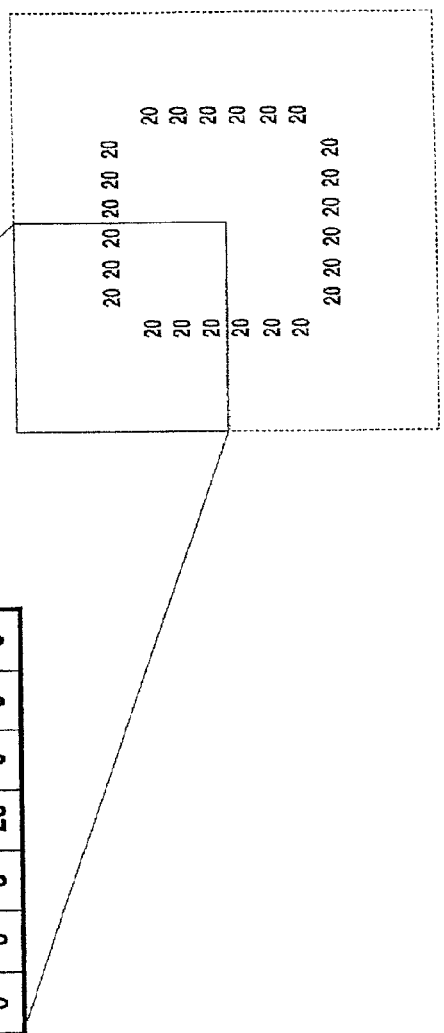
FIG. 39 is a schematic view showing an example of magnitudes of edges of a two-dimensional image of a pattern to-be-inspected.
Figure 41:
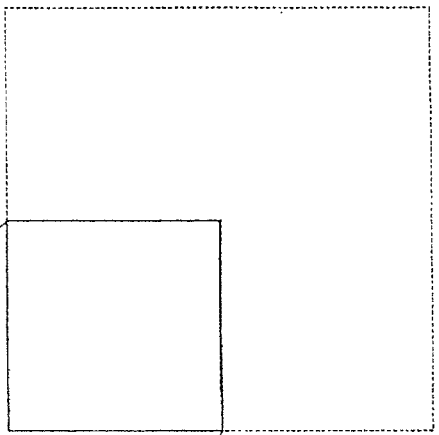
FIG. 41 is a schematic view showing another example in which the edges of FIG. 39 are dilated.

FIG. 39 is a schematic view showing an example of magnitudes of edges of a two-dimensional image of a pattern to-be-inspected, and FIGS. 40 and 41 are schematic views showing examples in which the edges of FIG. 39 are dilated. In FIG. 39, the magnitudes of edges are all zero except for pixels whose magnitudes are 20. FIG. 40 shows a result of the same dilation shown in FIG. 33, and FIG. 41 shows a result of the same dilation shown in FIG. 37.

Figure 42:
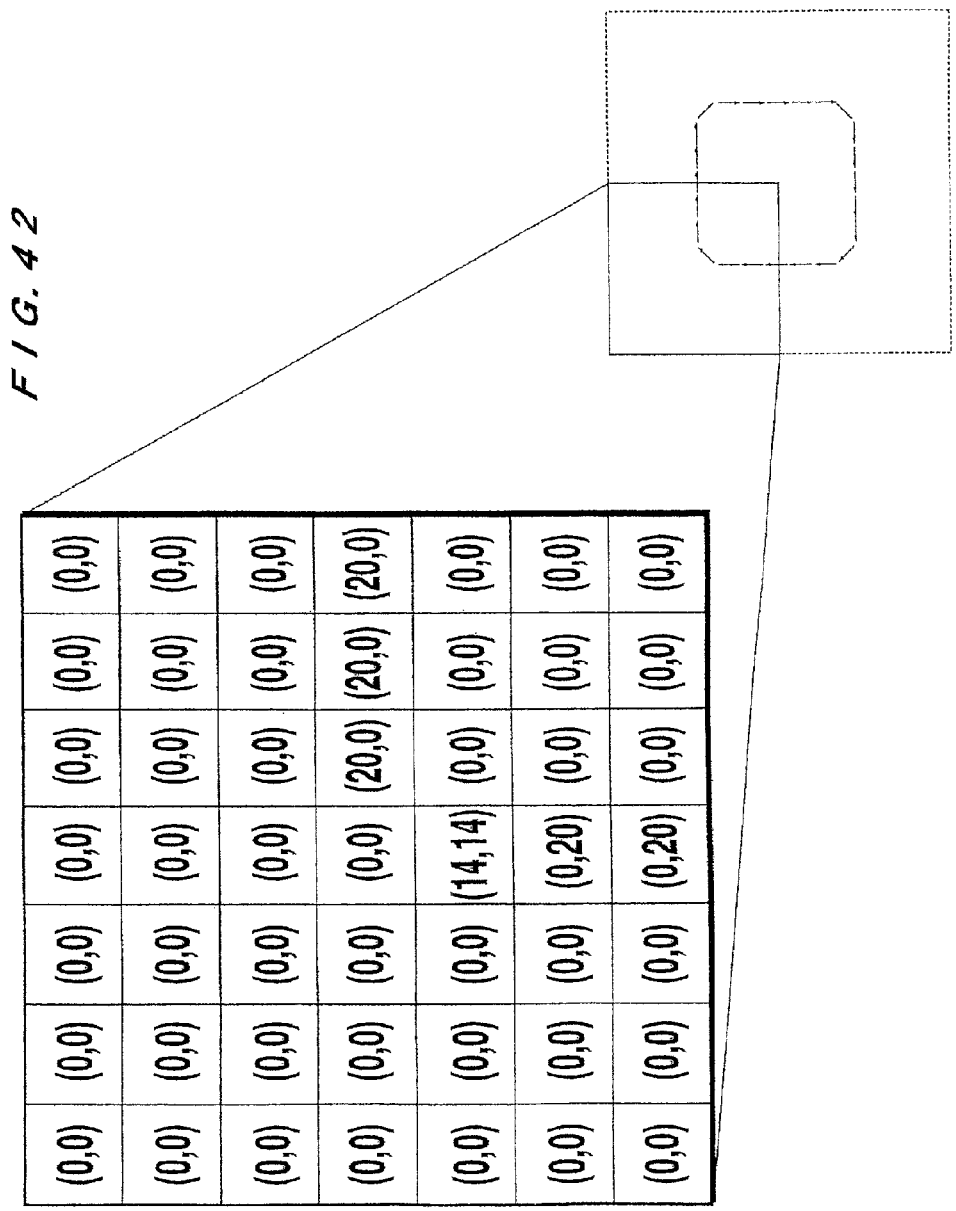
FIG. 42 is a schematic view showing an example of edge vectors of the two-dimensional image of a pattern to-be-inspected.
Figure 43:
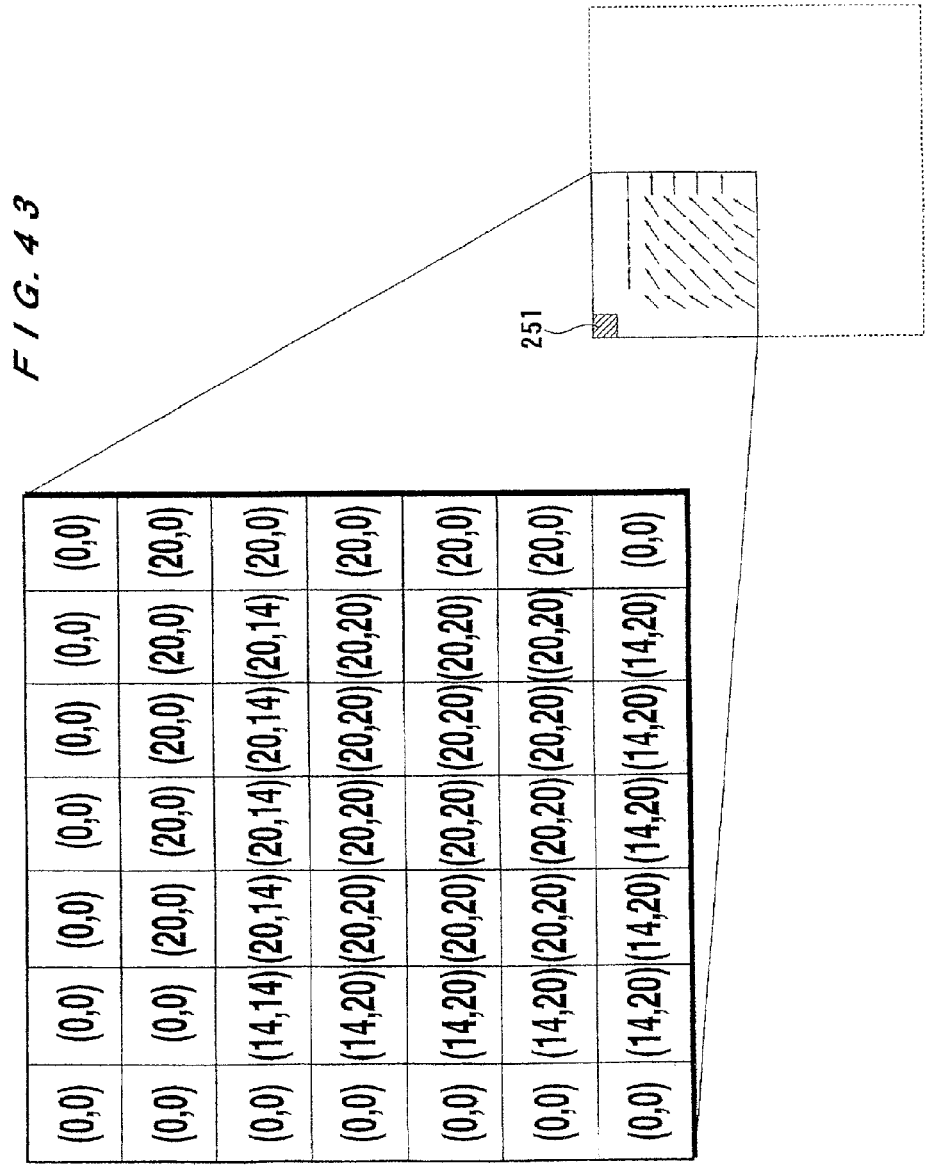
FIG. 43 is a schematic view showing an example in which the edge vectors in FIG. 42 are dilated.
Figure 44:
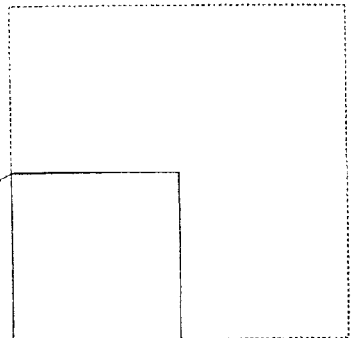
FIG. 44 is a schematic view showing another example in which the edge vectors in FIG. 42 are dilated.

FIG. 42 is a schematic view showing an example of edge vectors of the two-dimensional image of the pattern to-be-inspected, and FIGS. 43 and 44 are schematic views showing examples in which the edges of FIG. 42 are dilated. FIG. 43 shows a result of the same dilation shown in FIG. 33, and FIG. 44 shows a result of the same dilation shown in FIG. 37. The dilation is performed for each X- and Y-component separately.

The inspection unit 12 compares the dilated edges with the edge of the reference pattern, and performs the matching between the image of the pattern to-be-inspected and the reference pattern, pixel by pixel (step S314).

In this embodiment, the matching is performed by using a shift quantity $S_2$ with sub pixel accuracy as described in the following description of 4.8 Pattern deformation quantities obtained from the whole inspection-unit-area. Therefore, the matching is performed pixel by pixel for purpose of high-speed calculation. Therefore, as shown in FIG. 45, edge vectors, which represent the edge vectors of the reference pattern in FIG. 20 in pixel unit, are used for matching.

In the matching of this embodiment, the reference pattern is shifted vertically and horizontally for every pixel relative to the image of the pattern to-be-inspected to obtain a position where the evaluation value $F_0$ becomes the maximum, and the obtained position is taken as a matching position (FIG. 46). In this embodiment, as described in the following equation, a total sum of the magnitudes of the dilated edges in pixels where the edge of the reference pattern exists is used as the evaluation value $F_0$.

$$F_0(x_s, y_s) = \sum_{x=X_{Ea}}^{X_{Eb}} \sum_{y=Y_{Ea}}^{Y_{Eb}} |E(x, y)||R(x + x_s, y + y_s)|$$

$$(X_{Ra} - X_{Ea} \le x_s \le X_{Rb} - X_{Eb})$$

$$(Y_{Ra} - Y_{Ea} \le y_s \le Y_{Rb} - Y_{Eb})$$

where $E(x,y)$ is a vector whose magnitude is equal to the magnitude of the dilated edge, and whose direction is equal to the direction of the dilated edge. In pixels where no edge exists, the magnitude of $E(x,y)$ is zero. $R(x+x_s,y+y_s)$ is a vector whose direction is equal to the edge direction of the reference pattern, where the magnitude of $R(x+x_s,y+y_s)$ is a length of the reference pattern in the pixel. Here, a vector $(x_s,y_s)$ is the shift quantity $S_1$ of the edge of the reference pattern.

If, in the calculation of $F_0$, only the pixels whose $R(x,y)$ is non-zero are stored, the calculation can be performed at high speed and the memory area to be used can be reduced. If truncation of calculations used in the sequential similarity detection algorithm (SSDA) is adopted, the calculation can be speeded up even further.

Figure 47:
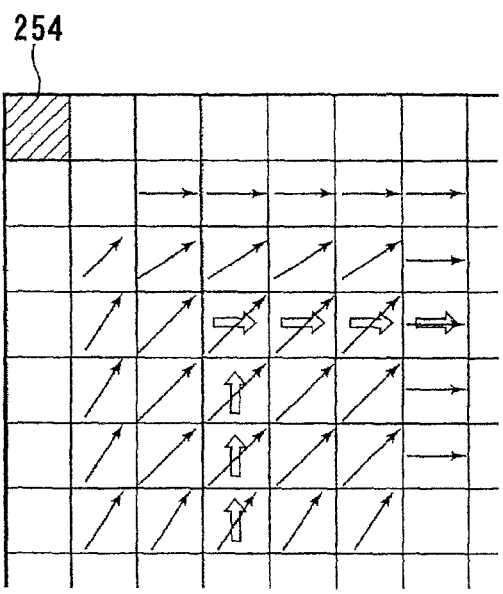
FIG. 47 is a schematic view made by superimposing FIG. 43 on FIG. 45.
Figure 48:
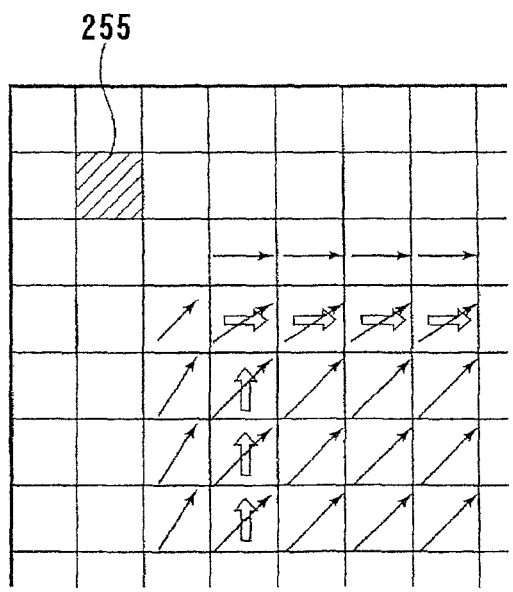
FIG. 48 is another schematic view made by superimposing FIG. 43 on FIG. 45.

FIGS. 47 and 48 are schematic views made by superimposing FIG. 43 (the dilated edges) on FIG. 45 (the edges of the reference pattern). In FIG. 47, a pixel 254 corresponds to a pixel 251 of FIG. 43 and a pixel 252 of FIG. 45. FIG. 48 shows relationship of positions of FIG. 43 and FIG. 45 in which FIG. 43 is shifted by one pixel in rightward direction and by one pixel in downward direction from relationship of positions shown in FIG. 47. Therefore, a pixel 255 corresponds to the pixel 251 of FIG. 43 and the pixel 253 of FIG. 45. By using evaluation value $F_0$, the larger the degree of overlapping of the pixels where the edges exist is, the higher the evaluation value becomes. In the case where the evaluation value $F_0$ is used, the dilation processing as shown in FIGS. 39 through 41 should be performed. In addition, the evaluation value $F_0$ can be applied to both images described in the above-mentioned 4.1.1 The first edge detection method 1 and the above-mentioned 4.1.2 The first edge detection method 2.

In this embodiment, the above-mentioned evaluation value $F_0$ is used, however, other evaluation values can also be used. For example, in the case of the image having the contrast between the inside of the pattern-to-be-inspected and the ground described in the above-mentioned 4.1.1 The first edge detection method 1, the following evaluation value $F_a$ can be used:

$$F_a(x_s, y_s) = \sum_{x=X_{Ea}}^{X_{Eb}} \sum_{y=Y_{Ea}}^{Y_{Eb}} E(x, y) \cdot R(x + x_s, y + y_s)$$

$$(X_{Ra} - X_{Ea} \le x_s \le X_{Rb} - X_{Eb})$$

$$(Y_{Ra} - Y_{Ea} \le y_s \le Y_{Rb} - Y_{Eb})$$

Moreover, for example, in the case of the image having bright edges and having no contrast between the inside of the pattern-to-be-inspected and the ground described in the above-mentioned 4.1.2 The first edge detection method 2, the following evaluation value $F_b$ can be used.

$$F_b(x_s, y_s) = \sum_{x=X_{Ea}}^{X_{Eb}} \sum_{y=Y_{Ea}}^{Y_{Eb}} |E(x, y) \cdot R(x + x_s, y + y_s)|$$

$$(X_{Ra} - X_{Ea} \le x_s \le X_{Rb} - X_{Eb})$$

$$(Y_{Ra} - Y_{Ea} \le y_s \le Y_{Rb} - Y_{Eb})$$

In the case where the evaluation value $F_a$ or $F_b$ is used, the dilation processing as shown in FIGS. 42 through 44 should be performed.

Figure 49A:
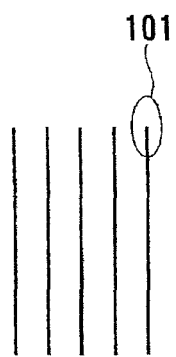
FIG. 49A is a schematic view showing an example of reference patterns.
Figure 49B:
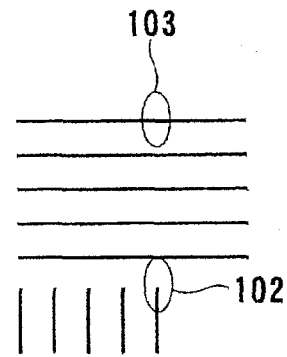
FIG. 49B is a schematic view showing an example of an image of a pattern to-be-inspected.

The evaluation values $F_0$, $F_a$, and $F_b$ will be considered. The evaluation value $F_0$ has advantage with regard to high-speed calculation, because the data is scalar. On the other hand, the evaluation values $F_a$ and $F_b$ are effective, for example, in the case as shown in FIGS. 49A and 49B. When the evaluation values $F_a$ and $F_b$ are used, because the inner product between the edge (vector) of vertical line part of the reference pattern (FIG. 49A) and the edge (vector) of the horizontal line part of the image of the pattern to-be-inspected (FIG. 49B) becomes close to zero, a part 101 and a part 102 can be matched successfully. On the contrary, when the evaluation value $F_0$ is used, because only the magnitude is used without considering the direction, the part 101 and a part 103 are likely to be matched erroneously.

Figure 50:
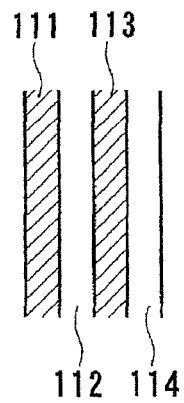
FIG. 50 is a schematic view showing an example in which widths of lines and widths of spaces are equal.

The evaluation value $F_a$ is more robust for matching than the evaluation value $F_b$, because the evaluation value $F_a$ distinguishes the inside of the pattern-to-be-inspected and the ground. For example, in the case where widths of lines 111, 113 and widths of spaces 112, 114 are equal as shown in FIG. 50, the value $F_a$ can obtain a more suitable result than the value $F_b$, because distinction between the line and the space is clear.

In this embodiment, the edges of the image of the pattern to-be-inspected are dilated and the matching is performed. As an alternative method, the edges of the reference pattern may be dilated to perform the matching.

4.2.1 Matching Method in which Unique Pattern is Used

Figure 51A:
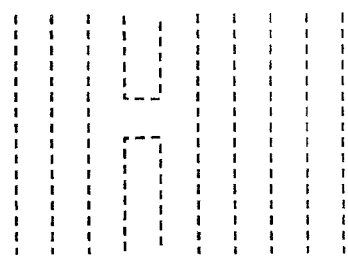
FIG. 51A is a schematic view showing an example of reference patterns.
Figure 51B:
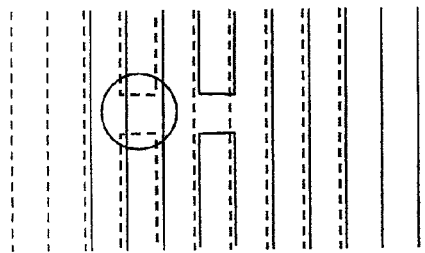
FIG. 51B is a schematic view showing an example of the relation between the reference pattern in FIG. 51A and the image of the pattern to-be-inspected.

The above-mentioned matching method uses the magnitudes of the edges of the reference pattern equally. As described in the above-mentioned 3.1 Edge, the magnitude is a length of vector multiplied by a degree of contribution to matching. As an alternative method of the above-mentioned matching method, a matching method in which matching is more robust by setting different values to the magnitudes of the edges of the reference pattern can be used. This method is performed by the following procedure using FIGS. 51A and 51B:

FIG. 51A is a schematic view showing an example of reference patterns, and FIG. 51B is a schematic view showing an example of the reference patterns (shown by dotted lines) and an image of a pattern to-be-inspected (shown by solid lines) corresponding to the reference patterns in FIG. 51A. The reference pattern shown in FIG. 51A is periodic patterns that have a gap at one position. When the matching between the reference patterns and the image of the pattern to-be-inspected is performed, even if both are shifted by one period as shown in FIG. 51B, most of parts except for the gap part match with each other, and therefore this matching gives a high evaluation value erroneously. In order to solve this problem, a large value is set to the degree of contribution to matching of edges of reference pattern corresponding to the gap part so that the matching evaluation value will decrease drastically, when the gap of the image of the pattern to-be-inspected and the gap of the reference pattern do not match with each other.

First, the period of the reference patterns is obtained by the autocorrelation method. Next, by comparing the original reference patterns with the reference patterns shifted by one period, a reference pattern that exists in part of the original reference patterns, but does not exist in the reference pattern shifted by one period is obtained. Then, the obtained reference pattern is recognized as a unique pattern. A degree of contribution to matching of edges of the unique pattern is made larger value than that of other reference patterns. The value is larger than unity (1). As the value, a constant value obtained experimentally, a value defined as a constant value divided by a ratio of the unique pattern to all the patterns, or the like can be used.

4.2.2 Matching Method in which Negative Pattern is Used

In order to utilize the unique pattern more efficiently, a matching method in which a negative pattern paired with the unique pattern is used can be used. FIGS. 52A and 52B are schematic views showing a method of calculating a matching evaluation value of reference patterns, which are a periodical array of rectangular pattern. Although rectangular patterns are periodically arranged also on the right-hand side of patterns to-be-inspected shown in FIGS. 52A and 52B, termination of the rectangular patterns on the right-hand side cannot be recognized, because the image is limited. In this case, if matching is performed by using the above-mentioned 4.2.1 Matching method in which unique pattern is used, the matching evaluation value in FIG. 52A becomes substantially equal to the matching evaluation value in FIG. 52B, and therefore the matching position cannot be uniquely determined.

In order to solve this problem, negative patterns paired with unique patterns are extracted by using the following procedure, and the extracted negative patterns are used in calculation of the matching evaluation value.

FIGS. 53A, 53B and 53C are schematic views showing a method of calculating a matching evaluation value in which negative patterns paired with unique patterns are used. If there is no reference pattern at a portion shifted from the original reference pattern to the leftward by one period, the portion of the original reference pattern is taken as the unique pattern (rectangle shown by dotted lines). The portion shifted from the unique pattern to the leftward by one period is taken as a negative pattern (rectangle shown by solid lines). Similarly, a negative pattern is extracted in other directions such as rightward, upward, and downward.

With regard to the unique pattern, the degree of contribution to matching is higher than unity (1). On the other hand, with regard to the negative pattern, the degree of contribution to matching is the above-mentioned value, which is larger than unity (1), multiplied by (−1).

The evaluation value using the negative pattern will be considered. An evaluation value when a pattern to-be-inspected exists in one unique pattern is taken as F1. An evaluation value of FIG. 53A is (3·F₁), an evaluation value of FIG. 53B is (0), and an evaluation value of FIG. 53C is (3·F₁)−(3·F₁), i.e. nearly equal to (0). From this calculation, the condition shown in FIG. 53A is recognized as matching position.

According to this embodiment, it is possible to perform matching of the boundary between the region where the same patterns are periodically arranged and the other regions, because the negative patterns give a huge penalty for the evaluation value, in the case of shifting from the optimal matching position by one period.

4.2.3 Matching Method in which Projection Data Obtained by Projecting Edge on the Horizontal and Vertical Axes are Used Although the above matching method is high-speed enough, a method of performing at higher speed is required. In order to perform at higher speed, the portion "matching pixel by pixel" in the step S314 is improved.

Design data is mostly composed of horizontal lines and vertical lines. By using this characteristic of the design data, it is possible to perform matching at higher speed by using projection data obtained by projecting edges of a reference pattern on the horizontal and vertical axes, and projection data obtained by projecting edges of an image of a pattern to-be-inspected on the horizontal and vertical axes.

Figure 54A:
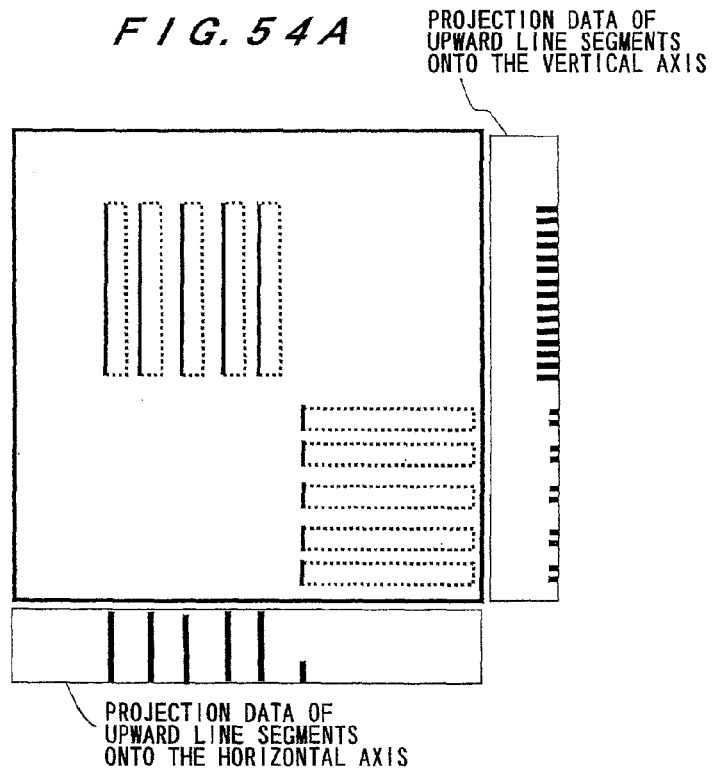
FIGS. 54A and 54B are schematic views showing a matching method in which projection data obtained by projecting an edge detected by the first edge detection on the horizontal and vertical axes are used.
Figure 54B:
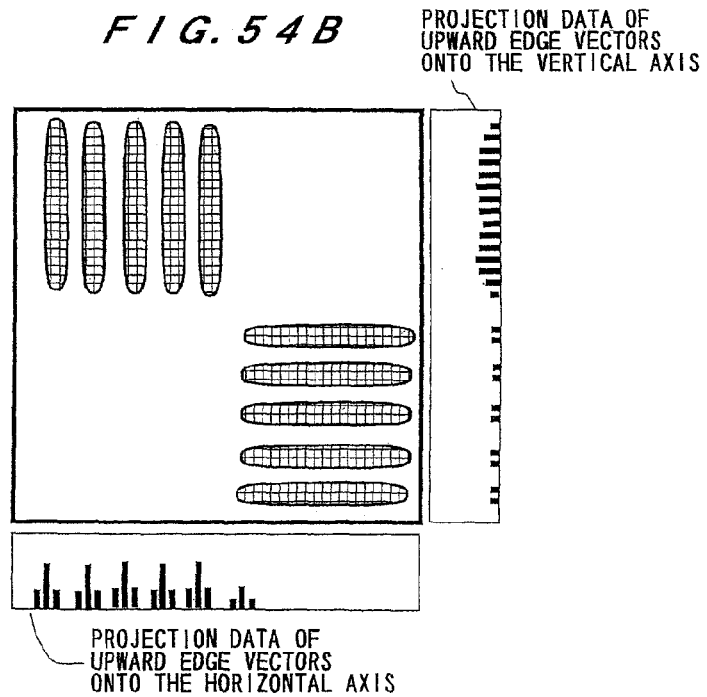

FIGS. 54A and 54B are schematic views showing a matching method in which projection data obtained by projecting edges detected by the above-mentioned 4.1 The first edge detection on the horizontal and vertical axes are used. In this embodiment, the matching method is explained by using the edge detection suitable for an image having a contrast between the inside of the pattern-to-be-inspected and the ground as described in 4.1.1 The first edge detection method 1. The reference patterns are composed of line segments that extend in four directions including upward, downward, rightward and leftward directions. As a representative example, a method in which matching is performed by using upward line segments will be described.

1. A summation $L_{rq}$ of lengths of all line segments that constitute the reference patterns is obtained. Next, the edges obtained by 4.1.1 The first edge detection method 1 are sorted out by magnitudes. The $L_{rq}$ edges are selected in the descending order of magnitude from the sorted edges that are left, and other edges are eliminated. The reference patterns are represented by a coordinate system of a pixel unit, and a size of the reference patterns is almost the same as a size of the image of the pattern to-be-inspected. Therefore, the selected edges correspond to edges of the reference patterns for the most part.

2. The upward line segments that constitute the reference pattern are extracted. The extracted line segments are projected onto the horizontal axis (the X-axis) to produce one-dimensional data. This one-dimensional data is in the form of array, and an index corresponds to an X coordinate value and an element corresponds to a length of the line segments. Similarly, the extracted line segments are projected onto the vertical axis (the Y-axis) to produce one-dimensional data. This one-dimensional data is in the form of array, and an index corresponds to a Y coordinate value and an element corresponds to a length of the line segments. This result is shown in FIG. 54A.

3. Upward edges are extracted from the above selected edges. The edges are projected onto the horizontal axis (the X-axis) to produce one-dimensional data. This one-dimensional data is in the form of array, and an index corresponds to an X coordinate value and an element corresponds to a Y component of the edge (vector). Similarly, the edges are projected onto the vertical axis (the Y-axis) to produce one-dimensional data. This one-dimensional data is in the form of array, and an index corresponds to a Y coordinate value and an element corresponds to a Y component of the edge (vector). These results are shown in FIG. 54B.

4. While shifting the projection data of the upward edges onto the horizontal axis within the range of the X direction shown in FIG. 46, matching error values $E_{pm}$ in the X direction between the projection data of the upward edges onto the horizontal axis and the projection data of upward line segments onto the horizontal axis are calculated. Similarly, while shifting the projection data of the upward edges onto the vertical axis within the range of the Y direction shown in FIG. 46, the matching error values $E_{pm}$ in the Y direction between the projection data of the upward edges onto the vertical axis and the projection data of upward line segments onto the vertical axis are calculated. In FIG. 55, the calculated matching error values $E_{pm}$ are shown.

5. The maximum value $E_{pmMax}$ and the minimum value $E_{pmMin}$ of matching error values $E_{pm}$ in the X direction are obtained to calculate a threshold value by the following equation, and a threshold value with regard to the Y direction is calculated by the same manner:

$$E_{pmMin} \cdot k_{mt} + E_{pmMax}(1-k_{mt})$$

Figure 56:
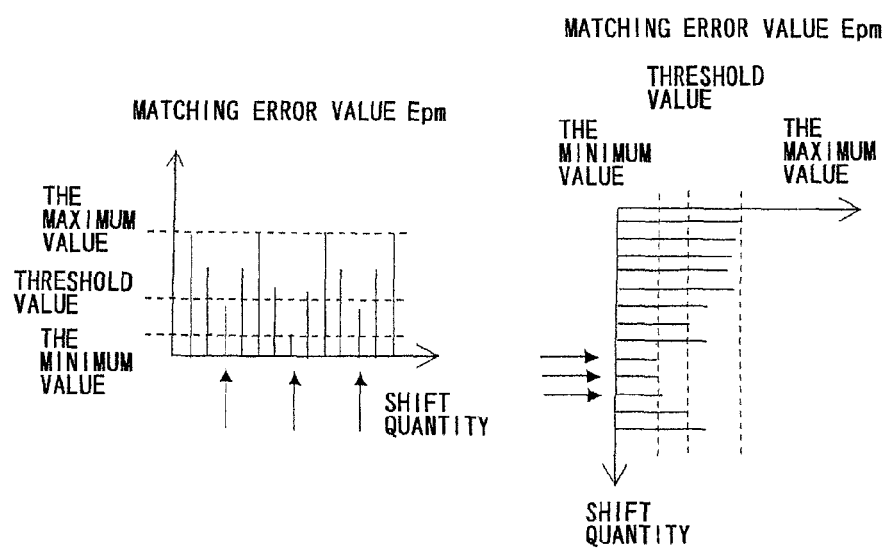
FIG. 56 is a schematic view showing shift quantities recognized to be suitable for matching from the calculated matching error values $E_{pm}$.

The shift quantities having the matching error values $E_{pm}$ that are equal to or less than the threshold value are recognized to be suitable for matching. A coefficient $k_{mt}$ is a value that is empirically determined and is in the range of 0 to 1. As the coefficient $k_{mt}$ is nearer to 0, the number of the shift quantities that are recognized to be suitable for matching becomes larger. The shift quantities shown by the arrows in FIG. 56 are recognized to be suitable for matching.

6. Next, the optimal solution is obtained from the shift quantities that are recognized to be suitable for matching in the above step 5. In the above-mentioned 4.2 Line-shaped pattern matching method, "In the matching of this embodiment, the reference pattern is shifted vertically and horizontally for every pixel relative to the image of the pattern to-be-inspected to obtain a position where the evaluation value $F_0$ becomes the maximum, and the obtained position is taken as a matching position (FIG. 46)" has been explained. According to this method, this phrase is replaced with "In the matching of this embodiment, the reference pattern is shifted vertically and horizontally for every shift quantity obtained from the above step 5 relative to the image of the pattern to-be-inspected to obtain a position where the evaluation value $F_0$ becomes the maximum, and the obtained position is taken as a matching position (FIG. 46)", and matching of the above-mentioned Line-shaped pattern matching method is performed.

The matching error value $E_{pm}$ is calculated by the method shown in FIG. 57A. In this embodiment, elements $R_p[i]$ of the projection data of upward line segments onto the horizontal axis, elements $E_p[i]$ of the projection data of upward edges onto the horizontal axis, and a shift quantity $S_p$ are used, as a representative example. The simple matching error value $E_{pmS}$ is calculated by the following equation using the elements $R_p[i]$ of the projection data of upward line segments onto the horizontal axis, and the shifted element $E_p[i+S_p]$ of the projection data of upward edges onto the horizontal axis:

$$E_{pmS} = \Sigma_i |R_p[i] - E_p[i+S_p]|$$

where $\Sigma_i$ means summation for all the elements $E_p[i]$.

As described in the step S312 (dilate the edges of the image of the pattern to-be-inspected to obtain dilated edges), the pattern deformation within the allowable pattern deformation quantity that does not affect an electrical property is necessary to be ignored.

Although the same manner as the step S312 may be used, in this case, the following different manner is used.

The case where the allowable pattern deformation quantity is one pixel will be described. First, the following calculations are performed for all the elements $E_p[i]$:

1. If $R_p[i] \geq E_p[i+S_p]$ is satisfied, the following calculations are performed:

$$R_p[i] \Leftarrow R_p[i] - E_p[i+S_p]$$

$$E_p[i+S_p] \Leftarrow 0$$

2. If $R_p[i] < E_p[i+S_p]$ and the following $\delta R$ is positive, the following calculations with regard to $\rho_{-1}$ through $E_p[i+S_p]$ are performed:

$$\delta R \Leftarrow R_p[i-1] + R_p[i] + R_p[i+1] - E_p[i+S_p]$$

$$\rho_{-1} \Leftarrow R_p[i+S_p-1]/(R_p[i+S_p-1]+R_p[i+S_p+1])$$

$$\rho_{+1} \Leftarrow R_p[i+S_p+1]/(R_p[i+S_p-1]+R_p[i+S_p+1])$$

$$R_p[i] \Leftarrow 0$$

$$R_p[i-1] \Leftarrow \delta R \cdot \rho_{-1}$$

$$R_p[i+1] \Leftarrow \delta R \cdot \rho_{+1}$$

$$E_p[i+S_p] \Leftarrow 0$$

3. If $R_p[i] < E_p[i+S_p]$ and $\delta R$ is negative, the following calculations are performed:

$$R_p[i-1] \Leftarrow 0$$

$$R_p[i] \Leftarrow 0$$

$$R_p[i+1] \Leftarrow 0$$

$$E_p[i+S_p] \Leftarrow -\delta R$$

After finishing the above calculations, the matching error value $E_{pmD}$ in consideration of the deformation quantity is calculated by the following equation:

$$E_{pmD} = \Sigma_i (R_p[i] + E_p[i+S_p])$$

The results of the above calculations are shown in FIGS. 57B and 57C. In FIG. 57B, $R_p[i]$ and $E_p[i+S_p]$ are placed in a position suitable for matching. On the other hand, in FIG. 57C, $R_p[i]$ and $E_p[i+S_p]$ are placed in a position displaced by 1 pixel from the position suitable for matching. As shown in FIGS. 57B and 57C, the matching error value $E_{pmD}$ in consideration of the deformation quantity is smaller than the simple matching error value $E_{pmS}$ by the value that is created by correspondence in consideration of the allowable pattern deformation quantity. Therefore, the matching error value $E_{pmD}$ in consideration of the deformation quantity is suitable for the matching error value $E_{pm}$.

In the case where the allowable pattern deformation quantity is larger than one pixel, the above calculations should be performed by using not only $R_p[i-1], R_p[i+1]$, but also $R_p[i-2], R_p[i+2]$, and so forth.

The above matching error value $E_{pmD}$ calculation is performed for edges and line segments in downward, rightward and leftward directions also. The line segments in another direction, for example, directions of multiples of 45 degrees, also can be used.

In this embodiment, edges in the opposite directions of 180 degrees, for example, upward edge and downward edge, can be distinguished from each other. However, in the case of using the above-mentioned 4.1.2 The first edge detection method 2, the edges in the opposite directions of 180 degrees cannot be distinguished. In this case, edges in the opposite directions of 180 degrees are mingled and are calculated.

FIG. 46 shows the method in which the reference pattern is shifted vertically and horizontally for every pixel, and position where the evaluation value $F_0$ becomes the maximum is taken as a matching position. However, according to this embodiment, the reference pattern is shifted at sporadic pixel unit intervals, instead of shifting every pixel. Therefore, the calculation time is greatly shortened.

4.3 Matching Method in which Geometrical Information for Isolated Pattern is Used The above matching method is suitable for a line-shaped pattern. However, an alternative method of performing matching for a hole pattern and an island pattern, which are isolated patterns, can be used. A hole pattern and an island pattern are rectangular patterns, and both the longer side and the shorter side of each pattern are shorter than the width that is two to three times the minimum line width. A calculation time for matching of a hole pattern and an island pattern is longer than a calculation time for matching of a line-shaped pattern because the hole pattern and the island pattern are smaller and more numerous than the line-shaped pattern. In order to solve this problem, the following high-speed calculation method that requires less calculation time than the above-mentioned 4.2 Line-shaped pattern matching method can be used.

This method can be used for the case where all patterns to-be-inspected comprise hole patterns or island patterns. In addition, ordinarily a hole pattern and an island pattern don't exist simultaneously. Therefore, in this embodiment, a method in which every pattern to-be-inspected is a hole pattern will be described. In the case of an island pattern, matching method of a hole pattern can be used by replacing hole with island.

Figure 58A:
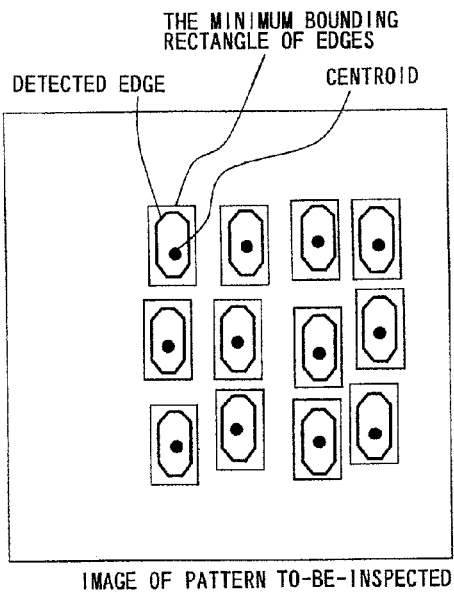
FIGS. 58A, 58B and 58C are schematic views of the first matching method of a hole pattern.
Figure 58B:
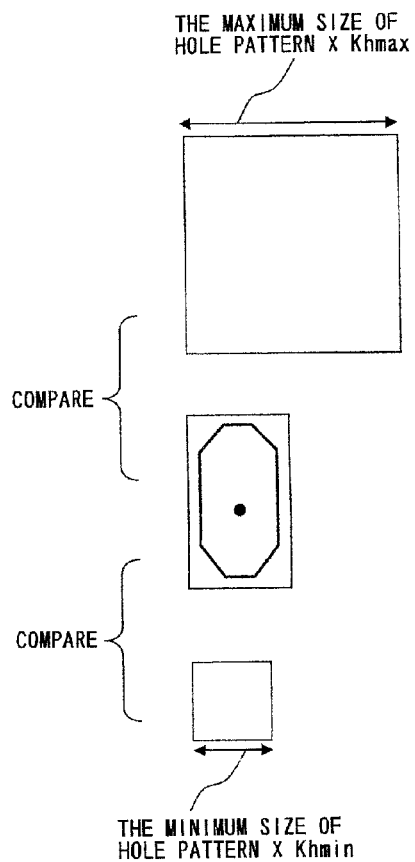
Figure 58C:
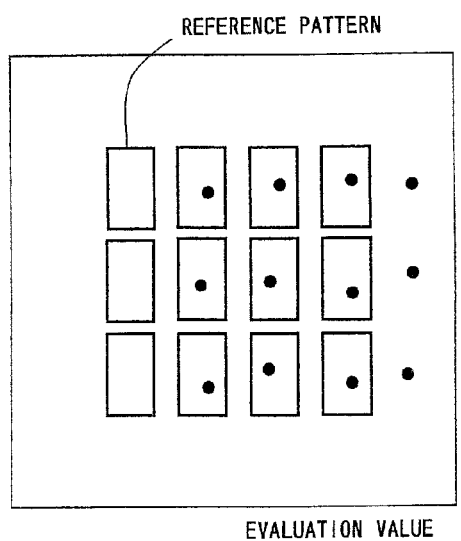

In the first matching method of a hole pattern, geometrical information obtained from edges of an image of a pattern to-be-inspected is used. FIGS. 58A, 58B and 58C are schematic views of the first matching method of a hole pattern. FIG. 58A shows bold lines as edges of an image of a pattern to-be-inspected, and solid circles (●) as centroids of the edges.

As the first step, edges are detected, and the minimum bounding rectangle and a centroid of the connecting edges are calculated as shown in FIG. 58A. In the case of an image having a contrast between the inside of the pattern-to-be-inspected and the ground, the edge detection as described in 4.1.1 The first edge detection method 1 can be used.

In the case of an image having bright edges and having no contrast between the inside of the pattern-to-be-inspected and the ground, the edge detection as described in the above-mentioned 4.1.2 The first edge detection method 2 can be used. In this case, detected edges may not be necessarily recognized as connecting pixels. Therefore, detected edges are dilated in order to be connected to each other, and are recognized as connecting pixels by the labeling processing. The labeling processing is defined as a method in which a group of connected pixels is formed by writing the same value on the pixels that are being connected at four neighborhoods or eight neighborhoods thereof. Then, the minimum bounding rectangle and the centroid of the edges are calculated as the minimum bounding rectangle and the centroid of those connecting pixels.

As the second step, the detected edges are selected by the following procedure using FIG. 58B:

1. The above-mentioned 3.3 Recipe data "7. The minimum size $S_{hmin}$ and the maximum size $S_{hmax}$ of an isolated pattern, and the safety factors $k_{hmin}$ and $k_{hmax}$" are determined, and set beforehand.

2. If a size of the minimum bounding rectangle of the edges is greater than $S_{hmin} \times k_{hmax}$, the edges are not recognized as edges of a hole pattern. The safety factor $k_{hmax}$ is a value that is 1 to 2 and is empirically determined 3. If a size of the minimum bounding rectangle of the edges is smaller than $S_{hmax} \times k_{hmin}$, the edges are recognized as noise or dust, and are not recognized as edges of a hole pattern. The safety factor $k_{hmin}$ is a value that is 0.5 to 1 and is empirically determined 4. If the detected edges don't form a ring-shape, the edges are not recognized as edges of a hole pattern.

5. In the case of an image having a contrast between the inside of the pattern-to-be-inspected and the ground, it is possible to recognize whether the inside of the ring-shape of the above 4 is a hole or an island. If the inside of the ring-shape is not a hole, the edges are not recognized as edges of a hole pattern.

In this embodiment, matching is performed by using an evaluation value $F_h$ instead of the evaluation values $F_0$, $F_a$, and $F_h$ used in the above-mentioned 4.2 Line-shaped pattern matching method. The matching is performed in the same manner as the above-mentioned Line-shaped pattern matching method except for using the evaluation value $F_h$. In this embodiment, reference patterns are obtained from the design data by simple transformation. The evaluation value $F_h$ is a summation of values calculated from all the reference patterns, which are hole patterns, by the following procedure:

1. As shown in the first column of FIG. 58C, if there is no centroid of the edges in the reference pattern, the value is 0.

2. As shown in the second column of FIG. 58C, if there is a centroid of the edges in the reference pattern, the value is 1.

In order to use the above-mentioned 4.2.1 Matching method in which unique pattern is used, and the above-mentioned 4.2.2 Matching method in which negative pattern is used described in the above-mentioned 4.2 Line-shaped pattern matching method, the following two calculations are added. The recognition of the unique pattern and negative pattern, and setting of the degree of contribution to matching are the same as the above-mentioned 4.2 Line-shaped pattern matching method.

3. If there is a centroid of the edges in the unique pattern, the value is the above-mentioned degree of contribution to matching.

4. If there is a centroid of the edges in the negative pattern, the value is the above-mentioned degree of contribution to matching multiplied by (−1).

According to this embodiment, a matching method in which condensed information obtained from a plurality of edges is used can be realized. The method is performed at higher speed than a method in which edges are individually used. Moreover, calculation cost is reduced greatly.

Further, high-speed calculation can be performed by using the above-mentioned 4.2.3 Matching method in which projection data obtained by projecting edge on the horizontal and vertical axes are used. In this case, projection data obtained by projecting the centroid of the edges are used, instead of projection data obtained by projecting the edges.

4.4 Matching Method in which Statistics for Isolated Pattern are Used

In the second matching method of a hole pattern, a statistic calculated from part of the image of the pattern to-be-inspected corresponding to the inside of a reference pattern and a statistic calculated from part of the image of the pattern to-be-inspected corresponding to the outside of the reference pattern are compared. FIGS. 59A, 59B, and 59C are schematic views of the second matching method of a hole pattern. FIG. 59A shows reference patterns used in this embodiment. These reference patterns are obtained by applying the size-processing to design data. A dilating quantity of the size-processing is less than half of the limit value of the positive side of the above-mentioned 3.3 Recipe data "2. The allowable pattern deformation quantity of a diameter, in the case of an isolated pattern". FIG. 59B shows a typical image of a hole pattern to-be-inspected. Edges of the hole pattern are brighter than the ground, and the inside of the hole pattern is darker than the ground.

In this embodiment, matching is performed by using an evaluation value $F_d$ instead of the evaluation values $F_0$, $F_a$, and $F_b$ used in the above-mentioned 4.2 Line-shaped pattern matching method. The matching is performed in the same manner as the Line-shaped pattern matching method except for using the evaluation value $F_d$. The evaluation value $F_d$ is calculated from the following procedure:

1. As shown in FIG. 59C, a histogram $H_{inside}$ is obtained from pixels of the image of the hole pattern to-be-inspected corresponding to the insides of all the reference patterns. The obtained histogram $H_{inside}$ is standardized.

2. A histogram $H_{outside}$ is obtained from pixels of the image of the hole pattern to-be-inspected corresponding to the outside of all the reference patterns. The obtained histogram $H_{outside}$ is standardized.

3. Each element of a difference histogram $H_{difference}$ is calculated as a difference between an element of the histogram $H_{inside}$ and an element of the histogram $H_{outside}$ that correspond to the element of the difference histogram $H_{difference}$ respectively. The evaluation value $F_d$ is calculated by summing absolute values of all the elements of the difference histogram $H_{difference}$.

In order to use the above-mentioned 4.2.1 Matching method in which unique pattern is used, and the above-mentioned 4.2.2 Matching method in which negative pattern is used described in the above-mentioned 4.2 Line-shaped pattern matching method, the following two calculations are added. The recognition of the unique pattern and negative pattern, and setting of the degree of contribution to matching are the same as the above-mentioned 4.2 Line-shaped pattern matching method.

4. In the case of pixels of the image of the hole pattern to-be-inspected corresponding to the inside of the unique pattern, each of these pixels is converted into the number of the above-mentioned degree of contribution to matching pixels, and the converted pixels are used for obtaining the histogram $H_{inside}$.

5. In the case of pixels of the image of the hole pattern to-be-inspected corresponding to the inside of the negative pattern, each of these pixels converted into the above-mentioned degree of contribution to matching multiplied by (−1) pixels, and the converted pixels are used for obtaining the histogram $H_{inside}$.

The above-mentioned step 5 means the following: If a hole exists in a negative pattern, the total number of the elements of the histogram $H_{inside}$ decreases, however, a shape of histogram $H_{inside}$ is not deformed particularly. Therefore, in this case, the evaluation value $F_d$ is nearly equal to the evaluation value $F_d$ that has been calculated before calculation of this negative pattern. On the other hand, if a hole does not exist in the negative pattern, the histogram $H_{inside}$ becomes similar to the difference histogram $H_{difference}$. The evaluation value $F_d$ using the difference histogram $H_{difference}$, which is used instead of the histogram $H_{inside}$ made by the above-mentioned procedure step 1, and the histogram $H_{outside}$ is greater than the evaluation value $F_d$ using the histogram $H_{inside}$ and the histogram $H_{outside}$. Therefore, in this case, the evaluation value $F_d$ becomes greater than the evaluation value $F_d$ that has been calculated before calculation of this negative pattern.

Image brightness distribution of ground of a hole pattern and an island pattern may be non-uniform due to the electrification phenomenon and the like. It means that the histogram $H_{outside}$ may become spreading. However, by using this embodiment, the evaluation value $F_d$ is not drastically affected by spreading of the histogram $H_{outside}$.

According to this embodiment, the difference histogram made from histograms with regard to the inside and outside of the hole pattern or the island pattern is used as the evaluation value, and therefore the matching method which is robust against non-uniform image brightness distribution of the ground due to the electrification phenomenon and the like can be realized. In addition, this method can also be used for the line-shaped pattern matching.

4.5 Post-Matching Processing

When the matching is performed and the shift quantity $S_1=(x_s,y_s)$ at which the evaluation value takes the maximum is obtained, the reference pattern is shifted by the shift quantity $S_1$. The subsequent processing is performed while this shift is being maintained. The shift quantity $S_1$ can be outputted to the display device 5 and the printer 6 as the inspection result.

After the matching is completed, the edges of the image of the pattern to-be-inspected are binarized. The binarization is performed by using the above-mentioned 3.3 Recipe data "3. The threshold used in binarization of the edges of the image of the pattern to-be-inspected". Specifically, if the magnitude of each edge of the image of the pattern to-be-inspected is larger than the above-mentioned 3.3 Recipe data "3. The threshold used in binarization of the edges of the image of the pattern to-be-inspected", the edge of the image of the pattern to-be-inspected becomes an edge of the image of the pattern to-be-inspected after binarization, otherwise the edge of the image of the pattern to-be-inspected does not become an edge of the image of the pattern to-be-inspected after binarization. In subsequent processing, the magnitude of each edge of the image of the pattern to-be-inspected is not used.

As another binarization method, the p-tile method can be used. In this method, the number of the edges of the image of the pattern to-be-inspected after binarization becomes the number of the edge of the reference pattern×p. Specifically, in the descending order, the number of the edge of the reference pattern×p pieces of the edges of the image of the pattern to-be-inspected becomes edges of the image of the pattern to-be-inspected after binarization. The remainders do not become edges of the image of the pattern to-be-inspected after binarization. The coefficient p is normally about 0.9 to 1.1, and is set as the parameter in the above-mentioned 3.3 Recipe data "3. The p-tile coefficient used in binarization of the edges of the image of the pattern to-be-inspected", and is used.

4.6 The First Inspection

Next, the inspection unit 12 performs the first inspection. Specifically, calculation of a pattern deformation quantity, defect detection, and recognition of a defect-class are performed. The inspection unit 12 establishes a correspondence between the edge of the image of the pattern to-be-inspected and the edge of the reference pattern (step S318). The position of edges is treated with sub pixel accuracy. Therefore, the distance between the two edges can also be obtained with sub pixel accuracy. The direction of the edges is determined as a value in a range of 0 to 360 degrees with the right direction being set to 0 degree.

In this embodiment, the establishing of correspondence is performed in consideration of a distance between the edge of the image of the pattern to-be-inspected and the edge of the reference pattern, which is shifted by the shift quantity $S_1$, and the directions of both the edges as described in the following procedure:

For each edge of the reference pattern, the edge of the image of the pattern to-be-inspected located within the distance of the above-mentioned 3.3 Recipe data "2. The limit values of the negative side and the positive side of the allowable pattern deformation quantities" is searched. Then, a directional difference between each detected edge and the edge of the reference pattern is calculated. If the directional difference is smaller than the above-mentioned 3.3 Recipe data "2. The limit values of the allowable directional difference between edges", the edge that is used in the calculation is recognized as a corresponding edge within the allowable pattern deformation quantity. A vector d(x,y) between the two edges having the correspondence can be used to calculate the pattern deformation quantity. In addition, if a plurality of edges are recognized in the above procedure, an edge whose distance is smallest and whose directional difference is smallest is adopted.

Figure 60:
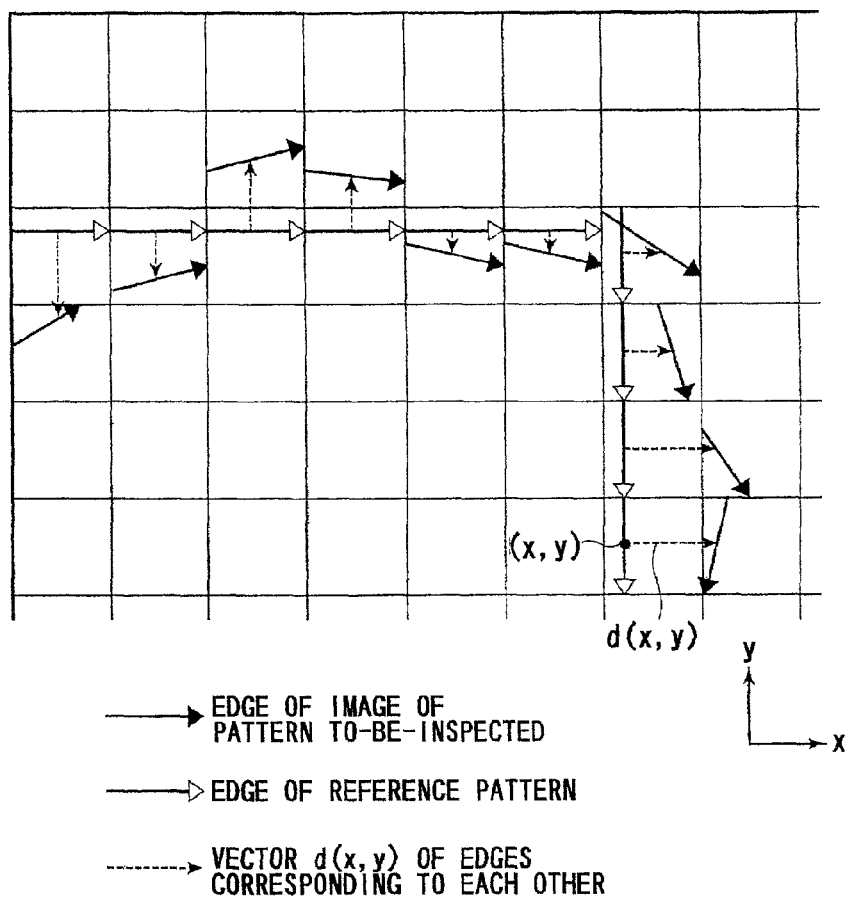
FIG. 60 is a schematic view showing an example of establishing correspondence between an edge of the image of the pattern to-be-inspected and an edge of the reference pattern.

FIG. 60 is a schematic view showing an example of the establishing of correspondence between the edge of the image of the pattern to-be-inspected and the edge of the reference pattern. In FIG. 60, each edge is shown by an arrow to show its direction. In the example of FIG. 60, the establishing of correspondence is performed for each pixel that contains the edge of the reference pattern by searching an edge of the image of the pattern to-be-inspected in a direction perpendicular to the edge direction from the center of the edge of the reference pattern. If a distance between an edge of the image of the pattern to-be-inspected and the center of the edge of the reference pattern is shorter than the allowable pattern deformation quantity, and a directional difference between those is smaller than the allowable directional difference between edges, those edges correspond. In FIG. 60, the vector d(x,y) between the two edges is an example of the above vector.

Figure 61A:
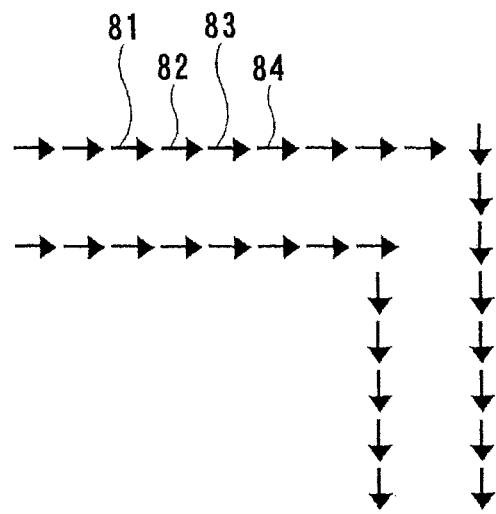
FIG. 61A is a schematic view showing an example of the edges of the reference pattern.
Figure 61B:
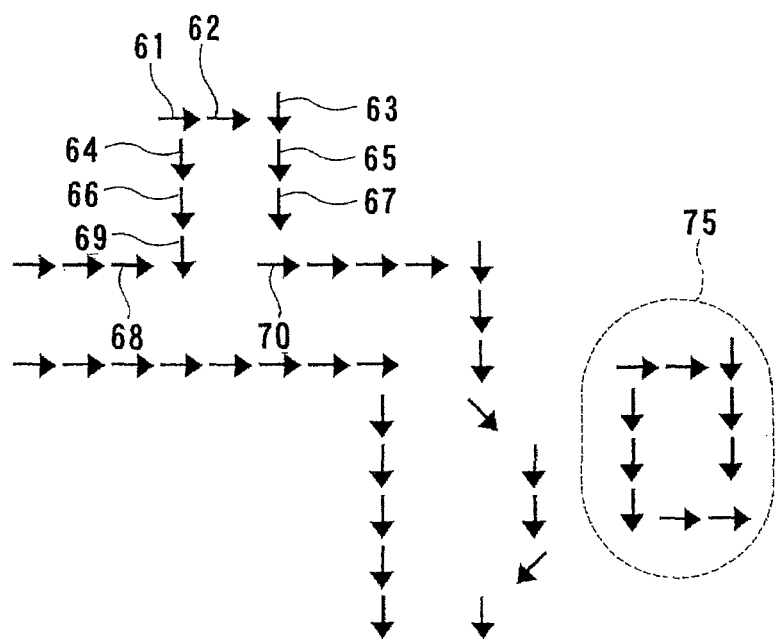
FIG. 61B is a schematic view showing an example of the edges of the image of the pattern to-be-inspected.

FIG. 61A is a schematic view showing an example of the edge of the reference pattern, and FIG. 61B is a schematic view showing an example of the edge of the image of the pattern to-be-inspected corresponding to the reference pattern in FIG. 61A. The establishing of correspondence of both the edges will be described in FIGS. 61A and 61B. In this example, the allowable pattern deformation quantity is set to one pixel, and the allowable directional difference between edges is set to 60 degrees. For example, when an edge of the image of the pattern to-be-inspected corresponding to an edge 81 of the reference pattern is searched, because an edge 68 is located within the distance of the allowable pattern deformation quantity from the edge 81 and those directional differences are smaller than the allowable directional difference between edges, the edge 68 is recognized as the corresponding edge to the edge 81. With regard to an edge 84 of the reference pattern also, an edge 70 is recognized as the corresponding edge of the image of the pattern to-be-inspected.

With regard to an edge 82 of the reference pattern, an edge 61 is not located within the distance of the allowable pattern deformation quantity. An edge 64 is not located within the distance of the allowable pattern deformation quantity, and a directional difference is larger than the allowable directional difference between edges. Although edges 66 and 69 exist within the distance of the allowable pattern deformation quantity, those directional differences are not smaller than the allowable directional difference between edges. Therefore, an edge corresponding to the edge 82 cannot be obtained. Similarly, an edge corresponding to an edge 83 cannot be obtained.

Figure 62:
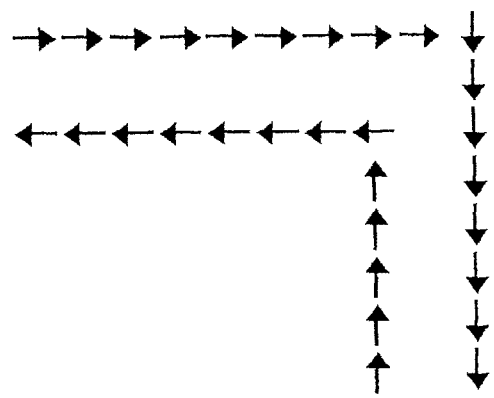
FIG. 62 is a schematic view showing another example of the edges of the reference pattern.

In addition, FIGS. 61A and 61B show a method in which the inside and the outside of a pattern are not distinguished and the direction has a value only in a range of 0 to 180 degrees. However, a method in which the inside and the outside of the pattern are distinguished can be used. For example, if the edge direction is determined so that the inside of the pattern is always located on the right-hand side of the edge, the edges of reference pattern in FIG. 61A become the state shown in FIG. 62. Therefore, the establishing of correspondence can be executed more exactly.

Next, the inspection unit 12 performs defect detection (step S320). In order to detect a defect, the following two methods are used.

4.6.1 Method of Recognizing Defect Having Abnormal Pattern Deformation Quantity

As the first defect detection method, a defect having abnormal pattern deformation quantity is recognized by the following procedure: FIGS. 63A and 63B are schematic views showing a method of recognizing a defect having abnormal pattern deformation quantity. The inspection unit 12 recognizes edges of the image of the pattern to-be-inspected that do not correspond to edges of the reference pattern (for example, the edges 61 to 67, the edge 69, and the edge 75 of FIG. 61B) as defect pixels. A binary bitmap that represents the above defect pixels is obtained.

Next, the obtained binary bitmap is dilated in order to connect defect pixels with each other by a dilation width $W_{dilation}$ (in this figure, the dilation width $W_{dilation}$ is two pixels) as shown in FIG. 63A. The dilated binary bitmap is obtained as the result of the dilation operation on the binary bitmap. The dilation operation is a well-known operation used in the mathematical morphology.

As shown in FIG. 63B, when a defect is detected, the defect may be detected in such a state that the defect is divided into a plurality of parts due to noise and the like. In this case, the divided parts are merged by using the dilation width $W_{dilation}$, which is empirically determined, and an area including the merged parts is recognized as a single defect.

The dilation operation and the erosion operation that are well known in the mathematical morphology will be described. The dilation operation $\delta$ and the erosion operation $\epsilon$ are operations that make the following results of calculation:

$$\delta_B(A) = \bigcup_{b \in B} (A)_{-b}$$

$$\varepsilon_B(A) = \bigcup_{b \in B} (A)_{-b}$$

In these equations, 'A' is a target image (binary bitmap), and 'B' is a structure element (binary bitmap). '$(A)_{-b}$' means translation of 'A' by '−b'. The symbols $\cup \cap$ mean summation operation OR, and product operation AND of binary bitmaps for each b which satisfies b∈B.

Next, the pixels that connect with each other are recognized as one area by the labeling processing. The labeling processing is defined as a method in which a group of connected pixels is formed by writing the same value on the pixels that are being connected at four neighborhoods or eight neighborhoods thereof. By giving different values to groups of connected pixels that are not connected with each other, each group of connected pixels can be distinguished. When the group of the connected pixels is recognized as an area containing a defect, the minimum bounding rectangle of the defect is obtained. The minimum bounding rectangle of the defect is defined as a minimum rectangle containing the group of connected pixels.

The above procedure is performed as shown in FIG. 63B. In FIG. 63B, there are discontinuous defects corresponding to a line segment extending in the lower right direction (minus 45 degrees) of a reference pattern. These defects are to be a single defect inherently, but appear in a divided state. First, areas that have been recognized as the defects are obtained as a binary image (shown by black pixels). This binary image is dilated by the dilation width $W_{dilation}$ so that a region shown by white pixels is created. Next, the black pixels and the white pixels are recognized as an area by the labeling process, and the minimum rectangle including the obtained recognized area is obtained as the minimum bounding rectangle.

Finally, a center of the minimum bounding rectangle and a size of the minimum bounding rectangle are calculated to obtain a defect location and a defect size. The obtained defect location and the defect size are taken as defect information.

4.6.2 Method of Recognizing Defect Using Luminance Distribution of Pixels

As the second defect detection method, a defect is recognized by the following procedure using luminance distribution of pixels. First, a region is obtained by connecting edges of an image of a pattern to-be-inspected that correspond to a reference pattern. Luminance distribution of pixels existing in the inside of the region and luminance distribution of pixels existing in the outside of the region are obtained. If there is no defect, these luminance distributions should be normal distributions. Therefore, pixels having luminance values that are out of the normal distribution are recognized as defect pixels.

Pixels having luminance values that are out of the normal distribution are obtained, and are recognized as an area by the labeling process, and the minimum rectangle including the recognized area is obtained as the minimum bounding rectangle. Finally, a center of the minimum bounding rectangle and a size of the minimum bounding rectangle are calculated to obtain a defect location and a defect size. The obtained defect location and the defect size are taken as defect information.

Figure 64:
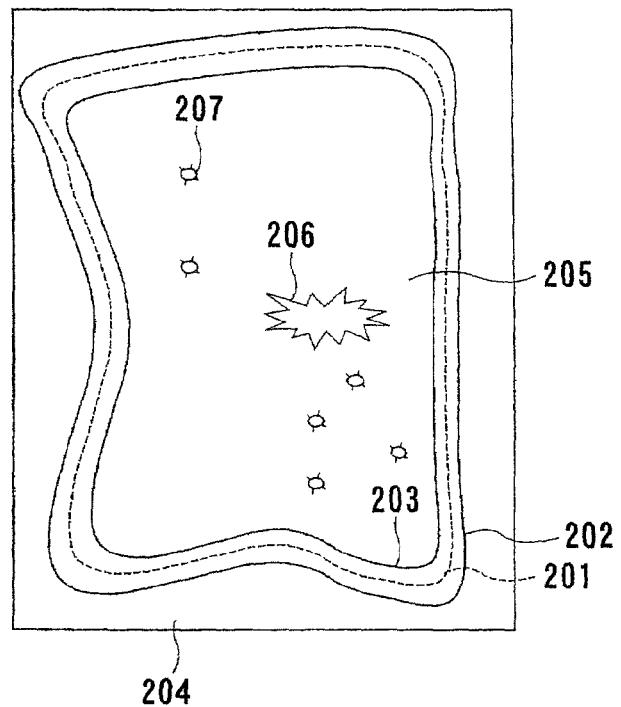
FIG. 64 is a schematic view showing a method of recognizing a defect using luminance distribution of pixels.

FIG. 64 is a schematic view showing a method of recognizing a defect using luminance distribution of pixels. A broken line 201 shows edges of an image of a pattern to-be-inspected. Solid lines 202, 203 on both sides of the broken line 201 are boundaries of a region formed by dilating the edges by a predetermined width, and a part surrounded by the solid lines 202, 203 is determined as an edge area. Luminance values of the ground 204 and the inside 205 of the pattern to-be-inspected roughly constitute the normal distribution.

Figure 65:
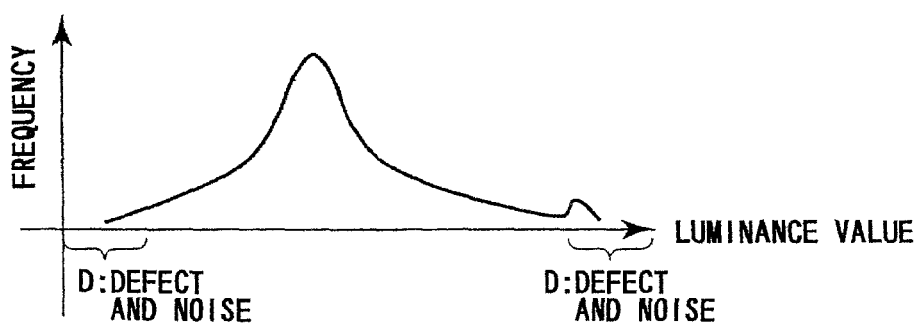
FIG. 65 is a schematic view showing an example of frequency distribution of luminance values.

As shown in FIG. 65, parts D, which are located beyond the ±3σ region of luminance distribution, are very likely to be a defect. Although the parts D also contain a noise, the noise exists in the area in a relatively uniform manner. On the other hand, the defect exists as being clustered. A binarized map in which any pixel having a luminance value corresponding to the parts D is binarized to unity, i.e. (1), and a pixel having other luminance value is binarized to zero is created. The clustered pixels having a luminance value of unity (1) whose size is not more than a specified size (for example, 2×2 pixels) are erased (for example, the clustered pixels 207 of FIG. 64 being erased). For this calculation, the median filter or the like can be used. A window size of these filters should be empirically determined in consideration of a size of a defect that should be detected. The clustered pixels having a luminance value of unity (for example, the clustered pixels 206 in FIG. 64) are recognized as a defect.

The above-mentioned 4.6.1 Method of recognizing defect having abnormal pattern deformation quantity detects a defect existing near the edge of the reference pattern. On the other hand, this method of recognizing a defect using luminance distribution of pixels detects a defect exiting in parts except for the neighborhood of the edges of the reference pattern.

When the defect is detected, defect information (the defect position, the defect size, and the image including the defect) is outputted to the defect-class determination unit 14 (steps S322, S324).

4.7 Method of Determining Defect-Classes Based on Feature Quantity Obtained from Image of Pattern to-be-Inspected The defect-class determination unit 14 determines a defect-class using the defect information and information of the defect-class reference database 23 (step S326). Specifically, feature quantities are obtained from part of an image of a pattern to-be-inspected corresponding to a defect and are compared with reference feature quantities to recognize the defect-class. The reference feature quantities are obtained from parts of images of patterns to-be-inspected corresponding to various typical defects, and stored in the defect-class reference database 23. The defect-class determination unit 14 outputs the defect information (the defect position, the defect size, and the image including the defect) and the defect-class to the display device 5 and the printer 6 through the output unit 13 (step S328). The defect-class reference database 23 is a database in which the already acquired images have been registered for respective defect-classes.

The defect-class determination unit 14 determines the defect-classes by the following procedure:

Geometrical information, which is a kind of a feature quantity, of connected pixels determined as defects is obtained. By using the geometrical information, a shape feature such as being circular, being elongated, and the like can be recognized, and if the shape is circular, the defect is recognized as an alien substance, or the like. If the shape is elongated, the defect is recognized as a scratch, or the like. The pixels recognized as defects are classified into three parts: pixel inside the pattern to-be-inspected; pixel outside the pattern to-be-inspected; and pixel on the boundary. For each part, the feature quantities of the pixels are obtained by using luminance values of pixels of the image of the pattern to-be-inspected. If the pixel is recognized as an alien substance, whether the alien substance is a metal piece or organic material (for example, human dirt) or the like can be recognized. Specifically, if the alien substance is a metal, it looks bright; and if it is the organic material, it looks dark.

Further, in the case where the alien substance exists in the inside of the pattern to-be-inspected, when the pixels recognized as the alien substance show a large variation in the luminance values of pixels, it is recognized that the alien substance is likely to exist on the pattern to-be-inspected; when such pixels show a small variation in the luminance values of pixels, it is recognized that the alien substance is likely to exist beneath the pattern to-be-inspected. This is difficult processing for the conventional die-to-die method, because whether the defect is in the inside of the pattern to-be-inspected or the outside of the pattern to-be-inspected is difficult to determine only by using the image of the pattern to-be-inspected. The present method uses these feature quantities to determine the defect-class by a well-known classification method. As the classification method, the k nearest neighbor method can be used.

The above method of determining the defect-class is a method based on a conventional optical method, namely, the ADC (Automatic Defect Classification) of the SEM method. According to this embodiment, the inside and the outside of the pattern to-be-inspected can be clearly recognized by using the design data. Therefore, the feature quantities for each part are obtained correctly, and accuracy of the classification is improved.

4.8 Pattern Deformation Quantities Obtained from the Whole Inspection-Unit-Area

Next, the inspection unit 12 obtains pattern deformation quantities from relation between the edge of the image of the pattern to-be-inspected and the edge of the reference pattern that correspond (step S330). The pattern deformation quantities are obtained from part where a defect is not detected. Then, the pattern deformation quantities are outputted to the display device 5 and the printer 6 through the output unit 13 (step S332).

Two kinds of pattern deformation quantities are used. One is pattern deformation quantities obtained from the whole inspection-unit-area, and the other is pattern deformation quantities obtained for each attribute of the reference pattern. As the pattern deformation quantities obtained from the whole inspection-unit-area, an average value of edge placement errors, a magnification variation quantity, and a deformation quantity of the line width can be used.

The average value of the edge placement errors can be calculated as an average value of the vectors d(x,y) between the edge of the image of the pattern to-be-inspected and the edge of the reference pattern that correspond. The average value of the edge placement errors becomes the shift quantity $S_2$ with sub pixel accuracy. The shift quantity $S_2$ to which the shift quantity $S_1$ is added, which was described in the above-mentioned 4.5 Post-matching processing, becomes a shift quantity with sub pixel accuracy. If the error of the XY stage 321 can be neglected, a value of the shift quantity $S_1+S_2$ becomes an average value of the edge placement error of pattern to-be-inspected in each inspection-unit-area.

If the error of the XY stage 321 cannot be neglected and inspection is performed with sub pixel accuracy, the value of the shift quantity $S_1+S_2$ is substituted for the shift quantity $S_1$, and the reference pattern is shifted by the shift quantity $S_1$, and then steps S318 through S330 are performed again.

In order to calculate a magnification variation quantity in the X-direction, X-components of the vectors d(x,y) with regard to a line segment of a reference pattern in the vertical direction are approximated by a regression line, and a regression line D(x) is obtained. Then, a gradient of the regression line is taken as the magnification variation quantity in the X-direction. The procedure is the same for the magnification variation quantity in the Y-direction.

Figure 66A:
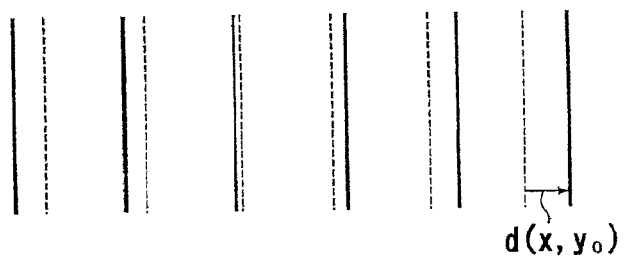
FIG. 66A is a schematic view showing an example of edges of a reference pattern and edges of an image of a pattern to-be-inspected.
Figure 66B:
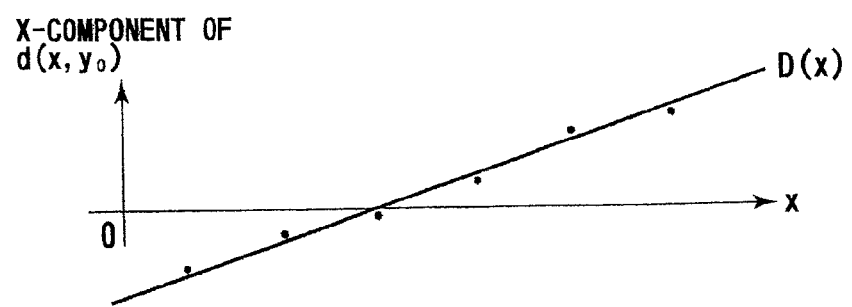
FIG. 66B is a schematic view showing an example in which X components of the vectors $d(x,y_0)$ at $y=y_0$ between two edges shown in FIG. 66A are approximated by a regression line $D(x)$.

FIG. 66A is a schematic view showing an example of edges of the reference pattern (broken lines) and edges of the image of the pattern to-be-inspected (solid lines), and FIG. 66B is a schematic view showing an example in which the X-components of the vectors $d(x,y_0)$ between two edges at $y=y_0$ shown in FIG. 66A are approximated by the regression line D(x). When the X-components of the vectors $d(x,y_0)$ are approximated by the regression line D(x)=ax+b, the gradient 'a' corresponds to the magnification variation quantity. In the example of FIG. 66A, it is recognized that the patterns to-be-inspected are larger than the reference pattern as a whole.

FIG. 67A is a schematic view showing another example of the edges of the reference pattern (broken lines) and the edges of the image of the pattern to-be-inspected (solid lines), and FIG. 67B is a schematic view showing an example in which the X-components of the vectors $d(x,y_0)$ between the two edges at $y=y_0$ shown in FIG. 67A are approximated by the regression line D(x). In the example of FIG. 67A, in addition to patterns in the image of the pattern to-be-inspected being larger than the reference pattern as a whole, line widths are dilated. In FIG. 67A, line-shaped patterns 121, 122, and 123 of the reference pattern correspond to line-shaped patterns 124, 125, and 126 of the image of the pattern to-be-inspected, respectively.

The deformation quantity of the line width in the X-direction can be obtained, for example, by calculating the average value of $\text{sign}(x,y_0) \cdot \{\text{X-component of } d(x,y_0) - D(x)\}$, where sign $(x,y_0)$ takes a value of $-1$ when $(x,y_0)$ is positioned on the left side of the line, and takes a value of $+1$ when $(x,y_0)$ is positioned on the right side of the line. In addition, if a standard deviation of $\text{sign}(x,y_0) \cdot \{\text{X-component of } d(x,y_0) - D(x)\}$ is calculated with regard to the deformation quantity of the line width, the standard deviation of the line widths can be obtained.

4.9 Extraction Rules for Attributes of Reference Pattern

Examples of the above-mentioned 3.3 Recipe data "4. The parameters used in the extraction rules for determining attributes of the reference pattern" will be described by using FIG. 68. The line part 171 is extracted as a line segment having a length longer than a predetermined length L. The corner 172 is extracted as a portion positioned in the neighborhood of connecting points where two line parts connect with each other at a predetermined angle (90 degrees, 135 degree, 270 degrees, and the like). The end 173 is extracted as a line segment having a length equal to or shorter than a predetermined length L and having both terminations 173*t*, 173*t* which contact the line parts 171, 171 at an angle of 90 degrees. The end 173 and the two line parts 171, 171 form a U shape. The isolated pattern is extracted as a closed figure having an area equal to or smaller than a predetermined area.

4.10 Method of Detecting Defect Using Attributes of Reference Pattern

Figure 68:
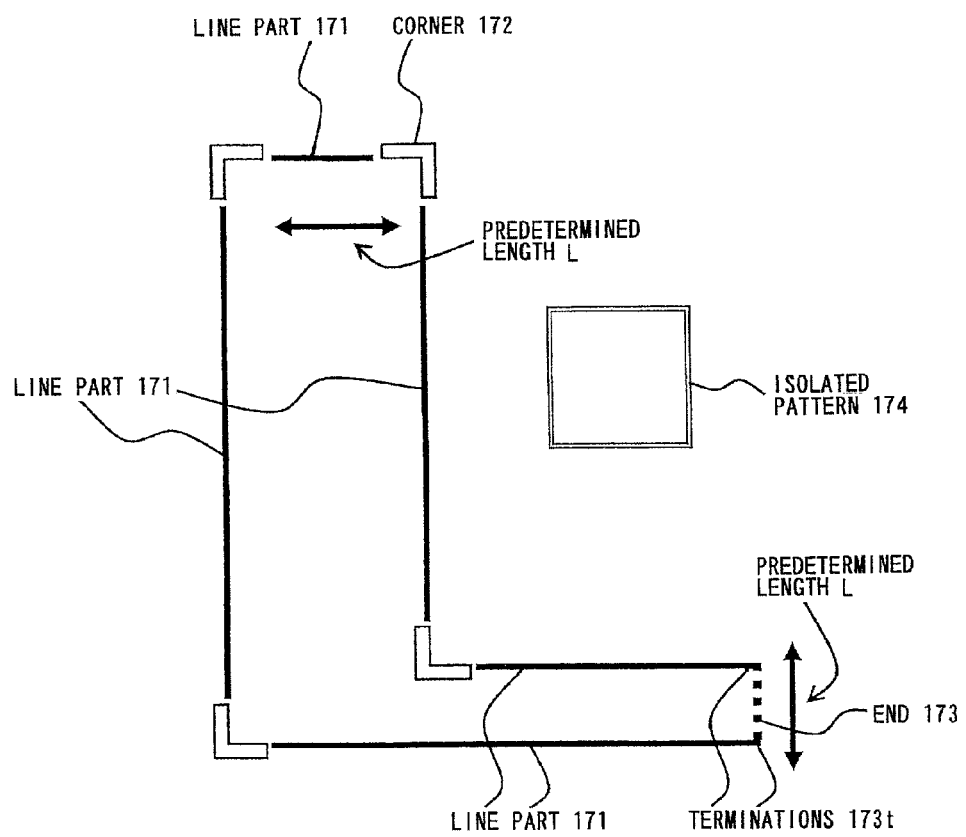
FIG. 68 is a schematic view showing an example of attributes of a reference pattern.

As attributes of reference pattern, a line part 171, a corner 172, an end 173, an isolated pattern 174, and the like are used as shown in FIG. 68. The attributes of reference pattern are automatically added to the reference pattern and used at the time of inspection.

As the pattern deformation quantities with regard to the attributes of reference pattern, the following can be used: the average value of the edge placement errors, the magnification variation quantity, and the deformation quantity of the line width, which were described in the above-mentioned 4.8 Pattern deformation quantities obtained from the whole inspection-unit-area; in addition, deformation quantities of feature quantities such as a diameter, an area, a length of periphery, a circularity, a moment, and a radius of curvature.

4.10.1 Defect of End Having Edge Placement Error

Figure 69A:
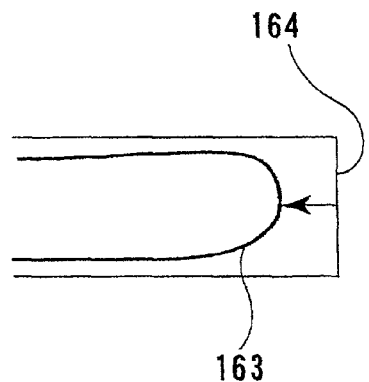
FIGS. 69A and 69B are schematic views showing edge placement errors of an end.
Figure 69B:
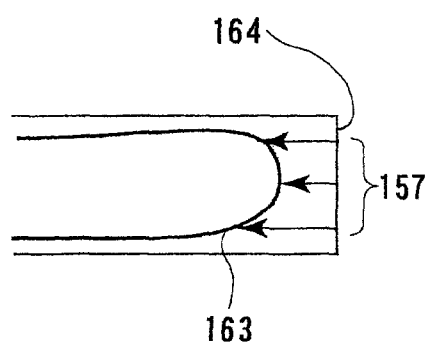

FIGS. 69A and 69B are schematic views showing an edge placement error of an end. As shown in FIG. 69A, the edge placement error of the end is the minimum distance between edges 164, which constitute the end of the reference pattern, and edges 163 of the image of the pattern to-be-inspected.

As an alternative method, as shown in FIG. 69B, an average value, the maximum value, the minimum value, the median, or the like of distances corresponding to a section 157 having an arbitrary length may be used as the edge placement error of the end.

If the edge placement error is not within the allowable edge placement error of an end in the above-mentioned 3.3 Recipe data "2. The limit values of the negative side and the positive side of the allowable pattern deformation quantities", it is recognized that the end has a defect.

4.10.2 Defects of Line Part and Corner Having Edge Placement Error

In FIGS. 69A and 69B, the edge placement error of the end has been described. In addition, with regard to a line part and a corner, the edge placement error can be calculated in the same manner. With regard to the line part, the edge placement error corresponding to the line part is calculated and a defect is detected. With regard to the corner, the edge placement error corresponding to direction at an angle of half of the corner's angle or a specified angle is calculated and a defect is detected.

In these cases, instead of the allowable edge placement error of an edge, the allowable edge placement error of a line part and a corner are used, respectively.

4.10.3 Defects of Isolated Pattern Having Placement Error

Figure 70:
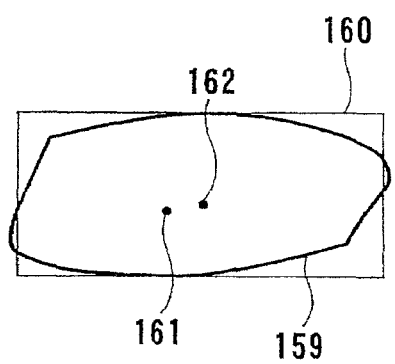
FIG. 70 is a schematic view showing a placement error of an isolated pattern.

FIG. 70 is a schematic view showing a placement error of an isolated pattern. A placement error is defined as a distance between a centroid 162 of edges 160 of a reference pattern (which forms an isolated pattern) and a centroid 161 of edges 159 of an image of a pattern to-be-inspected (which forms the isolated pattern).

If the placement error is not within the allowable placement error of an isolated pattern in the above-mentioned 3.3 Recipe data "2. The limit values of the negative side and the positive side of the allowable pattern deformation quantities", it is recognized that the isolated pattern has a defect.

4.10.4 Other Defects of Isolated Pattern

Moreover, deformation quantities of feature quantities obtained from the isolated pattern can be inspected. As the feature quantities, a diameter, an area, a length of periphery, the degree of circularity, a moment, and the like can be used. As shown in FIG. 70, the above-mentioned feature quantities of the edges 160 of the reference pattern and the edges 159 of the image of the pattern to-be-inspected are calculated, and then differences between feature quantities of both are inspected to detect a defect.

4.10.5 Defect of Corner Having Abnormal Curvature

FIG. 71A is a schematic view showing an example of edges of a corner of a reference pattern, and FIG. 71B is a schematic view showing an example of edges of a corner of an image of a pattern to-be-inspected. An edge 166 of the corner of the reference pattern shown in FIG. 71A has been rounded off with a radius $R_1$. As a curvature of an edge 165 of the image of the pattern to-be-inspected, a radius $R_2$ of a circle that is approximated by a circle by using the least square method is obtained. Instead of the radius $R_2$, a major axis or minor axis of an ellipse that is approximated by an ellipse by the least square method may be used. A difference between the radius $R_1$ and the radius $R_2$ is inspected to detect a defect.

The above inspection methods are performed simultaneously for a plurality of positions within the field of view. The inspection items are selected according to the above-mentioned 3.3 Recipe data "1. The pattern deformation quantities to be inspected".

4.11 The Second Edge Detection

Figure 76:
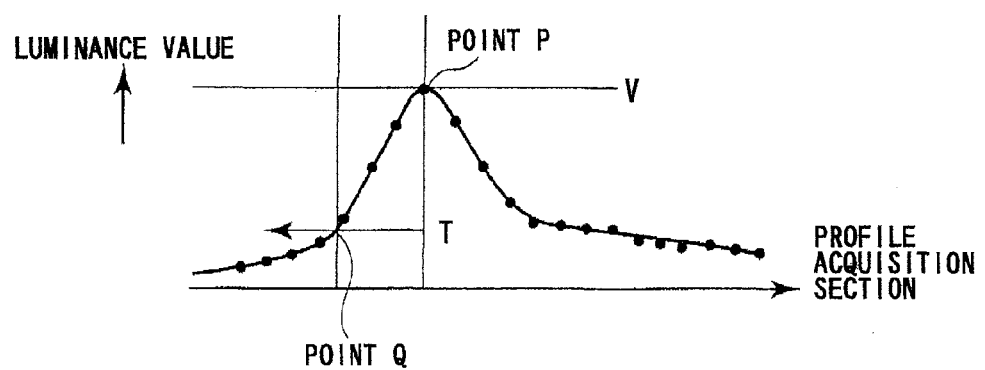
FIG. 76 is a schematic view showing an example of a profile.

The inspection unit 12 detects the edge (the second edge) again from the image of the pattern to-be-inspected (step S334). The second edge is detected from a profile obtained from the image of the pattern to-be-inspected. As the second reference pattern, a reference pattern whose edge is a point Q in FIG. 76 is used. On the contrary, in the case of the image having bright edges and having no contrast between the inside of the pattern-to-be-inspected and the ground, as described in 4.1.2 The first edge detection method 2, as the first reference pattern, a reference pattern whose edge is a point P in FIG. 76 is used. Therefore, the second reference pattern generally differs from the first reference pattern.

Before detecting the second edge of the image of the pattern to-be-inspected, the second reference pattern is shifted by the above-mentioned shift quantity of $S_1+S_2$. Any subsequent processing is performed, with the shift quantity keeping.

In order to detect an edge position from the profile, various methods (for example the threshold method, the linear approximation method, and the like) have been disclosed. In this embodiment, the threshold method is used and measurement of a line width that is performed in a CD-SEM is applied to an image of a two-dimensional pattern (an image of a pattern to-be-inspected). However, if the threshold method is replaced with other methods such as the linear approximation method, the processing can be made similarly. The linear approximation method is a method in which the profile is approximated by lines and an intersection is used to detect the edge.

Figure 72:
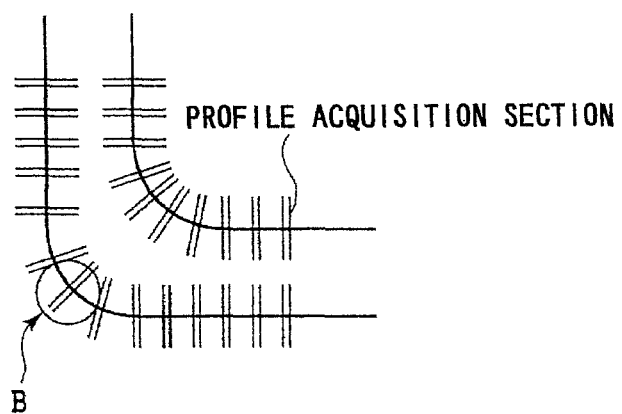
FIG. 72 is a schematic view showing an example of profile acquisition sections.

FIG. 72 is a schematic view showing an example of profile acquisition sections. As shown in FIG. 72, the profile acquisition sections are perpendicular to edges of the second reference pattern, and the edges of the second reference pattern are center points of the profile acquisition section (double lines in FIG. 72). A length of the profile acquisition section is the above-mentioned 3.3 Recipe data "6. The length of a profile acquisition section", and an interval between the profile acquisition sections is the above-mentioned 3.3 Recipe data "6. The interval between profile acquisition sections".

Figure 73:
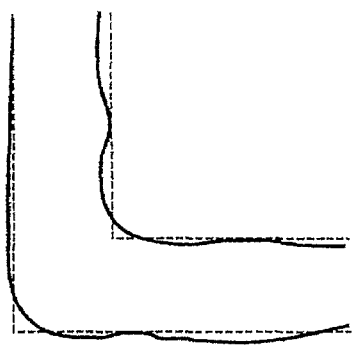
FIG. 73 is a schematic view showing a contour of a simulation pattern obtained by a lithography simulator.

In addition, instead of the above-mentioned second reference pattern, as shown in FIG. 73, a contour of an exposed pattern obtained by a lithography simulator (solid lines in FIG. 73) can be used.

Profile data is obtained from a section of the image of the pattern to-be-inspected corresponding to the profile acquisition section for every interval, which is the above-mentioned 3.3 Recipe data "6. The interval between sampling points in a profile acquisition section". The length of the profile acquisition section is set to an arbitrary length longer than the allowable pattern deformation quantity. The interval between sampling points is set to an arbitrary value equal to or smaller than the interval of pixels. For obtaining profile data, the bilinear interpolation, the spline interpolation, or the Fourier series is used.

Figure 74:
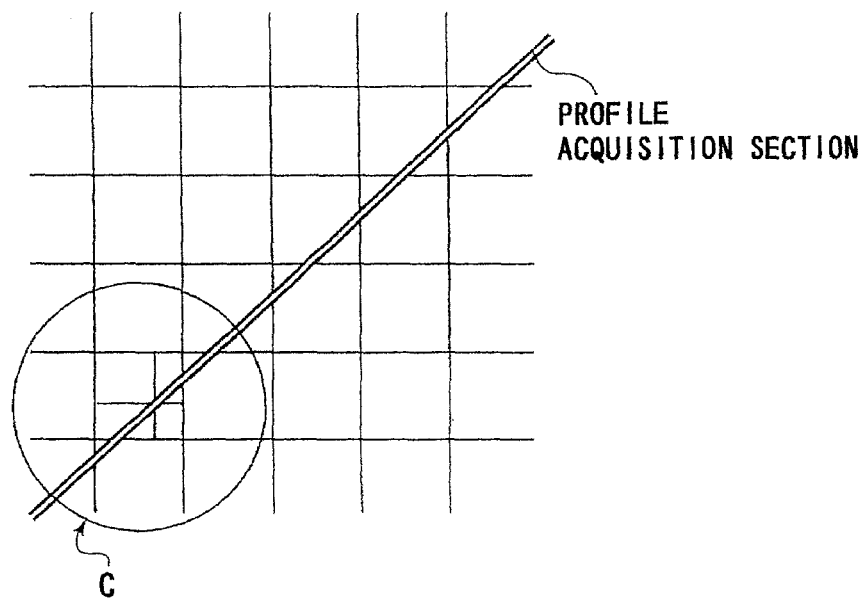
FIG. 74 is a schematic view showing an enlarged part of FIG. 72 (portion of B)
Figure 75:
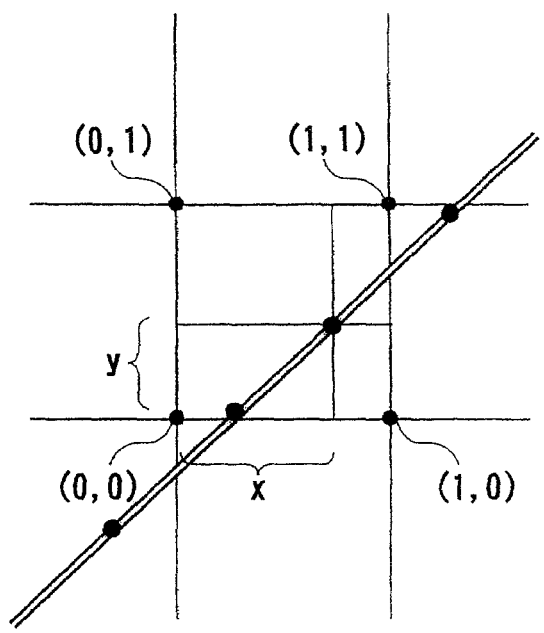
FIG. 75 is a schematic view showing an enlarged part of FIG. 74 (portion of C)

FIG. 74 is an enlarged schematic view of a part of FIG. 72 (portion B) and FIG. 75 is an enlarged schematic view of a part of FIG. 74 (portion C). A double line in FIG. 74 or FIG. 75 is the same profile acquisition section in FIG. 72. In FIG. 75, intersections of a grid represent positions of pixels, and solid circles on the profile acquisition section represent positions where luminance values on the profile acquisition section are obtained.

The bilinear interpolation method is a method in which a luminance value I(x,y) at a position (x,y) ($0<x\leq1, 0<y\leq1$) is calculated by the following equation using luminance values I(0,0), I(0,1), I(1,0), and I(1,1) of pixels shown by (0,0), (0,1), (1,0), and (1,1).

$$I(x,y)=\{I(0,0)(1-x)+I(1,0)x\}(1-y)+\{I(0,1)(1-x)+I(1,1)x\}y$$

From the profile obtained by using this equation, the second edge position is detected by using the threshold method. As shown in FIG. 76, the maximum luminance value V and its position P in the profile are obtained. The maximum luminance value V is multiplied by a previously specified coefficient k to obtain a threshold T, and intersections of a line whose luminance value is equal to the threshold T and the profile curve are obtained. From these intersections, an intersection Q, which is located in an outward direction of the pattern to-be-inspected from the point P and is closest to the point P, is obtained. A location of the intersection Q becomes a location of the second edge.

A cross section of a pattern to-be-inspected formed on a wafer has a trapezoidal shape. By using the coefficient k, it can be set whether measurement is performed at the upper level, the lower level, or the middle level.

For example, in the case of using the coefficient k equal to 0.5, the detected edge exists in a position shifted from an ideal position by a half of an electron beam spot size in the outer direction of the pattern to-be-inspected. The electron beam spot size is defined as a width of a section, in which luminance values are more than a half of the maximum luminance value.

Figure 77A:
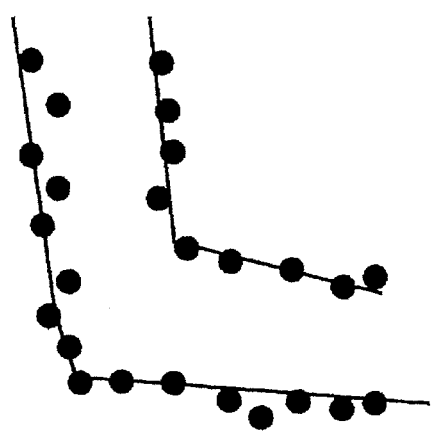
FIGS. 77A and 77B are schematic views showing examples in which the detected second edges are approximated by curves (including the polygon approximation) to connect the detected second edges.

After the second edges are detected, the detected second edges are approximated by curves (including the polygon approximation) to connect the detected second edges. The simplest method is to connect the detected second edges by segment lines (polygonal lines). For example, in the case of using the split-and-merge method disclosed in the following, the detected second edges are smoothly connected by polygon approximation using the least square method. T. Pavlidis and S. L. Horowitz, "Segmentation of plane curves," IEEE Trans. on Computers, Vol. C-23, No. 8, August, 1974. FIG. 77A is a schematic view showing examples of the above method.

Figure 77B:
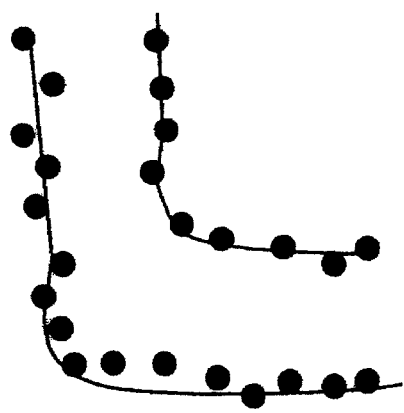

As an alternative method, a curve approximation of plane data by a two-dimensional spline function using the least square method, as shown in FIG. 77B, can also be used. The former can be processed at high speed, but has little flexibility for a curve containing many rounded parts. On the other hand, the latter can be processed at high speed and can be flexible. Besides the above methods, various methods such as a method in which the Fourier descriptor is used have been disclosed and one of these can be substituted for the above methods.

In addition, the above curve approximation may be performed after detecting the first edges.

As methods of setting the profile acquisition sections, the following two methods can be used. One is the above-mentioned method in which directions and positions for acquiring the profiles are set beforehand by using the second reference pattern. This method is used for the case where the above-mentioned 3.3 Recipe data "6. The flag for indicating whether profile acquisition sections are set at the time of setting recipe data, or are set after detecting the first edges" is "at the time of settling recipe data". In this method, the profile acquisition sections are set uniquely by using the second reference pattern.

As an alternative method of setting the profile acquisition sections, a method in which the profile acquisition sections are adaptively set after detecting the first edges can be used. This method is used for the case where the above-mentioned 3.3 Recipe data "6. The flag for indicating whether profile acquisition sections are set at the time of setting recipe data, or are set after detecting the first edges" is "after detecting the first edges".

Figure 78A:
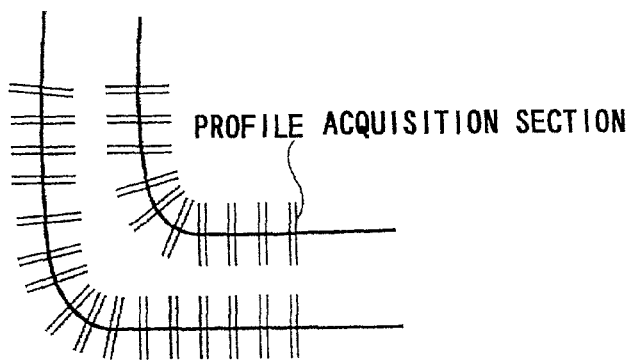
FIG. 78A is a schematic view showing another example of the profile acquisition sections.
Figure 78B:
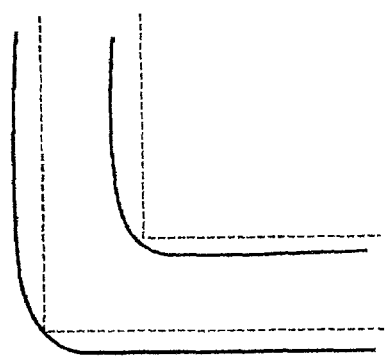
FIG. 78B is a schematic view showing an example of relation between the first edges of the image of the pattern to-be-inspected and the second reference pattern.

Specifically, as shown in FIG. 78A, in this method, profile acquisition sections are set in a direction perpendicular to the detected first edges of the image of the pattern to-be-inspected. According to this method, as shown in FIG. 78B, even if the detected first edges (solid lines) of the image of the pattern to-be-inspected are displaced from the above-mentioned second reference pattern (dotted lines), the profile acquisition sections can be shorter than the above-mentioned method. Further, this method can easily follow pattern deformation compared to the above-mentioned method. After the profile acquisition sections are set, the same processing as the above-mentioned method is performed.

4.12 The Second Inspection

After the second edge detection, the inspection unit 12 performs the second inspection (step S336). This inspection (step S336) is the same processing as the steps S320 through S332 in the above-mentioned 4.6 The first inspection except for using the second edge instead of the first edge. In step S318, the inspection unit 12 establishes the correspondence between the edge of the image of the pattern to-be-inspected and the edge of the reference pattern; however, in the second inspection, the correspondence is established by the profile acquisition sections.

The second inspection performs the defect detection, and then obtains the pattern deformation quantity. The shift quantity $S_3$ with regard to the whole image corresponds to the quantity $S_2$ as described in the above-mentioned 4.8 Pattern deformation quantities obtained from the whole inspection-unit-area. The obtained quantity $S_3$ plus the above shift quantity $S_1$ and $S_2$ becomes the total shift quantity between the second reference pattern and the patterns in the image of the pattern to-be-inspected.

In the second inspection, the above-mentioned 4.6.1 Method of recognizing defect having abnormal pattern deformation quantity and the above-mentioned 4.6.2 Method of recognizing defect using luminance distribution of pixels are altered.

In the above-mentioned 4.6.1 Method of recognizing defect having abnormal pattern deformation quantity of the first inspection, the edges of the image of the pattern to-be-inspected that do not correspond to the edges of the reference pattern are recognized as the defect pixels. However, in the second inspection, the profile acquisition sections which do not have edges within the above-mentioned 3.3 Recipe data "2. The limit values of the negative side and the positive side of the allowable pattern deformation quantities" are recognized as a defect.

In the above-mentioned 4.6.2 Method of recognizing defect using luminance distribution of pixels of the above-mentioned first inspection, the region is obtained by connecting the edges of the image of the pattern to-be-inspected that correspond to the reference pattern. However, in second inspection, a region is obtained by connecting the edges of the reference pattern.

If the above basic inspection processing has been performed for all the inspection-unit-areas, the inspection processing is terminated; otherwise the flow goes back to step S308 (step S340).

5. Application Inspection Processing

The foregoing is the basic inspection processing according to the flow chart shown in FIG. 25. In this chapter, application processing expanded based on the basic inspection processing will be described.

5.1 Method of Recognizing Repeated Defects

As described in the above-mentioned 4. Basic Inspection processing, the example of inspection processing for recognizing repeated defects is described in FIG. 27. The inspection processing is an expanded process of the inspection processing according to the flow chart shown in FIG. 25.

First, the block A of the preparation process before inspection is performed. Next, defects are detected by the block B of the inspection process for an inspection area in each semiconductor device, and then the detected defects are merged (step S402). The block A and the block B of FIG. 27 are identical to the block A and the block B of FIG. 26, respectively. The steps S302 to S306 in the block A are identical to the steps S302 to S306 of FIG. 25. Further, the steps S308 to S336 in the block B are identical to the steps S308 to S336 of FIG. 25.

In the block B, after the step S336, the step S338 for outputting the defect information to the defect information storage unit 24 is added. Addition of step S338 is different from FIG. 25. The step S340 in the block B is identical to the step S340 of FIG. 25. The inspection-unit-areas in the step S340 are obtained by dividing the inspection area represented by the coordinate system used in the design data, and the inspection-unit-areas in each semiconductor device are inspected.

In the case where the inspection area larger than the inspection-unit-area shown in FIG. 23 is inspected, a defect existing in a plurality of the inspection-unit-areas may be detected in such a state that the defect is divided into a plurality of portions. By merging these divided portions of the defect, division of the defect by the boundaries between the inspection-unit-areas can be eliminated.

Figure 79:
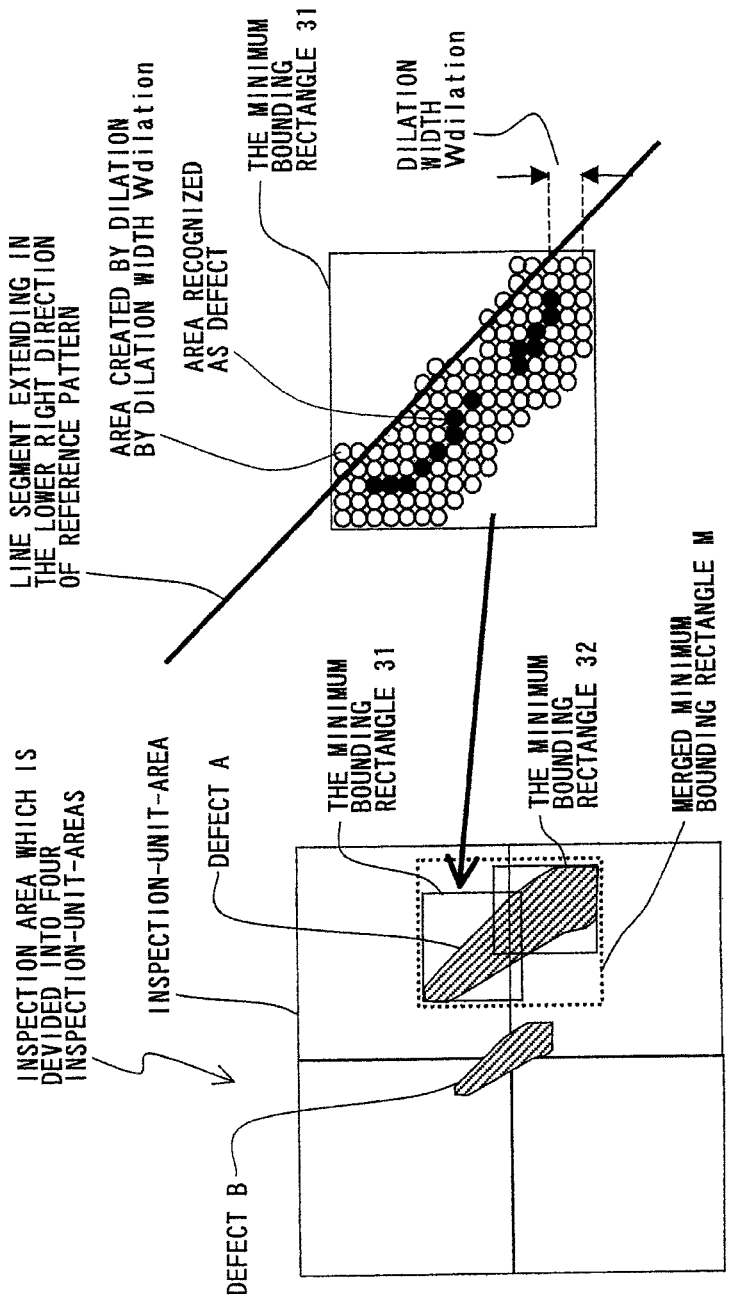
FIG. 79 is a schematic view showing an example in which an inspection area is divided into four inspection-unit-areas.

FIG. 79 is a schematic view showing an example in which an inspection area is divided into four inspection-unit-areas. A defect A lies across an inspection-unit-area on the upper right side and an inspection-unit-area on the lower right side. First, the minimum bounding rectangle 31 of a part of the defect A located in the inspection-unit-area on the upper right side and the minimum bounding rectangle 32 of a part of the defect A located in the inspection-unit-area on the lower right side are obtained. The minimum bounding rectangle 31 and the minimum bounding rectangle 32 are obtained by the procedure described in the above-mentioned 4.6.1 Method of recognizing defect having abnormal pattern deformation quantity.

Next, overlapping check of the minimum bounding rectangles included in all of the inspection-unit-areas that constitute the inspection area is performed. If the minimum bounding rectangles overlap, the minimum bounding rectangle including all the overlapped minimum bounding rectangles is taken as the merged minimum bounding rectangle. In this example, the minimum bounding rectangle M is obtained as the merged minimum bounding rectangle from the minimum bounding rectangle 31 and the minimum bounding rectangle 32. In FIG. 79, although the minimum bounding rectangle M (shown by dotted line), the minimum bounding rectangle 31, and the minimum bounding rectangle 32 should be overlapped partially, the minimum bounding rectangle M is drawn slightly larger for simple drawing.

Similarly, the defect B lying across four inspection-unit-areas may be merged. In this case, the four minimum bounding rectangles are merged as a single minimum bounding rectangle (step S402). The defect information existing in the obtained minimum bounding rectangle is merged, and the merged defect information is stored in the defect information storage unit 24 (step S403).

After checking whether all the inspection of the semiconductor device to-be-inspected has been completed (step S404), if it is judged that all the inspection has been completed, repeated defects are recognized (step S406). The defect information obtained from the same inspection areas in each semiconductor device, which has been fabricated based on the same design data, and is represented in a coordinate system used in the design data. The defect information is stored in the defect information storage unit 24 by step S338.

Figure 80:
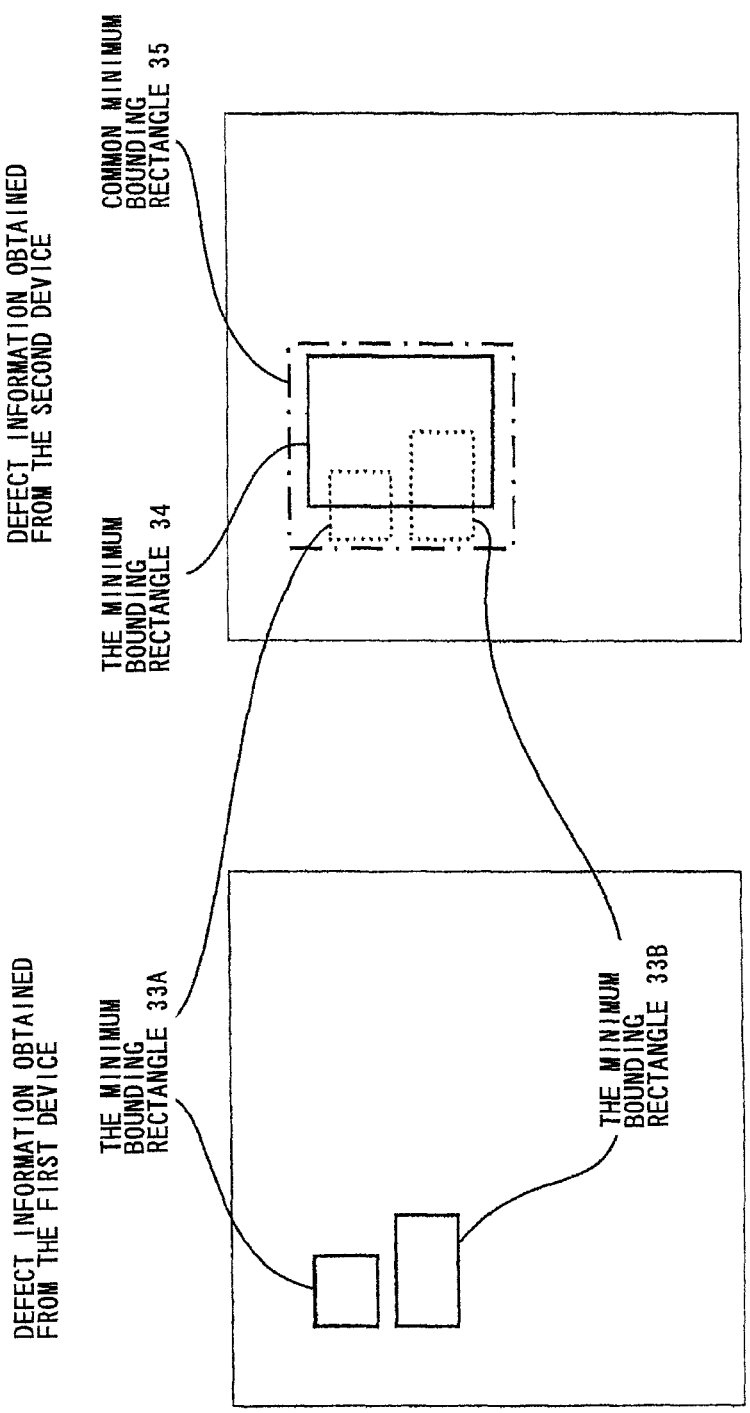
FIG. 80 is a schematic view showing defect information obtained from the first semiconductor device and defect information obtained from the second semiconductor device.

FIG. 80 is a schematic view showing defect information obtained from the first semiconductor device and defect information obtained from the second semiconductor device. When the defect information obtained from the first semiconductor device and the defect information obtained from the second semiconductor device are superimposed, it is recognized that the minimum bounding rectangle 33A and the minimum bounding rectangle 33B overlap with the minimum bounding rectangle 34. This processing is well known as processing of the Boolean operation. The common minimum bounding rectangle 35 is obtained as the minimum bounding rectangle including these three minimum bounding rectangles. Defects, which are not shown in the figure, in the common minimum bounding rectangle 35 are recognized as defects that exist commonly in a plurality of semiconductor devices, i.e. repeated defects.

This means that there exist the repeated defects in the common minimum bounding rectangle 35, the defects have been detected as the divided minimum bounding rectangle 33A and the minimum bounding rectangle 33B due to noise or the like in the first semiconductor device, and the defect has been detected as the single minimum bounding rectangle 34 in the second semiconductor device. The shift of the minimum bounding rectangle 33A and the minimum bounding rectangle 33B from the minimum bounding rectangle 34 means that the defects have been detected at a slightly different position.

The above processing can be performed in the case of using defect information that has been obtained from N semiconductor devices including at least three semiconductor devices. In this case, when the minimum bounding rectangles obtained from semiconductor devices of not less than M overlap each other, repeated defects are recognized. The number M is in the range of two to N. The larger M is, the more accurately the repeated defects can be obtained.

The defect information of the repeated defects detected by the above inspection is outputted to the defect information storage unit 24 (step S408). The defect information in the defect information storage unit 24 is outputted to the display device 5 and the printer 6 through the output unit 13 (step S410).

According to this embodiment, huge labor of an operator is made unnecessary, and the defect recognition inaccuracy caused by an operator's mistake can be prevented. In addition, even if a specimen is contaminated, contaminations are not detected as repeated defects, because the contaminations seldom or never exist at the same location of different devices.

5.2 Region Inspection Method

In the above-mentioned 4.6 The first inspection and the above-mentioned 4.12 The second inspection, the design data is simply transformed into the reference pattern. As an alternative inspection method, an inspection method in which a reference pattern suitable for a region inspection method is extracted by using geometrical information of line segments constituting design data, and/or by using relationship between line segments that contact with each other or are located closely to each other can be used. The region inspection method means an inspection method in which edges facing each other are used.

As the region inspection method, methods of inspecting a line width, an average line width, a space width, and an average space width of a line-shaped pattern; a line width, an average line width, a space width, and an average space width of a curvilinear-shaped pattern; a part that is liable to cause an open or bridge defect; and a gate width can be used.

Figure 81:
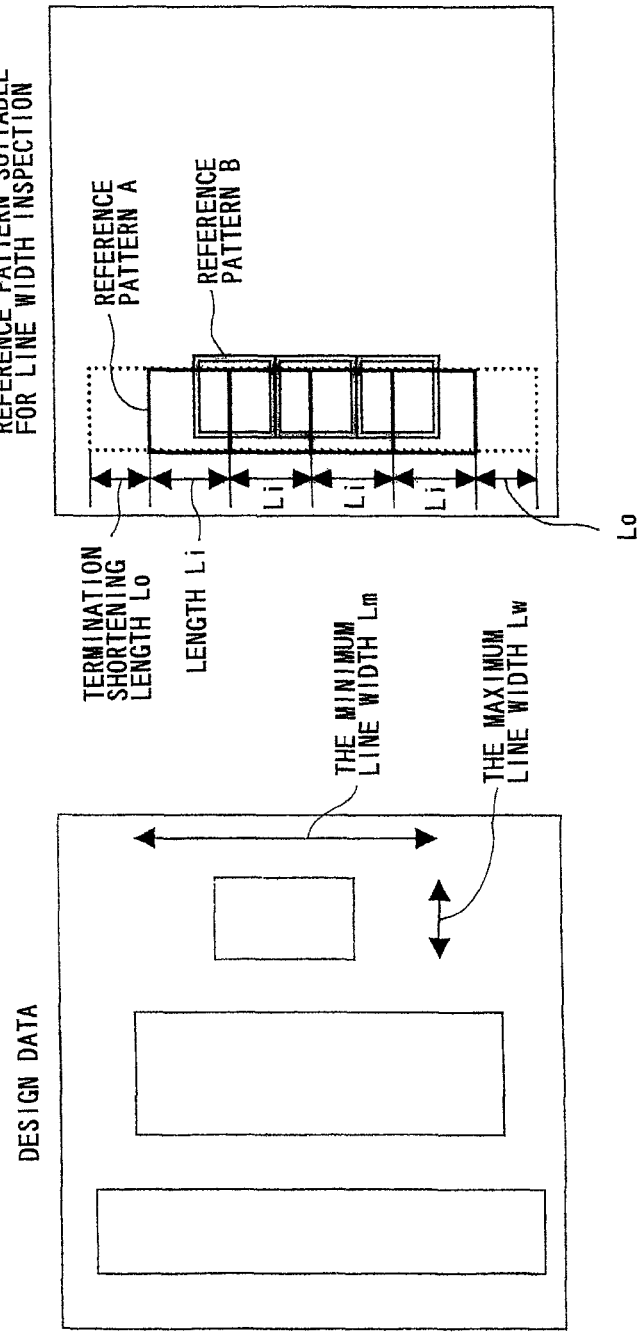
FIG. 81 is a schematic view showing a rule for automatically extracting reference patterns suitable for line width inspection from design data.

5.2.1 Methods of Inspecting Line Width, Average Line Width, Space Width, and Average Space Width of Line-Shaped Pattern A semiconductor device process is controlled by monitoring a line width, an average line width, a space width, or an average space width. According to this embodiment, an inspection method in which a reference pattern suitable for inspection of the line width, the average line width, the space width, or the average space width is extracted from design data; and an allowable pattern deformation quantity for the line width, the average line width, the space width, or the average space width is set to the extracted reference pattern can be used. The inspection method is performed by the following procedure:

FIG. 81 is a schematic view showing a rule for automatically extracting reference patterns suitable for line width inspection from design data. A line-shaped pattern of the design data that has a width smaller than a predetermined maximum line width Lw and has a length longer than a predetermined minimum line length Lm is an object for obtaining a reference pattern suitable for line width inspection. As shown in the left side of FIG. 81, there are three line-shaped patterns in the design data. The left line-shaped pattern can be the object to be processed, but the middle line-shaped pattern cannot be the object to be processed because the middle line-shaped pattern has a width larger than the maximum line width Lw. Further, the right line-shaped pattern cannot be the object to be processed because the right line-shaped pattern has a length shorter than the minimum line length Lm.

Next, as shown on the right-hand side of FIG. 81, the selected line-shaped pattern is shortened from its terminations by a predetermined termination shortening length Lo. The line-shaped pattern is divided into rectangles having a length Li, and the divided rectangles are set as reference patterns A (shown by solid lines) for line width inspection. Further, reference patterns B (shown by double lines) whose centers are located at boundaries between the adjacent reference patterns A for line width inspection may be added for line width inspection.

By addition of the reference patterns B, defect detection capability is improved in the case where a defect exists in the boundaries of the reference patterns A and their neighbors. The higher a ratio of a defect size to a reference pattern size is, the higher defect detection capability is. The ratio of the defect size to the reference pattern size in the case where the defect exists in the one reference pattern is defined as R. Then, two respective ratios of the defect size to the reference pattern size in the case where the defect, which has the same size as the above, exists in the two reference patterns in a divided manner are less than R. Therefore, the defect detection capability is higher in the case where the defect exists in the one reference pattern.

As shown in FIG. 82, a line-shaped pattern of the design data having at least one corner is separated into a plurality of rectangles at the corner, and then the plurality of rectangles is processed. In an example shown in FIG. 82, the line-shaped pattern (L-shaped polygon) having a corner (shown by dotted lines) is separated into two rectangles (shown by the solid lines).

Figure 83:
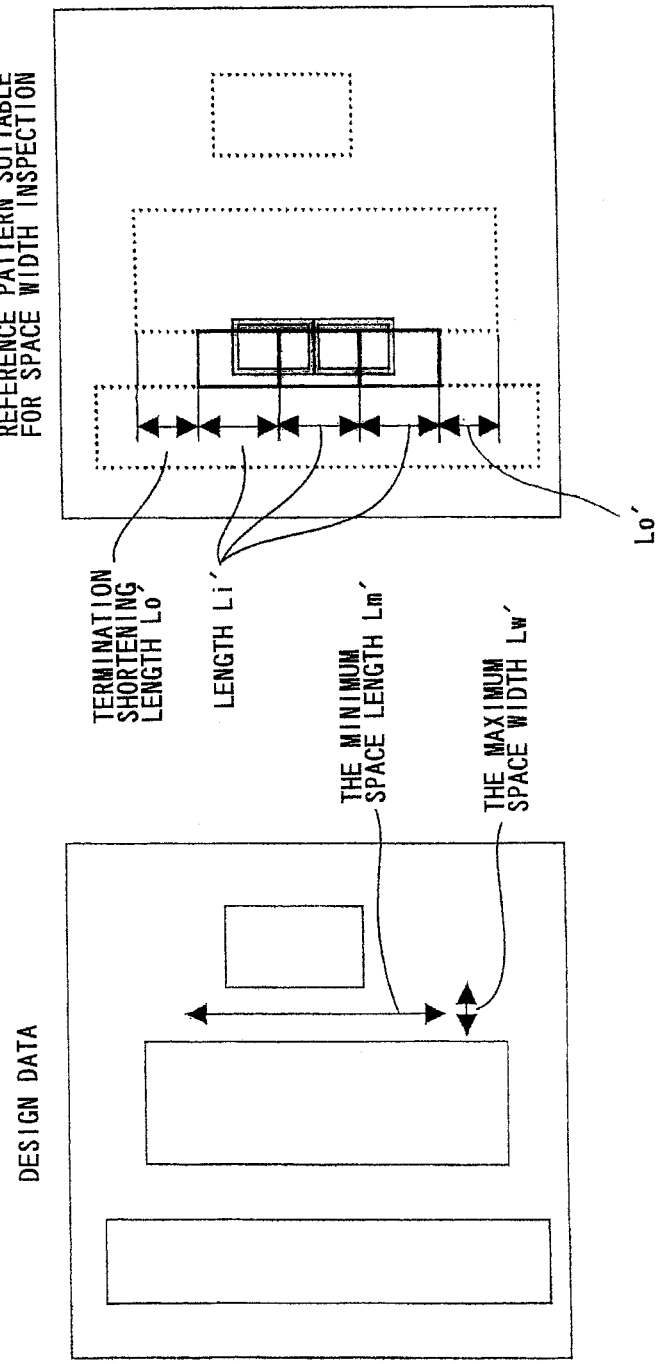
FIG. 83 is a schematic view showing a rule for automatically extracting a reference pattern suitable for space width inspection from design data.

The space width inspection can be realized in the same process described above by using inverted design data. The inverted design data is produced by inverting inside and outside of a pattern in the design data, i.e. inverting the inside into the outside and the outside into the inside. FIG. 83 is a schematic view showing a rule for automatically extracting a reference pattern suitable for space width inspection from design data. As shown in FIG. 83, Lm', Lw', Li', and Lo' are the same as Lm, Lw, Li, Lo, however, the values of Lm', Lw', Li', and Lo' are different from those of Lm, Lw, Li, and Lo. By using these values, the space width inspection may be performed in the same manner as the method described in FIG. 81. The values of Lm, Lw, Li, Lo, Lm', Lw', Li', and Lo' are controlled as the above-mentioned 3.3 Recipe data "5. the maximum line width, the minimum line length, and the termination shortening length of a reference pattern suitable for line width inspection; and the maximum line width, the minimum line length, and the termination shortening length of a reference pattern suitable for space width inspection".

An inspection method in which the reference patterns suitable for line width inspection and the reference patterns suitable for space width inspection are used is performed by the following procedure:

Average edge locations of edges of an image of a pattern to-be-inspected corresponding to line segments in the obtained reference pattern that had existed in the design data are calculated. A distance between the average edge locations is calculated. If a difference between the distance and a line width or space width W of the design data exceeds the above-mentioned 3.3 Recipe data "2. The allowable pattern deformation quantity of a line width", or "The allowable pattern deformation quantity of a space width", it is recognized that the portion corresponding to the reference pattern has a defect.

FIG. 84 is a schematic view showing the inspection method in which a reference pattern suitable for line width inspection and a reference pattern suitable for space width inspection is used. The reference pattern includes line segments Ld (shown by double lines) which had existed in the design data, and line segments Le added when the reference pattern is created. As shown in FIG. 72, profiles are acquired in a direction perpendicular to the line segments Ld, and edges are detected from the profiles as shown in FIG. 76. The detected edge locations are averaged to calculate an average edge location.

As shown in FIG. 84, the left average edge location A and the right average edge location B are calculated. Next, the distance W' between the left average edge location A and the right average edge location B is calculated, and then a difference between the distance W' and the line width W of the design data is calculated. If this difference is larger than the allowable pattern deformation quantity, it is recognized that the portion corresponding to the reference pattern has a defect.

As an alternative method, a method in which all profiles with regard to the line segment Ld are acquired, and these profiles are averaged to obtain an average edge location can be used.

The above description also is made for methods of inspection of the average line width and the average space width. Instead of using the average values, a method in which an individual line width or an individual space width is inspected can be used.

5.2.2 Methods of Inspecting Line Width, Average Line Width, Space Width, and Average Space Width of Curvilinear-Shaped Pattern Methods of inspecting a line width, an average line width, a space width, and an average space width of a curvilinear-shaped pattern that cannot be inspected by the above region inspection methods can be used. A typical example of the curvilinear-shaped pattern is a corner part of design data. Although complex calculation for methods of inspecting a curvilinear-shaped pattern is required, these inspection methods are as important as the above methods for inspecting the line-shaped pattern in order to control a semiconductor device process.

Figure 85:
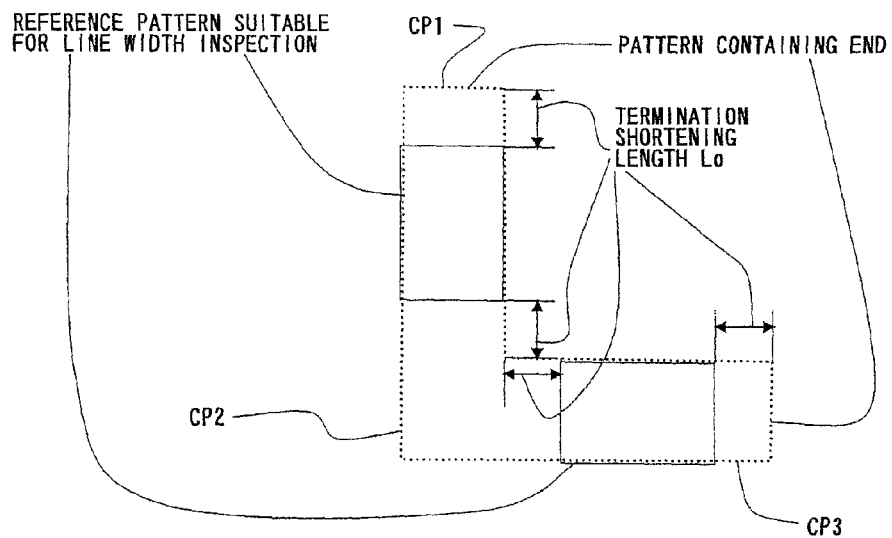
FIG. 85 is a schematic view showing a method of obtaining a reference pattern suitable for line width inspection of a corner part of design data.
Figure 86:
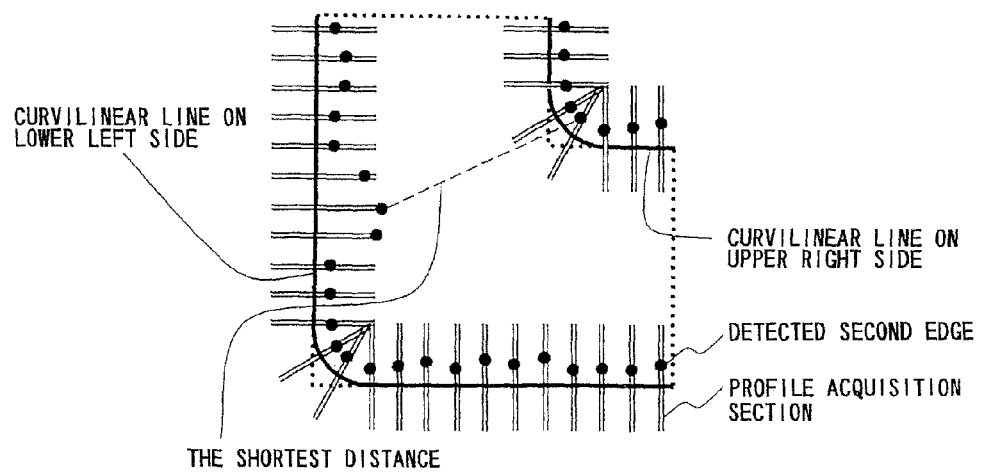
FIG. 86 is a schematic view showing a method of inspecting the minimum line width of a curvilinear-shaped pattern that is the corner part of the design data.

FIG. 85 is a schematic view showing a method of obtaining a reference pattern suitable for line width inspection of a corner part of design data, and FIG. 86 is a schematic view showing a method of inspecting the minimum line width of the curvilinear-shaped pattern that is the corner part of the design data.

As shown in FIG. 85, polygons CP1, CP2, and CP3 are obtained by subtracting reference patterns (two rectangles shown by solid lines) suitable for the line width inspection of the line-shaped pattern from a reference pattern (L-shaped polygon shown by dotted lines) obtained from the design data. The polygon CP2 that does not contain an end is chosen as a reference pattern suitable for line width inspection of a corner part of design data.

A line width to-be-inspected is the minimum distance between curvilinear lines (shown by bold solid lines in FIG. 86 corresponding to the L-shaped line segments having corners rounded off by the curve as shown in FIG. 18) corresponding to line segments that had existed in the design data. First, the second edges (see FIGS. 72 through 76) corresponding to these curvilinear lines are detected. In FIG. 86, double lines represent profile acquisition sections and solid circles (●) represent the detected second edges.

The following procedure is performed for all the detected second edges corresponding to the curvilinear line on the lower left side:

1. Distances from one of the detected second edges corresponding to the curvilinear line on the lower left side to all the detected second edges corresponding to the curvilinear line on the upper right side are calculated.

2. The shortest distance of the above distances is chosen.

In the case where the shortest distance in the obtained distances is shorter than the above-mentioned 3.3 Recipe data "2. The allowable minimum line width", it is recognized that a part corresponding to the reference pattern has a defect. A method of inspecting an average line width may also be performed by calculating an average distance, instead of the shortest distance.

The curvilinear-shaped patterns are composed of a plurality of line-shaped patterns that have different line widths in general. In addition, the curvilinear-shaped patterns are used for connection of circuits. From the above reasons, the method of inspecting the minimum line width is more suitable than the method of inspecting the line width that uses the allowable pattern deformation quantity.

Figure 87:
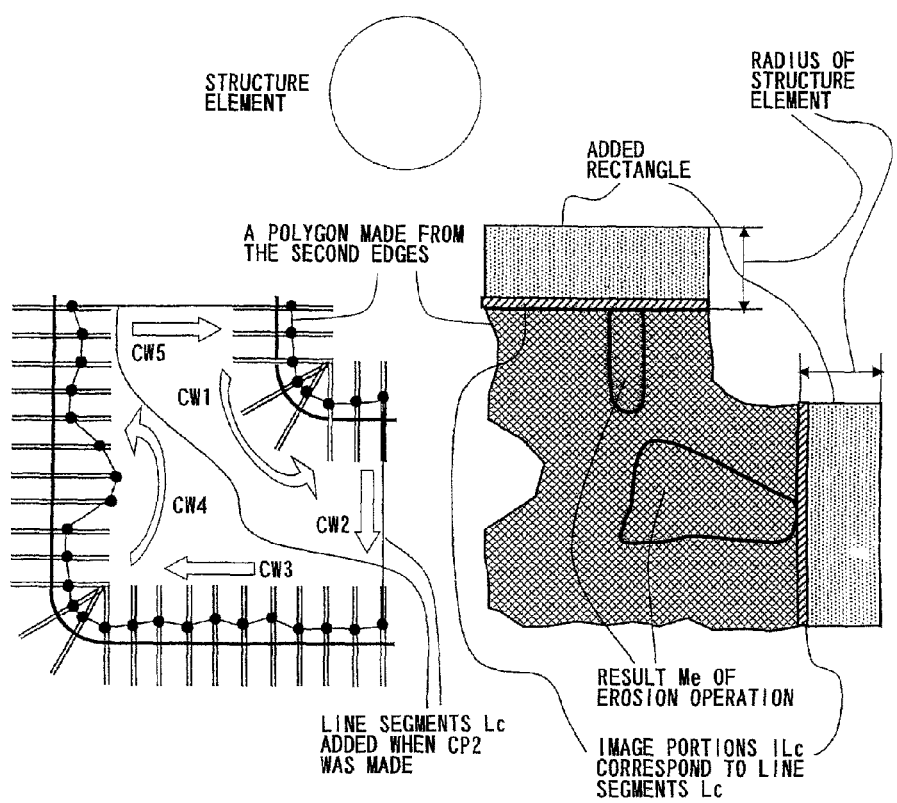
FIG. 87 is a schematic view showing a method of inspecting the minimum line width of a curvilinear-shaped pattern that is the corner part of the design data, using the erosion operation.

An alternative method in which the erosion operation is used can be used. The erosion operation is described in the above-mentioned 4.6.1 Method of recognizing defect having abnormal pattern deformation quantity. FIG. 87 is a schematic view showing a method of inspecting the minimum line width of the curvilinear-shaped pattern that is the corner part of the design data, using the erosion operation. A method of inspecting the minimum line width using the erosion operation is performed by the following procedure:

1. A polygon is made from the detected second edges on the lower left side and the detected second edges on the upper right side with all the detected second edges sequentially connecting clockwise or counterclockwise. In FIG. 87, all the detected second edges are connected sequentially clockwise by line segments as shown by arrows CW1-CW5.

2. The above polygon is transformed into a binary bitmap (a grid-like part in FIG. 87).

3. Rectangles having a width equal to a radius of a structure element, which is used in the erosion operation, are attached to line segments $L_C$ that are added when the polygon CP2 was made (two rectangles shown by dotted parts in FIG. 87).

4. A result of the erosion operation on the above binary bitmap is obtained (the two regions Me surrounded with bold lines in FIG. 87). The structure element used in erosion operation is a circle whose diameter is an absolute value of the above-mentioned 3.3 Recipe data "2. The limits values of the negative side of the allowable pattern deformation quantity of a line width".

5. If portions $IL_C$ of the bitmap corresponding to the line segments $L_C$ are connected through the regions Me, it is recognized that a part corresponding to the reference pattern does not have a defect. However, in this case, the portions $IL_C$ corresponding to the line segments $L_C$ are not connected through the regions Me, and therefore it is recognized that this part has a defect.

As an equivalent process of the above-mentioned steps 1 through 5, the size-processing for the polygon shown by the arrows CW1-CW5 may be used. In this case, the line segments $L_C$ are not size-processed, and other line segments in the polygon are size-processed by a half of the absolute value of the above-mentioned 3.3 Recipe data "2. The limits values of the negative side of the allowable pattern deformation quantity of a line width" in order to shrink. If the size-processed polygon has line segments corresponding to both of the line segment $L_C$, it is recognized that a part corresponding to the reference pattern does not have a defect; otherwise it is recognized that this part have a defect.

Although, the above description is made for the method of inspecting the line width, a space width is inspected in the same manner.

According to these embodiments with regard to the region inspections, defect detection capability and defect recognition accuracy can be improved, because the above-mentioned region inspections use a plurality of edge information.

5.2.3 Method of Inspecting Part that is Liable to Cause Open or Bridge Defect

As a kind of the methods of inspecting the line width of the line-shaped pattern and the space width of the line-shaped pattern, a method of inspecting a part that is liable to cause an open or bridge defect can be used. FIG. 88 is a schematic view showing a method in which a part that is liable to cause an open or bridge defect is extracted. As shown on the right-hand side of FIG. 88, a part (shown by a rectangle γ) of a line-shaped pattern of design data, whose line width is narrower than the above-mentioned 3.3 Recipe data "5. The maximum line width Bw of a part that is liable to cause an open defect", and whose length is shorter than the above-mentioned 3.3 Recipe data "5. The maximum line length Bl of a part that is liable to cause an open defect", is extracted.

The extracted part (shown by the rectangle γ) means a part that is liable to cause open, and the part is set as a reference pattern. The second edge detection is performed with regard to a line segment α and a line segment β, which are both sides of the rectangle γ, in the same manner shown in FIG. 84. The line segment β has corner roundness. Therefore, without using the average line width, an individual line width is inspected.

Similarly, with regard to the part that is liable to cause a bridge defect, as shown on the right-hand side of FIG. 88, a rectangle ζ obtained by using the above-mentioned 3.3 Recipe data "5. The maximum space width Sw of a part that is liable to cause a bridge defect" and 3.3 Recipe data "5. The maximum space length Sl of a part that is liable to cause a bridge defect" is set as the part that is liable to cause bridge, and the space width is inspected.

Figure 89:
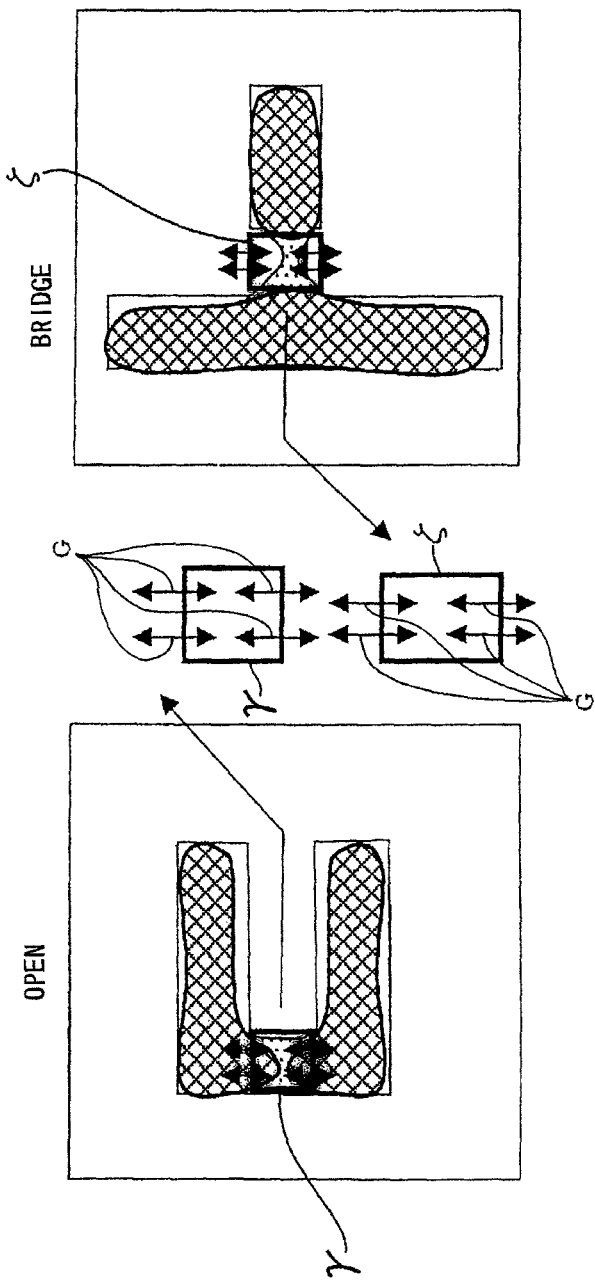
FIG. 89 is a schematic view showing a procedure for inspecting a part that is liable to cause open or bridge.

An alternative method of inspecting a part that is liable to cause an open or bridge defect is performed by the following procedure as shown in FIG. 89:

The left-hand side of FIG. 89 shows schematically a method of inspecting a part that is liable to cause an open defect, and the right-hand side of FIG. 89 shows schematically a method of inspecting a part that is liable to cause a bridge defect. Patterns shown by bold lines in FIG. 89 are the same as the rectangle γ and the rectangle ζ of FIG. 88. Parts of an image of a pattern to-be-inspected corresponding to grid-like parts of FIG. 89 have a high contrast to the ground; however, parts of the image of the pattern to-be-inspected corresponding to a dotted part have a low contrast to the ground. The dotted part of the left-hand side of FIG. 89 shows open state, and the dotted part of the right-hand side of FIG. 89 shows bridge state.

In such cases, three kinds of edges exist. One of them is an edge that exists in a boundary between the ground and the grid-like parts, another is an edge that exists in the boundary between the ground and the dotted part, and the remaining one is an edge that exists in a boundary between the grid-like parts and the dotted part. In the case of the open defect as shown on the left-hand side of FIG. 89, the edges existing in the boundary between the ground and the dotted part are detected so that a defect cannot be detected. Further, in the case of the bridge defect as shown on the right-hand side of FIG. 89, the edges existing in the boundary between the grid-like parts and the dotted part are detected so that a defect cannot be detected. In either case, a defect existing in the dotted part can be detected in the following manner:

It is inspected whether the second edge exists or not in the eight sections (shown by G) included in the rectangle γ and the rectangle ζ in the direction shown by arrows. The second edge should not exist in these eight sections. Therefore, if the second edge is detected in these eight sections, the rectangle γ or the rectangle ζ is recognized as a defect.

According to this embodiment, an open or bridge defect observed as a weak contrast can be detected. Further, the defect-class having information of an open or bridge defect can be set.

According to these embodiments with regard to the region inspections, inspection for a wide area that cannot be inspected by an operator can be performed.

5.3 Method of Inspecting Patterns Requiring Signal Intensity Correction

In the above-mentioned 4.6 The first inspection and the above-mentioned 4.12 The second inspection, a pattern to-be-inspected is inspected individually. However, in some cases, a distance between two edges of a pattern to-be-inspected is observed to be narrower than the actual width, or to be wider than the actual width due to phenomena caused by a variation in generation rate of charged particles and a variation in capture rate of secondary charged particles. These phenomena appear in parts of patterns to-be-inspected corresponding to proximate line segments and remote line segments of a reference pattern. The proximate line segments are defined as line segments that face each other closest together with a distance between them shorter than a predetermined distance. The remote line segments are defined as line segments that face each other closest together with a distance between them longer than a predetermined distance.

For example, in some cases, a distance between two edges corresponding to the proximate line segments is observed to be wider than the actual width, or a distance between two edges corresponding to the remote line segments is observed to be narrower than the actual width. According to this embodiment, positions of the proximate/remote line segments are corrected and allowable deformation quantities of the proximate/remote line segments are set to different values from those of other line segments of the reference pattern to cancel these phenomena.

Further, in some cases, a distance between two edges corresponding to the remote line segments is shorter than a distance between those in design data, due to a variation in process condition. However, an electrical property of a semiconductor device is not necessarily affected by this shorter distance. In such cases, the allowable deformation quantities of the remote line segments are made larger to neglect the shorter distance.

Figure 90:
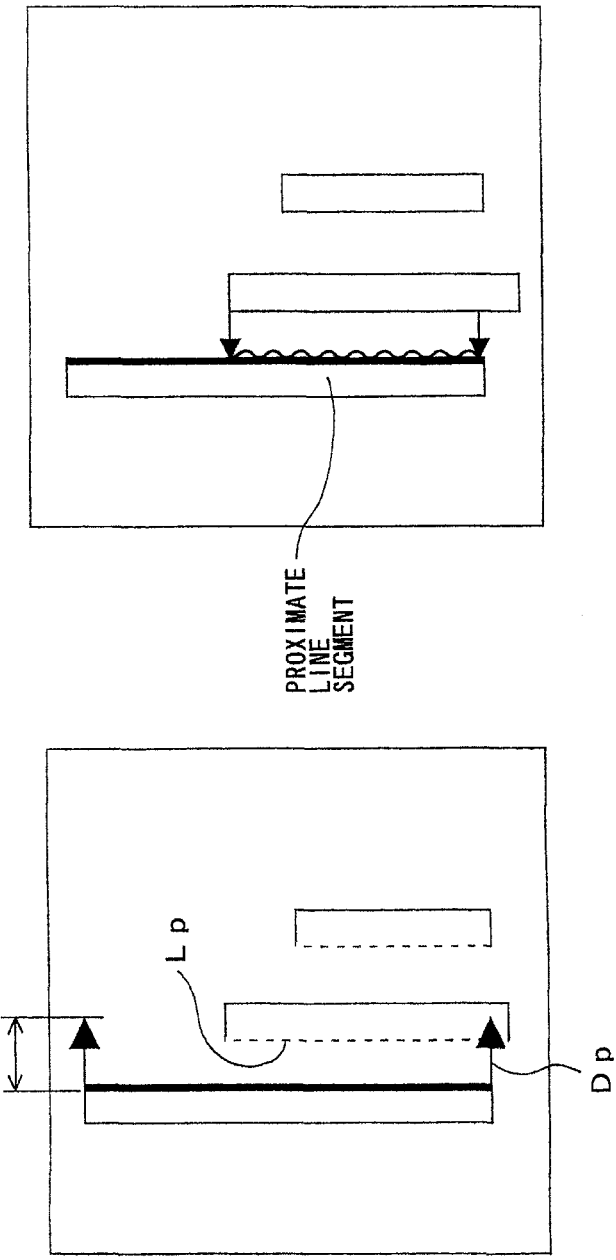
FIG. 90 is a schematic view showing a method of extracting proximate line segments, which are defined as line segments which face each other closest together with a distance between them shorter than a predetermined distance, from reference patterns.

FIG. 90 is a schematic view showing a method of extracting proximate line segments from reference patterns. The maximum distance between the proximate line segments that requires correction is taken as Dp. First, line segments close to the one shown by a bold line on the right-hand side of a left rectangle in the left frame of FIG. 90 are obtained. Line segments to be obtained face the line segment shown by the bold line, exist in the rightward direction, and correspond to line segments for forming the left sides of the reference patterns (shown by dotted lines in the left frame of FIG. 90). Next, the line segment Lp (shown by the dotted line) being a part of a central rectangle is selected, because the line segment Lp is located within the distance Dp from the bold line. Finally, the selected line segment Lp is projected on the line segment (shown by the bold line), and an overlapping part is recognized as a proximate line segment to be corrected (shown by a wavy line in the right frame of FIG. 90).

With regard to the proximate line segment, the correction of the position of the line segment is made, and the allowable pattern deformation quantity is set to a different value from those of other line segments. In this case, the position correction quantity or the allowable pattern deformation quantity may be variable according to the distance.

Figure 91:
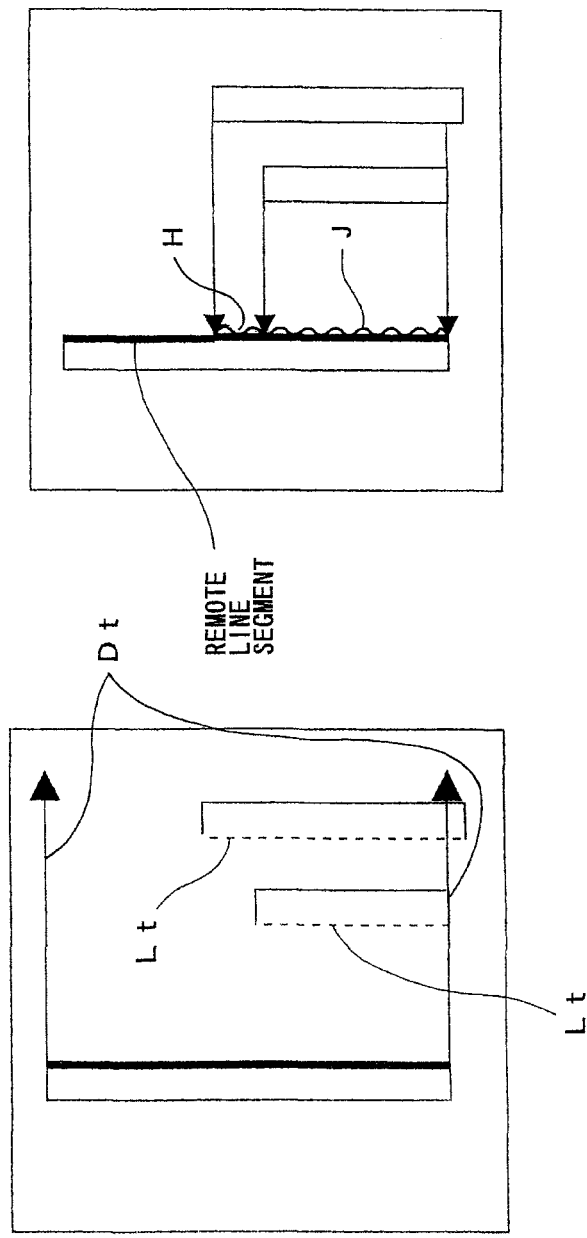
FIG. 91 is a schematic view showing a method of extracting remote line segments, which are defined as line segments which face each other closest together with a distance between them longer than a predetermined distance, from reference patterns.

FIG. 91 is a schematic view showing a method of extracting remote line segments from reference patterns. The minimum distance between the remote line segments that requires correction is taken as Dt. First, line segments close to the one shown by a bold line on the right-hand side of a left rectangle in the left frame of FIG. 91 are obtained. Line segments to be obtained face the line segment shown by the bold line, exist in the rightward direction, and correspond to line segments for forming the left sides of reference patterns (shown by dotted lines in the left frame of FIG. 91).

Next, line segments Lt (shown by the dotted lines) are selected, because they are located within the distance Dt from the bold line. Finally, the selected line segments Lt are projected on the line segment (shown by the bold line), and an overlapping part is recognized as a line segment not to be corrected (shown by a wavy line in the right frame of FIG. 91). Finally, the line segment that is a part of the line segment shown by the bold line and is not a part shown by the wavy line is recognized as a remote line segment.

Also with regard to the remote line segment, the correction of the position of the line segment is made, and the allowable pattern deformation quantity is set to a different value from those of other line segments. In this case, the position correction quantity or the allowable pattern deformation quantity may be variable according to the distance. For example, the case where a position correction quantity for a part H is set to a smaller quantity than the position correction quantity for the obtained remote line segment and a position correction quantity for the part J is set to zero can be used.

According to this embodiment, by correcting the position of the line segment of the reference pattern or setting the allowable pattern deformation quantity individually, these effects of the above-mentioned phenomena can be reduced.

5.4 Method of Inspecting Overlay Error 5.4.1 Method of Inspecting Overlay Error Between Pattern to-be-Inspected and Pattern of Preceding Process As an inspection method which can be used for the case where there is a pattern of a lower layer formed in the preceding process of a process at the time of the inspection beneath a pattern to-be-inspected, a method of inspecting overlay error between a pattern to-be-inspected and a pattern of the preceding process of the process at the time of the inspection can be used.

Figure 92:
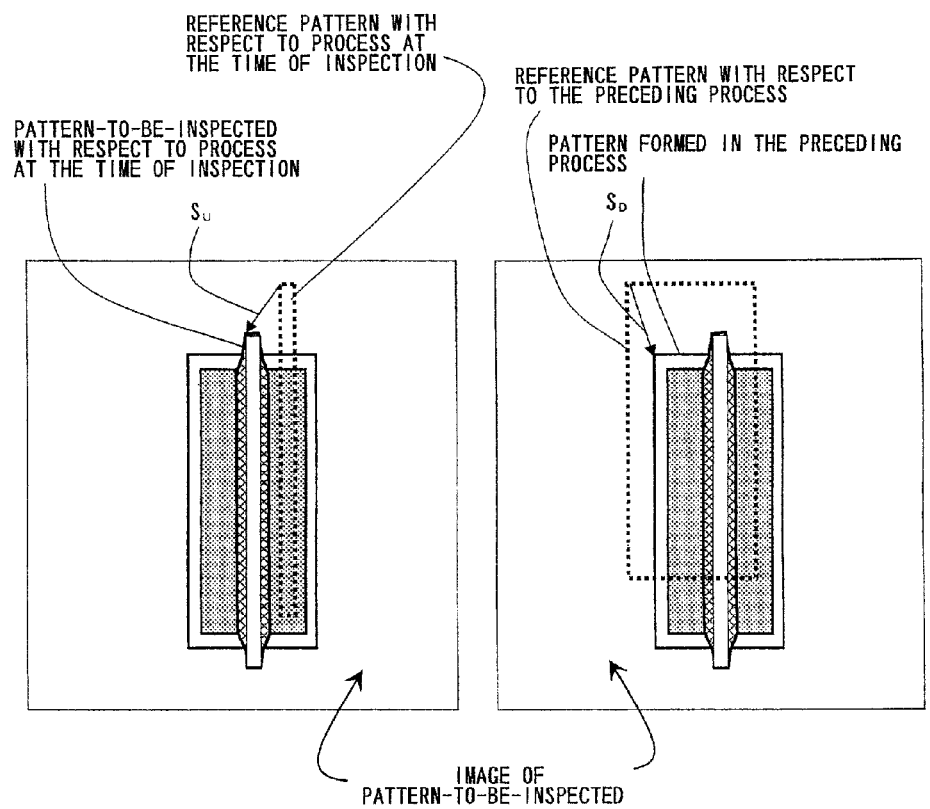
FIG. 92 is a schematic view showing an example of an image of a pattern to-be-inspected, a reference pattern with regard to a process at the time of the inspection, and a reference pattern with regard to the preceding process of the process at the time of the inspection.

In this embodiment, a reference pattern with regard to a process at the time of the inspection, and a reference pattern with regard to the preceding process of the process at the time of the inspection are used. FIG. 92 is a schematic view showing an example of an image of a pattern to-be-inspected, a reference pattern with regard to a process at the time of the inspection, and a reference pattern with regard to the preceding process of the process at the time of the inspection.

First, matching is performed by using the reference pattern with regard to the process at the time of the inspection, the reference pattern with regard to the preceding process of the process at the time of the inspection, and the image of the pattern to-be-inspected. Generally, an edge placement error, which is called the overlay error, exists between the pattern formed in the process at the time of the inspection and the pattern formed in the preceding process of the process at the time of the inspection. Next, a shift quantity $S_3$, which is described in the above-mentioned 4.12 The second inspection, is calculated by using the reference pattern with regard to the process at the time of the inspection and the image of the pattern to-be-inspected. The obtained shift quantity $S_3$ is taken as a shift quantity $S_U$. A shift quantity $S_D$ is calculated by using the reference pattern with regard to the preceding process of the process at the time of the inspection and the image of the pattern to-be-inspected in the same manner. Finally, a difference between the shift quantity $S_U$ and the shift quantity $S_D$ is taken as the overlay error quantity.

According to this embodiment, overlay error distribution of the entire semiconductor device can be obtained by calculating the overlay error for each inspection unit area in the entire semiconductor device. Conventionally, the overlay error is controlled by measuring limited areas in the semiconductor device, and therefore the local overlay error caused by a stepper aberration or the like cannot be controlled. However, according to this embodiment, the obtained overlay error distribution of the entire semiconductor device can be used for controlling the local overlay error over the entire semiconductor device.

Figure 93A:
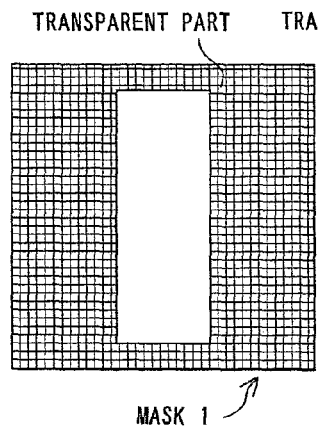
FIGS. 93A, 93B, 93C, and 93D are schematic views showing a method of fabricating a gate by the double exposure method.
Figure 93B:
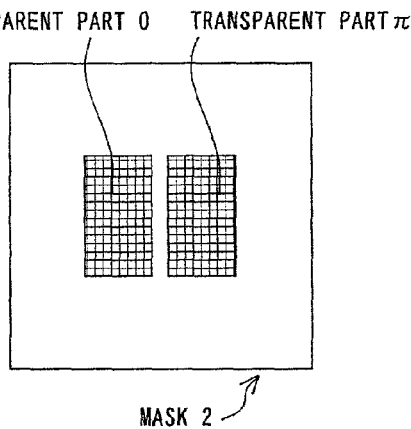

5.4.2 Method of Inspecting Overlay Error of Pattern to-be-Inspected Fabricated by Double Exposure Method FIGS. 93A, 93B, 93C, and 93D are schematic views showing a method of fabricating a gate by the double exposure method. A mask 1 shown in FIG. 93A is a binary mask or a half-tone phase shift mask. The mask 1 is used for fabricating a gate wiring, which is wider than a gate part. A mask 2 shown in FIG. 93B is an alternating aperture phase shift mask. Because a phase of a transparent part 0 in the mask 2 and a phase of a transparent part π in the mask 2 have inverted relationship, a part between the transparent part 0 and the transparent part π is exposed in high resolution. A gate part is fabricated by using the part between the transparent part 0 and the transparent part π.

Figure 93C:
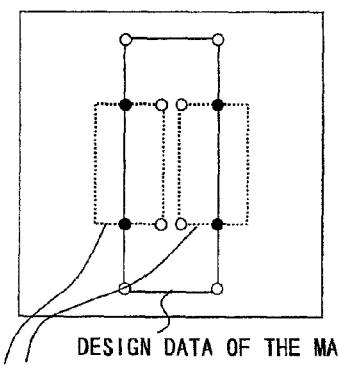
Figure 93D:
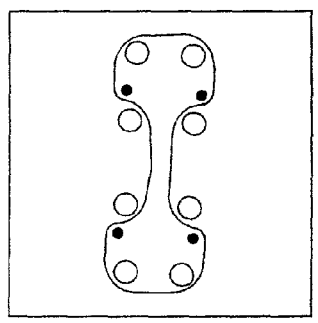

The double exposure method means a method in which a gate wiring and a gate part are exposed by double exposures that are an exposure by using the mask 1 and an exposure by using the mask 2. Part exposed by either transparent part of the mask 1 or transparent part of the mask 2 or both of those becomes ground of a pattern to-be-inspected. Specifically, a part corresponding to results of the Boolean OR operation on design data of the mask 1 and design data of the mask 2 as shown in FIG. 93C becomes ground of a pattern to-be-inspected. FIG. 93D is a schematic view showing the pattern to-be-inspected formed on a wafer by the double exposure method.

Figure 94A:
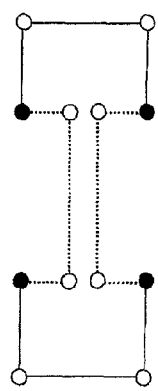
FIGS. 94A and 94B are schematic views showing an example of a reference pattern used in inspection of the pattern to-be-inspected fabricated by the double exposure method.
Figure 94B:
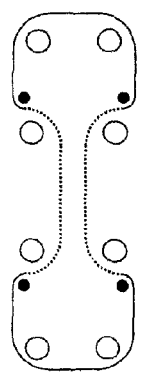

FIGS. 94A and 94B are schematic views showing an example of a reference pattern used in inspection of the pattern to-be-inspected fabricated by the double exposure method. The reference pattern used in inspection of a pattern to-be-inspected fabricated by the double exposure method is created by the following procedure:

1. Result of the Boolean OR operation on the design data of the mask 1 shown in FIG. 93C and the design data of the mask 2 shown in FIG. 93C is obtained as shown in FIG. 94A. Straight lines shown in FIG. 94A represent lines in the design data of the mask 1, and dotted lines shown in FIG. 94A represent lines in the design data of the mask 2. Neighboring portions of solid circles (●) shown in FIG. 94A correspond to corners with regard to vertices created by the Boolean OR operation. Neighboring portions of open circles (○) shown in FIG. 94A correspond to other corners.

2. Corners of a polygon, which is the obtained result of the Boolean OR operation, are corrected to be close to the pattern to-be-inspected by applying a circle, an ellipse, a straight line, or a curve described by other methods to the corner parts as described in the above-mentioned 3.2 Reference pattern.

If the same circles as the circles, which are applied to the other corners, are applied to the corners with regard to the vertices created by the Boolean OR operation, nuisance defects are detected. The reason is that the corner round of the other corner is caused by an effect with regard to the OPC, however, the corner round of the corners with regard to the vertices created by the Boolean OR operation is caused by summations of intensities of double exposures.

In order to solve this problem, the corners with regard to the vertices created by the Boolean OR operation are corrected to be close to the pattern to-be-inspected by applying a circle, an ellipse, a straight line, or a curve described by other methods, which are different from those applied to the other corners. Specifically, a radius of the circles applied to the corners, which is neighboring portions of solid circles (●) shown in FIG. 94A, with regard to the vertices created by the Boolean OR operation is made smaller than a radius of the circles applied to other corners, which are neighboring portions of open circles (○) shown in FIG. 94A. FIG. 94B is a schematic view showing examples of circles applied to corners.

Figure 95A:
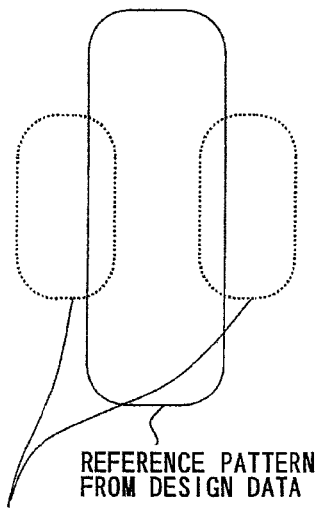
FIGS. 95A and 95B are schematic views showing an example of a reference pattern created by a method in which a result of the Boolean OR operation on a reference pattern created from design data of a mask 1 and a reference pattern created from design data of a mask 2 is used for a reference pattern.
Figure 95B:
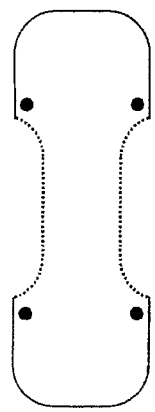

As an alternative method, a method in which a result of the Boolean OR operation on a reference pattern created from the design data of the mask 1 and a reference pattern created from the design data of the mask 2 is used for a reference pattern, can be used. FIGS. 95A and 95B are schematic views showing an example of a reference pattern created by the above method. Circles applied to a reference pattern created from the design data of the mask 2 shown in FIG. 95A and lines of a reference pattern created from the design data of the mask 1 shown in FIG. 95A intersect. If the method used in FIGS. 94A and 94B is used for this case, the circles applied to the reference pattern created from the design data of the mask 2 cannot be split correctly. By using this method, a result of the Boolean OR operation on the reference pattern created from the design data of the mask 1 and the reference pattern created from the design data of the mask 2 is obtained as a reference pattern, as shown in FIG. 95B. Corner round can be more correctly represented by using this method, than by using the method used in FIGS. 94A and 94B. In addition, circles are applied to the corners with regard to the vertices created by the Boolean OR operation in the same manner as the method used in FIG. 94.

Figure 96A:
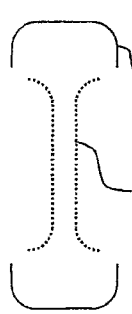
FIGS. 96A and 96B are schematic views showing a method of inspecting an overlay error of a pattern to-be-inspected fabricated by the double exposure method.
Figure 96B:
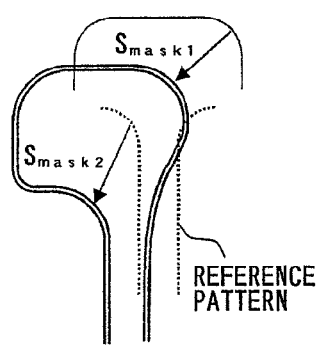

An overlay error between part of the pattern to-be-inspected exposed by using the mask 1 and part of the pattern to-be-inspected exposed by using the mask 2 is inspected by the same method as the above-mentioned 5.4.1 Method of inspecting overlay error between pattern to-be-inspected and pattern of preceding process. In this method, the following parts are different from the above-mentioned 5.4.1 Method of inspecting overlay error between pattern to-be-inspected and pattern of preceding process:

FIGS. 96A and 96B are schematic views showing a method of inspecting the overlay error of the pattern to-be-inspected fabricated by the double exposure method. A shift quantity $S_{mask1}$ is obtained by using the lines and the circles of the reference pattern created from the design data of the mask 1, instead of using the reference pattern with regard to a process at the time of the inspection. In the same manner, a shift quantity $S_{mask2}$ is obtained by using the lines and circles of the reference pattern created from the design data of the mask 2, instead of using the reference pattern with regard to the preceding process of the process at the time of the inspection. A difference between the shift quantity $S_{mask1}$ and the shift quantity $S_{mask2}$ is taken as the overlay error quantity. In addition, the circles applied to the corners with regard to the vertices created by the Boolean OR operation are not used, because the circles are fabricated by both of the exposure using the mask 1 and the exposure using the mask 2.

According to this embodiment, overlay error distribution can be obtained by obtaining overlay error of a pattern to-be-inspected fabricated by double exposure method, and the obtained overlay error distribution can be used for controlling the local overlay error over the entire semiconductor device. Further, nuisance defect can be reduced by using a reference pattern, which is made by applying corner round to a polygon that is obtained by the Boolean OR operation on the polygons in the design data with regard to the double exposures. In this case, a radius of circles applied to corners with regard to vertices created by the Boolean OR operation is made smaller than a radius of circles applied to other corners. Furthermore, although complex calculation and calculation cost are required, corner round can be represented more correctly by using a result of the Boolean OR operation on reference patterns obtained from the design data with regard to the double exposures.

5.5 Inspection Method in which Contours are Used 5.5.1 Die-to-Die Comparison Method in which Contours are Used The conventional die-to-die comparison method is performed by comparing corresponding two images. In this method, it is necessary for luminance values of pixels to be interpolated so that the two images have the same relationship between a pattern to-be-inspected and pixel boundaries. However, in this embodiment, edges of the two images are compared, and therefore interpolation of luminance value is not necessary. Consequently, inspection accuracy is improved.

Figure 97:
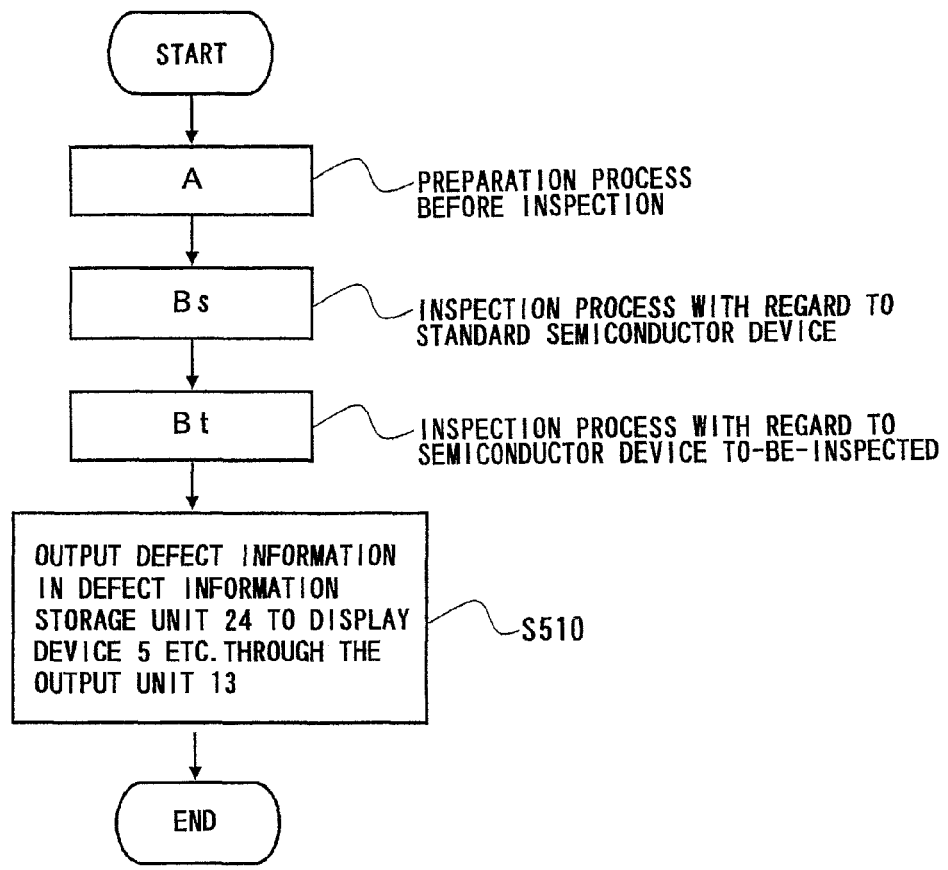
FIG. 97 is a flowchart showing a die-to-die comparison method in which contours are used.

FIG. 97 is a flowchart showing a die-to-die comparison method in which contours are used. FIG. 97 is made based on FIG. 27. A block A of FIG. 97 is identical to the block A of FIG. 26, and is a preparation process before the inspection. A block Bs of FIG. 97 shows an inspection process of an inspection area with regard to a standard semiconductor device. The block Bs of FIG. 97 is identical to the block B of FIG. 26 except for the following steps:

1. Instead of performing the step S336 (the second inspection), a contour is obtained from the standard semiconductor device. Hereafter, this processing is called step S336-1.
2. Instead of performing the step S338 (outputting the defect information to the defect information storage unit 24), the contour obtained by step S336-1 is outputted to the defect information storage unit 24. Hereafter, this processing is called step S338-1.

A block Bt of FIG. 97 shows the inspection process of the inspection area with regard to a semiconductor device to-be-inspected. The block Bt of FIG. 97 is identical to the block B of FIG. 26 except for the following steps:

3. Instead of performing the step S336 (the second inspection), the detected second edge is compared with the stored contour in the defect information storage unit 24. Hereafter, this processing is called step S336-2.

Step S510 (the defect information in the defect information storage unit 24 is outputted to the display device 5 and the printer 6 through the output unit 13) is identical to the step S410 except for outputting a result of the die-to-die comparison method as the defect information.

FIG. 98 is a schematic view showing a die-to-die comparison method in which contours are used. The inspection-unit-areas in the step S340 are obtained by dividing the inspection area represented by the coordinate system used in the design data, and the inspection-unit-areas in each semiconductor device are inspected. The inspection-unit-areas of this embodiment are inspection-unit-areas G1 through G8 of the standard semiconductor device and inspection-unit-areas H1 through H8 of the semiconductor device to-be-inspected. The inspection-unit-areas G1 through G8 correspond to the inspection-unit-areas H1 through H8, respectively.

First, the steps S336-1 and S338-1 will be described. The Block A and the steps S308 through S332 in the Block Bs are performed. The second edges are detected from the inspection-unit-area G1 of the standard semiconductor device by the step S334 (the second edge detection). The detected second edges are connected in the detection order for obtaining a polygon, and the obtained polygon is used as a contour (the step S336-1). The obtained contour is outputted to the defect information storage unit 24 (the step S338-1).

The same processing is applied for the inspection-unit-areas G2 through G4 successively. The standard semiconductor device means a semiconductor device having good quality that is judged by using another inspection method. By the above processing, the inspection process of the inspection area with regard to the standard semiconductor device is completed.

Next, the steps S336-2 will be described. The steps S308 through S332 in the Block Bs are performed. The second edges are detected from the inspection-unit-area H1 of the semiconductor device to-be-inspected by the step S334 (the second edge detection). The detected second edges are compared with the stored contour with regard to the inspection-unit-area G1 in the defect information storage unit 24 (the step S336-2).

The same processing is applied for the inspection-unit-areas H2 through H4 successively. By the above processing, the inspection process of the inspection area with regard to the semiconductor device to-be-inspected is completed.

FIG. 99 is a schematic view showing a method of comparing the contour with the second edge. In the case where the two images have the same pixel intervals and the method in which directions and positions for acquiring the profiles are set beforehand by using the second reference pattern is used, a distance D between an edge $E_{DT}$ and an edge $E_{DS}$ is calculated. The edge $E_{DT}$ is an edge detected from a profile acquisition section of the semiconductor device to-be-inspected, and the edge $E_{DS}$ is an edge detected from the profile acquisition section of the standard semiconductor device. Those profile acquisition sections exist in the same position. The edge $E_{DS}$ is a vertex of the stored contour.

In the case where the calculated distance D is larger than a predetermined distance, which is an allowable pattern deformation quantity of the die-to-die comparison inspection, it is judged that a part corresponding to the profile acquisition section has a defect. The allowable pattern deformation quantity of the die-to-die comparison inspection can be set for all the attributes of a reference pattern, or allowable deformation quantities can be set for the respective attributes of a reference pattern.

Figure 100:
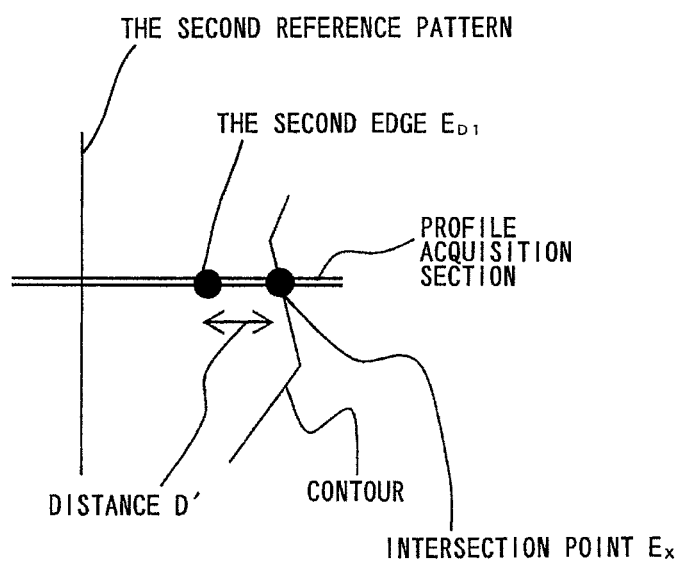
FIG. 100 is another schematic view showing a method of comparing a contour with the second edge.

FIG. 100 is a schematic view showing an alternative method of comparing the contour with the second edge. In the case where two images have different pixel intervals or the method in which the profile acquisition sections are adaptively set after detecting the first edges is used, profile acquisition sections do not exist in the same position. In this case, an intersection point $E_X$ of the contour with the profile acquisition section is obtained, a distance D' between the second edge $E_{DT}$ and the intersection point $E_X$ is calculated, and the above-mentioned method is performed by using the distance D' instead of using the distance D.

In the above, the contour obtained from the standard semiconductor device is used for the inspection. However, a simulator obtains a contour that corresponds to the pattern to-be-inspected, and the obtained contour may be used. In addition, in the case of inspecting periodical patterns such as part of a memory, a contour obtained from the periodical patterns or a contour corresponding to the periodical patterns obtained by a simulator may be used. As an alternative method, a process controlling method, in which a contour of a semiconductor device having good quality at the starting time of fabrication is stored, and the second edge of a semiconductor device that is being fabricated is compared with the stored contour, can be used.

According to this embodiment, the die-to-die comparison inspection, in which contours of patterns to be-inspected are used, can be performed with sub pixel accuracy, and can be performed by using a contour of one image of a pattern to-be-inspected, whose pixel interval is different from a pixel interval of an image of another pattern to-be-inspected, or a contour obtained by a simulator, or the like. Further, a process controlling method in which a contour of a semiconductor device having good quality at the starting time of fabrication is used can be realized.

5.5.2 Inspection Method in which Deformation Quantities for Every Pattern to-be-Inspected are Used In the above-mentioned 5.5.1 Die-to-die comparison method in which contours are used, the method, in which the inspection is performed for every profile acquisition section, is described. However, by using such local inspection method, deformation for every pattern to-be-inspected cannot be inspected. In order to solve this problem, an inspection method in which deformation quantities for every pattern to-be-inspected are used can be used. In this method, the following parts are added to the steps in 5.5.1 Die-to-die comparison method in which contours are used.

1. In the step S336-1, when the contour is obtained from the standard semiconductor device, statistics of deformation quantities for every pattern to-be-inspected are obtained from the standard semiconductor device.

2. In the step S338-1, when the contour, which is obtained by the step S336-1, is outputted to the defect information storage unit 24, the statistics of the deformation quantities for every pattern to-be-inspected, which are obtained by the step S336-1, also are outputted.

3. In the step S336-2, after the detected second edge is compared with the contour stored in the defect information storage unit 24, the following procedure is added. Statistics of deformation quantities for every pattern to-be-inspected are obtained from the semiconductor device to-be-inspected. The statistics of the deformation quantities obtained from the standard semiconductor device are read from the defect information storage unit 24. Then, the obtained statistics of deformation quantities are compared with the statistics of the deformation quantities obtained from the standard semiconductor device.

For calculating the above statistics of deformation quantities, the vectors d(x,y) between the two edges that correspond, which are described in the above-mentioned 4.8 Pattern deformation quantities obtained from the whole inspection-unit-area, can be used. The vector d(x,y) means an edge placement error. In addition, the individual line widths, which are described in the above-mentioned 5.2.1 Methods of inspecting line width, average line width, space width of line-shaped pattern, can be used. If line widths of a curvilinear-shaped pattern are constant, the line widths, which are described in the above-mentioned 5.2.2 Methods of inspecting line width, average line width, space width, and average space width of curvilinear-shaped pattern, can be used. The following items are examples of the statistics of the deformation quantities:

1. An average value <d> of the edge placement errors of the pattern to-be-inspected is defined by the following equation:

$$<d> = \frac{1}{N}\sum_{k=0}^{N-1} d(k)$$

where

N: the number of the edge placement errors of the pattern to-be-inspected d(k): the k-th edge placement error FIG. 101 is a schematic view showing edge placement errors of a pattern to-be-inspected. The value of the k-th edge placement error d(k) in FIG. 101 is a length of the vectors d(x,y) between the two edges that correspond, which is described in the above-mentioned 4.8 Pattern deformation quantities obtained from the whole inspection-unit-area.

2. A 3-sigma (three times standard deviation) 3σEPE of the edge placement errors of the pattern to-be-inspected is defined by the following equation:

$$3\sigma EPE = 3\sqrt{\frac{1}{N}\sum_{k=0}^{N-1} d(k)^2}$$

3. A power spectrum of the edge placement errors of the pattern to-be-inspected is defined by absolute values of frequency components G(n).

$$G(n) = \frac{1}{N}\sum_{k=0}^{N-1} d(k) W^{nk}$$

where

W: a twiddle factor $\exp(-2\pi i/N)$

4. An autocorrelation R(s) of the edge placement errors of the pattern to-be-inspected is defined by the following equation:

$$R(s) = \frac{\sum_{k=0}^{N-1}(d(k) - <d>)(d((k+s)\bmod N) - <d>)}{\sum_{k=0}^{N-1}(d(k) - <d>)^2}$$

5. A 3-sigma (three times standard deviation) 3σLWE of the line widths of the pattern-to-be-inspected is defined by the following equation:

$$3\sigma LWE = 3\sqrt{\frac{1}{N}\sum_{k=0}^{N-1}(w(k) - w_{ref})^2}$$

where

N: the number of the line widths of the pattern to-be-inspected w(k): the k-th line width $w_{ref}$: a value of a line width of a reference pattern FIG. 102 is a schematic view showing line widths of a pattern to-be-inspected. Each line width w(k) is obtained by using the reference pattern, which is described in the above-mentioned 5.2.1 Methods of inspecting line width, average line width, space width, and average space width of line-shaped pattern. In the case of the line-shaped pattern, a distance between the edge and the edge on the opposite side is the line width w(k). Each line width w(k) is obtained by using the reference pattern, which is described in the above-mentioned 5.2.2 Methods of inspecting line width, average line width, space width, and average space width of curvilinear-shaped pattern. In the case of the curvilinear-shaped pattern, the minimum distance between the edges facing each other is the line width w(k). In this case, the value of the line width of the reference pattern $w_{ref}$ should not depend on a location.

In the above, the inspection method in which the statistics of the deformation quantities are obtained from the standard semiconductor device is described. However, instead of obtaining the statistics of the deformation quantities from the standard semiconductor device, constant values, which are empirically determined, can be used.

In order to obtain repeatability of the statistics of the deformation quantities, a variation in the measurement values caused by measurement should be counterbalanced. As the variation in the measurement values, dilation of line widths due to adhering carbon contamination or shrinkage of line widths due to shrinking of an ArF resist may be caused. The following methods of counterbalancing the variation in the measurement values can be used:

1. Method 1 of Counterbalancing

A constant value is added to the edge placement errors d(k) obtained from the second measurement, so that the average value <d> of edge placement errors obtained from the second measurement is equivalent to the average value <d> of edge placement errors obtained from the first measurement. In measurement after the second measurement, the same method is used.

2. Method 2 of Counterbalancing

The average value <d>i of the edge placement errors is obtained from every measurement. The suffix i means the number of measurements, which have already been performed. The obtained edge placement errors <d>i are approximated by straight line by using the least square method, and the following equation is obtained.

$$f(i)=a \cdot i + b$$

where f(i): the average value of the edge placement errors obtained from the approximation a, b: the obtained coefficients The variation in the measurement values of the edge placement errors <d>i is counterbalanced with a value of a·i.

3. Method 3 of Counterbalancing

The same method as the method 2 of counterbalancing, except for using a value that is empirically determined instead of the above-mentioned coefficient 'a', is performed.

In order to obtain power spectrum and autocorrelation of edge placement errors existing in a line part of a pattern-to-be-inspected, it is necessary to perform the clipping process to the edge placement errors existing in the line part by using a window function or the like. However, according to this embodiment, because the edge placement errors going round the pattern-to-be-inspected are used, the clipping process is not necessary.

Further, because the edge placement errors existing in a larger part than the line part are used to obtain statistics of the deformation quantities, information having less error can be obtained and efficient information, such as information with regard to a curvilinear part, can be obtained. Furthermore, repeatability of the statistic values of the deformation quantities can be obtained by counterbalancing a variation in the measurement values caused by measurement.

5.5.3 Method of Correcting Contour and Methods of Reducing Noise on Contour

As described in the above-mentioned 4.11 The second edge detection, the second edges in the above-mentioned 5.5.1 Die-to-die comparison method in which contours are used exist in the different positions from positions where the edges should be detected ideally. For example, in the case of using the coefficient k in FIG. 76 equal to 0.5, the detected edge exists in the position shifted from the ideal position by the half of the electron beam spot size in the outward direction of the pattern to-be-inspected. In the case of comparing contours, which are obtained from images acquired by using different electron beam spot sizes, the die-to-die comparison should be applied after correcting the edge shift quantity caused by the electron beam spot size.

The edge shift quantity $W_{beam}$ caused by the electron beam spot size is obtained by the following equation:

$$W_{beam}=(W_{measure}-W_{standard})/2$$

where a line width $W_{standard}$ means a standard line width and a line width $W_{measure}$ means a line width obtained by measuring a pattern to-be-inspected having a standard line width.

FIG. 103 is a schematic view showing a method of correcting a contour. As shown in FIG. 103, the second edge is shifted by the edge shift quantity $W_{beam}$ along the profile acquisition section in the inside direction (the opposite direction) of the pattern-to-be-inspected in order to cancel the edge shift quantity $W_{beam}$. Then a position of the shifted second edge is registered as a position of a vertex of a contour.

Next, a method of reducing a spike noise on a contour will be described. FIG. 104 is a schematic view showing a method of reducing a noise on a contour. A contour shown on the left-hand side of FIG. 104 by dotted lines has a spike noise. The spike noise has about one pixel width and about two or three pixel length. In order to reduce such a spike noise, a contour shown on the left-hand side of FIG. 104 by solid lines is obtained by applying the size-processing to the contour by a half of a pixel interval. Then, a contour shown on the right-hand side of FIG. 104 by solid lines is obtained by applying the Boolean OR operation on the applied contour. The obtained contour is a contour after noise reduction. Two triangles exist in a part of the contour shown on the left-hand side, the part corresponding to the outside of the contour shown by the solid lines on the right-hand side. In order to understand easily, the two triangles are shown in a large size, however, they are tiny so that they are ignored in practice.

In order to compensate for shrinkage of the contour after the noise reduction, it is necessary to apply the above method of correcting the contour before the noise reduction. The half of pixel interval is subtracted from the edge shift quantity $W_{beam}$, and the obtained quantity is used as the edge shift quantity, which compensates for the noise reduction.

As an alternative method, a method of reducing noise on a contour by using an average of distances between edges of the second reference pattern and the corresponding second edges of an image of a pattern to-be-inspected can be used. FIG. 105 is a schematic view showing a method of reducing noise on a contour by using an average position of the second edge, the preceding edge to the second edge, and the subsequent edge to the second edge. The average position means a position whose X and Y coordinate values are average values of the X and Y coordinate values of the three edges. The obtained average position is registered as a vertex of a contour. In this method, although a corner part of the contour does not have noise, a curvature of the corner part of the contour after reducing noise is different from a curvature of the corner part of the contour before reducing noise.

FIG. 106 is a schematic view showing a method of reducing noise on a contour by using an average of distances between edges of the second reference pattern and the corresponding second edges of an image of a pattern to-be-inspected. Although a vector between the two edges having the correspondence is shown by d(x,y) in 4.6 The first inspection, the vector is shown by d(k) in order to relate the vector to a vertex of a contour. 'k' means a sequential number of a vertex. In order to reduce noise of the second edge that is an end point of a vector d(0), the following calculation is performed by using vectors d(−1), d(0), and d(1):

$$(\text{len}(d(-1))+\text{len}(d(0))+\text{len}(d(1)))/3$$

where len is a function that returns a signed length of a vector. The sign is positive when the vector goes to the outside of a pattern to-be-inspected; and the sign is negative when the vector goes to the inside of a pattern to-be-inspected. A vector, which has a length same as the obtained length, a start point same as a start point of the vector d(0), and a direction same as a direction of the vector d(0), is the vector d(0) after reducing noise. An end point of the vector d(0) after reducing noise is the second edge after reducing noise.

In this method, a curvature of a corner part of the contour after reducing noise is not drastically different from a curvature of the corner part of the contour before reducing noise, because the lengths of the vectors used in the above calculation are measured from a curve applied to the corner part. The number of edges for average length may be 5, 7, or the other number. Further, the lengths of the vectors may be given weights. Furthermore, median value of the lengths or the like may be used, instead of the average lengths. In the case of using the median value of the lengths, it is efficient to reduce spike noise.

In this embodiment, the example in which lengths of the three edges are used is described; however, the FIR (Finite Impulse Response) filter should be used in order to obtain desired information. Specifically, the short FIR filter should be used for reducing noise having only high frequency component, and the long FIR filter should be used for reducing undulation caused by polymers in a resist.

According to this embodiment, because correction of the contour or reduction of spike noise on the contour can be performed by shifting edges, deterioration of the image of the pattern to-be-inspected caused by the image filter is not caused. As an alternative method, in the case where noise on the contour is reduced by using distances between edges of reference pattern and edges of the image of the pattern to-be-inspected, variation in curvature of corners can be minimized 5.6 Method of Grouping Gates Based on Space Widths of Reference Patterns A method of controlling OPC patterns of gates by using a line width and space widths on both sides of gates has been used. FIGS. 107A and 107B are schematic views showing examples of gates having different OPC patterns. Space widths on both sides of a gate existing in a central part of FIG. 107A are half of space widths on both sides of a gate existing in a central part of FIG. 107B, so that those gates have different OPC patterns. In such case, if each group of line widths, which are obtained by measuring gates having the same line width and the same space widths on both sides of the gates, is statistically analyzed, OPC patterns can be easily controlled.

FIG. 108 is a schematic view showing an example of a gate having different space widths on one side. Because space widths on both sides of this gate cannot be determined uniquely, OPC patterns of the gate cannot be controlled. In this case, the gate is divided by using the proximate line segments described in the above-mentioned 5.3 Method of inspecting patterns requiring signal intensity correction, so that the divided gates have unique space widths on both sides. FIG. 90 is a schematic view showing a method of extracting proximate line segments from reference patterns.

First, proximate line segments are obtained by using the method as described by using FIG. 90. The proximate line segments are defined as line segments that face each other closest together with a distance between them shorter than a predetermined distance. The distance between the line segments that face each other closest together is the space width. A minimum value of space widths in the case of states, which are regarded as isolation, is set to the maximum distance Dp between the proximate line segments that requires correction. Bold lines shown in FIG. 108 are obtained as proximate line segments, which have a space width $L_{S1}$, a space width $L_{S2}$, and a space width $L_{S3}$, respectively. Next, divided gates $G_{D1}$, $G_{D2}$, $G_{D3}$, and $G_{D4}$ are obtained, so that those have unique space widths on both sides, respectively. The divided gate $G_{D1}$ has isolation state on the left-hand side and the space width $L_{S1}$ on the right-hand side. The divided gate $G_{D2}$ has the space width $L_{S2}$ on the left-hand side and the space width $L_{S1}$ on the right-hand side.

A line width is measured for every divided gate. The line width obtained from the divided gate is statistically analyzed equally as much as a line width obtained from a gate being not divided.

According to this embodiment, a gate, which has different space widths on one side, is divided into parts having unique space widths on both sides, and a line width for every divided part of the gate is measured, so that whole gates can be controlled. In addition, although the method of grouping gates is described in this embodiment, the method of grouping may be applied for the methods of inspecting a line width, an average line width, a space width, and an average space width of line-shaped pattern.

5.7 Threshold Method, in which Luminance Value of Part of Image of Pattern to-be-Inspected Other than Part of the Profile is Used as Bottom of the Profile FIG. 109 is a schematic view showing bridge state of a pattern to-be-inspected, which is a negative pattern in a wiring layer. In this case, the bridge state can be detected by applying the above-mentioned 5.2.3 Method of inspecting part that is liable to cause open or bridge defect. Specifically, it is inspected whether the second edge exists or not in the direction shown by arrows in FIG. 109. However, in this method, it takes a long time to inspect the whole inside of the pattern to-be-inspected.

In order to solve this problem, the threshold method, in which a luminance value of a part of an image of a pattern to-be-inspected other than a part of the profile is used as a bottom of the profile, can be used. FIG. 110 is a schematic view showing the threshold method, in which a luminance value of a part of an image of a pattern to-be-inspected other than a part of the profile is used as a bottom of the profile, is used. A profile Fu in FIG. 110 is obtained from part having no defect. A profile Fd in FIG. 110 is obtained from part having bridge state. A peak Pu of the profile Fu is nearly equal to a peak Pd of the profile Fd, however, a bottom Bd of the profile Fd is brighter than a bottom Bu of the profile Fu.

In such case, if the threshold method, in which a threshold is equal to an average value of a peak and a bottom, is used, a threshold Td of the profile Fd is larger than a threshold Tu of the profile Fu. If an edge is detected by using the threshold Td, a position of the detected edges is nearly equal to a position of an edge detected from the profile Fu. In order to solve this problem, the bottom Bu should be used, instead of using the bottom Bd.

As described in the above-mentioned 2.2 Scan methods of image generation device, the intensity of the secondary electrons is observed with the lower level at the left edge in FIG. 5 where the electron beam starts scanning the pattern P to-be-inspected than at the right edge in FIG. 5 (the opposite edge) where the electron beam leaves the pattern P to-be-inspected. Therefore, a peak of a profile, which is the intensity of the secondary electrons, is different depending on a position. However, in the case where there is no pattern of a lower layer formed in the preceding process of a process at the time of the inspection beneath the pattern to-be-inspected, a bottom of a profile is not drastically different locally. For example, edge detection accuracy does not drastically deteriorate, even if the bottom Bu of the profile Fu existing in the neighborhood of the profile Fd is used, instead of the bottom Bd of the profile Fd.

FIG. 111 is a schematic view showing a method, in which a luminance value of a part of an image of a pattern to-be-inspected other than a part of the profile is used as a bottom of the profile. A solid line in FIG. 111 shows a reference pattern. The minimum value in luminance values of pixels existing in the reference pattern is taken as the bottom of the profile Fd from another part of the profile Fd. In the case where the reference pattern is large, it is necessary that the reference pattern is clipped by a rectangle, which is the neighborhood of the profile Fd, and the clipped reference pattern is used. In the case where profiles created by spatially accumulating profiles are used, a filter, which outputs the same results as the above accumulation, is applied to the luminance values of the pixels, and the minimum value in the luminance values of the pixels made by the filter are obtained. In this embodiment, the method of inspecting the defect that has the bridge state is described, however, a method of inspecting a defect that has open state can be used in the same manner.

Figure 112:
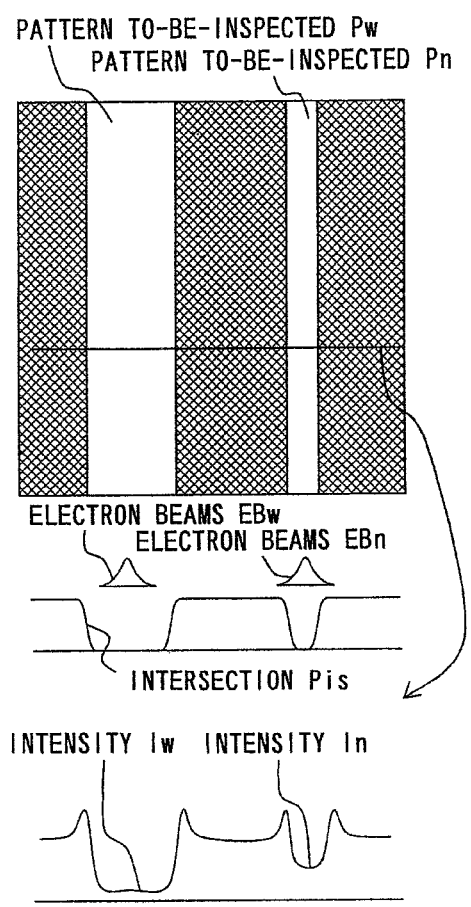
FIG. 112 is a schematic view showing intensities of secondary electrons obtained from a pattern to-be-inspected, which is a negative pattern in a wiring layer.

FIG. 112 is a schematic view showing intensities of secondary electrons obtained from a pattern to-be-inspected, which is a negative pattern in a wiring layer. A cross section Pis in FIG. 112 shows a cross section of the pattern to-be-inspected. As shown in FIG. 112, a line width of a pattern to-be-inspected Pw is larger than a line width of a pattern to-be-inspected Pn. Electron beams EBw are applied to a central part of the pattern to-be-inspected Pw to generate secondary electrons having intensity Iw. On the other hand, electron beams EBn are applied to a central part of the pattern to-be-inspected Pn to generate secondary electrons having intensity In. Because the whole electron beams EBn are not applied to the pattern to-be-inspected Pn, the intensity In of the secondary electrons is larger than the intensity Iw of the secondary electrons. Therefore, a method of obtaining a bottom of a profile from the pattern to-be-inspected Pw, which has the larger line width, is used.

According to this embodiment, bridge state of a pattern to-be-inspected, which is a negative pattern in a wiring layer, can be detected in higher speed. In addition, by obtaining a bottom of the profile from the pattern to-be-inspected, which is a negative pattern in a wiring layer and has the larger line width than the electron beam spot size, deterioration of defect detection accuracy of the pattern to-be-inspected, which is a negative pattern in a wiring layer and has the smaller line width than the electron beam spot size can be prevented.

5.8 Method of Correcting Profile by Using Inverse Filter

In the above-mentioned 5.7 Threshold method, in which luminance value of part of image of pattern to-be-inspected other than part of the profile is used as bottom of the profile, the pattern to-be-inspected, which is a negative pattern in a wiring layer and has the larger line width than the electron beam spot size, is used. However, in the case where the pattern to-be-inspected, which is a negative pattern in a wiring layer and has the larger line width than the electron beam spot size, does not exist, the method cannot be used. In this case, a method of correcting a profile by using an inverse filter can be used.

The method of correcting a profile by using an inverse filter is performed by the following procedure:

1. The edge shift quantity $W_{beam}$ caused by the electron beam spot size is obtained. As described in the above-mentioned 5.5.3 Method of correcting contour and Methods of reducing noise on contour, the edge shift quantity $W_{beam}$ caused by the electron beam spot size is obtained by the following equation:

$$W_{beam} = (W_{measure} - W_{standard})/2$$

where a line width $W_{standard}$ means a standard line width and a line width $W_{measure}$ means a line width obtained by measuring a pattern to-be-inspected having a standard line width. The line width $W_{measure}$ is obtained by using another specimen that has a line width larger than the electron beam spot size.

In the case where intensity of the electron beam forms the normal distribution and the coefficient k in FIG. 76 is equal to 0.5, the intensity of the electron beam is expressed by the following equation, which is a point spread function PSF:

$$\exp(-\alpha \cdot x^2)$$

where $\alpha$ is a constant that satisfies the following equation:

$$\exp(-\alpha(W_{beam}/L_{pixel})^2) = 0.5$$

where $L_{pixel}$ means a pixel interval, a position x=0 means a center of the beam, a position x=1 means a position shifted from the center of the beam by the pixel interval $L_{pixel}$ in the right direction, and a position x=−1 means a position shifted from the center of the beam by the pixel interval $L_{pixel}$ in the left direction.

2. An inverse filter is obtained. In this embodiment, the wiener filter is used, however, another inverse filter may be used. First, the point spread function PSF is processed by the discrete Fourier transformation.

$$F(k) = \sum_{x=0}^{N-1} \exp(-\alpha \cdot x^2) \exp(-2\pi i x k / N)$$

where N is the number of data, which is given to the discrete Fourier transformation. Next, coefficients of the inverse filter are obtained by the following discrete inverse Fourier transformation:

$$W(x) = \frac{1}{N} \sum_{k=0}^{N-1} \frac{\overline{F(k)}}{(F(k))^2 + \Gamma} \exp(2\pi i x k / N)$$

where $\Gamma$ is a variable representing noise. A constant experimentally determined is used for the $\Gamma$ in simple usage.

3. The inverse filter is applied to a profile before detecting an edge.

According to this embodiment, even if a pattern to-be-inspected, which is a negative pattern in a wiring layer and has a larger line width than an electron beam spot size, does not exist, deterioration of defect detection accuracy of the pattern to-be-inspected, which is a negative pattern in a wiring layer and has the smaller line width than the electron beam spot size can be prevented. In addition, the position of the edge can be obtained more accurately, because the profile is corrected.

5.9 Method of Extracting Region Suitable for Automatic Image Adjustments

In a long-term inspection, automatic image adjustments, which include automatic contrast brightness adjustment, automatic focus adjustment, automatic astigmatism adjustment, and the like, are required. A region suitable for automatic contrast brightness adjustment and automatic focus adjustment corresponds to a region that includes many horizontal or vertical line segments or ends. If the region that meets the above requirement is obtained from design data, and then the obtained region is used for automatic contrast brightness adjustment and automatic focus adjustment, automatic contrast brightness adjustment and automatic focus adjustment can be efficiently performed. Therefore, it is necessary to provide a method of extracting a region suitable for the automatic contrast brightness adjustment and automatic focus adjustment.

Figure 113:
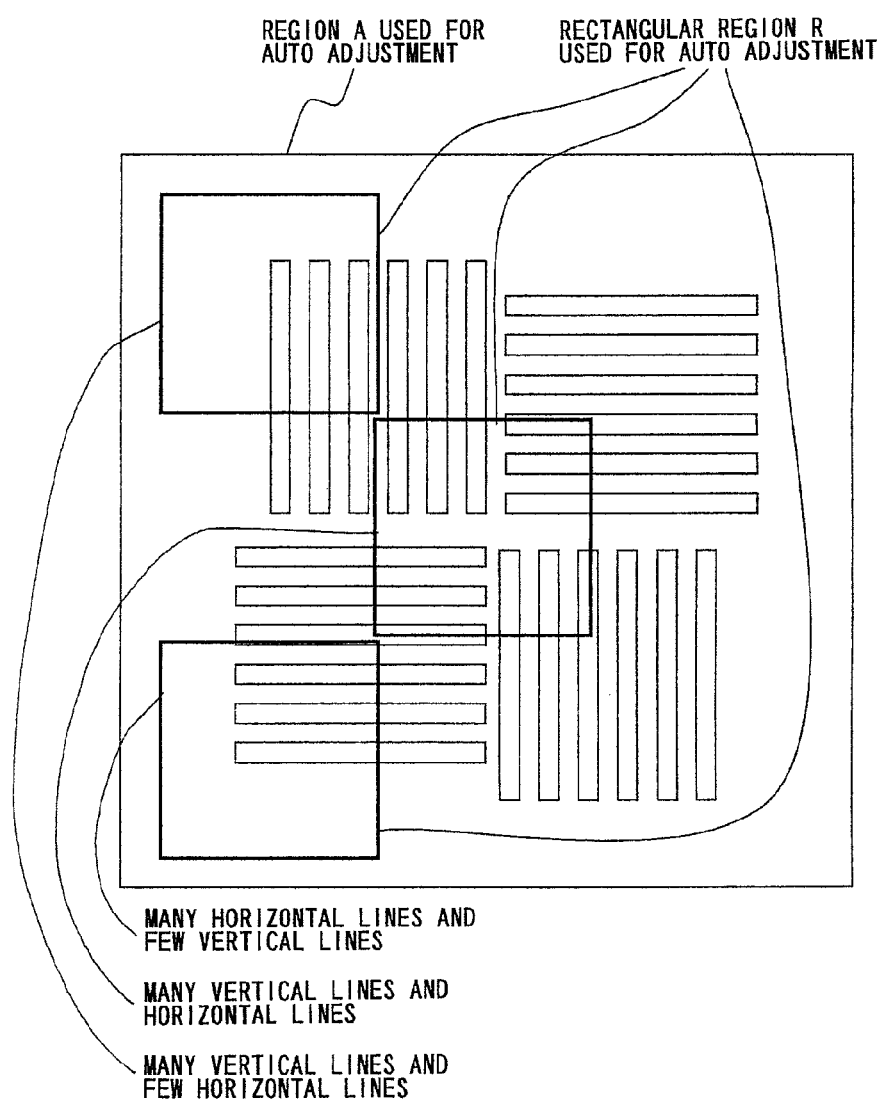

The method is performed by the following procedure using geometrical information of line segments of design data and/or using relationship between line segments of design data that connect or are located closely:

FIG. 113 is a schematic view showing the above method.

1. A size of a rectangular region R used for automatic contrast brightness adjustment and automatic focus adjustment is determined. The size of the rectangular region R is empirically determined.

2. The region A used for automatic contrast brightness adjustment and automatic focus adjustment is determined.

This region A is preferably near the inspection area. The region A is larger than the region R.

3. While moving the region R relative to the region A, the total length of the vertical line segments of design data corresponding to the region R is obtained. In the same manner, the total length of the horizontal line segments is obtained. The smaller one of the total length of the vertical line segments and the total length of the horizontal line segments is taken as an estimated value. In this example, the total length of the line segments is used as geometrical information.

4. The region R having the largest of the estimated values obtained in the above-mentioned step 3 is regarded as the optimal region (which includes many horizontal lines and vertical lines).

The above region R is set into the above-mentioned 3.3 Recipe data "11. The region suitable for automatic contrast brightness adjustment, automatic focus adjustment, and automatic astigmatism adjustment". Automatic contrast brightness adjustment and automatic focus adjustment can be performed timely during inspection using the above registered region R.

Figure 114:
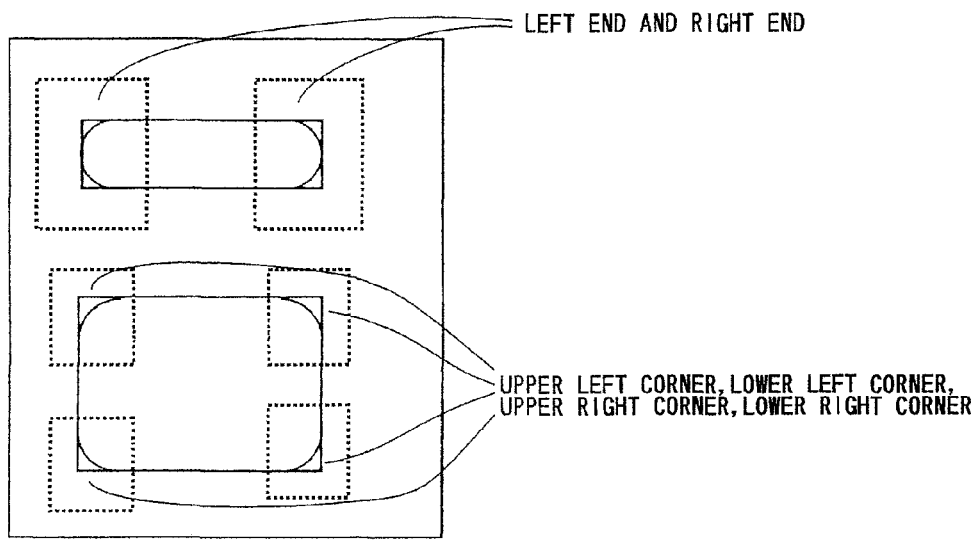

A region suitable for automatic astigmatism adjustment corresponds to a region that includes many line segments with the total length in direction of X direction, Y direction, 45 degree direction, and 135 degree direction being substantially the same. In this case, the procedure is performed in the same manner as the above except for using the total lengths of 45 degree direction and 135 degree direction in addition to the total lengths of X direction and Y direction. If the above region cannot be obtained, partial regions corresponding to ends or corners of design data may be used. In this case, automatic astigmatism adjustment is performed by the following procedure:

First, a region suitable for automatic astigmatism adjustment is obtained. As an example, this region is a region that includes partial regions including a left end and a right end as shown in FIG. 114. As another example, this region is a region that includes partial regions including an upper left corner, a lower left corner, an upper right corner, and a lower right corner as shown in FIG. 114. These regions may be replaced with other regions that include partial regions including an upper end and a lower end, for example. If the above regions are obtained, the regions contain omnidirectional edges, and therefore such regions are suitable for automatic astigmatism adjustment.

Figure 115:
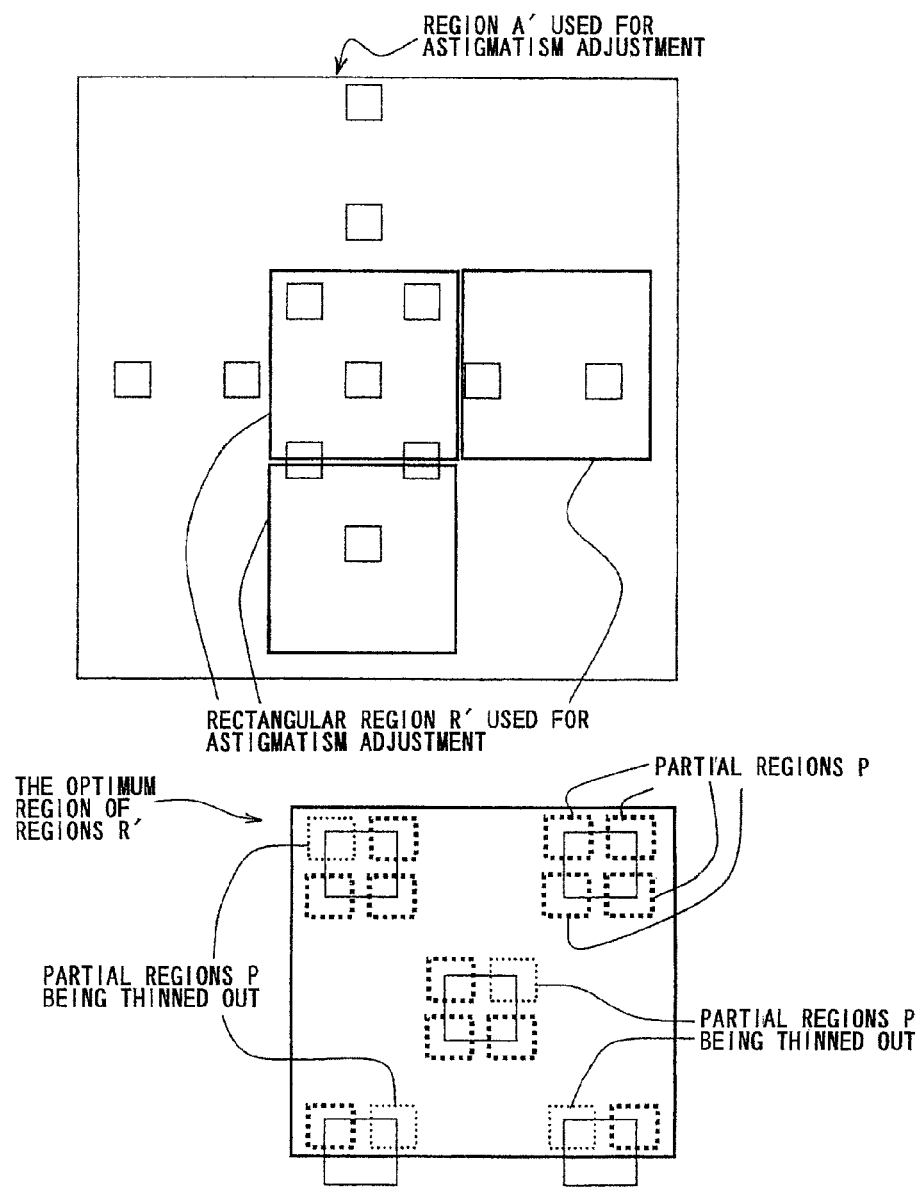

The following procedure that is similar to the procedure for obtaining the region suitable for the above automatic contrast brightness adjustment and automatic focus adjustment is performed. In this example, the procedure that uses upper left corners, lower left corners, upper right corners, and lower right corners will be described by using FIG. 115.

1'. A size of a rectangular region R' used for astigmatism adjustment is determined. The size of the rectangular region R' is empirically determined.

2'. The region A' used for astigmatism adjustment is determined. The region A' is larger than the region R'.

3'. While moving the region R' relative to the region A', the number of the upper left corners of design data corresponding to the region R' is obtained. In the same manner, the number of the lower left corners, the number of the upper right corners, and the number of the lower right corners are obtained. The smallest of the number of the upper left corners, the lower left corners, the number of the upper right corners, and the number of the lower right corners is taken as an estimated value. In this example, the number of corners is used as geometrical information.

4'. The region R' having the largest of the estimated values obtained in the above-mentioned step 3' is regarded as the optimal region (which includes many upper left corners, lower left corners, upper right corners, and lower right corners).

5'. Some corners are thinned out so that the number of the upper left corners, the number of the lower left corners, the number of the upper right corners, and the number of the lower right corners are almost the same.

The corners and their neighborhoods obtained in the above are used as partial regions P.

The rectangular region obtained by the above procedure is set into the above-mentioned 3.3 Recipe data "11. The region suitable for automatic contrast brightness adjustment, automatic focus adjustment, and automatic astigmatism adjustment". Automatic astigmatism adjustment can be performed timely during inspection using the above registered rectangular region. This automatic astigmatism adjustment is performed by the following procedure:

1. Automatic focus adjustment is performed.

2. The matching between an image of a pattern to-be-inspected and a reference pattern corresponding to the region R' suitable for automatic astigmatism adjustment is performed.

3. The evaluation value of astigmatism is obtained from partial images of the image of the pattern to-be-inspected corresponding to the partial regions P included in the region R'.

4. The above-mentioned step 2 and step 3 are performed while varying a value of astigmatism.

5. A value of astigmatism corresponding to an optimal evaluation value of astigmatism obtained in the above-mentioned step 4 is taken as an optimal astigmatism value.

According to this embodiment, the region suitable for automatic image adjustments can be extracted automatically and optimally. Further, in the case of using the partial regions of the image of the pattern to-be-inspected as the regions to-be-recognized, automatic image adjustments may be more accurately performed than in the case where the whole image of the pattern to-be-inspected is used.

5.10 Method of Adjusting Time-Dependence Variation in Setting Value of Image Generation Device In the case of long-term inspection, it may be necessary to adjust a setting value of the image generation device 7 in real time. In such case, a method, in which the most suitable setting value of the image generation device 7 is estimated and the setting value of the image generation device 7 is adjusted by using the estimated setting value, can be used.

In this embodiment, the method, in which brightness adjustment is used, will be described. In the case of converting the intensity of the secondary electrons into a digital value, a brightness value is adjusted, so that a range of a histogram of the converted intensity of the secondary electrons does not exceed a range between 0 and 255.

Figure 116:
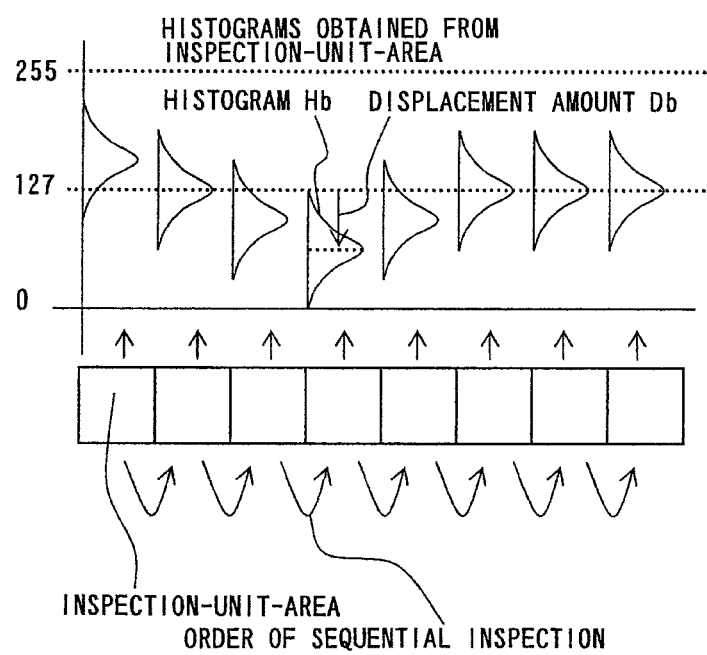

FIG. 116 is a schematic view showing an example of the case in which intensity of the secondary electrons from inspection-unit-areas has gradually decreased according to a sequential inspection. The minimum value of converted intensity of the secondary electrons in a histogram Hb is nearly equal to 0. If the intensity of the secondary electrons continuously decreases, the minimum value of the converted intensity of the secondary electrons becomes less than 0 in course of time. In such case, brightness adjustment is performed in the following procedure:

1. A ratio $R_{Bright}$ of a setting value of a bias of the secondary electron detector 330 to a displacement quantity of the converted intensity of the secondary electrons is determined beforehand. The setting value of the bias of the secondary electron detector 330 is a setting value used in the brightness adjustment.

2. A displacement quantity Db from 127, which is a central value of the histogram Hb, to an average value of the minimum value and maximum value of the converted intensity of the secondary electrons is obtained. In the case of using an average of a previously specified number of the displacement quantities Db obtained from the latest inspected inspection-unit-areas or using a moving average of those, the brightness adjustment is robust against sporadic variation in the intensity of the secondary electrons.

3. The setting value of the bias of the secondary electron detector 330 is increased by $(-Db/R_{Bright})$ The ratio $R_{Bright}$ may be changed in real time by using the following equation:

$$R_{Bright}=(Db-Db_0)/\delta M$$

where $Db_0$ is displacement quantity Db used in the previous brightness adjustment, and $\delta M$ is an increase value of the setting value of the bias of the secondary electron detector 330 used in the previous brightness adjustment.

In this embodiment, the method, in which the brightness adjustment is performed by using intensities of the secondary electrons from whole inspection-unit-areas, is described. However, the brightness adjustment can be more robust by using the intensities of the secondary electrons obtained from inspection-unit-areas, which are suitable for automatic brightness adjustment. The inspection-unit-areas, which are suitable for automatic brightness adjustment, are selected by using the method described in the above-mentioned 5.9 Method of extracting region suitable for automatic image adjustments. Further, sub-inspection-unit-areas can be used instead of using inspection-unit-areas. The sub-inspection-unit-area is defined as an area made by dividing an inspection-unit-area.

In this embodiment, the method, in which the brightness adjustment is used, is described, however, a method, in which contrast adjustment or the like is used, may be used.

According to this embodiment, because a variation in setting value such as a brightness value of the image generation device 7 can be adjusted in real time, accuracy of a measurement value is improved. Further, because the state of the image generation device 7 can be monitored in real time, reliability of the measurement value is improved by replacing a measurement value, which has been measured in an inadequate state of the image generation device 7, with a new measured value.

5.11 Method of Deforming Reference Pattern by Using Pattern Deformation Quantities Obtained from Pattern to-be-Inspected A part of a pattern to-be-inspected fabricated by a stepper under a focus condition and an exposure dose condition, which are different from the optimal conditions, may be deformed more than an allowable deformation quantity. In such case, pattern deformation quantities cannot be obtained from the above-mentioned part.

In order to solve this problem, a method of deforming a reference pattern by using pattern deformation quantities obtained from a pattern to-be-inspected can be used. One of an end, a line part, a part that is liable to cause open, and a part that is liable to cause bridge, of a reference pattern is an object that may be deformed.

FIGS. 117A, 117B, 117C, and 117D are schematic views showing a method of deforming an end of a reference pattern. In FIGS. 117A, 117B, 117C, and 117D, each bold line represents a reference pattern, each straight line represents edges of a pattern to-be-inspected, and each dotted line, whose one side has an arrow, represents the vector d(x,y) between the two edges. A location shown by a dotted line, whose both sides have arrows, represents a part, where the vector d(x,y) between the two edges cannot be obtained. Specifically, the part represents a part of a pattern to-be-inspected deformed more than an allowable deformation quantity. As shown in FIG. 117A, an end tends to shrink more than a line part. Further, as shown in FIG. 117B, an end tends to dilate more than a line part.

In the case shown in FIG. 117A, the vector d(x,y) obtained from immediately in front of a part, where the vector d(x,y) between the two edges cannot be obtained, exists inside of the reference pattern. Therefore, the vectors d(x,y) in the part, where the vectors d(x,y) between the two edges cannot be obtained, are expected to exist inside of the reference pattern. In this case, the vectors d(x,y) can be obtained by shifting the end in the rightward direction. In the same manner, in the case shown in FIG. 117B, the end should be shifted in the leftward direction, in the case shown in FIG. 117C, the end should be shifted in the leftward direction, and in the case shown in FIG. 117D, the end should be shifted in the rightward direction. A shift amount is taken as a nearly equal value to an allowable pattern deformation quantity.

If the vectors d(x,y) cannot be obtained sufficiently, the above method is applied repeatedly. If the number of the vectors d(x,y), which have not been obtained, does not decrease, the above method is applied, with the shift amount being inverted or changed.

The above method can be used for a line part. In the above-mentioned 5.3 Method of inspecting patterns requiring signal intensity correction, a pattern to-be-inspected corresponding to the proximate line segment or a remote line segment may be deformed differently from other line segments.

The case where a method of deforming a line part of a reference pattern by using the remote segment shown in FIG. 91 will be described. FIG. 118 is a schematic view showing a method of deforming a line part of a reference pattern. In the case shown in FIG. 118, the vector d(x,y) obtained from immediately in front of a part, where the vector d(x,y) between the two edges cannot be obtained, exists inside of the reference pattern. Therefore, the vectors d(x,y) in the part, where the vectors d(x,y) between the two edges cannot be obtained, are expected to exist inside of the reference pattern. In this case, the vectors d(x,y) can be obtained by shifting the remote segment in the leftward direction. The proximate line segment should be processed in the same manner.

Figure 119A:
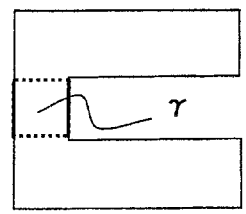
Figure 119B:
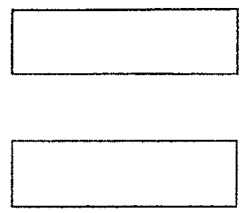
Figure 119C:
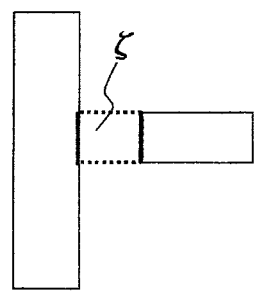
Figure 119D:
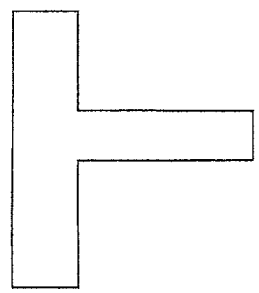

FIGS. 119A, 119B, 119C, and 119D are schematic views showing a method of deforming a part of a reference pattern that is liable to cause open, and a part that is liable to cause bridge. The rectangle γ shown in FIG. 119A, which means a part that is liable to cause open, is identical to the rectangle γ shown in FIG. 88; and the rectangle ζ shown in FIG. 119C, which means a part that is liable to cause bridge, is identical to the rectangle ζ shown in FIG. 88. In the case where a pattern to-be-inspected corresponding to the rectangle ζ is open state, a reference pattern is divided by removing the rectangle ζ. The obtained reference pattern is shown in FIG. 119B. In the case where a pattern to-be-inspected corresponding to the rectangle γ is bridge state, a reference pattern is merged by adding the rectangle γ. The obtained reference pattern is shown in FIG. 119D.

According to this embodiment, a deformation quantity of a pattern to-be-inspected, which is more than an allowable deformation quantity, can be obtained. Therefore, matching can be performed by using a pattern to-be-inspected, which is deformed by more than an allowable deformation quantity.

Further, a contour of a pattern to-be-inspected, which is deformed by more than an allowable deformation quantity, can be obtained.

As described above, the present invention offers the following advantages:

1. Because the edge placement errors going round the pattern-to-be-inspected are used, the clipping process is not necessary. The edge placement error means the vectors between the edge of the image of the pattern to-be-inspected and the edge of the reference pattern that correspond. Further, because the edge placement errors existing in a larger part than the line part are used to obtain the statistics of the deformation quantities, information having less error can be obtained and information, such as information with regard to a curvilinear part, can be obtained. Furthermore, repeatability of the statistics of the deformation quantities can be obtained by counterbalancing a variation in the measurement values caused by measurement.

2. Bridge state of a pattern to-be-inspected, which is a negative pattern in a wiring layer, can be detected in higher speed. In addition, by obtaining a bottom of a profile from a pattern to-be-inspected, which is a negative pattern in a wiring layer and has a larger line width than an electron beam spot size, deterioration of defect detection accuracy of the pattern to-be-inspected, which is a negative pattern in a wiring layer and has the smaller line width than the electron beam spot size can be prevented.

3. Even if a pattern to-be-inspected, which is a negative pattern in a wiring layer and has a larger line width than an electron beam spot size, does not exist, deterioration of defect detection accuracy of the pattern to-be-inspected, which is a negative pattern in a wiring layer and has the smaller line width than the electron beam spot size can be prevented. In addition, the position of the edge can be obtained more accurately, because the profile is corrected.

4. Overlay error distribution can be obtained by obtaining overlay error of a pattern to-be-inspected fabricated by double exposure method, and the obtained overlay error distribution can be used for controlling the local overlay error over the entire semiconductor device. Further, nuisance defect can be reduced by using a reference pattern, which is made by applying circles to a polygon that is obtained by the Boolean OR operation on the polygons in the design data with regard to the double exposures. In this case, a radius of circles applied to corners with regard to vertices created by the Boolean OR operation is made smaller than a radius of circles applied to other corners. Furthermore, although complex calculation and calculation cost are required, corner round can be represented more correctly by using a result of the Boolean OR operation on reference patterns obtained from the design data with regard to the double exposures.

5. Because a variation in setting value such as a brightness value of an image generation device with time can be adjusted in real time, accuracy of a measurement value is improved. Further, because the state of the image generation device can be monitored in real time, reliability of the measurement value is improved by replacing a measurement value, which has been measured in an inadequate state of the image generation device, with a new measured value.

6. A method of controlling OPC patterns of gates by using a line width and space widths on both sides of gates has been used. A gate, which has different space widths on one side, is divided into parts having unique space widths on both sides, and a line width for every divided part of the gate is measured, so that whole gates can be controlled.

7. A deformation quantity of a pattern to-be-inspected, which is more than an allowable deformation quantity, can be obtained. Therefore, matching can be performed by using a pattern to-be-inspected, which is deformed by more than an allowable deformation quantity. Further, a contour of a pattern to-be-inspected, which is deformed by more than an allowable deformation quantity, can be obtained.

What is claimed is:

1. A pattern inspection apparatus for inspecting a pattern to-be-inspected of a semiconductor device by using an image of the pattern to-be-inspected and data for fabricating the pattern to-be-inspected, the pattern inspection apparatus comprising:

an image generation device configured to generate at least one image of an area of the semiconductor device including a pattern to-be-inspected; and a memory storing a plurality of machine readable instructions that when executed perform the steps of:

storing, in the memory, a reference pattern representing patterns formed in the area and generated from fabrication data of the semiconductor device, the reference pattern representing one or both of (i) one or more line segments, and (ii) one or more curves;

storing at least part of the image in the memory;

detecting edges within the image;

obtaining pattern deformation quantities by comparing the detected edges to the reference pattern;

deforming at least one of an end portion of the reference pattern partially inside or outside, a line portion of the reference pattern partially inside or outside, a portion that is liable to cause open circuits of the reference pattern, and a portion that is liable to cause bridging faults of the reference pattern, by using the obtained pattern deformation quantities, where deforming a portion that is liable to cause open circuits of the reference pattern is performed by removing a rectangle, and deforming a portion that is liable to cause bridging faults of the reference pattern is performed by adding a rectangle;

detecting edges within the image again; and comparing the detected edges to the deformed reference pattern to identify the pattern to-be-inspected.

2. A method for inspecting a pattern to-be-inspected of a semiconductor device by using an image of the pattern to-be-inspected and data for fabricating the pattern to-be-inspected, the method comprising:

generating at least one image of an area of the semiconductor device including a pattern to-be-inspected using an electron-beam image generation device;

storing, in a memory, a reference pattern representing patterns formed in the area and generated from fabrication data of the semiconductor device, the reference pattern representing one or both of (i) one or more line segments, and (ii) one or more curves;

storing at least part of the image in the memory;

detecting edges within the image;

obtaining pattern deformation quantities by comparing the detected edges to the reference pattern;

deforming at least one of an end portion, of the reference pattern partially inside or outside, a line portion of the reference pattern partially inside or outside, a portion that is liable to cause open circuits of the reference pattern, and a portion that is liable to cause bridging faults of the reference pattern, by using the obtained pattern deformation quantities, where deforming a portion that is liable to cause open circuits of the reference pattern is performed by removing a rectangle, deforming a portion that is liable to cause bridging faults of the reference pattern is performed by adding a rectangle;

detecting edges within the image again; and
comparing the detected edges to the deformed reference pattern to identify the pattern to-be-inspected.

\* \* \* \* \*